United States Patent [19]
Gai et al.

[11] Patent Number: 5,517,255
[45] Date of Patent: May 14, 1996

[54] LUMINANCE/CHROMINANCE SEPARATING FILTER

[75] Inventors: Toshihiro Gai; Tomonori Ohashi; Miyoichi Watanabe, all of Nagaokakyo, Japan

[73] Assignee: Mitsubishi Denki Kabushiki Kaisha, Tokyo, Japan

[21] Appl. No.: 231,845

[22] Filed: Apr. 25, 1994

[30] Foreign Application Priority Data

Apr. 28, 1993 [JP] Japan ................................ 5-102620

[51] Int. Cl.$^6$ ................................................ H04N 9/78
[52] U.S. Cl. ........................ 348/663; 348/664; 348/666
[58] Field of Search ................................ 348/663, 664, 348/665, 668, 666, 712, 713; 358/31; H04N 9/78

[56] References Cited

U.S. PATENT DOCUMENTS

| | | | |
|---|---|---|---|
| 4,305,091 | 12/1981 | Cooper | 358/36 |
| 4,573,070 | 2/1986 | Cooper | 358/37 |
| 4,803,547 | 2/1989 | Stratton | 358/31 |
| 4,954,885 | 9/1990 | Ito et al. | 358/31 |
| 5,386,244 | 1/1995 | Gai | 348/668 |
| 5,392,075 | 2/1995 | Gai | 348/663 |

FOREIGN PATENT DOCUMENTS

| | | |
|---|---|---|
| 039558 | 12/1990 | Germany . |
| 124698 | 7/1991 | Germany . |
| 2273018 | 6/1994 | United Kingdom . |

OTHER PUBLICATIONS

John P. Rossi, "Digital TV Comb Filter With Adaptive Features", IERE Conf. Proc., pp. 267–282 (1976).
John P. Rossi, "Digital Television Image Enhancement", J. SMPTE, vol. 84, Jul. (1975).

Primary Examiner—James J. Groody
Assistant Examiner—Sherrie Hsia

[57] ABSTRACT

In a YC separating filter, a first horizontal chrominance extraction filter extracts frequency components corresponding to components of a color subcarrier in a horizontal direction to produce a first chrominance signal, a vertical chrominance extraction filter extracts frequency components corresponding to components of a color subcarrier in a vertical direction to produce a second chrominance signal, a horizontal and vertical chrominance extraction filter extracts frequency components corresponding to components of a color subcarrier in horizontal and vertical directions to produce a third chrominance signal, a first selector selects one of the first, second and third chrominance signals, a second horizontal chrominance extraction filter having a narrower bandwidth than the first horizontal chrominance extraction filter is provided to receive the selected chrominance signal, and a second selector selects the output of the second horizontal chrominance extraction filter when the first selector selects either the first or third chrominance signal, and selects the output of the first selector when the first selector selects the second chrominance signal.

74 Claims, 50 Drawing Sheets

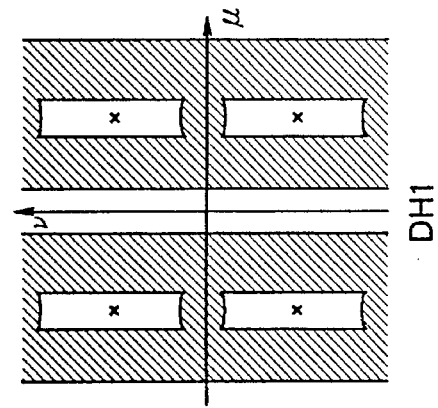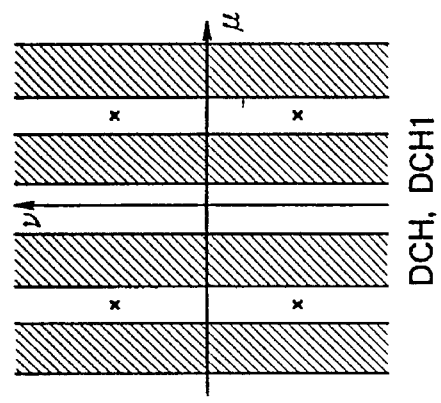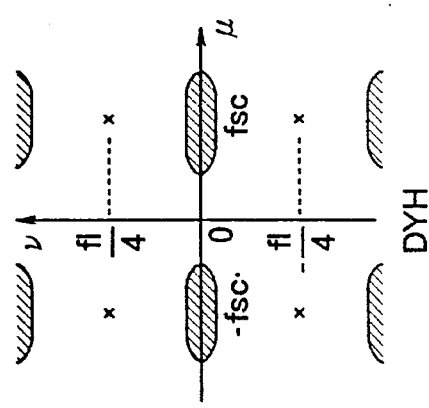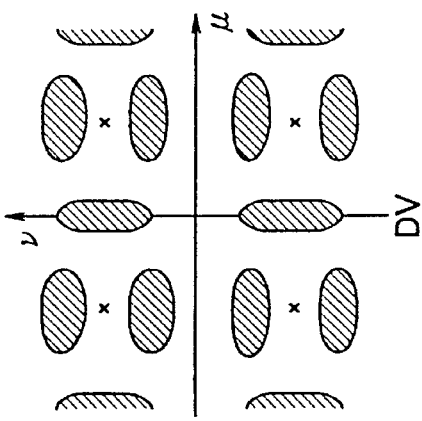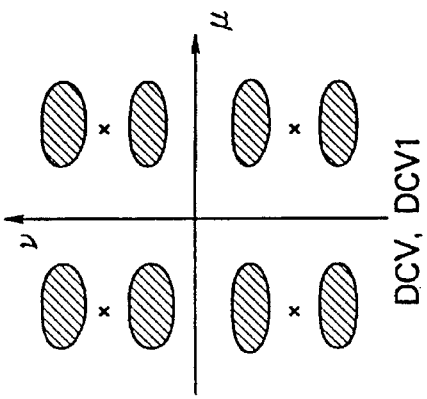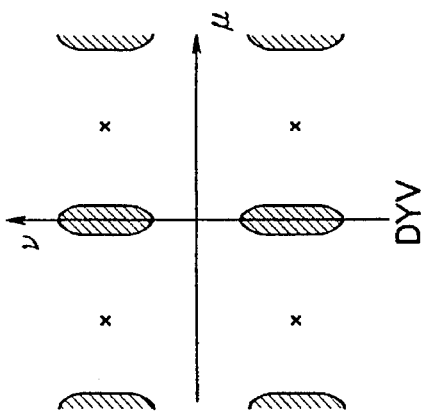

LUMINANCE/CHROMINANCE SEPARATING FILTER

BACKGROUND OF THE INVENTION

The present invention relates to a luminance/chrominance separating filter for separating luminance and chrominance signals from, for example, an NTSC composite color television signal.

FIG. 43 shows an example of a conventional luminance/chrominance separating filter (YC separating filter) with an NTSC composite color television signal applied to the input terminal 11. An A/D converter 12 converts the analog composite color television signal input via the input terminal 11 into a digital signal. The output signal of the A/D converter 12 is applied to a first 1-line delay circuit 13.

The conventional system further comprises a second 1-line delay circuit 14, a compensating delay circuit 19, a vertical chrominance (V-C) extraction filter 15, a horizontal chrominance (H-C) extraction filter 16, a horizontal and vertical chrominance (HV-C) extraction filter 17, a picture non-correlation decision circuit 18, compensating delay circuits 19–22, a selector 23 provided with an output terminal 26, and a subtractor 27 provided with an output terminal 28.

FIG. 11 shows an example of the picture non-correlation decision circuit 18 in FIG. 43. As illustrated, the picture non-correlation decision circuit 18 comprises a horizontal chrominance non-correlation (H-C) energy extractor 29, a horizontal luminance (H-Y) non-correlation energy extractor 30, a vertical chrominance (V-C) non-correlation energy extractor 31, a vertical luminance (V-Y) non-correlation energy extractor 32, maximum value circuits (MAXs) 33–36, comparators 37–39, a decision circuit 40, multipliers 71, 72, 73a, 73b, 74a, 74b, 77, 78, 79a, 79b and 80, and delay circuits 86–89.

The output signal 101 from the A/D converter 12 in FIG. 43 is applied to the horizontal luminance non-correlation energy extractor 30, the vertical chrominance non-correlation energy extractor 31 and the vertical luminance non-correlation energy extractor 32.

In the foregoing, "non-correlation energy" refers to the signal high frequency component arising, depending on the degree of signal variation. As the signal variation is increased, the sharper the high frequency component in the direction of the variation is increased. Thus, the "non-correlation energy" represents the signal high frequency component energy, which can be obtained by extracting the required band (high-frequency band) component through a two dimensional (or one dimensional) filtering process (energy extraction). The required band can be expressed on a two dimensional frequency plane, shown for example in FIG. 44 to FIG. 47.

The output signal 102 of the first 1-line delay circuit 13 is applied to the horizontal chrominance non-correlation energy extractor 29, the horizontal luminance non-correlation energy extractor 30 and the vertical luminance non-correlation energy extractor 32.

The output signal 103 of the second 1-line delay circuit 14 is applied to the horizontal luminance non-correlation energy extractor 30, the vertical chrominance non-correlation energy extractor 31 and the vertical luminance non-correlation energy extractor 32.

The output signal DCH of the horizontal chrominance non-correlation energy extractor 29 is branched in three routes. In the first route, the signal is multiplied by a coefficient b at the multiplier 72 and the resultant signal is sent to the maximum value circuit 33. In the second route, the signal is multiplied by a coefficient f1 at the multiplier 74a and the resultant signal is sent to the maximum value circuit 34. In the third route, the signal is multiplied by a coefficient f2 at the multiplier 74b and the resultant signal is sent to the maximum value circuit 35.

The output signal DYH of the horizontal luminance non-correlation energy extractor 30 is branched in three routes. In the first route, the signal is multiplied by a coefficient a at the multiplier 71 and the resultant signal is sent to the maximum value circuit 34. In the second route, the signal is multiplied by a coefficient e1 at the multiplier 73a and the resultant signal is sent to the maximum value circuit 34. In the third route, the signal is multiplied by a coefficient e2 at the multiplier 73b and the resultant signal is sent to the maximum value circuit 35.

The output signal DCV of the vertical chrominance non-correlation energy extractor 31 is branched in two routes. In the first route, the signal is sent to the comparator 38. In the second route, the signal is multiplied by a coefficient d at the multiplier 78 and the resultant signal is sent to the maximum value circuit 36.

The output signal DYV of the vertical luminance non-correlation energy extractor 32 is branched in two routes. In the first route, the signal is sent to the comparator 39. In the second route, the signal is multiplied by a coefficient c at the multiplier 77 and the resultant signal is sent to the maximum value circuit 36.

The output signal of the maximum value circuit 33 is applied as a first horizontal non-correlation energy DH1 to the comparator 37.

The output signal of the maximum value circuit 34, as a second horizontal non-correlation energy DH21, is multiplied by a coefficient m1 at the multiplier 79a, and is then sent to the comparator 38.

The output signal of the maximum value circuit 35, as a third horizontal non-correlation energy DH22, is multiplied by a coefficient m2 at the multiplier 79b, and is then sent to the comparator 39.

The output of the maximum value circuit 36, as a vertical non-correlation energy DV, is multiplied by a coefficient n, and is then sent to the comparator 37.

The comparator 37 compares the first horizontal non-correlation energy DH1 and the product n·DV obtained by multiplying the vertical non-correlation energy DV by the coefficient n, and produces a high level output signal 116 when DH1 $\geq$ n·DV, and a low level output signal 116 at other times.

The comparator 38 compares the vertical chrominance non-correlation energy DCV and the product m1·DH21 obtained by multiplying the second horizontal non-correlation energy DH21 by the coefficient m1, and produces a high level output signal 117 when DCV $\geq$ m1·DH21, and a low level output signal 117 at other times.

The comparator 39 compares the vertical luminance non-correlation energy DYV and the product m2·DH22 obtained by multiplying the third horizontal non-correlation energy DH22 by the coefficient m2, and produces a high level output signal 118 when DYV $\geq$ m2·DH22, and a low level output signal 118 at other times.

The output signal 116 of the comparator 37 is applied to the delay circuit 86, and the output signal 117 of the comparator 38 is applied to the delay circuit 87.

The output signal 118 of the comparator 39 is applied to the delay circuit 88 and the AND circuit 90, and the output signal 121 of the delay circuit 88 is applied to the delay circuit 89 and the AND circuit 90.

The output signal 122 of the delay circuit 89 is applied to the AND circuit 90. The output signal 119 of the delay circuit 86, the output signal 120 of the delay circuit 87 and the output signal 124 of the AND circuit are applied to the decision circuit 40. The output signal 110 of the decision circuit 40 is then sent out as the output of the picture non-correlation decision circuit 18.

FIG. 48 shows an example of the decision circuit 40 in FIG. 11. The circuit comprises AND circuits 41 and 42, a NOT circuit 43 and a NOR circuit 44. The output signal 119 of the delay circuit 86 is applied to one input of the AND circuit 42 and to the input of the NOT circuit 43. The respective output signals 120 and 123 of the delay circuit 87 and AND circuit 90 are applied to the NOR circuit 44.

The output signal of the NOR circuit 44 is applied to the other input of the AND circuit 42 and to one input of the AND circuit 41. The outpost signal of the NOT circuit 43 is applied to the other input of the AND circuit 41.

The outputs of the AND circuits 41 and 42 form the output signal 110 of the decision circuit 40.

FIG. 49 shows an example of the horizontal chrominance non-correlation energy extractor 29 in FIG. 11. The circuit comprises a delay circuit 45 having a delay equivalent to one period (1/fsc) of the color subcarrier having a frequency fsc, a subtractor 46 and an absolute value circuit (ABS) 47.

The output signal 102 of the first 1-line delay circuit 13 is applied to the delay circuit 45 and one input of the subtractor 46. The output signal of the delay circuit 45 is applied to the other input of the subtractor 46. The output signal of the subtractor 46 is applied to the absolute value circuit 47.

The output of this absolute value circuit 47 forms the horizontal chrominance non-correlation energy.

FIG. 50 shows an example of the horizontal luminance non-correlation energy extractor 30 used in FIG. 11. The circuit comprises a vertical direction lowpass filter (LPF) 48, delay circuits 49 and 50 each having a delay equivalent to ½ the period (½fsc) of the color subcarrier, subtractors 51 and 52, absolute value circuits 53 and 54, and a maximum value circuit 55.

The respective output signals 101, 102 and 103 of the A/D converter 12, the first 1-line delay circuit 13 and the second 1-line delay circuit 14 are applied to the vertical direction lowpass filter 48.

The output signal of the vertical direction lowpass filter 48 is applied to the delay circuit 49 and one input of the subtractor 51. The output signal of the delay circuit 49 is applied to the delay circuit 50, the other input of the subtractor 51 and one input of the subtractor 52. The output signal of the delay circuit 50 is applied to the other input of the subtractor 52.

The output signal of the subtractor 51 is applied to the absolute value circuit 53 and the output signal of the absolute value circuit 53 is applied to the maximum value circuit 55. The output signal of the subtractor 52 is applied to the absolute value circuit 54 and the output signal of the absolute value circuit 54 is applied to the maximum value circuit 55.

The output signal of the maximum value circuit 55 forms the output DYH of the horizontal luminance non-correlation energy extractor 30.

FIG. 51 shows an example of the vertical chrominance non-correlation energy extractor 31 in FIG. 11. The circuit comprises horizontal bandpass filters (BPFs) 56 and 57, a subtractor 58 and an absolute value circuit 59.

The output signal 101 of the A/D converter 12 is applied to the horizontal bandpass filter 56. The output signal 103 of the second 1-line delay circuit 14 is applied to the horizontal bandpass filter 57. The output signal of the horizontal bandpass filter 56 is applied to one input of the subtracter 58, while the output signal of the horizontal bandpass filter 57 is applied to the other input of the subtracter 58. The output signal of the subtracter 58 is applied to the absolute value circuit 59. The output signal of the absolute value circuit 59 forms the output DCV of the vertical chrominance non-correlation energy extractor 31.

FIG. 52 shows an example of the vertical luminance non-correlation energy extractor 32 used in FIG. 11. The circuit comprises horizontal lowpass filters 60, 61 and 62, subtracters 63 and 64, absolute value circuits 65 and 66, and a maximum value circuit 67.

The output signal 101 of the A/D converter 12 is applied to the horizontal lowpass filter 60. The output signal 102 of the first 1-line delay circuit 18 is applied to the horizontal lowpass filter 61. The output signal 103 of the second 1-line delay circuit 14 is applied to the horizontal lowpass filter 62.

The output signal of the horizontal lowpass filter 60 is applied to one input of the subtractor 63. The output signal of the horizontal lowpass filter 61 is applied to the other input of the subtractor 63 and to one input of the subtractor 64. The output signal of the horizontal lowpass filter 62 is applied to the other input of the subtractor 64.

The output signal of the subtractor 63 is applied to the absolute value circuit 65 and the output signal of the subtractor 64 is applied to the absolute value circuit 66.

The outputs off the absolute value circuits 65 and 66 are applied to the maximum value circuit 67. The output signal of the absolute value circuit 67 forms the output DYV of the vertical luminance non-correlation energy extractor 32.

Following is a description of the principle and operation of the conventional YC separating filter indicated in FIG. 43, FIG. 11, and FIG. 48 to FIG. 52.

When the horizontal frequency $\mu$ and vertical frequency $v$ axes are plotted on a two dimensional plane, the NTSC composite color television signal distribution appears as shown in FIG. 44. This signal distribution takes different forms according to the two dimensional correlation of the picture. For example, if the correlation is weak in the vertical direction, but strong in the horizontal, the signal distribution appears as indicated in FIG. 45. In this case, the chrominance signal can be extracted using a horizontal chrominance extraction filter having a passband as indicated by the shaded rectangles in the figure.

If the correlation is strong in the vertical direction, but weak in the horizontal, the signal distribution appears as indicated in FIG. 46. In this case, the chrominance signal can be extracted using a vertical chrominance extraction filter having a passband as indicated by the shaded rectangles in the figure.

When the correlation is strong in both directions, the signal distribution appears as indicated in FIG. 47. In this case, the chrominance signal can be extracted by using a horizontal and vertical chrominance extraction filter having a passband as indicated by the shaded rectangles in the figure.

As indicated in FIG. 43, in the case of this YC separating filter, selector 23, selects in accordance with the output of the picture non-correlation decision circuit 18, one of the output from the vertical chrominance extraction filter 15, the horizontal chrominance extraction filter 16, and the horizontal and vertical chrominance extraction filter 17.

It will be seen from FIG. 45 that the condition on which the horizontal chrominance extraction filter 16 is selected is that there is much chrominance signal vertical high frequency component (there is much color component in the shaded rectangles) and there is little luminance signal horizontal high frequency component (there is little color component in the shaded rectangles).

It will be seen from FIG. 46 that the condition on which the vertical chrominance extraction filter 15 is selected is that there is much chrominance signal horizontal high frequency component (there is much color component in the shaded rectangles) and there is little luminance signal vertical high frequency component (there is little luminance component in the shaded rectangles).

If neither of the conditions for selecting either of the above horizontal or vertical chrominance signal extraction filters is met, the horizontal and vertical chrominance extraction filter 17 is selected.

Following is a description of the process from derivation of these conditions to the filter selection.

When an NTSC composite color television signal is applied via the input terminal 11, the A/D converter 12 samples this composite color television signal at a sampling frequency fs=4·fsc (fsc is the color subcarrier frequency). The sampled composite color television signal forms a two dimensional arrangement on the screen as indicated in FIG. 53. Since fsc=(455/2)fH, the phase of the chrominance signal C reverses 180 degrees every line and 4 samples per period are taken.

In the figure, Y denotes the luminance signal, C1 and C2 denote chrominance signals having a 180° phase difference, blank circles are Y+C1, shaded circles are Y−C1, blank triangles are Y+C2 and shaded triangles are Y−C2. By passing this composite color television signal through the first and second 1-line delay circuits 13 and 14, the sample value at a specific sampling point and two reference sampling points respectively one line above and one line below the specific sample tag point on the screen are simultaneously extracted. Here the term "specific sampling point" means the sampling point for which the signal processing is made, and the term "reference sampling points" means sampling points which are situated in the neighborhood of the specific sampling point when the sampling points are arranged on a two-dimensional plane corresponding to a display screen used for the display of the picture.

In other words, at the time point the composite color television signal (sample value) S(m, n) at the position of coordinate (m, n) appears at the output 102 of the first 1-line delay circuit 13, the signal (m, n−1) appears at the output 103 of the second 1-line delay circuit 13 and the signal (m, n+1) appears at the output 101 of the A/D converter 12.

The signal 102 is applied to the horizontal chrominance extraction filter 16. This signal 102 and the other two signals 101 and 103 are respectively applied to the vertical chrominance extraction filter 15, the horizontal and vertical chrominance extraction filter 17, and the picture non-correlation decision circuit 18.

Using Z conversion, 1-sample delay and 1-line delay can be expressed by $Z^{-1}$ and $Z^{-L}$, respectively. In this case, $$Z^{-1}=\exp(-j2\pi f/4fsc)$$

Also, since fsc=(455/2), L=910. For example, in this case, the transfer function of the vertical chrominance extraction filter 15 is expressed as follows.

$$Cv(Z)=(-¼)(1-Z^{-L})^2$$

The transfer function of the horizontal chrominance extraction filter 16 is expressed as follows.

$$Ch(Z)=(-¼)(1-Z^{-2})^2$$

The transfer function of the horizontal and vertical chrominance extraction filter 17 is expressed as follows.

$$Chv(Z)=(-¼)(1-Z^{-2})^2 \cdot (-¼)(1-Z^{-L})^2$$

The output signal 106 of the vertical chrominance extraction filter 15 is supplied as the output signal 107 of the compensating delay circuit 20 to the selector 23. The output signal 108 of the horizontal chrominance extraction filter 16 is supplied as the output signal 109 of the compensating delay circuit 21 to the selector 23. The output signal 110 of the horizontal and vertical chrominance extraction filter 17 is supplied as the output signal 111 of the compensating delay circuit 22 applied to the selector 23.

The vertical and horizontal picture non-correlation of a specific sampling point is detected and the selector 23 functions in the following manner.

When the horizontal non-correlation is particularly strong, the output signal 107 of the compensating delay circuit 20 to which the output signal 106 of the vertical chrominance extraction filter 15 is supplied is selected. When the vertical non-correlation is particularly strong, the output signal 109 of the compensating delay circuit 21 to which the output signal 108 of the horizontal chrominance extraction filter 16 is selected. At other times, the output signal 111 of the compensating delay circuit 22 to which the output signal 110 of the horizontal and vertical chrominance extraction filter 17 is supplied is selected.

The detection of the picture non-correlation and control over the selector 23 are performed by the picture non-correlation decision circuit 18. This picture non-correlation decision circuit 18 operates in the following manner to control the selector.

The horizontal chrominance non-correlation energy represented DCH(Z), the horizontal luminance non-correlation energy DYH(Z), the vertical chrominance non-correlation energy DCV(Z) and the vertical luminance non-correlation energy DYV(Z) can be expressed as follows.

$$DCH(Z)=|1-Z^{-4}|$$

$$DYH(Z)=\max\{|(¼)\cdot(1+Z^{-L})^2\cdot(1-Z^{-2})|, |(¼)\cdot(1+Z^{-L})^2\cdot(Z^{-2}-Z^{-4})|\}$$

$$DCV(Z)=|(-¼)\cdot(1-Z^{-2})^2\cdot(1-Z^{-2L})|$$

$$DYV=\max\{|(¼)\cdot(1+Z^{-2})^2(1-Z^{-L})|, |(¼)\cdot(1+Z^{-2})^2\cdot(Z^{-L}-Z^{-2L})|\}$$

The first horizontal non-correlation energy DH1, the second horizontal non-correlation energy DH21, the third horizontal non-correlation energy DH22 and the vertical non-correlation energy DV can be expressed as follows.

$$DH1=\max(a\cdot DYH, b\cdot DCH)$$

$$DH21=\max(e1\cdot DYH, f1\cdot DCH)$$

$$DH22=\max(e2\cdot DYH, f2\cdot DCH)$$

$$DV=\max(c\cdot DYV, d\cdot DCV)$$

At the comparator 37, DH1 and n·DV are compared. If $$DH1 \geq n\cdot DV$$

the horizontal non-correlation is interpreted as strong, and a "1" signal 116 is sent to the delay circuit 86. If $$DH1 < n \cdot DV$$

the horizontal non-correlation is interpreted as weak, and a "0" signal 116 is sent to the delay circuit 86. This signal 116 is delayed ½fsc by the delay circuit 86 and is sent as the signal 119 to the decision circuit 40.

At the comparator 88, DCV and m1·DH21 are compared. If $$DCV \geq m1 \cdot DH21$$

the vertical non-correlation is interpreted as strong, and a "1" signal 117 is sent to the delay circuit 87. If $$DCV < m1 \cdot DH21$$

the horizontal non-correlation is interpreted as weak, and a "0" signal 117 is sent to the delay circuit 87. The signal 117 delayed ½fsc by the delay circuit 87 is sent as a signal 120 to the decision circuit 40.

At the comparator 39, DYV and m2·DH22 are compared. If $$DYV \geq m2 \cdot DH22$$

the vertical non-correlation is interpreted as strong, and a "1" signal 118 is sent to the delay circuit 88 and the AND circuit 90. If $$DYV < m2 \cdot DH22$$

the vertical non-correlation is interpreted as weak, and a "0" signal 118 is sent to the delay circuit 88 and the AND circuit 90.

The output signal 121 of the delay circuit 88 is sent to the delay circuit 89 and the AND circuit 90. The output signal 122 of the delay circuit 89 is sent to the AND circuit 90. The output signal 123 of the AND circuit 90 is applied to the decision circuit 40.

According to the results or the above correlation detection, the decision circuit 40 controls the selector 23 in the following manner. That is, the relationship between the input signals 119, 120 and 123 of the decision circuit 40 and the selection of the chrominance output signal 107, 109 or 111 at the selector 23 is as shown in Table 1.

TABLE 1

| Output 119 of Delay Circuit 86 | Output 120 of Delay Circuit 87 | Output 123 of Delay Circuit 90 | Output 1120 of Decision Circuit 40 | | Chrominance Output 113 Selected by Selector 23 |
|---|---|---|---|---|---|
| | | | Output 110a of AND 41 | Output 110b of AND 42 | |
| 0 | 0 | 0 | 1 | 0 | 111 |
| 0 | 0 | 1 | 0 | 0 | 109 |
| 0 | 1 | 0 | 0 | 0 | 109 |
| 0 | 1 | 1 | 0 | 0 | 109 |
| 1 | 0 | 0 | 0 | 1 | 107 |
| 1 | 0 | 1 | 0 | 0 | 109 |
| 1 | 1 | 0 | 0 | 0 | 109 |
| 1 | 1 | 1 | 0 | 0 | 109 |

When the output signal 110a of the AND circuit 41 and the output signal 110b of the AND circuit 42 are both "0", the selector 23 selects the output: signal 109 of the compensating delay circuit 21. When the output signal 110a of the AND circuit 41 is "0" and the output signal 110b of the AND circuit 42 is "1", the selector 23 selects the output signal 107 of the compensating delay circuit 20. When the output signal 110a off the AND circuit 41 is "1" and the output signal 110b of the AND circuit 42 is "0", the selector 23 selects the output signal 111 of the compensating delay circuit 22.

Consequently, in this example, the overall C(z) response of the filter for extracting the chrominance signal to be output at the output terminal 26 is switched as follows according to the presence or absence of correlation. When the vertical non-correlation is strong:

$$C(Z) = Ch(Z)$$

When the horizontal non-correlation is strong:

$$C(Z) = Cv(Z)$$

If neither of these conditions are met:

$$C(Z) = Chv(Z)$$

In the conventional YC separating filter described above, the luminance signal Y and the chrominance signal C are separated by adaptively selecting one of the horizontal filter, the vertical direction filter, and the horizontal and vertical direction filter. As a result, in areas where the picture horizontal or vertical direction luminance or chrominance signal variation is sharp, e.g., in areas at the boundary between different color regions, such as at an edge of a color bar signal, picture quality impairment such as dot crawl (due to leakage of the chrominance signal component into the luminance signal) does not occur. However, the conventional YC separating filter described above is associated with the problems of considerable cross color (due to leakage of high frequency luminance components into chrominance signal areas), particularly at the areas where the picture includes inclined fine stripes or gratings, and the diagonal resolution is insufficiently high.

SUMMARY OF THE INVENTION

An object of the invention is to resolve the problems mentioned above.

Another object of the invention is to provide a luminance/chrominance separating filter which can perform accurate luminance/chrominance separation even when sharp variations occur in the television signal, and which is associated with less cross color and smaller diagonal resolution impairment.

A luminance/chrominance separating filter according to the present invention is for separating a composite color television signal into a luminance signal and a chrominance signal, and comprises:

means (13, 14, 13a, 14a) for producing sample values of a specific sampling point and a plurality of reference sampling points of the composite color television signal, said reference sampling points which are situated in the neighborhood of the sampling points when the sampling points are arranged on a two-dimensional plane corresponding to a display screen;

a first horizontal chrominance extraction filter (16) for extracting, from said sample value of said specific and reference sampling points, frequency components corresponding to components of a color subcarrier in a horizontal to produce a first chrominance signal (107);

a vertical chrominance extraction filter (15) for extracting, from said sample values of said specific and reference sampling points, frequency components corresponding to components of a color subcarrier in a vertical direction to produce a second chrominance signal (108);

a horizontal and vertical chrominance extraction filter (17) for extracting, from said sample values of said specific and reference sampling points, frequency components corresponding to components of a color subcarrier in horizontal and vertical directions to produce a third chrominance signal (110);

a first selector (23) for selecting one of said first, second and third chrominance signals;

a second horizontal chrominance extraction filter (24, 24a) receiving said selected chrominance signal and having a narrower bandwidth than said first horizontal chrominance extraction filter (16); and a second selector (25, 25a) receiving the output of said second horizontal chrominance extraction filter (24, 24a) and the output of said first selector (23), and selecting said output of said second horizontal chrominance extraction filter (24, 24a) when said first selector selects either said first or third chrominance signal, and selecting said output of said first selector (23) when said first selector selects said second chrominance signal.

The luminance/chrominance separating filter may further comprises:

a picture non-correlation decision circuit (18) responsive to the sample values of said specific and reference sampling points for detecting non-correlation in the horizontal direction and non-correlation in the vertical direction of said sample values and outputting a chrominance signal selection signal;

wherein said first selector (23) selects said one of the first to third chrominance signals on the basis of said chrominance signal selection signal;

wherein said picture non-correlation decision circuit (18) comprises:

a horizontal chrominance non-correlation energy extractor (29, 129) responsive to the sample values of said specific and reference sampling points for extracting horizontal chrominance non-correlation energy (DCH) consisting primarily of the chrominance signal extending in the horizontal direction;

a horizontal luminance non-correlation energy extractor (30) responsive to the sample values of said specific and reference sampling points for extracting horizontal luminance non-correlation energy (DYH) consisting primarily of the luminance signal extending in the horizontal direction;

a vertical chrominance non-correlation energy extractor (31, 131) responsive to the sample values of said reference sampling points for detecting vertical chrominance non-correlation energy (DCV) consisting primarily of the chrominance signal extending in the vertical direction;

a vertical luminance non-correlation energy extractor (32) responsive to the sample values of said specific and reference sampling points for detecting vertical luminance non-correlation energy (DYV) of consisting primarily of the luminance signal extending in the vertical direction; and judging means (33–36, 37–39, 40) responsive to the outputs or said horizontal chrominance non-correlation energy extractor (29, 129), said horizontal luminance non-correlation energy extractor (30), said vertical chrominance non-correlation energy extractor (31, 131) and said vertical luminance non-correlation energy extractor (32) for determining which of the horizontal and vertical non-correlations is stronger, causing said first chrominance signal selecting means (23) to select said first chrominance signal when the vertical non-correlation is strong, to select said second chrominance signal when the horizontal non-correlation is strong, and to select said third chrominance signal when neither of above conditions is met, and causing said second chrominance signal selector (25, 25a) to select-the output of said second horizontal chrominance extraction filter (24) when said first selector selects either said first or third chrominance signal.

With the above arrangement, dot crawl is avoided in areas where the variation in the picture in the horizontal or vertical direction is sharp.

The output of said second selector (25) may be used for calculation with the composite video signal to produce an output luminance signal. The calculation may be accomplished by providing a subtractor (27) for subtracting the output of said second selector (25) from said composite video signal to produce said output luminance signal.

With the above arrangement, the second horizontal chrominance non-correlation extraction filter is used for Further band-limiting the chrominance signal used for determining the luminance signal, so that the diagonal. resolution call be improved.

The output of said second selector (25a) may alternatively be used as an output chrominance signal. In such a case, there may be further provided a subtractor (27) for subtracting the output of said first selector (23) from the composite video signal to produce an output luminance signal.

With the above arrangement, the second horizontal chrominance non-correlation extraction filter is used for Further band-limiting the output chrominance signal, so that cross color can be further reduced.

The horizontal chrominance non-correlation energy extractor may comprise first and second horizontal chrominance non-correlation energy extractors.

With the above arrangement, cross colors appearing with the inclined stripes or gratings can be restrained.

The picture non-correlation decision circuit may be additionally provided with delay circuits and an AND circuit to receive the outputs of the comparators comparing the non-correlation energies with each other.

With the above arrangement, it is possible to avoid degradation in the horizontal resolution.

The judging means may comprise four maximum value circuits. With the above arrangement, the non-correlation can be detected without being affected by the noise components.

The judging means may alternatively comprise one or more maximum value circuits and one or more adders in combination. With the above arrangement, accurate non-correlation detection is achieved where the non-correlation of the luminance signal and the non-correlation of the chrominance signal are both strong.

BRIEF DESCRIPTION OF THE DRAWINGS

FIG. 5A to FIG. 5C are diagrams showing the frequency distributions of the signals representing non-correlation energy at the outputs of various circuits.

FIG. 6A to FIG. 6C arc diagrams showing the frequency distributions of the signals representing non-correlation energy at the outputs of various circuits.

DETAILED DESCRIPTION OF THE PREFERRED EMBODIMENTS

Following is a description of Embodiment 1 to Embodiment 64.

Embodiment 1

Figure 1:
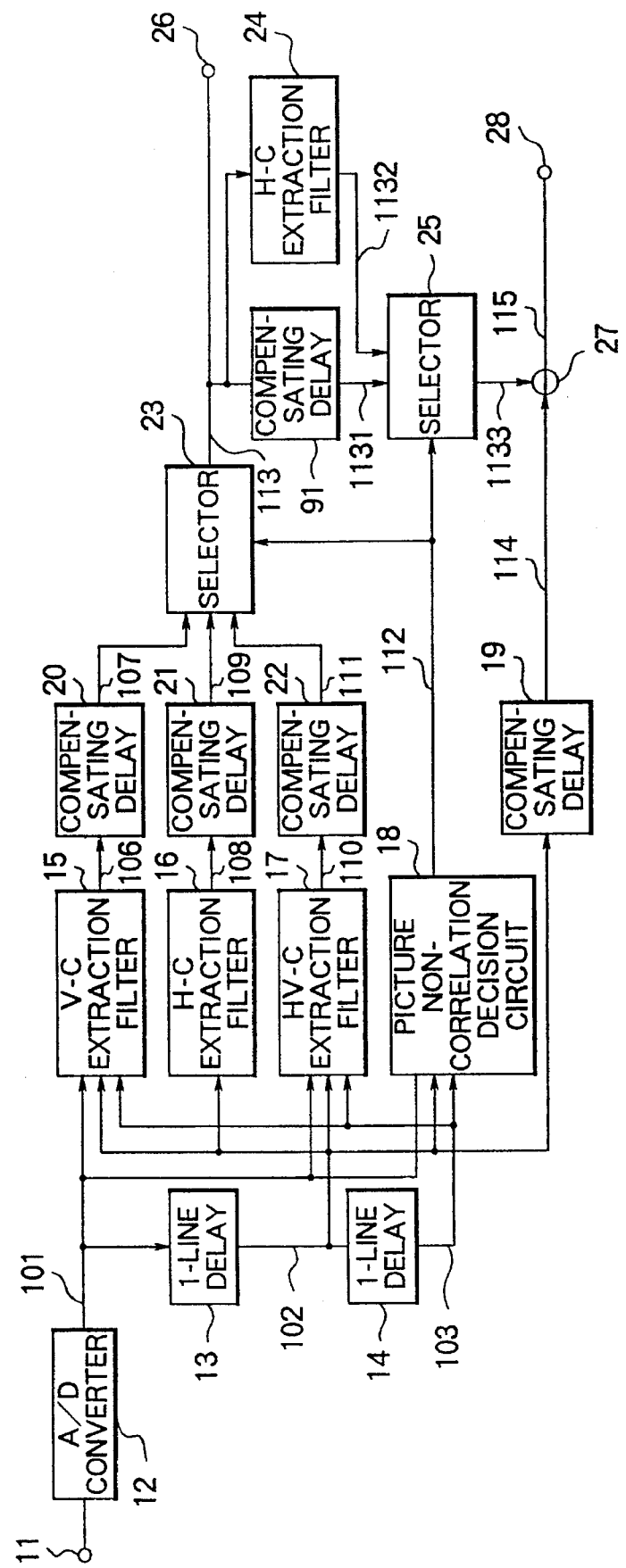
FIG. 1 is a block diagram showing a luminance/chrominance separating filter of an embodiment of the present invention.
Figure 53:
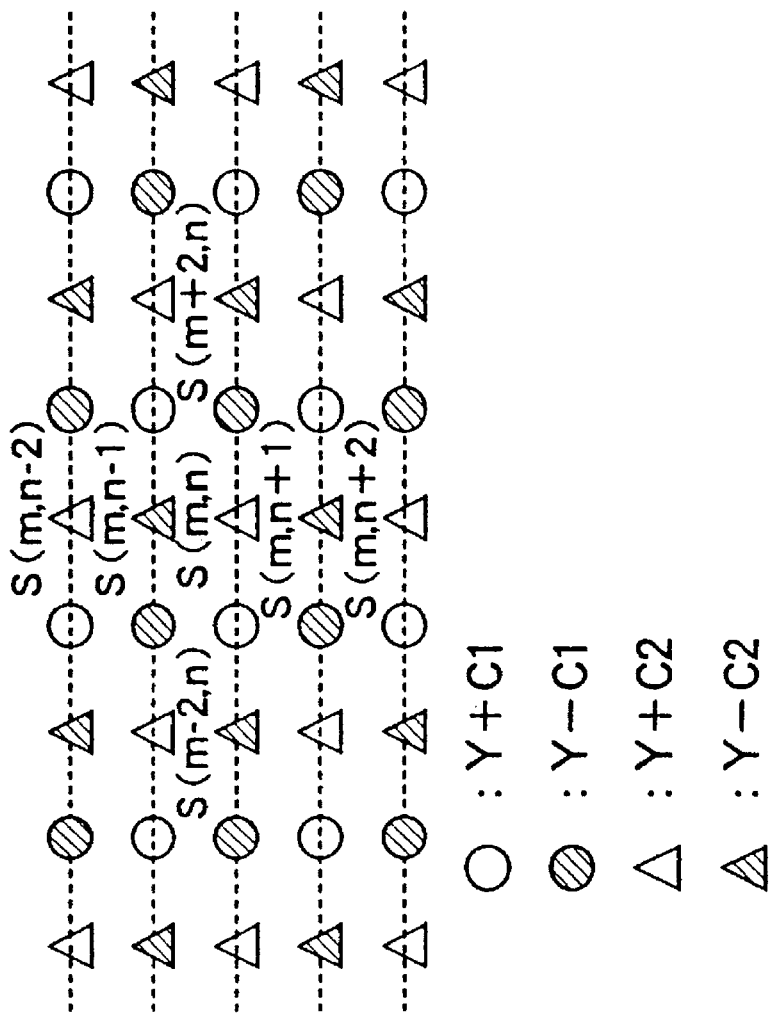
FIG. 53 is a diagram showing the arrangement of the sampling points for the sample values obtained by sampling the NTSC composite color television signal at a frequency four times the frequency of the color subcarrier.

FIG. 1 is a schematic block diagram showing a YC separating filter of Embodiment 1. In the figure, an NTSC system composite color television signal is applied to an input terminal 11. The applied composite color television signal, which is an analog signal, is converted into a digital signal by an A/D converter 12. The A/D conversion at the A/D converter 12 is effected at a frequency 4fsc four times the frequency of the color subcarrier, and the A/D converter 12 therefore produces a sequence of digital signals representing sample values corresponding to sampling points which are situated as shown in FIG. 53 when the sampling points are arranged on a two-dimensional plane corresponding to a display screen used for display of the picture. The output signal of the A/D converter 12 is applied to a first 1-line delay circuit 13.

There are also provided a second 1-line delay circuit 14, a vertical chrominance (V-C) extraction filter 15, a horizontal chrominance (H-C) extraction filter 16, a horizontal and vertical chrominance (HV-C) extraction filter 17, a picture non-correlation decision circuit 18, compensating delay circuits 19, 20, 21 and 22, a first selector 23, a horizontal chrominance extraction filter 24 for receiving the output signal of the selector 23, a second selector 25, an output terminal 26 for an output chrominance signal, a subtractor 27, and an output terminal 28 for a luminance signal.

Figure 9:
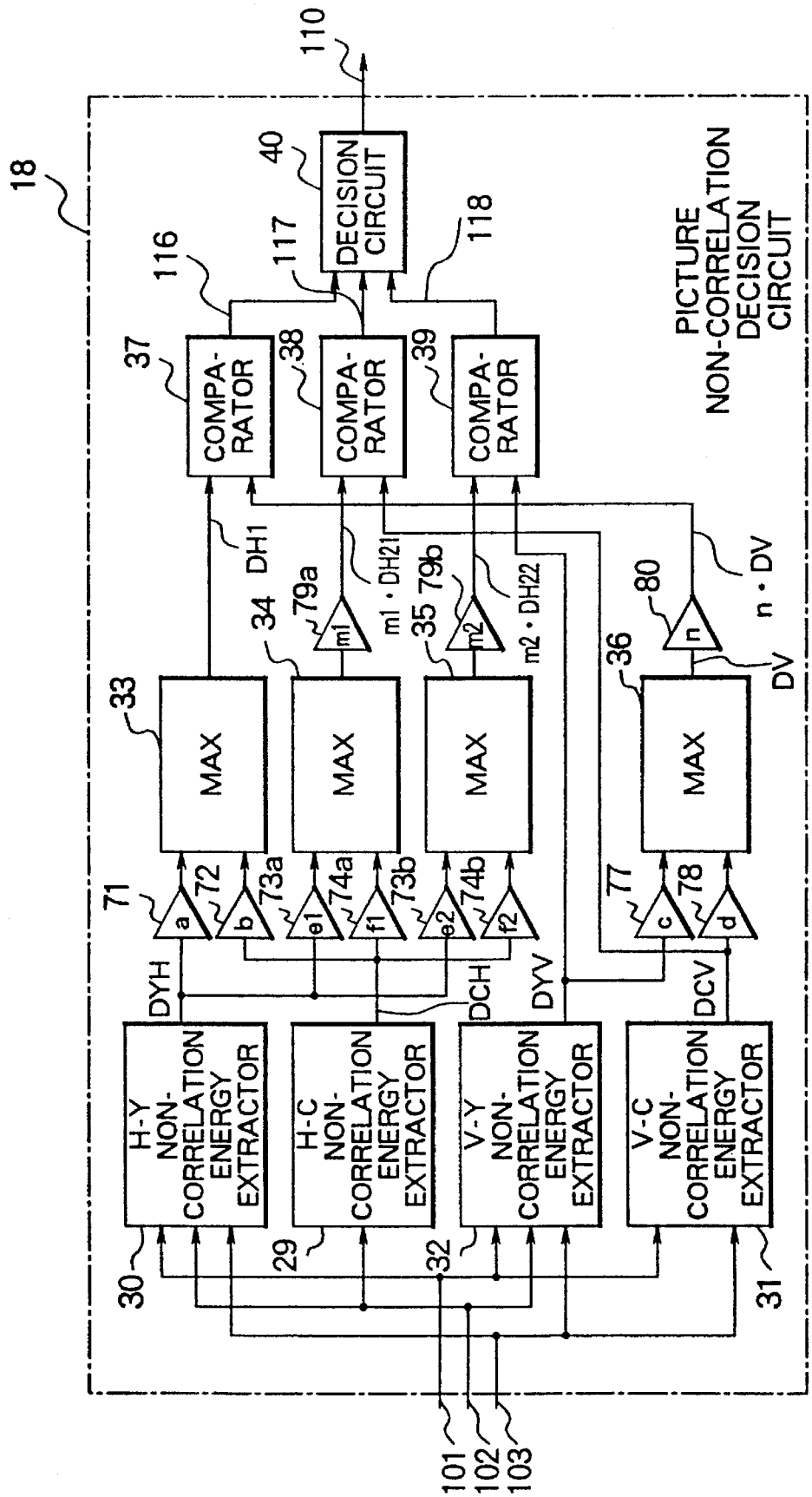
FIG. 9 is a block diagram showing a picture non-correlation decision circuit 18 used in Embodiments 1 and 2.

FIG. 9 shows the picture non-correlation decision circuit 18 of the Embodiment 1 of FIG. 1. As illustrated, it comprises a horizontal chrominance (H-C) non-correlation energy extractor 29, a horizontal luminance (H-Y) non-correlation energy extractor 30, a vertical chrominance (V-C) non-correlation energy extractor 31, a vertical luminance (V-Y) non-correlation energy extractor 32, comparators 37, 38 and 39, multipliers 71, 72, 73a, 73b, 74a, 74b, 77, 78, 79a, 79b and 80, and maximum value circuits (MAXs) 33–36.

The horizontal chrominance non-correlation energy extractor 29 receives the output signal 102 of the first 1-line delay circuit 13 in FIG. 1.

The horizontal luminance non-correlation energy extractor 30 receives the output signal 101 of the A/D converter 12, the output signal 102 of the first 1-line delay circuit 13 and the output signal 103 of the second 1-line delay circuit 14 in FIG. 1.

The vertical chrominance non-correlation energy extractor 31 receives the output signal 101 of the A/D converter 12, and the output signal 103 of the second 1-line delay circuit 14 in FIG. 1.

The vertical luminance non-correlation energy extractor 32 receives the output signal 101 of the A/D converter 12, the output signal 102 of the first 1-line delay circuit 13, and the output signal 103 of the second 1-line delay circuit 14 in FIG. 1.

The output signal DCH of the horizontal chrominance non-correlation energy extractor 29 is branched in three routes. In the first route, the signal is multiplied by a coefficient b at the multiplier 72 and the resultant signal is sent to the maximum value circuit 33. In the second route, the signal is multiplied by a coefficient f1 at the multiplier 74a and the resultant signal is sent to the maximum value circuit 34. In the third route, the signal is multiplied by a coefficient f2 at the multiplier 74b and the resultant signal is sent to the maximum value circuit 35.

The output signal DYH of the horizontal luminance non-correlation energy extractor 30 is branched in three routes. In the first route, the signal is multiplied by a coefficient a at the multiplier 71 and the resultant signal is sent to the maximum value circuit 33. In the second route, the signal is multiplied by a coefficient e1 at the multiplier 73a and the resultant signal is sent to the maximum value circuit 34. In the third route, the signal is multiplied by a coefficient e2 at the multiplier 73b and the resultant signal is sent to the maximum value circuit 35.

The output signal DCV of the vertical chrominance non-correlation energy extractor 31 is branched in two routes. In the first route, the signal is applied to the comparator 38. In the second route, the signal is multiplied by a coefficient d at the multiplier 78 and the resultant signal is sent to the maximum value circuit 36.

The output signal DYV of the vertical luminance non-correlation energy extractor 32 is branched in two routes. In the first route, the signal is applied to the comparator 39. In the second route, the signal is multiplied by a coefficient c at the multiplier 77 and the resultant signal is sent to the maximum value circuit 36.

The output signal of the maximum value circuit 33 is applied as the first horizontal non-correlation energy DH1 to the comparator 37. The output signal of the maximum value circuit 34 is multiplied by a coefficient m1 at the multiplier 79a, and the resultant signal is sent as the second horizontal non-correlation energy DH21 to the comparator 38. The output signal of the maximum value circuit 35, as the third horizontal non-correlation energy DH22, is multiplied by a coefficient m2 at the multiplier 79b, and the resultant signal is sent to the comparator 39. The output signal of the maximum value circuit 36, as the vertical non-correlation energy DV, is multiplied by a coefficient n at the multiplier 80, and the resultant signal is sent to the comparator 37.

The comparator 37 compares the first horizontal non-correlation energy DH1 and the product n·DV of the vertical non-correlation energy DV and the coefficient n, and produces a high level output signal 116 when DH1≧n·DV, and a low level output signal 116 at other times.

The comparator 38 compares the vertical chrominance non-correlation energy DCV and the product m1·DH21 of the second horizontal non-correlation energy DH21 and the coefficient m1, and produces a high level output signal 117 when DCV≧m1·DH21, and a low level output signal 117 at other times.

The comparator 39 compares the vertical luminance non-correlation energy DYV and the product m2·DH22 of the third horizontal non-correlation energy DH22 and the coefficient m2, and produces a high level output signal 118 when DYV≧m2·DH22, and a low level output signal 118 at other times.

The respective output signals 116, 117 and 118 of the comparators 37, 38 and 39 are applied to the decision circuit 40. The output signal 110 of the decision circuit 40 serves as the output of the picture non-correlation decision circuit 18.

Figure 48:
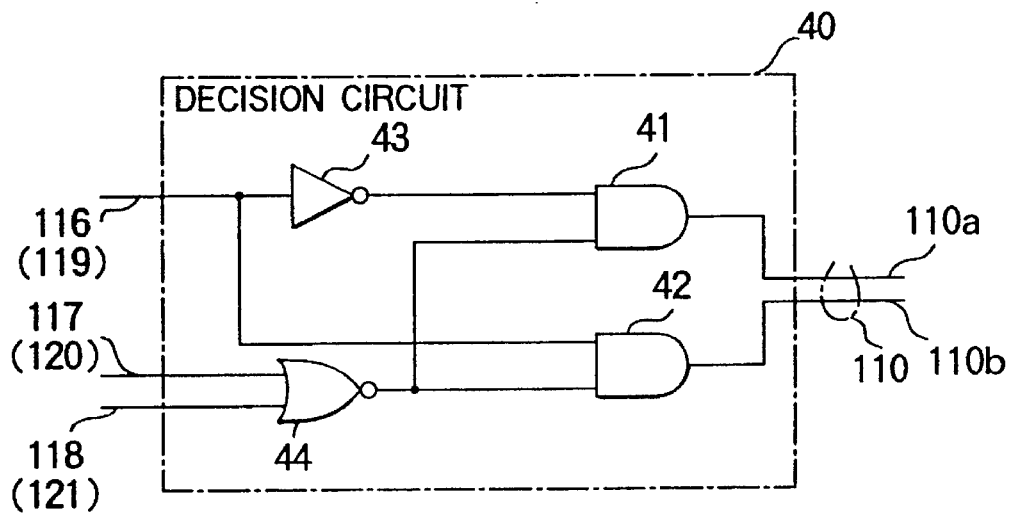
FIG. 48 is a block diagram showing an example of decision circuit used in the luminance/chrominance separating filter of FIG. 43 and that of FIG. 1.
Figure 49:
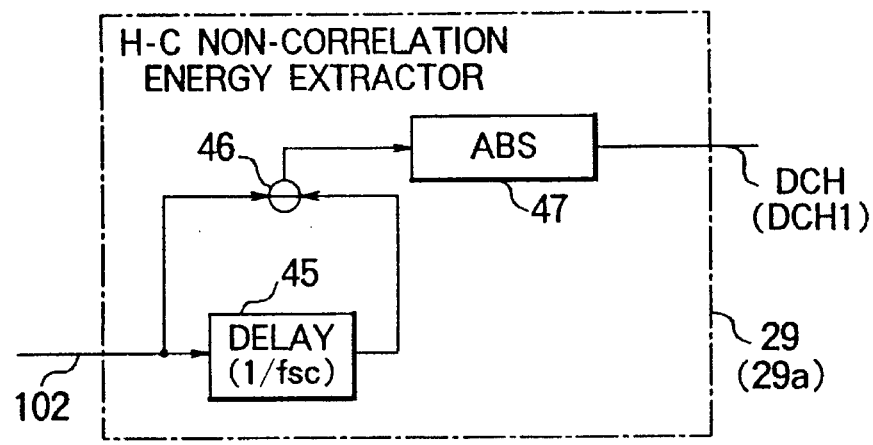
FIG. 49 is a block diagram showing an example of horizontal chrominance non-correlation energy extractor used in the luminance/chrominance separating filter of FIG. 43 and that of FIG. 1.
Figure 50:
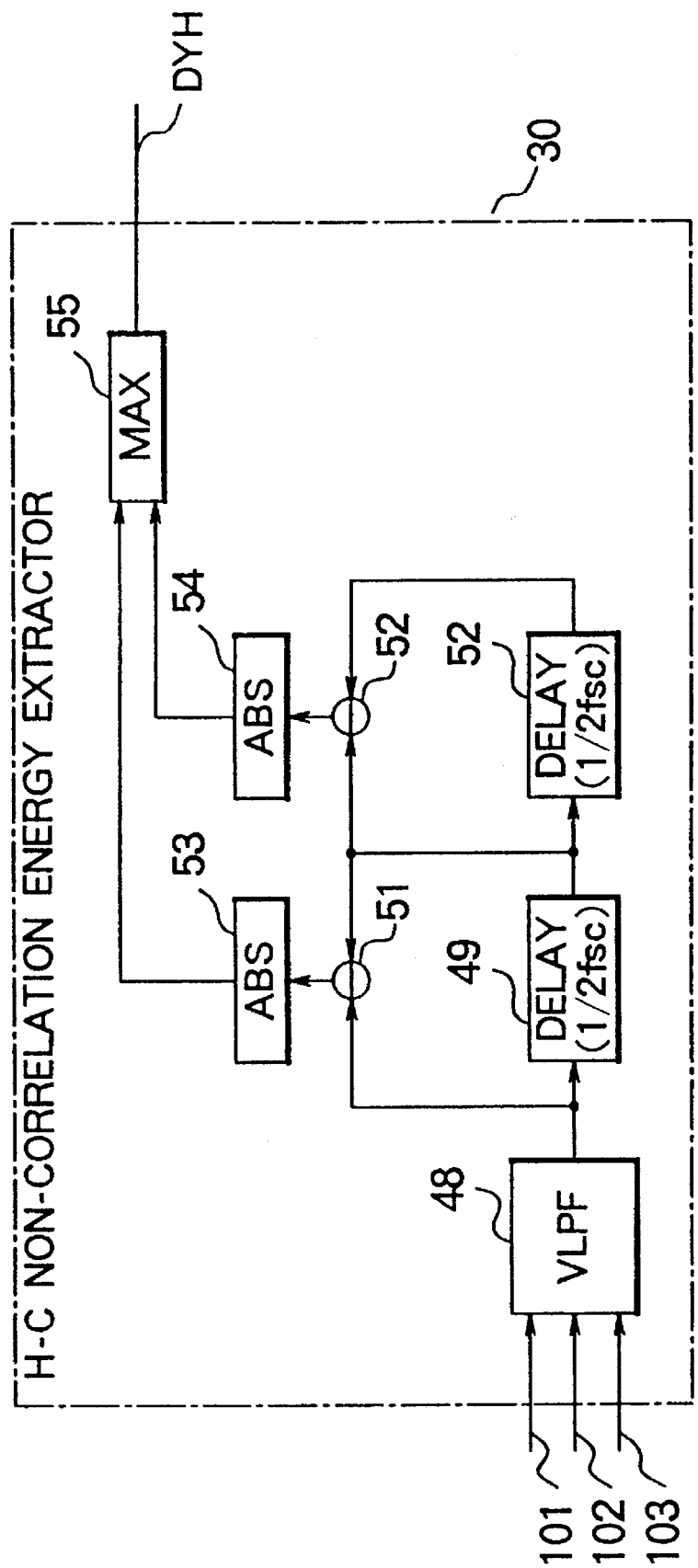
FIG. 50 is a block diagram showing an example of horizontal luminance non-correlation energy extractor used in the luminance/chrominance separating filter of FIG. 43 and that of FIG. 1.
Figure 51:
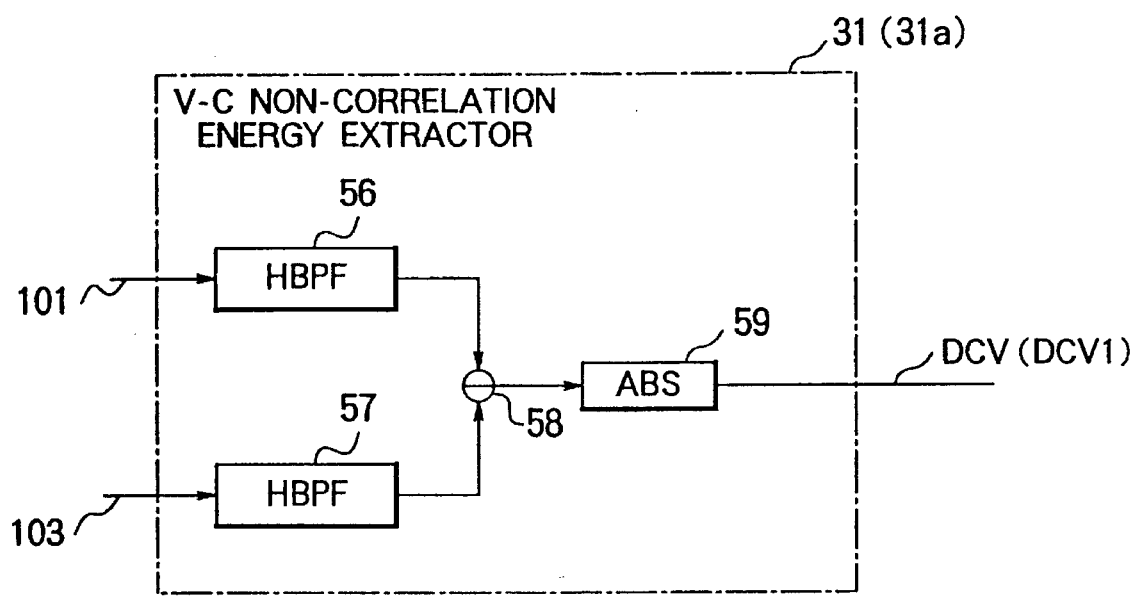
FIG. 51 is a block diagram showing an example of vertical chrominance non-correlation energy extractor used in the luminance/chrominance separating filter of FIG. 43 and that of FIG. 1.
Figure 52:
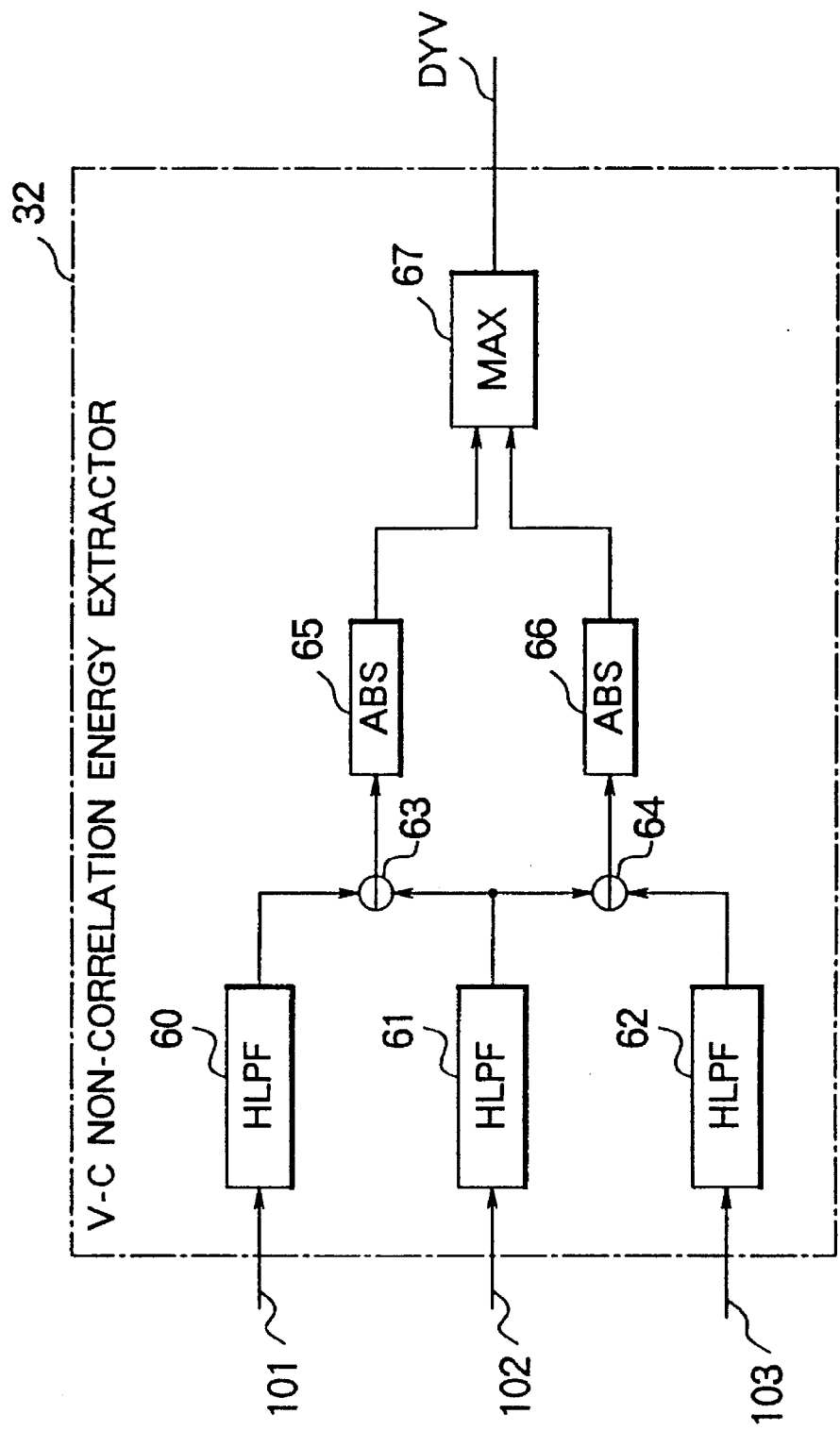
FIG. 52 is a block diagram showing an example of vertical luminance non-correlation energy extractor used in the luminance/chrominance separating filter of FIG. 43 and that of FIG. 1.

The decision circuit, 40 shown in FIG. 9 may be identical to that shown in FIG. 48. However, the output signal 116 of the comparator 37 is applied to one input of the AND circuit 42 and to the NOT circuit 43. The respective output signals 117 and 118 of the comparators 38 and 39 are applied to the NOR circuit 44.

The horizontal chrominance non-correlation energy extractor 29, the horizontal luminance non-correlation energy extractor 30, the vertical chrominance non-correlation energy extractor 31, and the vertical luminance non-correlation energy extractor 32 used in FIG. 9 may be identical to that shown in FIG. 49, FIG. 50, FIG. 51, and FIG. 52, respectively.

Following is a description of the operation of this embodiment with reference to FIG. 1, FIG. 9, FIG. 48 to FIG. 52, as well as FIG. 5A to FIG. 5C and FIG. 6A to FIG. 6C illustrating the frequency distribution on a two-dimensional plane of the non-correlation energy at outputs of the various circuits.

When an NTSC system composite color television signal is applied via the input terminal 11, the A/D converter 12 samples this composite color television signal at a sampling frequency fs=4fsc. By passing the sampled composite color television signal through late first and second 1-line delay circuits 13 and 14, the sample values at a certain specific sampling point and at reference sampling points 1-line above and 1-line below this specific sampling point on the screen are simultaneously extracted. Consequently, at the time point the composite color television signal (sample value) S(m, n) at the coordinate position (m, n) on the screen appears as the output signal 102 of the first 1-line delay circuit 13, a signal (m, n−1) appears as the output signal 103 of the second 1-line delay circuit 14 and signal S(m, n+1) appears as the output signal 101 of the A/D converter 12, as illustrated in FIG. 53.

The signal 102 is applied to the horizontal chrominance extraction filter 16. This signal 102 and the other two signals 101 and 103 are respectively applied to the vertical chrominance extraction filter 15, the horizontal and vertical chrominance extraction filter 17, and the picture non-correlation decision circuit 18.

For example, the transfer function of the vertical chrominance extraction filter 15 is expressed as follows.

$$Cv(Z)=(-¼)(1-Z^{-L})^2$$

The transfer function of the horizontal chrominance extraction filter 16 is expressed as follows.

$$Ch1(Z)=(-¼)(1-Z^{-2})^2$$

The transfer function off the horizontal and vertical chrominance extraction filter 17 is expressed as follows.

$$Chv(Z)=(-¼)(1-Z^{-2})^2 \cdot (-¼)(1-Z^{-L})^2$$

The output signal 107 of the compensating delay circuit 20, the output signal 109 of the compensating delay circuit 21, and the output signal 110 of the compensating delay circuit 22 are respectively applied to the selector 23.

The vertical and horizontal direction picture non-correlation of a specific sampling point is detected, and, in accordance with the result of the detection of the non-correlation, the selector 23 selectively outputs one of its input signals as follows:

When the horizontal non-correlation is particularly strong, the output signal 107 of the compensating delay circuit 20 to which the output signal 106 of the vertical chrominance extraction filter 15 is applied is selected. When the vertical non-correlation is particularly strong, the output signal 109 of the compensating delay circuit 21 to which output signal 108 of the horizontal chrominance extraction filter 16 is applied is selected. At other times, the output signal 111 of the compensating delay circuit 22 to which the output signal 110 of the horizontal and vertical chrominance extraction filter 17 is applied is selected.

The operation of the second selector 25 is as follows. When the chrominance signal selected by the selector 23 is the output signal 109 of the compensating delay circuit 21 or the output signal 111 of the compensating delay circuit 22, the selector 25 selects the output signal 1132 of the horizontal chrominance extraction filter 24, and when the chrominance signal selected by the selector 23 is the output signal 107 of the compensating delay circuit 20, the selector 25 selects the signal 1131 at the output of the compensating delay circuit 91.

The horizontal chrominance extraction filter 24 has a narrower band, and serves to band-limit the output signal 113 of the selector 23.

The transfer function of the horizontal chrominance extraction filter 24 is expressed. For example, as follows:

$$Ch2(Z)=(-1/16)(1-Z^{-2})^4$$

The detection of the picture non-correlation and control over the selectors 23 and 25 are performed by the picture non-correlation decision circuit 18. The operation of the picture non-correlation decision circuit 18 for control over the selectors 23 and 25 is as follows:

The horizontal chrominance non-correlation energy DCH(Z), the horizontal luminance non-correlation energy DYH(Z), the vertical chrominance non-correlation energy DCV(Z) and vertical luminance non-correlation energy DYV(Z) are expressed as follows.

$DCH(Z)=|1-Z^{-4}|$ $DYH(Z)=\max\{|(¼)\cdot(1+Z^{-L})^2\cdot(1-Z^{-2})|, |(¼)\cdot(1+Z^{-L})^2\cdot(Z^{-2}-Z^{-4})|\}$ $DCV(Z)=|(-¼)\cdot(1-Z^{-2})^2\cdot(a-Z^{-2L})|$ $DYV(Z)=\max\{|(¼)\cdot(1+Z^{-2})^2\cdot(1-Z^{-L})|, |(¼)\cdot(1+Z^{-2})^2\cdot(Z^{-L}-Z^{-2L})|\}$ The frequency distributions on the two-dimensional plane of DCH(Z), DYH(Z), DCV(Z) and DYV(Z) are respectively illustrated in FIG. 5B, FIG. 5A, FIG. 6B and FIG. 6A.

The first horizontal non-correlation energy DH1, the second horizontal non-correlation energy DH21, the third horizontal non-correlation energy DH22 and the vertical non-correlation energy DV can be expressed as follows.

$DH1=\max(a\cdot DYH, b\cdot DCH)$ $DH21=\max(e1\cdot DYH, f1\cdot DCH)$ $DH22=\max(e2\cdot DYH, f2\cdot DCH)$ $DV=\max(c\cdot DYV, d\cdot DCV)$ The frequency distributions on the two-dimensional plane of DH1 and DV are respectively illustrated in FIG. 5C and FIG. 6C.

At the comparator 37, DH1 and n·DV are compared. If $DH1 \geq n\cdot DV$ the horizontal non-correlation is interpreted as strong, and a "1" signal 116 is sent to the decision circuit 40. If $DH1 < n\cdot DV$ the horizontal non-correlation is interpreted as weak, and a "0" signal 116 is sent to the decision circuit 40. At the comparator 38, DCV and m1·DH21 are compared. If $DCV \geq m1\cdot DH21$ the vertical non-correlation is interpreted as strong, and a "1" signal 117 is sent to the decision circuit 40. If $DCV < m1\cdot DH21$ the horizontal non-correlation is interpreted as weak, and a "0" signal 117 is sent to the delay circuit 87. At the comparator 39, DYV and m2·DH22 are compared. If $DYV \geq m2\cdot DH22$ the vertical non-correlation is interpreted as strong, and a "1" signal 118 is sent to the decision circuit 40. If $DYV < m2\cdot DH22$ the vertical non-correlation is interpreted as weak, and a "0" signal 118 is sent to the decision circuit 40. On the basis of the results of the detection of the correlation as described above, the decision circuit 40 controls the selector 23 in the following manner. The relationship between the input signals 116, 117 and 118 of the decision circuit 40, and its output signal 110, the selection of the chrominance output signal 107, 109 or 111 at the selector 23 and the selection of the chrominance output signal 1131 or 1132 at the selector 25 is as shown in Table 2.

TABLE 2

| Output 116 (119) | Output 117 (120) | Output 118 (123) | Output 110 of of Decision Circuit 40 | | Chrominance Output 113 | Chrominance Output 1133 (1134) |
|---|---|---|---|---|---|---|
| of Delay Circuit 86 | of Delay Circuit 87 | of Delay Circuit 90 | Output 110a of AND 41 | Output 110b of AND 42 | Selected by Selector 23 | Selected by Selector 25 (25a) |
| 0 | 0 | 0 | 1 | 0 | 111 | 1132 |
| 0 | 0 | 1 | 0 | 0 | 109 | 1132 |
| 0 | 1 | 0 | 0 | 0 | 109 | 1132 |
| 0 | 1 | 1 | 0 | 0 | 109 | 1132 |
| 1 | 0 | 0 | 0 | 1 | 107 | 1131 |
| 1 | 0 | 1 | 0 | 0 | 109 | 1132 |
| 1 | 1 | 0 | 0 | 0 | 109 | 1132 |
| 1 | 1 | 1 | 0 | 0 | 109 | 1132 |

When the output signals 110a and 110b of the AND circuits 41 and 42 are both "0", the selector 23 selects the output signal 109 of the compensating delay circuit 21. When the output signal 110a of the AND circuit 41 is "0" and the output signal 110b or the AND circuit 42 is "1", the output signal 107 of the compensating delay circuit 20 is selected. When the output signal 110a of the AND circuit 41 is "1" and the output; signal 110b of the AND circuit 42 is "0", the output signal 111 of the compensating delay circuit 22 is selected.

When the output signal 110b of AND circuit 42 is "1", the selector 25 selects the output signal 1131 of the compensating delay circuit 91. When the output signal 110b of the AND circuit 42 is "0", the selector 25 selects the output signal 1132 of the horizontal chrominance extraction filter 24.

Consequently, in the embodiment of FIG. 1, the response C11(Z) of the filter for extracting the chrominance signal output via the terminal 26, and the response C12(Z) of the chrominance signal extraction filter for extracting the luminance signal via the terminal 28 are related as follows:

When the vertical non-correlation is strong, $C11(Z)=Ch1(Z)$ $C12(Z)=Ch1(Z)\cdot Ch2(Z)$ When the horizontal non-correlation is strong, $C11(Z)=C12(Z)=Cv(Z)$ When neither of these conditions are met, $C11(Z)=Chv(Z)$ $C12(Z)=Chv(Z)\cdot CH2(Z)$

Embodiment 2

Figure 2:
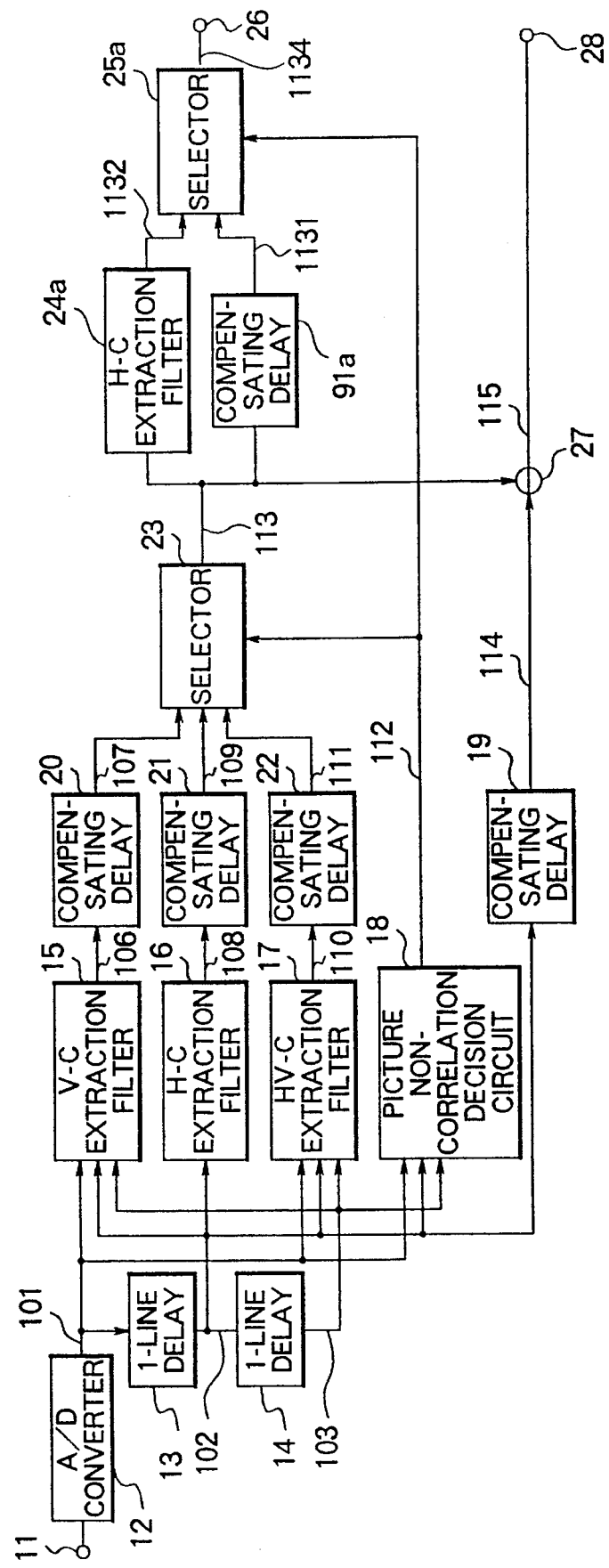
FIG. 2 is a block diagram showing a luminance/chrominance separating filter of another embodiment of the present invention.

FIG. 2 shows a YC separating filter of Embodiment 2. The YC separating filter of FIG. 2 is similar to that of FIG. 1, but in place of the horizontal chrominance extraction filter 24, the compensating delay circuit 91, and the selector 25, a horizontal chrominance extraction filter 24a, a compensating delay circuit 91a, and a selector 25a are provided. The horizontal chrominance extraction filter 24a and the compensating delay circuit 91a are coupled to receive the output signal of the selector 23, and the selector 25a is coupled to receive the output signals of the horizontal chrominance extraction filter 24a and the compensating delay circuit 91a and selects one of its input signals according to the output signal from the picture non-correlation decision circuit 18. The output of the selector 25a is connected to the output terminal. The subtractor 27 receives the output signal of the selector 23.

The picture non-correlation decision circuit 18 may be the one shown in FIG. 9. The selecting operation off the YC separating filter off FIG. 2 is the same as that of the YC separating filter of FIG. 1. Consequently, the relationship between the input signals 116, 117 and 118 of the decision circuit 40, and its output signal 110, the selection of the chrominance output signal 107, 109 or 111 at the selector 23 and the selection of the chrominance output signal 1131 or 1132 at the selector 25a is as shown in Table 2.

That is, when the output signals 110a and 110b of the AND circuits 41 and 42 are both "0", the selector 23 selects the output signal 109 of the compensating delay circuit 21. When the output signal 110a of the AND circuit 41 is "0" and the output signal 110b of the AND circuit 42 is "1", the output signal 107 of the compensating delay circuit 20 is selected. When the output signal 110a of the AND circuit 41 is "1" and the output signal 110b of the AND circuit 42 is "0", the output signal 111 of the compensating delay circuit 22 is selected.

When the output signal 110b of the AND circuit 42 is "1", the selector 25a selects the output signal 1131 of the compensating delay circuit 91a. When the signal 110b is "0", the output signal 1132 of the horizontal chrominance extraction filter 24a is selected.

Consequently, in the case of the embodiment of FIG. 2, the response C21(Z) of the filter for extracting the chrominance signal output; through the terminal 26, and the response C22(Z) of the filter For extracting the chrominance signal used for extracting the luminance signal are given below: That is, when the vertical non-correlation is strong, $$C21(Z)=Ch1(Z) \cdot Ch2(Z)$$

$$C22(Z)=Ch1(Z)$$

When horizontal non-correlation is strong, $$C21(Z)=C22(Z)=Cv(Z)$$

When neither of these conditions are met.

$$C21(Z)=Chv(Z) \cdot CH2(Z)$$

$$C22(Z)=Chv(Z)$$

The arrangement of FIG. 2 has an advantage over the arrangement of FIG. 1 in that the cross color is further reduced. On the other hand, the arrangement of FIG. 1 has an advantage over the arrangement of FIG. 2 in that the resolution is higher.

Embodiment 3

Figure 10:
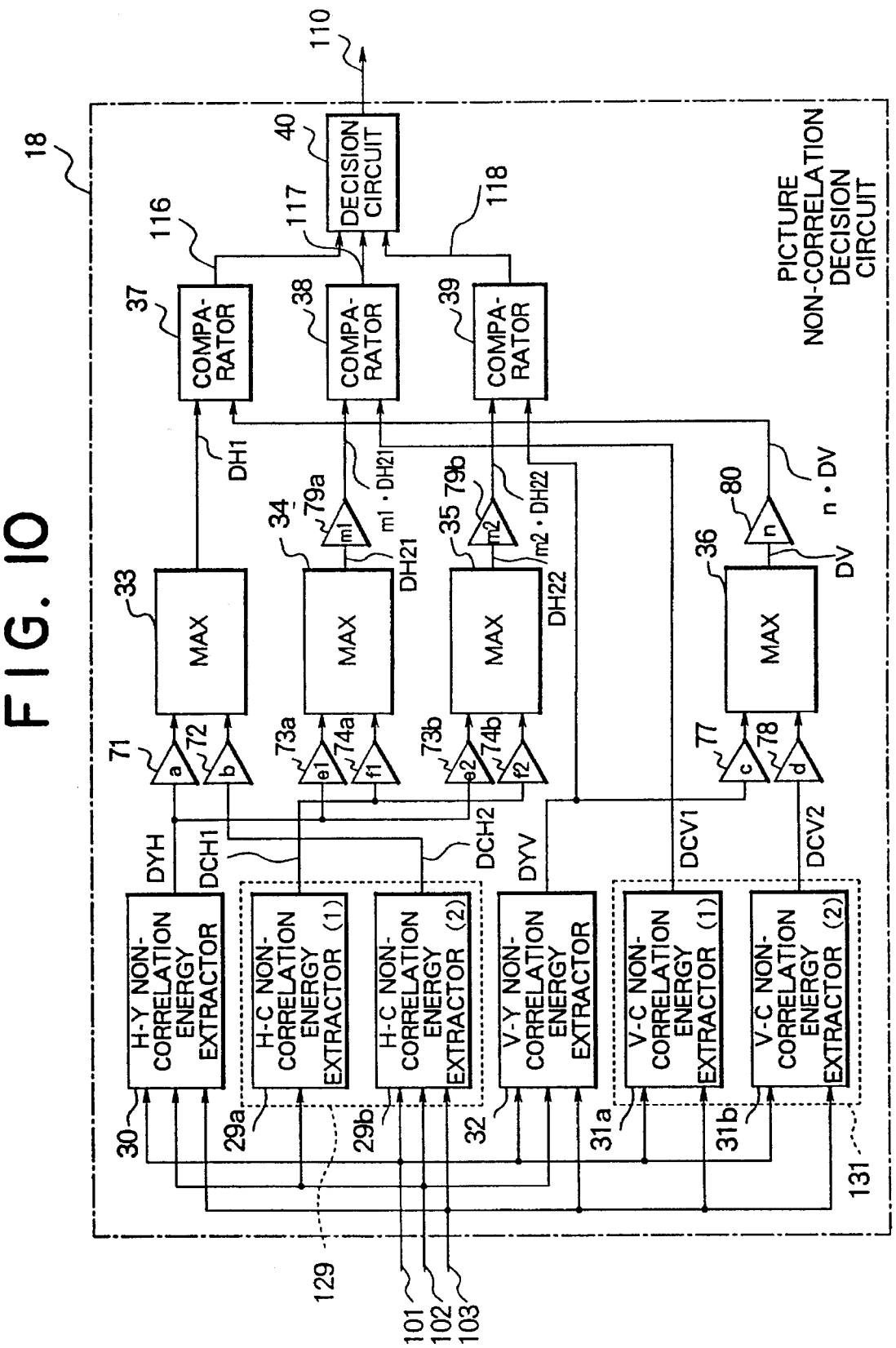
FIG. 10 is a block diagram showing a picture non-correlation decision circuit 18 used in Embodiments 3 and 4.

This embodiment is similar to Embodiment 1, but in place of the picture non-correlation decision circuit 18 of FIG. 9, the picture non-correlation decision circuit shown in FIG. 10 is used. The picture non-correlation decision circuit 18 is similar to that shown in FIG. 9. However, the horizontal chrominance non-correlation energy extractor 29 and the vertical chrominance non-correlation energy extractor 31 in FIG. 9 are replaced by a horizontal chrominance non-correlation energy extractor 129 and vertical chrominance non-correlation energy extractor 131.

The horizontal chrominance non-correlation energy extractor 129 comprises a first horizontal chrominance non-correlation energy extractor 29a and a second horizontal chrominance non-correlation energy extractor 29b. The configuration of the first horizontal chrominance non-correlation energy extractor 29a is identical to that of the horizontal chrominance non-correlation energy extractor 29 of FIG. 49. The configuration of the second horizontal chrominance non-correlation energy extractor 29b may be as shown in FIG. 3.

Figure 4:
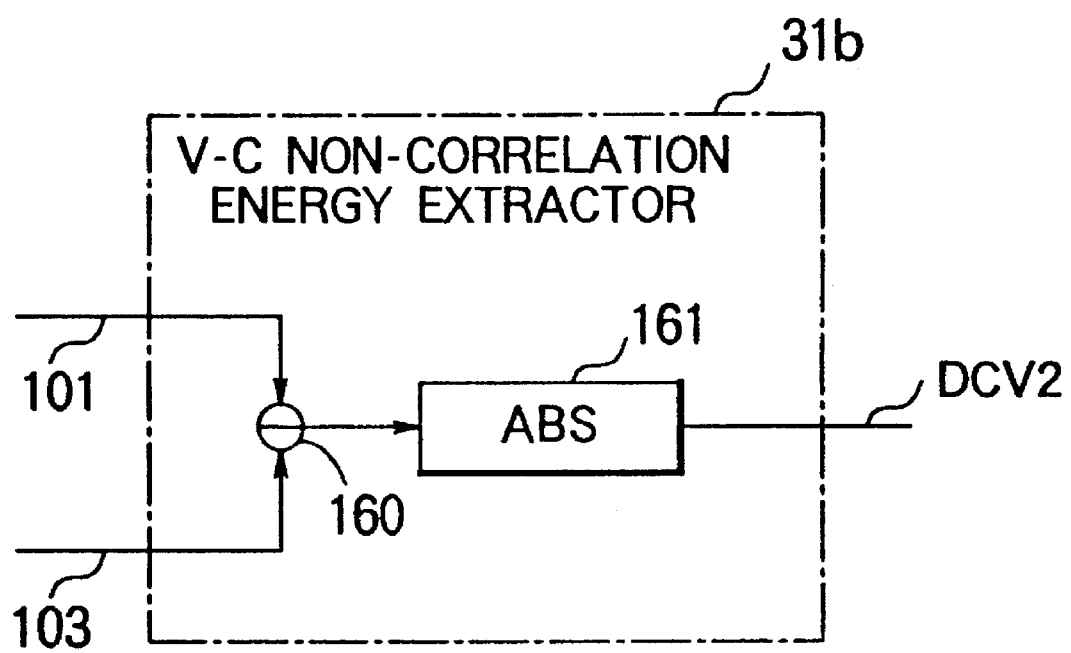
FIG. 4 is a block diagram showing the second vertical chrominance non-correlation energy extractor.

The vertical chrominance non-correlation energy extractor 131 comprises a first vertical chrominance non-correlation energy extractor 31a and a second vertical chrominance non-correlation energy extractor 31b. The configuration of the first vertical chrominance non-correlation energy extractor 31a is identical to that of the vertical chrominance non-correlation energy extractor 31 of FIG. 51. The configuration of the second vertical chrominance non-correlation energy extractor 31b may be as shown in FIG. 4.

Figure 3:
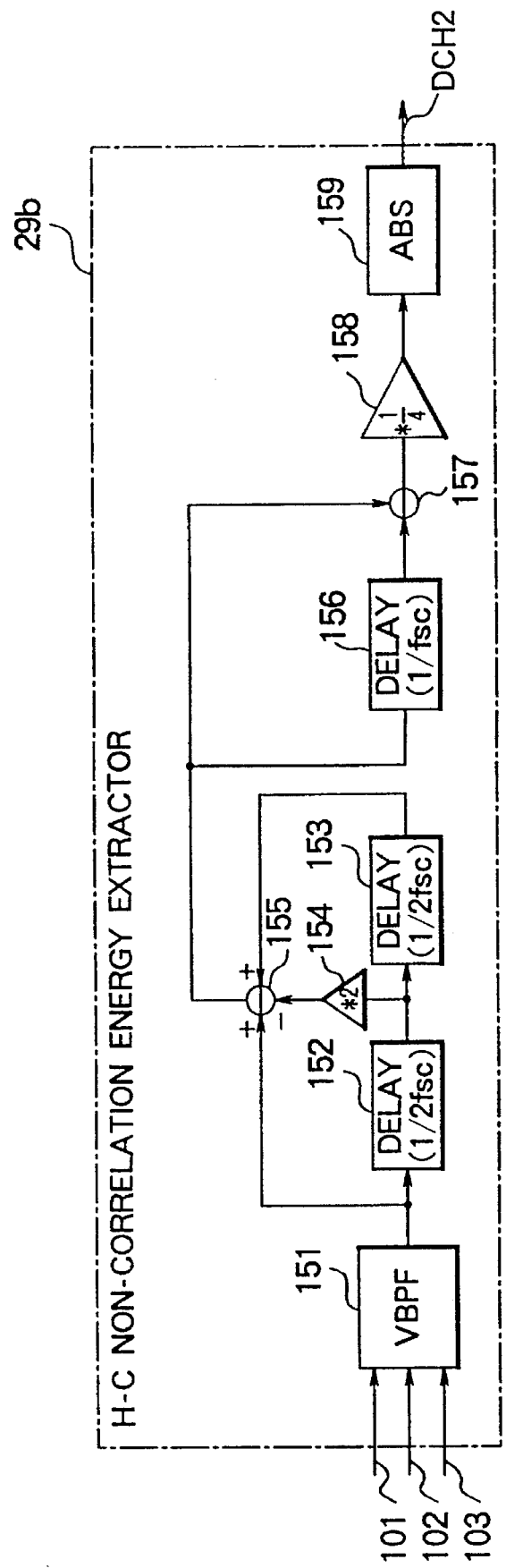
FIG. 3 is a block diagram showing the second horizontal chrominance non-correlation energy extractor.

The second horizontal chrominance non-correlation energy extractor 29b shown in FIG. 3 comprises a vertical direction bandpass filter 151, delay circuits 152, 153 and 156, multipliers 154 and 158, subtractors 155 and 157, and an absolute value circuit (ABS) 159.

The output signal 101 of the A/D converter 12, the output signal 102 of the first 1-line delay circuit 13 and the output signal 103 of the second 1-line delay circuit 14 are applied to the vertical direction bandpass filter 151. The output signal of the vertical direction bandpass filter 151 is applied to the delay circuit 152 and the subtractor 155.

The output signal of the delay circuit 152 is applied to the delay circuit 153 and the multiplier 154. The output signal of the delay circuit 153 is applied to the subtractor 155. The output signal of the multiplier 154 is applied to the sub tractor 155.

The output signal of the subtractor 155 is applied to the delay circuit 156 and the subtractor 157. The output signal of the subtractor 157 is applied to the multiplier 158. The output signal of the multiplier 158 is applied to the absolute value circuit 159.

The output signal of the absolute value circuit 159 forms the output DCH2 of the horizontal chrominance non-correlation energy extractor 29b.

The second vertical chrominance non-correlation energy extractor 31b shown in FIG. 4 comprises a subtractor 160 and an absolute value circuit 161.

The output signal 101 of the A/D converter 12 and output signal 103 of the second 1-line delay circuit 13 are applied to the subtractor 160. The output signal of the subtractor 160 is applied to the absolute value circuit 161. The output signal of the absolute value circuit 161 forms the output DCV2 of the vertical chrominance non-correlation energy extractor 31b.

The output signal DCH1 (whose frequency band is identical to that of DCH and is as shown in FIG. 5B) of the first horizontal chrominance non-correlation energy extractor 29a is multiplied by the coefficient f1 at the multiplier 74a, and the product f1·DCH1 and the output signal e1·DYH of the multiplier 73a are applied to the maximum value circuit 34 for detecting DH21. Thus, in this case, the following relationship is obtained.

$$DH21 = \max(e1 \cdot DYH, f1 \cdot DCH1)$$

The comparator 38 compares the output signal DCV1 (whose frequency band is identical to that of DCV and is as shown in FIG. 6B) of the vertical chrominance non-correlation energy extractor 31a and the product m1·DH21 of the above-mentioned DH21 and the coefficient m1. When $$DCV1 \geq m1 \cdot \max(e1 \cdot DYH, f1 \cdot DCH1)$$

the vertical non-correlation is interpreted as strong, and the output signal of the horizontal chrominance extraction filter 16 is selected by the selector 23 under control of the decision circuit 40.

The output signal DCH1 of the horizontal chrominance non-correlation energy extractor 29a is also multiplied by the coefficient f2 at the multiplier 74b, and the product f2·DCH1 and e2·DYH are applied to the maximum value circuit 35 for obtaining a larger one of them, DH22. That is, $$DH22 = \max(e2 \cdot DYH, f2 \cdot DCH1)$$

The comparator 39 compares the output signal DYV (FIG. 6A) of the vertical luminance non-correlation energy extractor 32 and the product m2·DH22 of the above-mentioned DH22 and the coefficient m2. Thus, when $$DYV \geq m2 \cdot \max(e2 \cdot DYH, f2 \cdot DCH1)$$

the vertical non-correlation is again interpreted as strong, and the decision circuit 40, responsive to the result of this interpretation, causes the output signal of the horizontal chrominance extraction filter 16 to be selected.

The output signal of the vertical chrominance extraction filter 15 is selected on the basis of the following judgement.

Figure 7A:
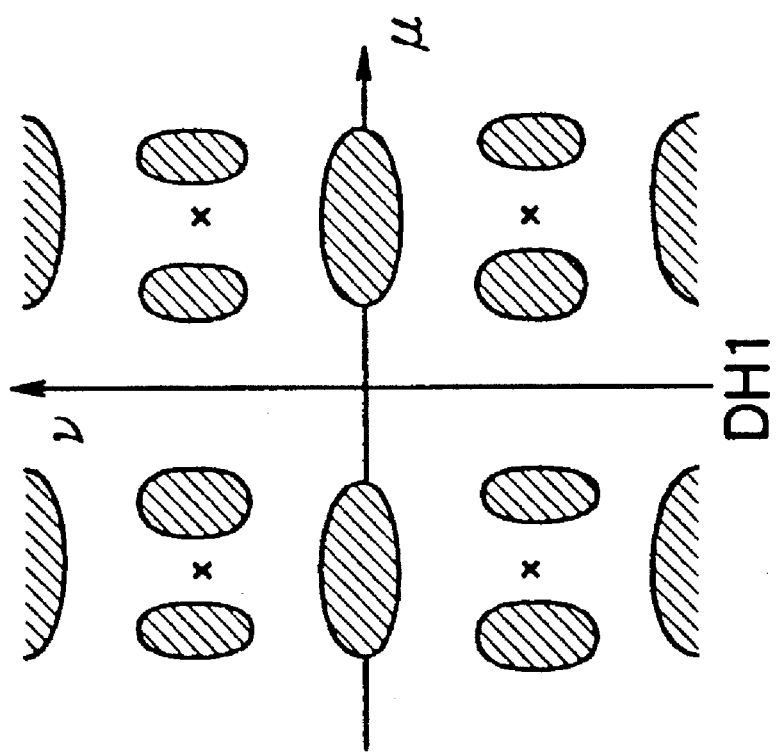
FIG. 7A to FIG. 7D are diagrams showing the frequency distributions of the signals representing non-correlation energy at the outputs of various circuits.

The output signal DCH2 (FIG. 7A) of the second horizontal chrominance non-correlation energy extractor 29b is multiplied by the coefficient b at the multiplier 72 to produce a product b·DCH2. The output signal DYH (FIG. 5A) of the horizontal luminance non-correlation energy extractor 30 is multiplied by the coefficient a at the multiplier 71 to produce a product a·DYH. The maximum value circuit 33 obtains the larger one of b·DCH2 and a·DYH to produce DH1. That is, $$DH1 = \max(a \cdot DYH, b \cdot DCH2)$$

Figure 7B:
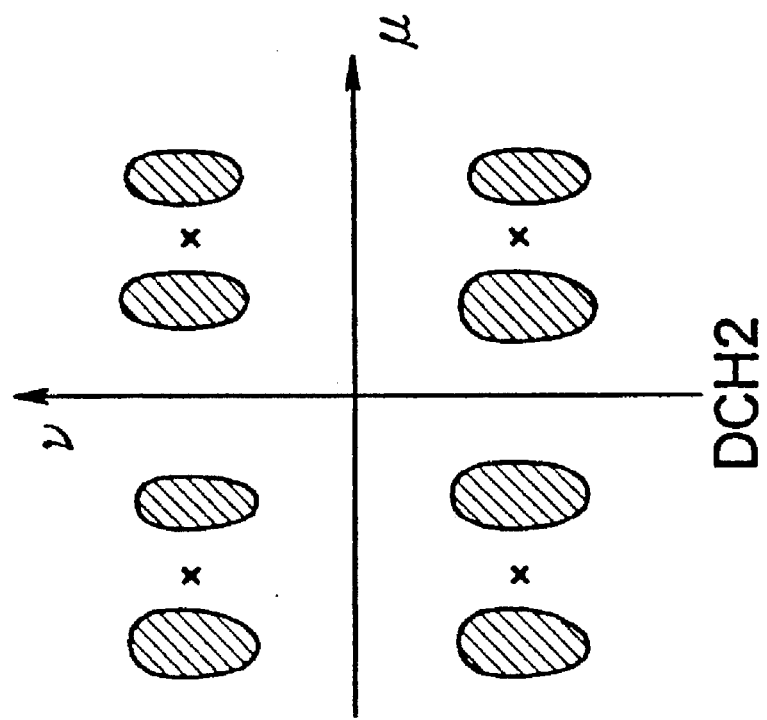

The frequency band on the two-dimensional plane of DH1 is as shown in FIG. 7B, and is different from that shown in FIG. 5C).

The output signal DCV2 (FIG. 7C) of the vertical chrominance non-correlation energy extractor 31b is multiplied by the coefficient d to produce d·DCV2. The output signal DYV of the vertical chrominance non-correlation energy extractor 32 is multiplied by the coefficient c at the multiplier 77 to produce a product c·DYV. The maximum value circuit 36 obtains a larger one of d·DCV2 and c·DYV to produce DV. That is, $$DV = \max(c \cdot DYV, d \cdot DCV2)$$

Figure 7D:
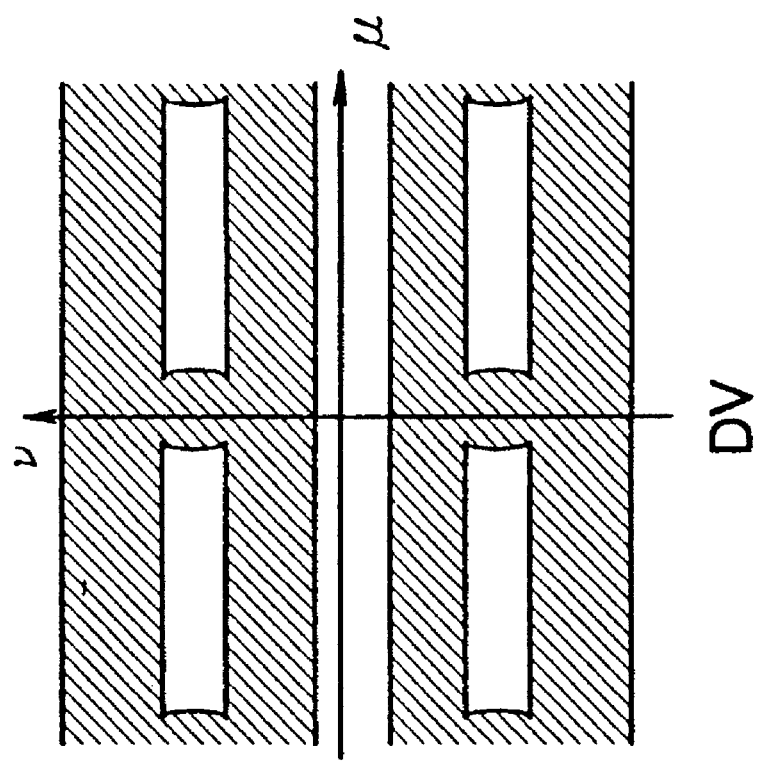
Figure 7C:
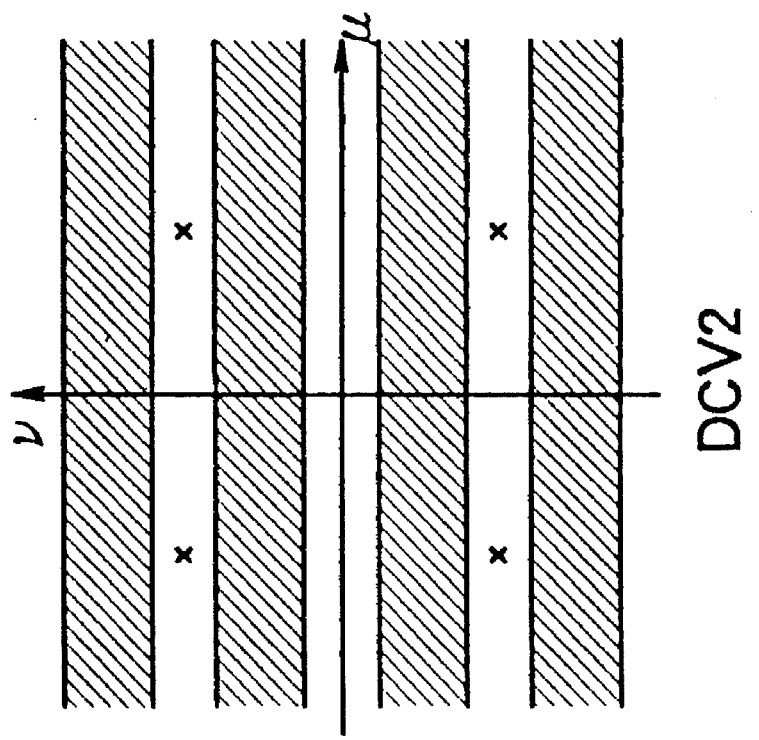

The frequency band on the two-dimensional plane of DV is as shown in FIG. 7D, and is different from that shown in FIG. 6C).

The output signal DV of the maximum value circuit 36 is multiplied by the coefficient n at the multiplier 80 to produce a product n·DV.

The comparator 37 compares DH1=max (a·DYH, b·DCH2) and n·DV=n·max (c·DYV, d·DCV2). If $$\max(a \cdot DYH, b \cdot DCH2) \geq n \cdot \max(c \cdot DYV, d \cdot DCV2)$$

the horizontal non-correlation is interpreted as strong, and the decision circuit 40, responsive to this result of interpretation, causes the output signal of the vertical chrominance extraction filter 15 to be selected.

The picture non-correlation decision circuit 18 of this embodiment shares the same concept as the picture non-correlation decision circuit 18 of FIG. 9 in the selection between the horizontal chrominance extraction filter 16 and the vertical chrominance extraction filter 15, but the former differs from the latter in that the selection of the output signal of the horizontal chrominance extraction filter 16 is based on DCV1 in place of DCV, and on DCH1 in place of DCH, and the selection of the output signal of the vertical chrominance extraction filter 15 is based on DCH2 in place of DCH, and on DCV2 in place of DCV.

Figure 8:
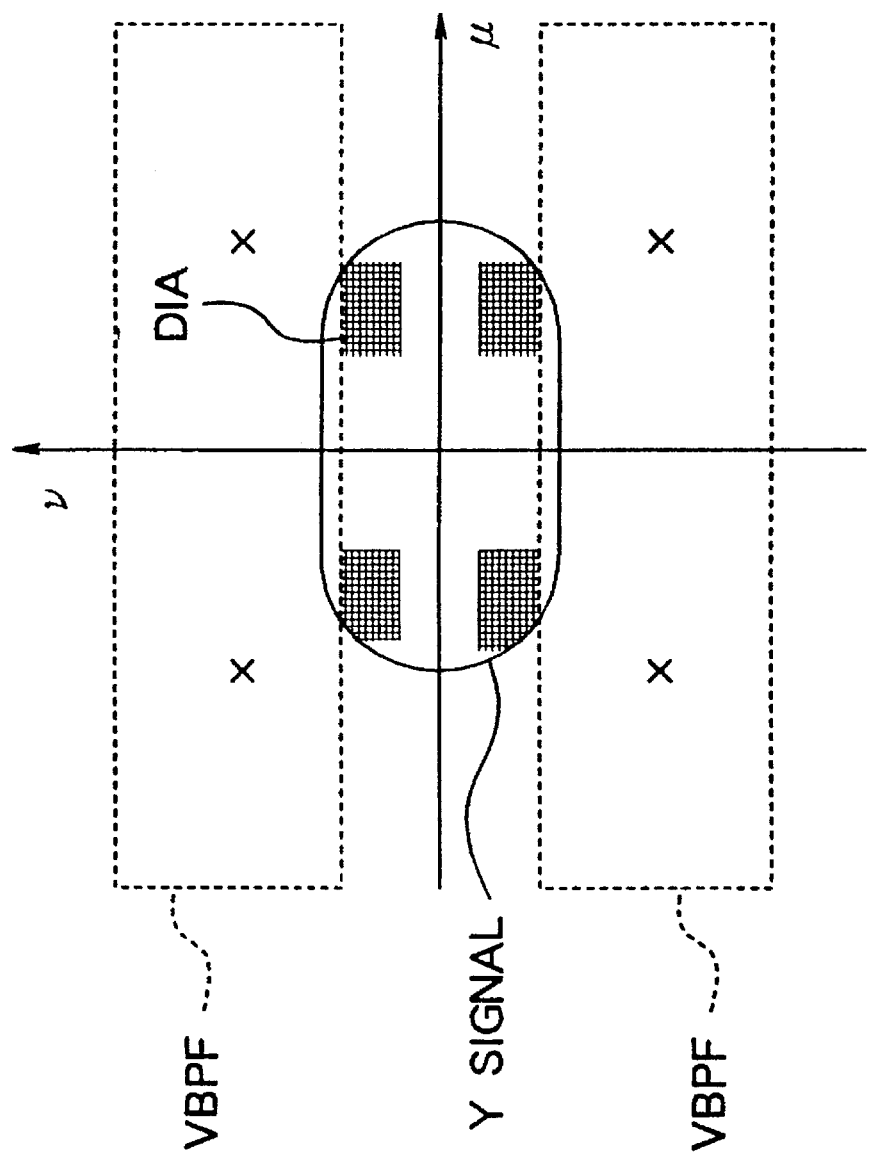
FIG. 8 is a diagram showing the frequency distribution of the signal due to diagonal stripes or diagonal grating.

Consequently, if DCH2 and DCV2 are so set that the left side of the expression expressing the condition for selecting the vertical chrominance extraction filter 15, i.e., max (a·DYH, b·DCH2) results in less extraction, compared with the counterpart in Embodiment 1, max (a·DYH, b·DCH), of luminance signal diagonal components indicated by cross hatching DIA in FIG. 8 (due to the oblique stripes in the picture, for example), and the right side of the above expression, max (c·DYV, d·DCV2) results in more extraction, compared with the counterpart in Embodiment 1, max (c·DYV, d·DCV), of such luminance signal diagonal components, then it is possible to prevent undue selection of the vertical chrominance extraction filter 15. Therefore it is possible to restrain cross color due to leakage of the vertically extending luminance signal components (of the horizontal and vertical frequency components originating from luminance signal diagonal components) into the chrominance signal region.

The control over the selection by the selectors 23 and 25 in accordance with the basis of the output signal 110 of the decision circuit 40 of FIG. 10 is as shown in Table 2.

Embodiment 4

This embodiment is similar to Embodiment 2, but in place of the picture non-correlation decision circuit 18 of FIG. 9, the picture non-correlation decision circuit shown in FIG. 10 is used. The selecting operation of the selector 23 responsive to the output of the decision circuit 40 is as shown in Table 2.

Embodiment 5

Figure 11:
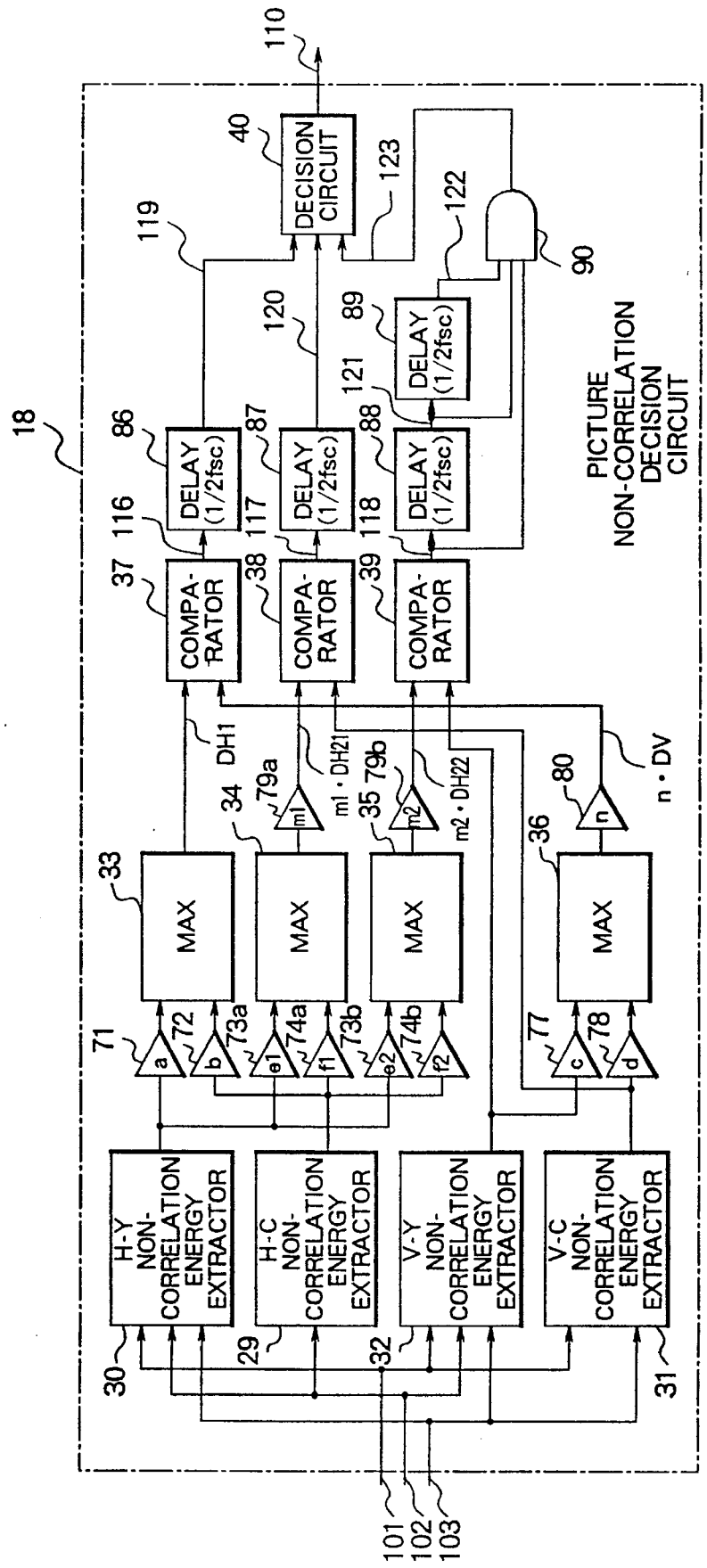
FIG. 11 is a block diagram showing a picture non-correlation decision circuit 18 used in Embodiments 5 and 6.

This embodiment is similar to Embodiment 1, but in place of the picture non-correlation decision circuit 18 of FIG. 9, the picture non-correlation decision circuit shown in FIG. 11 is used.

The picture non-correlation decision circuit 18 of FIG. 11 is similar to that of FIG. 9, but delay circuits 86, 87, 88 and 89, an AND circuit 90 are additionally provided, between the comparators 37, 38 and 39 and the decision circuit 40. The delay time of each of the delay circuits 86, 87, 88 and 89 is ½fsc.

Specifically, the output signal 116 of the comparator 37 is applied to the delay circuit 86, the output signal 117 of the comparator 38 is applied to the delay circuit 87, and the output signal 118 of the comparator 39 is applied to the delay circuit 88, whose output 121 is applied to another delay circuit 89. The output signals 118, 121 and 122 of the comparator 39, and the delay circuits 88 and 89 are applied to the AND circuit 90. The decision circuit 40 receives the output signals 119, 120 and 123 of the delay circuits 86 and 87, and the AND circuit 90.

Following is a description of the operation of the embodiment of FIG. 11. The operation up to comparators 37, 38 and 39 is the sane as the embodiment of FIG. 9.

The signal 116 is delayed ½fsc by the delay circuit 86 and the signal 117 is delayed ½fsc by the delay circuit 87, and these signals are then respectively applied to the decision circuit 40. The signal 118 is delayed ½fsc by the delay circuit 88. This output signal 121 is further delayed ½fsc by the delay circuit 89 and applied to the AND circuit 90, The signals 118 and 121 are also applied to this AND circuit 90.

The output signals 119, 120 and 123 off the delay circuits 86 and 87, and the AND circuit 90 are respectively applied to the decision circuit 40.

As described in connection with the picture non-correlation decision circuit 18 of FIG. 9, the decision circuit 40 controls the selecting operation of the selectors 23 and 25 according to the results off the correlation detection. The control over the selection by the selectors 23 and 25 in accordance with the output signal 110 of the decision circuit 40 is as shown in Table 2.

When the output signals 110a and 110b of the AND circuits 41 and 42 are both "0", the selector 23 selects the output signal 109 of the compensating delay circuit 21. When the output signal 110b of the AND circuit 41 is "0" and the output signal 110b of the AND circuit 42 is "1", the output signal 107 of the compensating delay circuit 20 is selected. When the output signal 110a off the AND circuit 41 is "1" and the output signal 110b of the AND circuit 42 is "0", the output signal 111 of the compensating delay circuit 22 is selected.

When the output signal 110b off the AND circuit 42 is "1", the selector 25 selects the output signal 1131 of the compensating delay circuit 91. When the signal 110b is "0", the output signal 1132 of the horizontal, chrominance extraction filter 24 is selected.

Consequently, in the case of this embodiment, the response C11(Z) of the filter for extracting the chrominance signal output through the terminal 26 and the response C12(Z) of the filter for extracting the chrominance signal for extracting the luminance signal are given according to the presence or absence of correlation in the following manner. When vertical non-correlation is strong, $$C11(Z)=Ch1(Z)$$

$$C12(Z)=Ch1(Z) \cdot Ch2(Z)$$

When horizontal non-correlation is strong, $$C11(Z)=C12(Z)=Cv(Z)$$

When neither of these conditions are met, $$C11(Z)=Chv(Z)$$

$$C12(Z)=Chv(Z) \cdot CH2(Z)$$

Embodiment 6

This embodiment is similar to Embodiment 2, but in place of the picture non-correlation decision circuit 18 of FIG. 9, the picture non-correlation decision circuit shown in FIG. 11 is used.

The relationship between the input signals 119, 120 and 123 of the decision circuit 40, and its output signal 110 (see FIG. 48), the selection of the chrominance output signal 107, 109 or 111 at the selector 23, and the selection of the chrominance output signal 1131 or 1132 at the selector 25a is as shown in Table 2.

When the output signals 110a and 110b of the AND circuits 41 and 42 are both "0", the selector 23 selects the output signal 109 of the compensating delay circuit 21. When the output signal 110a of the AND circuit 41 is "0" and the output signal 110b of the AND circuit 42 is "1", the output signal 107 of the compensating delay circuit 20 is selected. When the output signal 110a of the AND circuit 41 is "1" and the output signal 110b of the AND circuit 42 is "0", the output signal 111 of the compensating delay circuit 22 is selected.

When the output signal 110b of the AND circuit 42 is "1", the selector 25a selects the output signal 1131 of the compensating delay circuit 91a. When the signal 110b is "0", the output signal 1132 of the horizontal chrominance extraction filter 24a is selected.

Consequently, in the case of this embodiment, the response C21(Z) of the filter for extracting the chrominance signal output through the terminal 26, and the response C22(Z) of the filter for extracting the chrominance signal used for extracting the luminance signal are given below: When vertical non-correlation is strong, $$C21(Z)=Ch1(Z) \cdot Ch2(Z)$$

$$C22(Z)=Ch1(Z)$$

When horizontal non-correlation is strong, $$C21(Z)=C22(Z)=Cv(Z)$$

When neither of these conditions are met, $$C21(Z)=Chv(Z) \cdot CH2(Z)$$

$$C22(Z)=Chv(Z)$$

Embodiment 7

Figure 12:
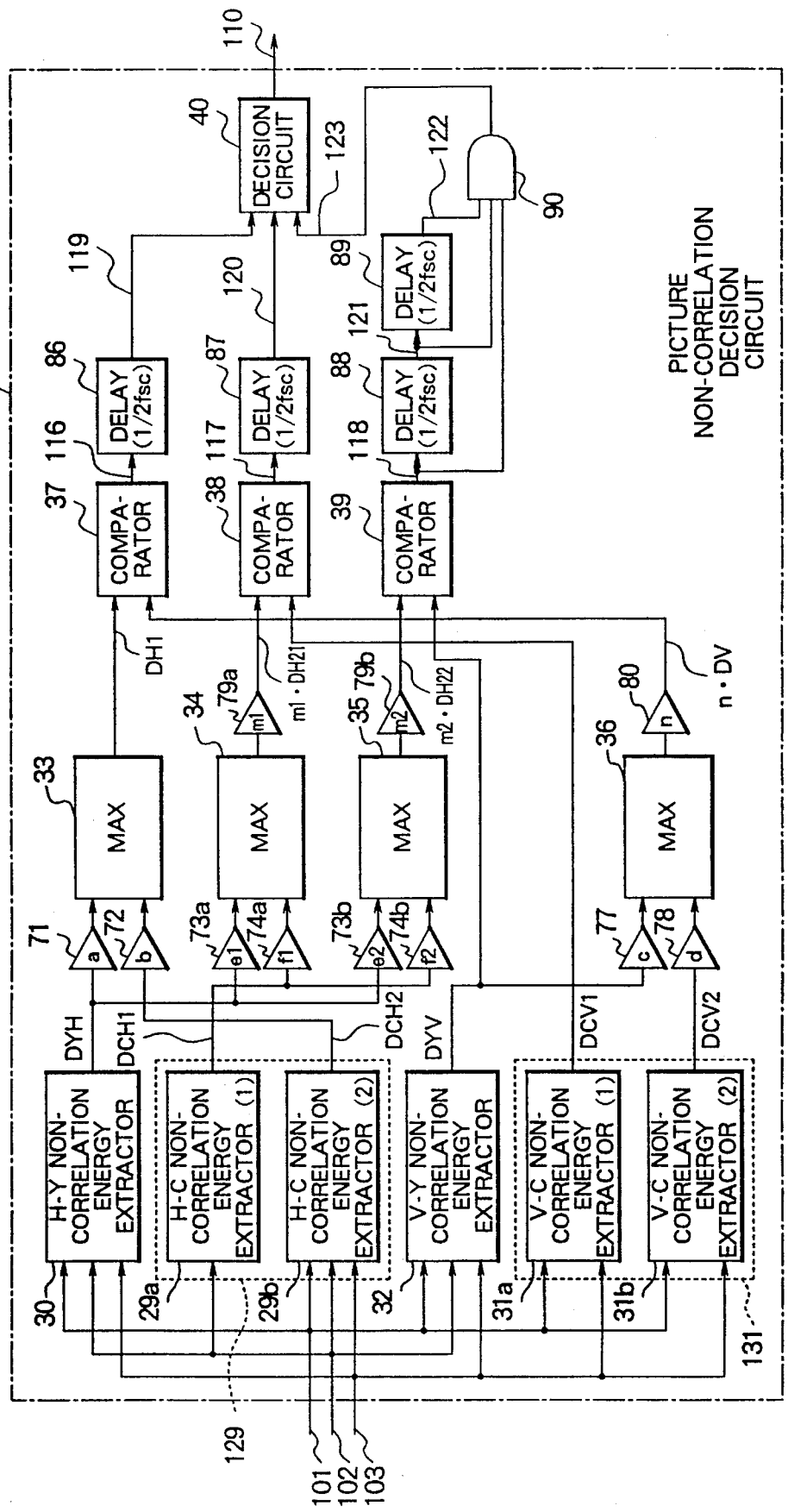
FIG. 12 is a block diagram showing a picture non-correlation decision circuit 18 used in Embodiments 7 and 8.

This embodiment is similar to Embodiment 1, but in place of the picture non-correlation decision circuit 18 of FIG. 9, the picture non-correlation decision circuit shown in FIG. 12 is used.

The picture non-correlation decision circuit 18 of this embodiment is basically similar to that of FIG. 9, but the modifications described with reference to FIG. 10 and FIG. 11 are both applied. That is, compared with the picture non-correlation decision circuit of FIG. 11, the picture non-correlation decision circuit of FIG. 12 is provided with the horizontal chrominance non-correlation energy extractor 129 comprising the first and second horizontal chrominance non-correlation energy extractors 29a and 29b, and the vertical chrominance non-correlation energy extractor 131 comprising the first and second vertical chrominance non-correlation energy extractors 31a and 31b. The output signal DCH1 of the first horizontal chrominance non-correlation energy extractor 29a is multiplied by a coefficient f1 is applied at the multiplier 74a to produce a product f1·DCH1, which, together with e1·DYH, is applied to the maximum value circuit 34 for detecting the larger one of them, DH21. The output signal DCH is also multiplied by a coefficient f2 at the multiplier 74b to produce their product f2·DCH1, which, together with e2·DYH, is applied to the maximum value circuit 35 for detecting the larger one of them, DH22.

The output signal DCH2 of the second horizontal chrominance non-correlation energy extractor 29b is multiplied by a coefficient b at the multiplier 72 to produce their product b·DCH2, which, together with a·DYH, is applied to the maximum value circuit 33 for detecting the larger one of them, DH1. The output signal DCV2 of the second vertical chrominance non-correlation energy extractor 31b is multiplied by a coefficient d at the multiplier 78 to produce their product d·DCV2, which together with c·DYV, is applied to the value circuit 36 for detecting the larger one of them, DV.

The signals DH1 and n·DV are compared at the comparator 37, the signals DCV1 and m1·21 are compared at the comparator 38, and the signals DYV and m2·DH22 are compared at comparator 39.

The control over selection by the selectors 23 and 25 according to the output 110 of the decision circuit 40 of the embodiment of FIG. 12 is the same as shown in Table 2.

In the case of the above embodiment, the signal 118 is sent through two delay circuits and when the sample values of reference sampling points one before and one after the specific sampling point are both "1", the signal 123 is "1". However, the number of the reference sampling points may be other than two, but what is required is that the same number of reference sampling points be provided before and after the specific sampling points so as to enable non-correlation. When the number of the reference sampling points is R (integer), the same number (R) of delay circuits are needed to delay the signals 116 and 117.

Embodiment 8

This embodiment is similar to Embodiment 2, but in place of the picture non-correlation decision circuit 18 of FIG. 9, the picture non-correlation decision circuit shown in FIG. 12 is used.

The control over selection by the selectors 23 and 25 according to the output 110 of the decision circuit 40 is the same as shown in Table 2.

Embodiment 9

Figure 13:
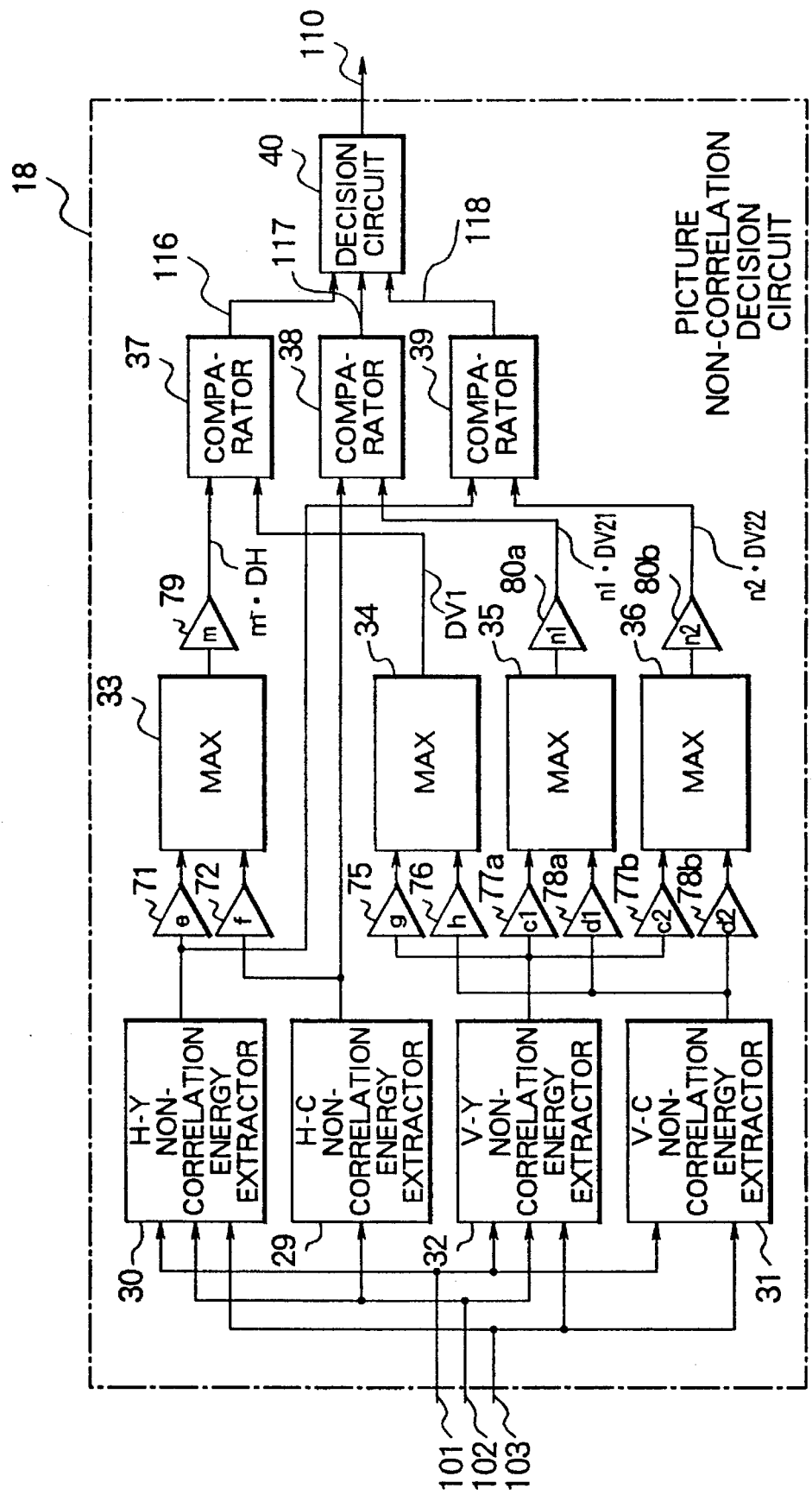
FIG. 13 is a block diagram showing a picture non-correlation decision circuit 18 used in Embodiments 9 and 10.

This embodiment is similar to Embodiment 1, but in place of the picture non-correlation decision circuit 18 of FIG. 9, the picture non-correlation decision circuit shown in FIG. 13 is used.

The picture non-correlation decision circuit 18 of FIG. 13 is similar to that of FIG. 9 in that it comprises the non-correlation energy extractors 29 to 31, the maximum value circuits 33 to 36, the comparators 37 to 39, and the decision circuit 40. However, they are interconnected differently, via a different set of multipliers 71, 72, 75, 76b, 77a, 77b, 78a, 78b, 79, 80a and 80b. The output signal DCH of the horizontal chrominance non-correlation energy extractor 29 is branched in two routes. In the first route, the signal is directly applied to the comparator 36. In the second route, the signal is multiplied by a coefficient f at the multiplier 72 and the resultant signal is sent to the maximum value circuit 33.

The output signal DYH of the horizontal luminance non-correlation energy extractor 30 is branched in two routes. In the first route, the signal is applied directly to the comparator 39. In the second route, the signal is multiplied by a coefficient h at the multiplier 72 and the resultant signal is sent to the maximum value circuit 33.

The output signal DCV of the circuit for vertical chrominance non-correlation energy extractor 31 is branched in three routes, in the first route, the signal is multiplied by a coefficient h at the multiplier 76 and the resultant signal is sent to the maximum value circuit 34. In the second route, the signal is multiplied by a coefficient d1 at the multiplier 78a and the resultant signal is sent to the maximum value circuit 35. In the third route, the signal is multiplied by a coefficient d2 at the multiplier 78b and the resultant signal is sent to the maximum value circuit 36.

The output signal DYV of the vertical luminance non-correlation energy extractor 32 is branched in three routes. In the first route, the signal is multiplied by a coefficient g at the multiplier 75 and the resultant signal is sent to the maximum value circuit 34. In the second route, the signal is multiplied by a coefficient c1 at the multiplier 77a and the resultant signal is sent to the maximum value circuit 35. In the third route, the signal is multiplied by a coefficient c2 at the multiplier 77b and the resultant signal is sent to the maximum value circuit 86.

The multiplier 79 multiplies the output signal of the maximum value circuit 33 by a coefficient m, and sends the product to the comparator 37 as the horizontal non-correlation energy DH.

The output signal of the maximum value circuit 33 is applied as a first vertical non-correlation energy DV1 to the comparator 37.

The output signal of the maximum value circuit 35, as a second vertical non-correlation energy DV21, is multiplied by a coefficient n1 at the multiplier 80a, and the product is sent to the comparator 38.

The output signal of the maximum value circuit 36, as a third vertical non-correlation energy DV22, is multiplied by a coefficient n2 at the multiplier 80b, and the product is sent to the comparator 39.

The comparator 37 compares the first vertical non-correlation energy DV1 and the product of the horizontal non-correlation energy DH and the coefficient m, and produces a high level output signal 116 when $DV1 \geq m \cdot DH$, and a low level output signal 116 at other times.

The comparator 38 compares the horizontal chrominance non-correlation energy DCH and the product of the second vertical non-correlation energy DV21 and the coefficient n1, and produces a high level output signal 117 when $DCH \geq n1 \cdot DV21$, and a low level output signal 117 at other times.

The comparator 39 compares the horizontal luminance non-correlation energy DYH and the product of the third vertical non-correlation energy DV22 and the coefficient n2, and produces a high level output signal 118 when $DYH \geq n2 \cdot DV22$, and a low level output signal 118 at other times.

The respective output signals 116, 117 and 118 of the comparators 37, 38 anti 39 are applied to the decision circuit 40. The output signal 110 of the decision circuit 40 serves as the output signal of the picture non-correlation decision circuit 18.

Following is a description of the picture non-correlation decision circuit 18 operation in accordance with this embodiment.

The horizontal non-correlation energy DH, the first vertical non-correlation energy DV1, the second vertical non-correlation energy DV21 and the third vertical non-correlation energy DV22 can be expressed as follows.

$$DH = \max(e \cdot DYH, f \cdot DCH)$$

$$DV1 = \max(g \cdot DYV, h \cdot DCV)$$

$$DV21 = \max(c1 \cdot DYV, d1 \cdot DCV)$$

$$DV22 = \max(c2 \cdot DYV, d2 \cdot DCV)$$

At the comparator 37, DV1 and n·DH are compared. If $$DV1 \geq m \cdot DH$$

the vertical non-correlation is interpreted as strong, and a "1" signal 116 is sent to the decision circuit 40. If $$DV1 < m \cdot DH$$

the vertical non-correlation is interpreted as weak, and a "0" signal 116 is sent to the decision circuit 40.

At the comparator 38, DCH and n1·DV21 are compared. If $$DCH \geq n1 \cdot DV21$$

the horizontal non-correlation is interpreted as strong, and a "1" signal 117 is sent to the decision circuit 40. If $$DCH < n1 \cdot DV21$$

the horizontal non-correlation is interpreted as weak, and a "0" signal 117 is sent to the decision circuit 40.

At the comparator 39, DYH and n2·DV22 are compared. If $$DYH \geq n2 \cdot DV22$$

the horizontal non-correlation is interpreted as strong, and a "1" signal 118 is sent to the decision circuit 40. If $$DYH < n2 \cdot DV22$$

the horizontal non-correlation is interpreted as weak, and a "0" signal 118 is sent to the decision circuit 40.

According to the results of the above correlation detection, the decision circuit 40 controls the selector in the following manner. That is, the relationship of the input signals 116, 117 and 118 off the decision circuit 40, and its output signal 110, the selection of the chrominance output signal 107, 109 or 111 at the selector 23 and the selection of the chrominance output signal 1131 or 1132 at the selector 25 is as shown in Table 3.

When the output signals 110a and 110b of the AND circuits 41 and 42 are both "0", the selector 23 selects the output signal 107 of the compensating delay circuit 20. When the output signal 110a of the AND circuit 41 is "0" and the output signal 110b of the AND circuit 42 is "1", the output signal 109 of the compensating delay circuit 21 is selected. When the output signal 110a of the AND circuit 41 is "1" and the output signal 110b of the AND circuit 42 is "0", the output signal 111 of the compensating delay circuit 22 is selected.

When the output signals 110a and 110b of the AND circuits 41 and 42 are both "0", the selector 25 selects the output signal 1131 of the compensating delay circuit 91. At other times, the selector 25 selects the output signal 1132 of the horizontal chrominance extraction filter 24.

Consequently, in this embodiment, the response C11(Z) of the filter for extracting the chrominance signal output through the terminal 26 and the response C12(Z) of the filter for extracting the chrominance signal for extracting the luminance signal are given according to the presence or absence of correlation in the following manner.

When the vertical non-correlation is strong, $$C11(Z) = Ch1(Z)$$

$$C12(Z) = Ch1(Z) \cdot Ch2(Z)$$

When the horizontal non-correlation is strong, $$C11(Z) = C12(Z) = Cv(Z)$$

When neither of these conditions are met, $$C11(Z) = Chv(Z)$$

$$C12(Z) = Chv(Z) \cdot CH2(Z)$$

Embodiment 10

This embodiment is similar to Embodiment 2, but in place of the picture non-correlation decision circuit 18 of FIG. 9, the picture non-correlation decision circuit shown in FIG. 13 is used.

Operation of the picture non-correlation decision circuit 18 used in this embodiment is similar to that of Embodiment 9.

The relationship of the input signals 116, 117 and 118 of the decision circuit 40, and its output signal 110, the selection of the chrominance output signal 107, 109 or 111 at the

TABLE 3

| Output 116 (119) of Delay Circuit 86 | Output 117 (120) of Delay Circuit 87 | Output 118 (123) of Circuit 90 | Output 110 of of Decision Circuit 40 | | Chrominance Output 113 Selected by Selector Circuit 23 | Chrominance Output 1133 (1134) Selected by Selector 25 (25a) |
|---|---|---|---|---|---|---|
| | | | Output 110a of AND 41 | Output 110b of AND 42 | | |
| 0 | 0 | 0 | 1 | 0 | 111 | 1132 |
| 0 | 0 | 1 | 0 | 0 | 107 | 1131 |
| 0 | 1 | 0 | 0 | 0 | 107 | 1131 |
| 0 | 1 | 1 | 0 | 0 | 107 | 1131 |
| 1 | 0 | 0 | 0 | 1 | 109 | 1132 |
| 1 | 0 | 1 | 0 | 0 | 107 | 1131 |
| 1 | 1 | 0 | 0 | 0 | 107 | 1131 |
| 1 | 1 | 1 | 0 | 0 | 107 | 1131 | selector 23 and the selection of the chrominance output signal 1131 or 1132 at the selector 25a is as shown in Table 3.

When the output signals 110a and 110b of the AND circuits 41 and 42 are both "0", the selector 23 selects the output signal 107 of the compensating delay circuit 20. When the output signal 110a off the AND circuit 41 is "0" and the output signal 110b of the AND circuit 42 is "1", the output signal 109 of the compensating delay circuit 21 is selected. When the output signal 110a of the AND circuit 41 "1" and the output signal 110b of the AND circuit 42 is "0", the output signal 111 of the compensating delay circuit 22 is selected.

When the output signals 110a and 110b of the AND circuits 41 and 42 and both "0", the selector 25a selects the output signal 1131 of the compensating delay circuit 91a. At other times, the selector 25a selects the output signal 1132 of the horizontal chrominance extraction filter 24a.

Consequently, in this embodiment, the response C21(Z) of the filter for extracting the chrominance signal output through the terminal 26, and the response C22(Z) of the filter for extracting the chrominance signal used for extracting the luminance signal are given below:
When the vertical non-correlation is strong, $$C21(Z)=Ch1(Z) \cdot Ch2(Z)$$

$$C22(Z)=Ch1(Z)$$

When the horizontal non-correlation is strong, $$C21(Z)=C22(Z)=Cv(Z)$$

When neither of these conditions are met, $$C21(Z)=Chv(Z) \cdot CH2(Z)$$

$$C22(Z)=Chv(Z)$$

Embodiment 11

Figure 14:
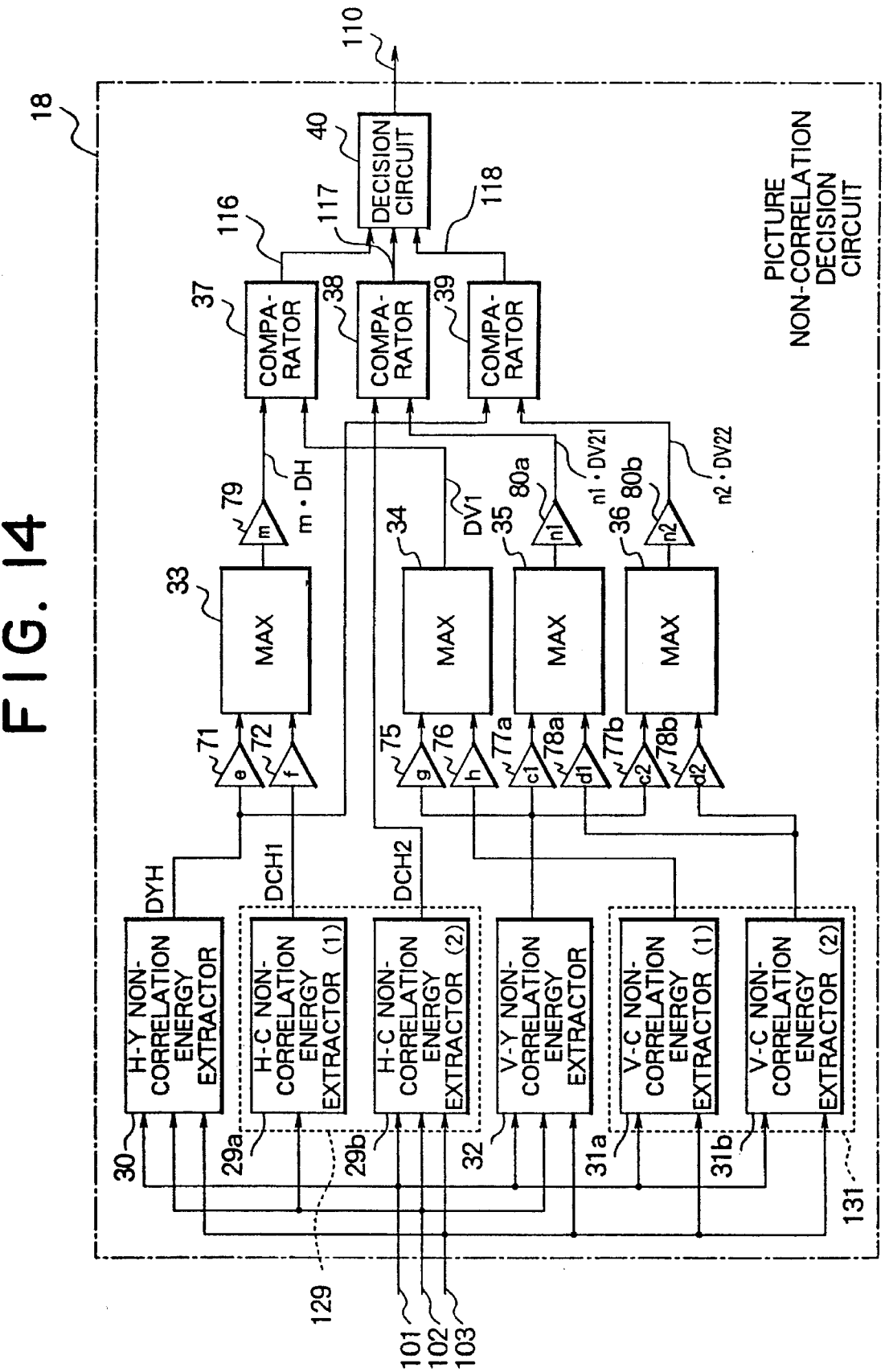
FIG. 14 is a block diagram showing a picture non-correlation decision circuit 18 used in Embodiments 11 and 12.

This embodiment is similar to Embodiment 1, but in place of the picture non-correlation decision circuit 18 of FIG. 9, the picture non-correlation decision circuit shown in FIG. 14 is used.

The picture non-correlation decision circuit 18 of this embodiment is basically similar to that of FIG. 13, but is modified in the same way as described in connection with FIG. 10. That is, it differs from the circuit of FIG. 13, in that it is provided with the horizontal chrominance non-correlation energy extractor 129 comprising the first and second horizontal chrominance non-correlation energy extractors 29a and 29b, and the vertical chrominance non-correlation energy extractor 131 comprising the first and second vertical chrominance non-correlation energy extractors 31a and 31b. The control over the circuits 23 and 25 in accordance with the signal 110 of the decision circuit 40 is as shown in Table 3.

Embodiment 12

This embodiment is similar to Embodiment 2, but in place of the picture non-correlation decision circuit 18 of FIG. 9, the picture non-correlation decision circuit shown in FIG. 14 is used.

The operation of the picture non-correlation decision circuit 18 is the same as Embodiment 11 and the control over the selectors 23 and 25a in accordance with the output signal 110 of the decision circuit 40 is as shown in Table 3.

Embodiment 13

Figure 15:
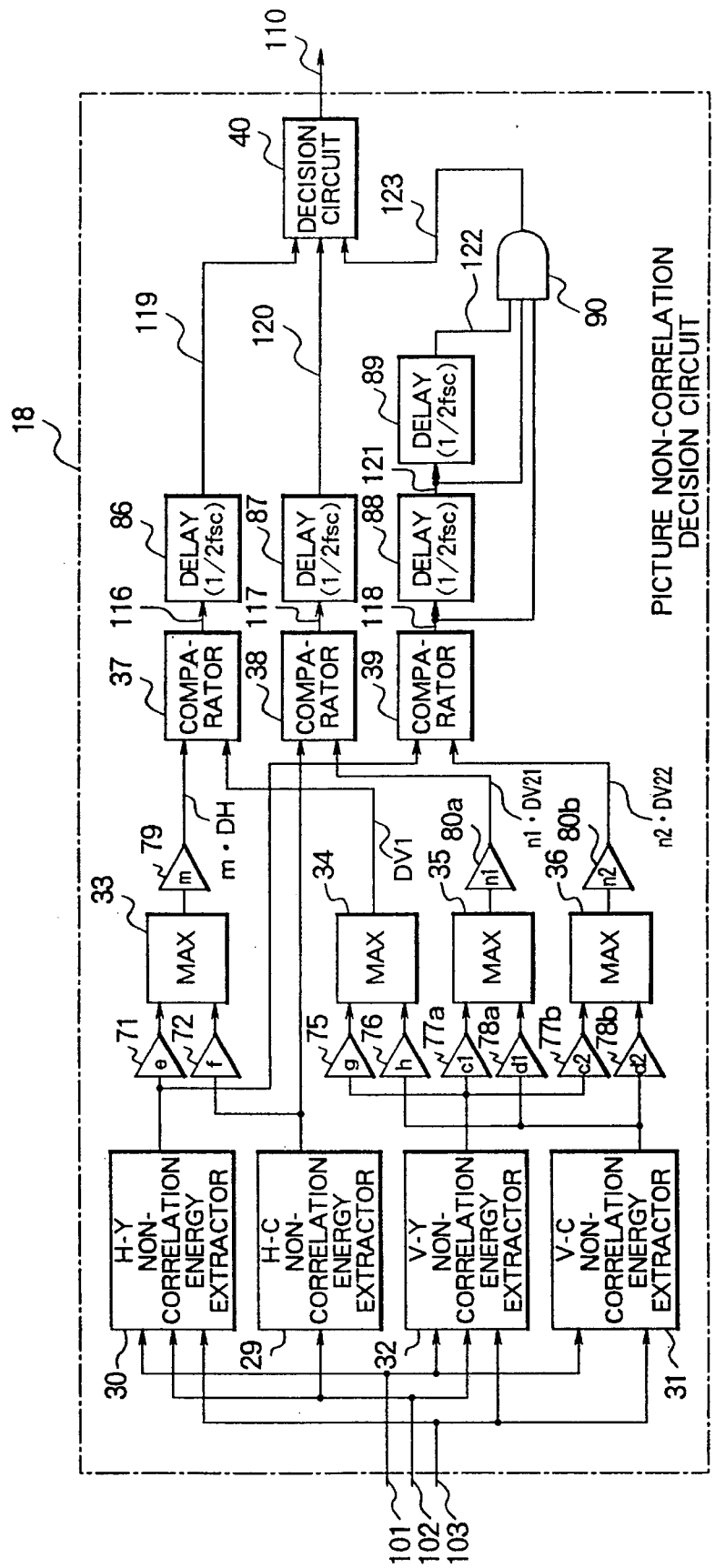
FIG. 15 is a block diagram showing a picture non-correlation decision circuit 18 used in Embodiments 13 and 14.

This embodiment is similar to Embodiment 1, but in place of the picture non-correlation decision circuit 18 of FIG. 9, the picture non-correlation decision circuit shown in FIG. 15 is used.

The picture non-correlation decision circuit 18 of this embodiment is basically similar to that of FIG. 13, but is modified in the same way as described in connection with FIG. 11. That is, it differs from the circuit of FIG. 13, in that the delay circuits 86–89 and the AND circuit 90 similar to those in FIG. 11 are provided between the comparators 37–39 and the decision circuit 40.

Operation of these added circuits is the same as the embodiment of FIG. 11. The decision circuit 40 controls the selectors 23 and 25 on the basis of the input signals 119, 120 and 123 according to the results of correlation detection described in the embodiment of FIG. 13. The control over the selectors 23 and 25a in accordance with the output signal 110 of the decision circuit 40 is as shown in Table 3.

Embodiment 14

This embodiment is similar to Embodiment 2, but in place of the picture non-correlation decision circuit 18 of FIG. 9, the picture non-correlation decision circuit shown in FIG. 15 is used.

The operation of the picture non-correlation decision circuit 18 is the same as Embodiment 13 and the control over the selectors 23 and 25a in accordance with the output signal 110 of the decision circuit 40 is as shown in Table 3.

Embodiment 15

Figure 16:
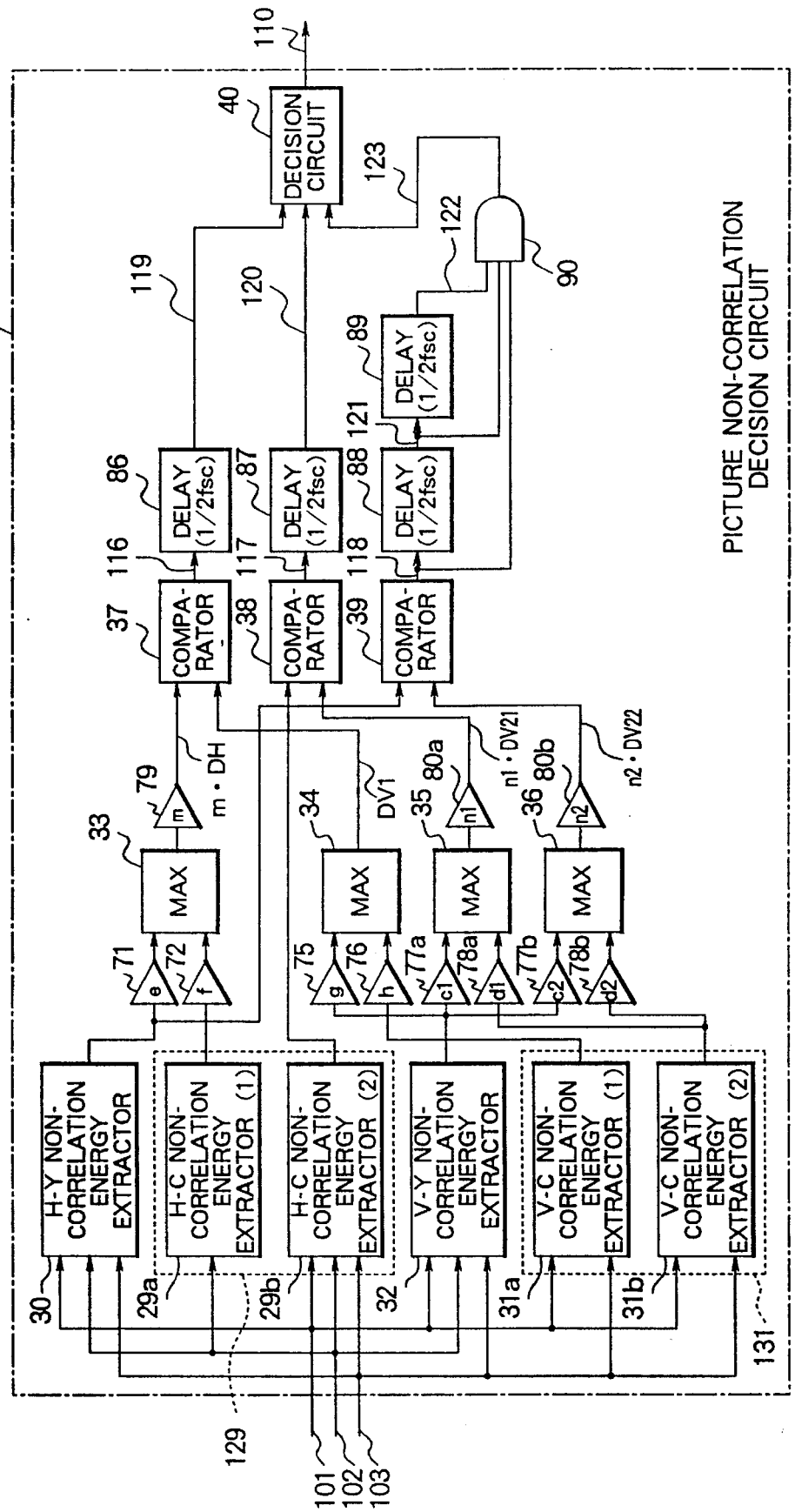
FIG. 16 is a block diagram showing a picture non-correlation decision circuit 18 used in Embodiments 15 and 16.

This embodiment is similar to Embodiment 1, but in place of the picture non-correlation decision circuit 18 of FIG. 9, the picture non-correlation decision circuit shown in FIG. 16 is used.

The picture non-correlation decision circuit 18 of this embodiment is basically similar to that of FIG. 15, but is further modified in the same way as described in connection with FIG. 10.

Thus, the picture non-correlation decision circuit 18 of FIG. 16 differs from that of FIG. 15 in that it is provided with the horizontal chrominance non-correlation energy extractor 129 comprising the first and second horizontal chrominance non-correlation energy extractors 29a and 29b, and the vertical chrominance non-correlation energy extractor 131 comprising the first and second vertical chrominance non-correlation energy extractors 31a and 31b. The control over the selectors 23 and 25 in accordance with the output signal 110 of the decision circuit 40 is the same as shown in Table 3.

Embodiment 16

This embodiment is similar to Embodiment 2, but in place of the picture non-correlation decision circuit 18 of FIG. 9, the picture non-correlation decision circuit shown in FIG. 16 is used.

The operation of the picture non-correlation decision circuit 18 of this embodiment is the same as Embodiment 15 and the control over the selectors 23 and 25a in accordance with the output signal 110 of the decision circuit 40 is the same as shown in Table 3.

Embodiment 17

Figure 17:
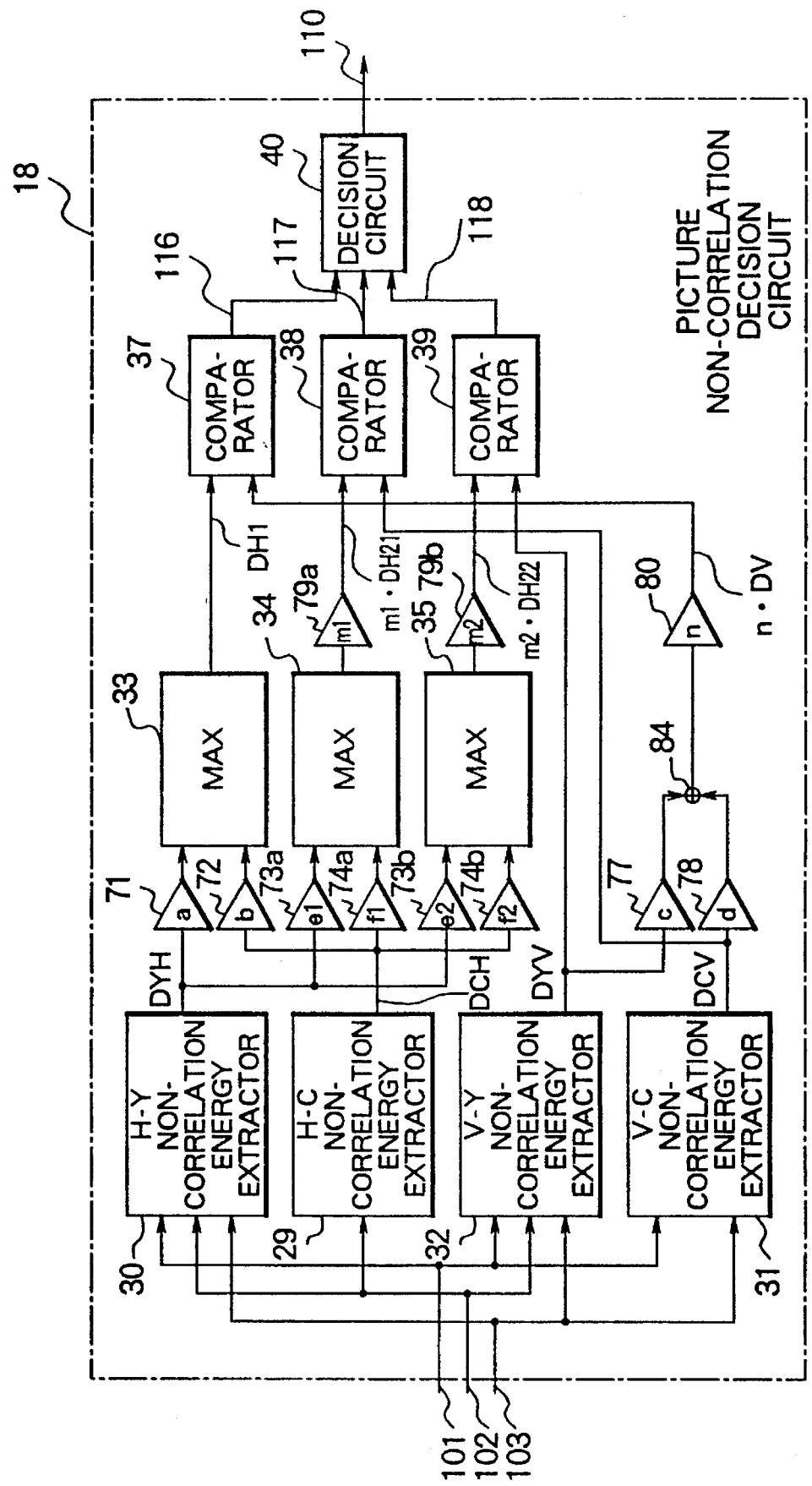
FIG. 17 is a block diagram showing a picture non-correlation decision circuit 18 used in Embodiments 17 and 18.

This embodiment is similar to Embodiment 1, but in place of the picture non-correlation decision circuit 18 of FIG. 9, the picture non-correlation decision circuit shown in FIG. 17 is used.

The picture non-correlation decision circuit 18 of this embodiment is generally similar to that of FIG. 9, but the maximum value circuit 36 of FIG. 9 is replaced by an adder 84.

That is, the output signal DCH of the horizontal chrominance non-correlation energy extractor 29 is branched in three routes. In the first route, the signal is multiplied by a coefficient b at the multiplier 72 and the resultant signal is sent to the maximum value circuit 33. In the second route, the signal is multiplied by a coefficient f1 at the multiplier 74a and the resultant signal is sent to the maximum value circuit 34. In the third route, the signal is multiplied by a coefficient f2 at the multiplier 74b and the resultant signal is sent to the maximum value circuit 35.

The output signal DYH of the horizontal luminance non-correlation energy extractor 30 is branched in three routes. In the first route, the signal is multiplied by a coefficient a at the multiplier 71 and the resultant signal is sent to the maximum value circuit 33. In the second route, the signal is multiplied by a coefficient e1 at the multiplier 73a and the resultant signal is sent to the maximum value circuit 34. In the third route, the signal is multiplied by a coefficient e2 at the multiplier 73b and the resultant signal is sent to the maximum value circuit 35.

The output signal DCV of the vertical chrominance non-correlation energy extractor 31 is branched in two routes. In the first route, the signal is applied directly to the comparator 38. In the second route, the signal is multiplied by a coefficient d at the multiplier 78 and the resultant signal is sent to the adder 84.

The output signal DYV of the vertical luminance non-correlation energy extractor 32 is branched in two routes. In the first route, the signal is applied directly to the comparator 39. In the second route, the signal is multiplied by a coefficient c at the multiplier 77 and the resultant signal is sent to the adder 84.

The output signal of the maximum value circuit 33 is applied as a first horizontal non-correlation energy DH1 to the comparator 37. The output signal of the maximum value circuit 34, as a second horizontal non-correlation energy DH21, is multiplied by a coefficient m1 at the multiplier 79a and the product is sent to the comparator 38. The output signal of the maximum value circuit 35, as a third horizontal non-correlation energy DH22, is multiplied by a coefficient m2 at the multiplier 79b, and the product is sent to the comparator 39.

The output signal of the adder 84, as the vertical non-correlation energy DV, is multiplied by a coefficient n at the multiplier 80, and the product is sent to the comparator 37.

The comparator 37 compares the first horizontal non-correlation energy DH1 and the product n·DV of the vertical non-correlation energy DV and the coefficient n, and produces a high level output signal 116 when DH1≧n·DV, and a low level output signal 116 at other times.

The comparator 38 compares the vertical chrominance non-correlation energy DCV and the product m1·DH21 of the second horizontal non-correlation energy DH21 and the coefficient m1, and produces a high level output signal 117 when DCV≧m1·DH21, and a low level output signal 117 at other times.

The comparator 39 compares the vertical luminance non-correlation energy DYV and the product m2·DH22 of the third horizontal non-correlation energy DH22 and the coefficient m2, and produces a high level output signal 118 when DYV≧m2·DH22, and a low level output signal 117 at other times.

The respective output signals 116, 117 and 118 of the comparators 37, 38 and 39 are applied to the decision circuit 40. The output signal 110 of the decision circuit 40 serves as the picture non-correlation decision circuit 18 output.

Following is a description of the operation of the picture non-correlation decision circuit 18 of this embodiment.

The first horizontal non-correlation energy DH1, the second horizontal non-correlation energy DH21, the third horizontal non-correlation energy DH22 and the vertical non-correlation energy DV can be expressed as follows.

$$DH1 = \max(a \cdot DYH, b \cdot DCH)$$

$$DH21 = \max(e1 \cdot DYH, f1 \cdot DCH)$$

$$DH22 = \max(e2 \cdot DYH, f2 \cdot DCH)$$

$$DV = \max(c \cdot DYV + d \cdot DCV)$$

At the comparator 37, DH1 and n·DV are compared. If $$DH1 \geq n \cdot DV$$

the horizontal non-correlation is interpreted as strong, and a "1" signal 116 is sent to the decision circuit 40. If $$DH1 < n \cdot DH$$

the horizontal non-correlation is interpreted as weak, and a "0" signal 116 is sent to the decision circuit 40.

At the comparator 38, DCV and m1·DH21 are compared. If $$DCV \geq m1 \cdot DH21$$

the vertical non-correlation is interpreted as strong, and a "1" signal 117 is sent to the decision circuit 40. If $$DCV < m1 \cdot DH21$$

the horizontal non-correlation is interpreted as weak, and a "0" signal 117 is sent to the decision circuit 40.

At the comparator 39, DYV and m2·DH22 are compared. If $$DYV \geq m2 \cdot DH22$$

the vertical non-correlation is interpreted as strong, and a "1" signal 118 is sent to the decision circuit 40. If $$DYV < m2 \cdot DH22$$

the vertical non-correlation is interpreted as weak, and a "0" signal 118 is sent to the decision circuit 40.

According to the results of the above correlation detection, the decision circuit 40 controls the selectors 23 and 25 in the following manner.

The relationship between the input signals 116, 117 and 118 of the decision circuit 40, and its output signal 110, the selection of the chrominance output signal 107, 109 or 111 at the selector 23 and the selection of the chrominance output signal 1131 or 1132 at the selector 25 is as shown in Table 2.

When the output signals 110a and 110b of the AND circuits 41 and 42 are both "0", the selector 23 selects the output signal 109 of the compensating delay circuit 21. When the output signal 110a of the AND circuit 41 is "0" and the output signal 110b of the AND circuit 42 is "1", the output signal 107 of the compensating delay circuit 20 is selected. When the output signal 110a of the AND circuit 41 is "1" and the output signal 110b of the AND circuit 42 is "0", the output signal 111 of the compensating delay circuit 22 is selected.

When the output signal 110b of the AND circuit 42 is "1", the selector 25 selects the output signal 1131 of the compensating delay circuit 91. When the output signal 110b is "0", the selector 25 selects the output, signal 1132 of the horizontal chrominance extraction filter 24.

Consequently, in this embodiment, the response C11(Z) of the filter for extracting the chrominance signal output through the terminal 26, and the response C12(Z) of the filter for extracting the chrominance signal used for extracting the luminance signal are given below:

When the vertical non-correlation is strong, $$C11(Z)=Ch1(Z)$$

$$C12(Z)=Ch1(Z) \cdot Ch2(Z)$$

When the horizontal non-correlation is strong, $$C11(Z)=C12(Z)=Cv(Z)$$

When neither of these conditions are met, $$C11(Z)=Chv(Z)$$

$$C12(Z)=Chv(Z) \cdot CH2(Z)$$

Embodiment 18

This embodiment is similar to Embodiment 2, but in place of the picture non-correlation decision circuit 18 of FIG. 9, the picture non-correlation decision circuit shown in FIG. 17 is used. The operation of the picture non-correlation decision circuit 18 is the same as Embodiment 17.

According to the results of the above correlation detection, the decision circuit 40 controls the selectors 23 and 25a in the following manner.

The relationship of the input signals 116, 117 and 118 of the decision circuit 40, and its output signal 110, the selection of the chrominance output signal 107, 109 or 111 at the selector 23 and the selection of the chrominance output signal 1131 or 1132 at the selector 25a is as shown in Table 2.

When the output signals 110a and 110b of the AND circuits 41 and 42 are both "0", the selector 23 selects the output signal 109 of the compensating delay circuit 21. When the output signal 110a of the AND circuit 41 is "0" and the output signal 110b of the AND circuit 42 is "1", the output signal 107 of the compensating delay circuit 20 is selected. When the output signal 110a of the AND circuit 41 is "1" and the output signal 110b of the AND circuit 42 is "0", the output signal 111 of the compensating delay circuit 22 is selected.

When the output signal 110b of the AND circuit 42 is "1", the selector 25a selects the output signal 1131 of the compensating delay circuit 91a. When the signal 110b is "0", the selector 25 selects the output signal 1132 of the horizontal chrominance extraction filter 24a.

Consequently, in the embodiment of FIG. 2, the response C21(Z) of the filter for extracting the chrominance signal output through the terminal 26, and the response C22(Z) of the filter for extracting the chrominance signal used for extracting the luminance signal are given below:

When the vertical non-correlation is strong, $$C21(Z)=Ch1(Z) \cdot Ch2(Z)$$

$$C22(Z)=Ch1(Z)$$

When the horizontal non-correlation is strong, $$C21(Z)=C22(Z)=Cv(Z)$$

When neither of these conditions are met, $$C21(Z)=Chv(Z) \cdot CH2(Z)$$

$$C22(Z)=Chv(Z)$$

Embodiment 19

Figure 18:
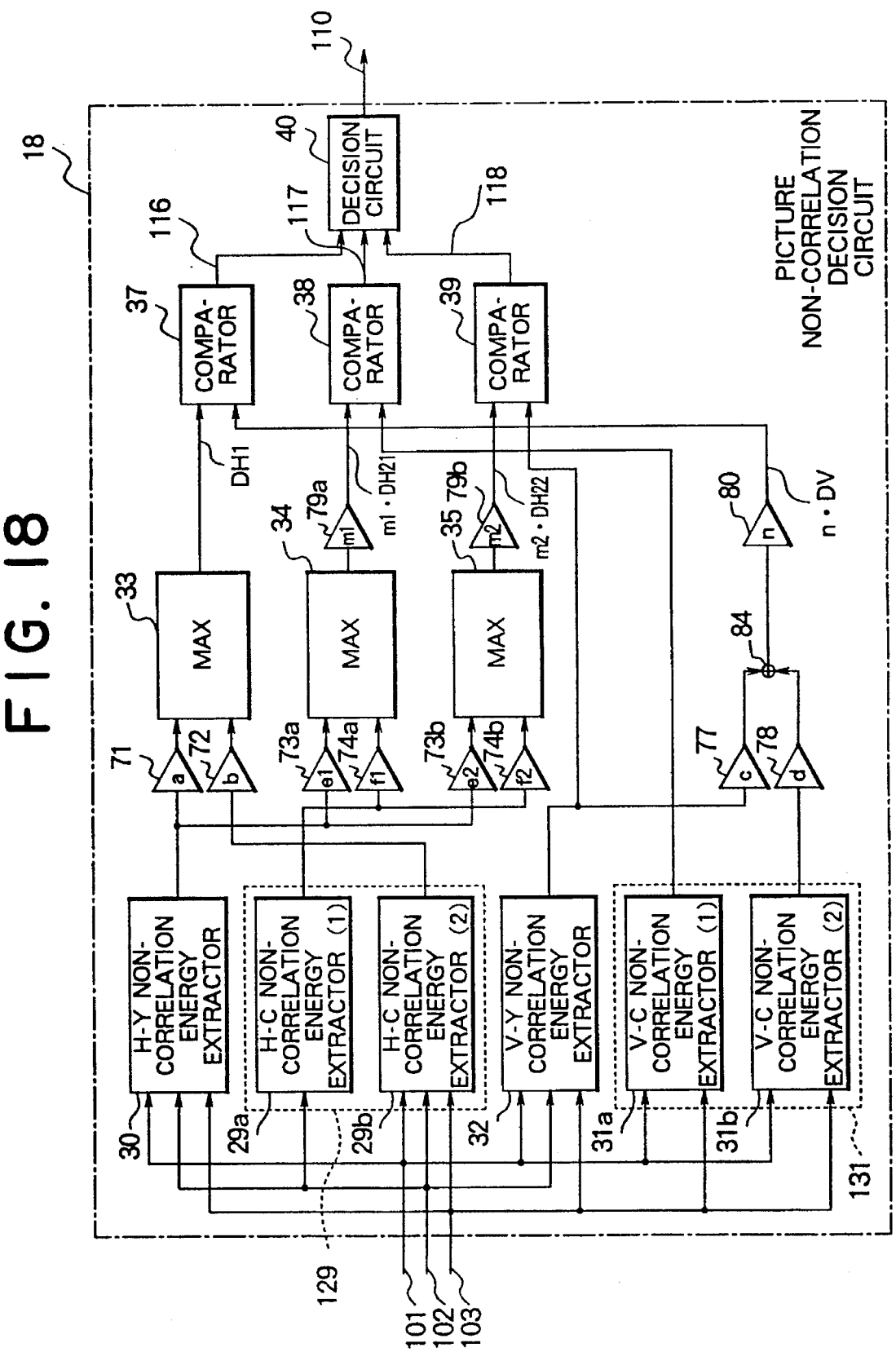
FIG. 18 is a block diagram showing a picture non-correlation decision circuit 18 used in Embodiments 19 and 20.

This embodiment is similar to Embodiment 1, but in place of the picture non-correlation decision circuit 18 of FIG. 9, the picture non-correlation decision circuit shown in FIG. 18 is used.

The picture non-correlation decision circuit 18 of this embodiment is similar to that of FIG. 1.7, but is modified in the manner described with reference to FIG. 10 or FIG. 14. That is, it is provided with the horizontal chrominance non-correlation energy extractor 129 comprising the first and second horizontal chrominance non-correlation energy extractors 29a and 29b, and the vertical chrominance non-correlation energy extractor 131 comprising the first and second vertical chrominance non-correlation energy extractors 31a and 31b. The control over the selection by the selectors 23 and 25 according to the output signal 110 of the decision circuit 40 is as shown in Table 2.

Embodiment 20

This embodiment is similar to Embodiment 2, but in place of the picture non-correlation decision circuit 18 of FIG. 9, the picture non-correlation decision circuit shown in FIG. 18 is used.

The operation of the picture non-correlation decision circuit 18 is the same as Embodiment 19. The control over the selection by the selectors 23 and 25a according to the output signal 110 of the decision circuit 40 is as shown in Table 2.

Embodiment 21

Figure 19:
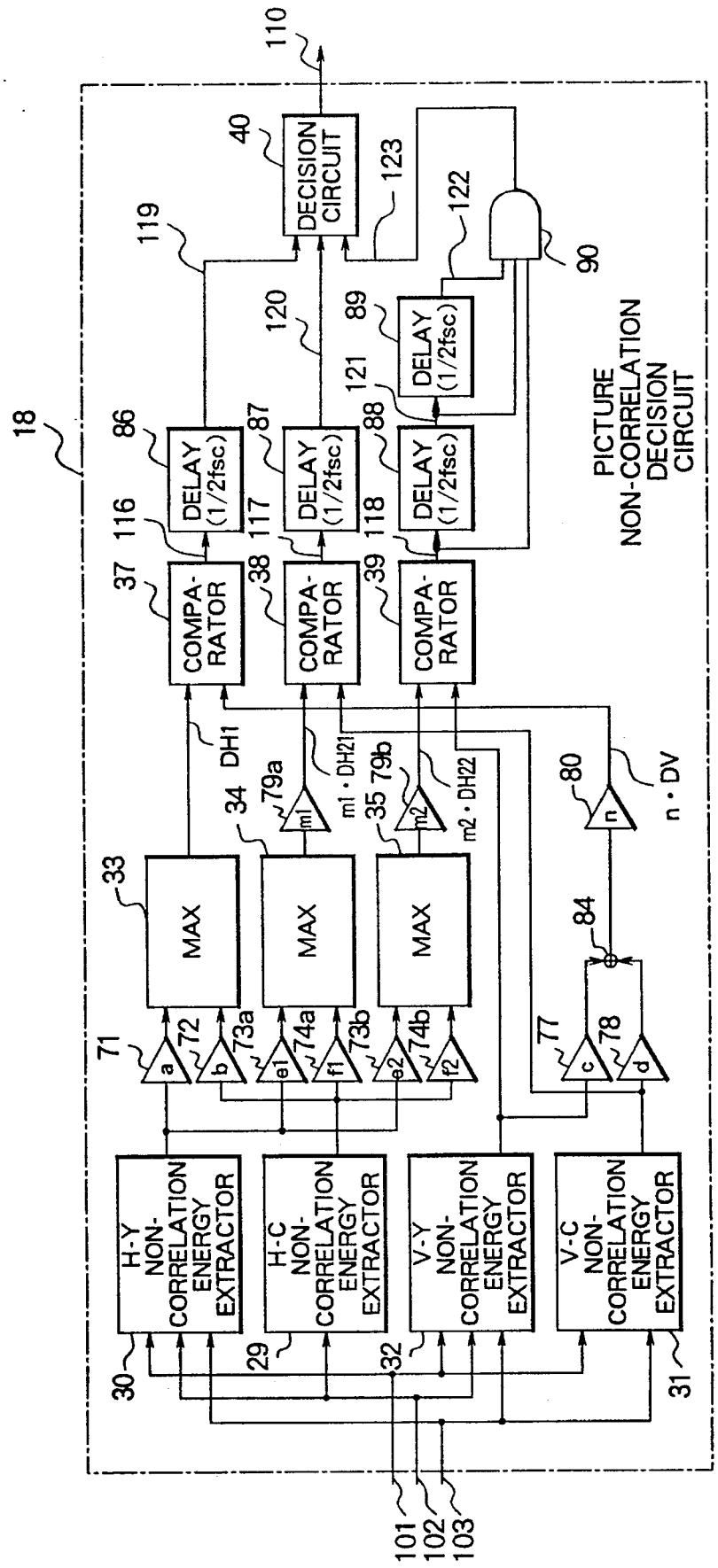
FIG. 19 is a block diagram showing a picture non-correlation decision circuit 18 used in Embodiments 21 and 22.

This embodiment is similar to Embodiment 1, but in place of the picture non-correlation decision circuit 18 of FIG. 9, the picture non-correlation decision circuit shown in FIG. 19 is used.

The picture non-correlation decision circuit 18 of this embodiment is similar to that of FIG. 17, but is modified in the same manner as described with reference to FIG. 11. That is, the picture non-correlation decision circuit 18 of FIG. 19 differs from that of FIG. 17 in that the delay circuits 86–89 and the AND circuit 90 as in FIG. 11 are provided between the comparators 37–39 and the decision circuit 40 of the embodiment of FIG. 17. Operation of these added portions is the same as the embodiment of FIG. 11. The decision circuit 40 controls the selectors 23 and 25 on the basis of the input signals 119, 120 and 123, in accordance with the results of the correlation detection described in the embodiment of FIG. 17.

The relationship of the input signals 119, 120 and 123 of the decision circuit 40, and its output signal 110, the selection of the chrominance output signal 107, 109 or 111 at the selector 23 and the selection of the chrominance output signal 1131 or 1132 at the selector 25 is as shown in Table 2.

Embodiment 22

This embodiment is similar to Embodiment 2, but in place of the picture non-correlation decision circuit 18 of FIG. 9, the picture non-correlation decision circuit shown in FIG. 19 is used.

The operation of the picture non-correlation decision circuit 18 is the same as Embodiment 21.

The relationship of the input signals 119, 120 and 123 of the decision circuit 40, and its output signal 110, the selection of the chrominance output signal 107, 109 or 111 at the selector 23 and the selection of the chrominance output signal 1131 or 1132 at the selector 25a is as shown Table 2.

Embodiment 23

Figure 20:
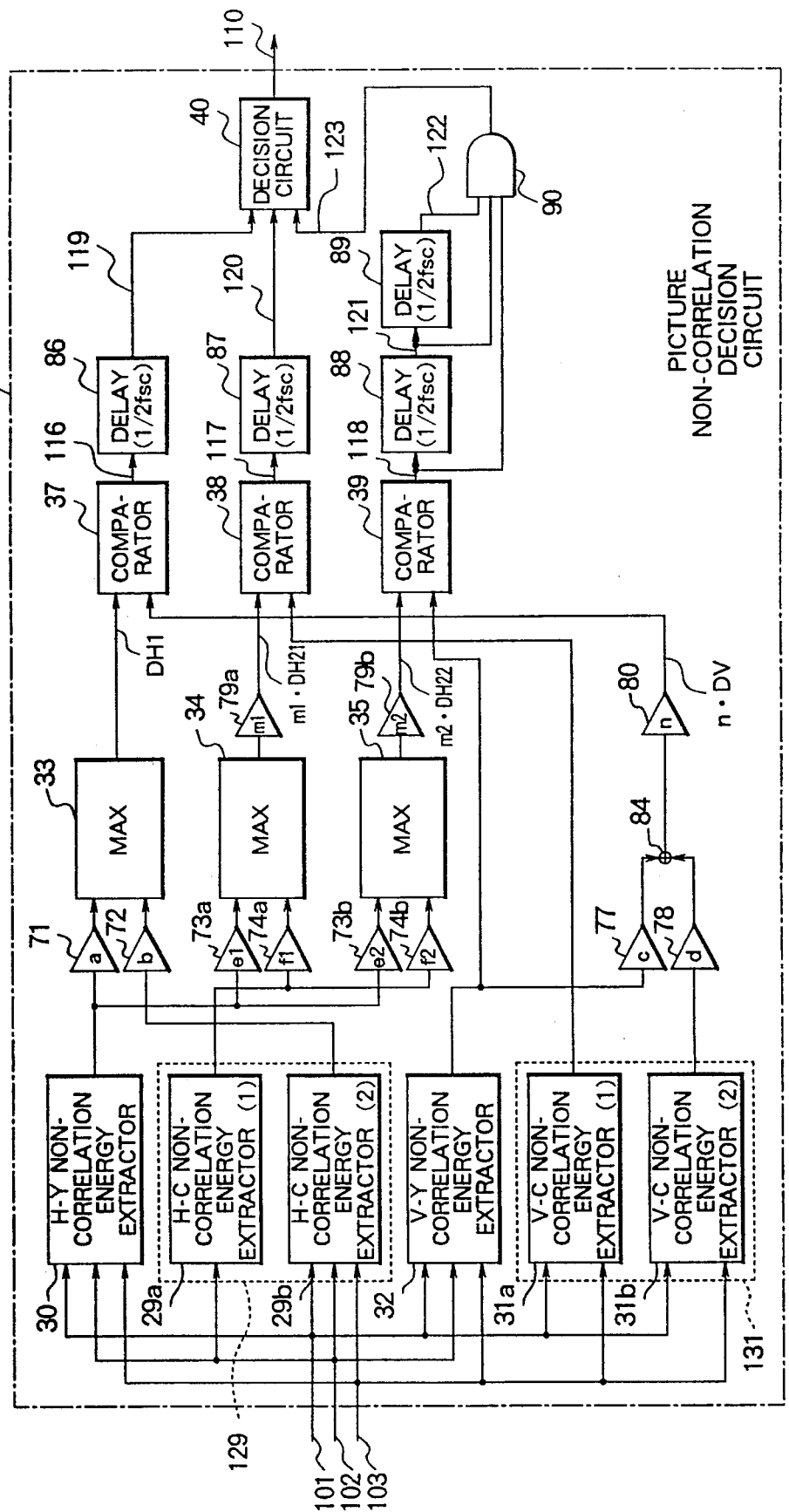
FIG. 20 is a block diagram showing a picture non-correlation decision circuit 18 used in Embodiments 23 and 24.

This embodiment is similar to Embodiment 1, but in place of the picture non-correlation decision circuit 18 of FIG. 9, the picture non-correlation decision circuit shown in FIG. 20 is used.

The picture non-correlation decision circuit 18 of this embodiment is similar to that of FIG. 19, but is modified in the same way as FIG. 10. That is, it is provided with the horizontal chrominance non-correlation energy extractor 129 comprising the first and second horizontal chrominance non-correlation energy extractors 29a and 29b, and the vertical chrominance non-correlation energy extractor 131 comprising the first and second vertical chrominance non-correlation energy extractors 31a and 31b. The control over the selection of the selectors 23 and 25 according to the output signal 110 of the decision circuit 40 is as shown in Table 2.

Embodiment 24

This embodiment is similar to Embodiment 2, but in place of the picture non-correlation decision circuit 18 of FIG. 9, the picture non-correlation decision circuit shown in FIG. 20 is used.

The operation off the picture non-correlation decision circuit 18 is the same as Embodiment 23. The control over the selection of the selectors 23 and 25a according to the output signal 110 of the decision circuit 40 is as shown in Table 2.

Embodiment 25

Figure 21:
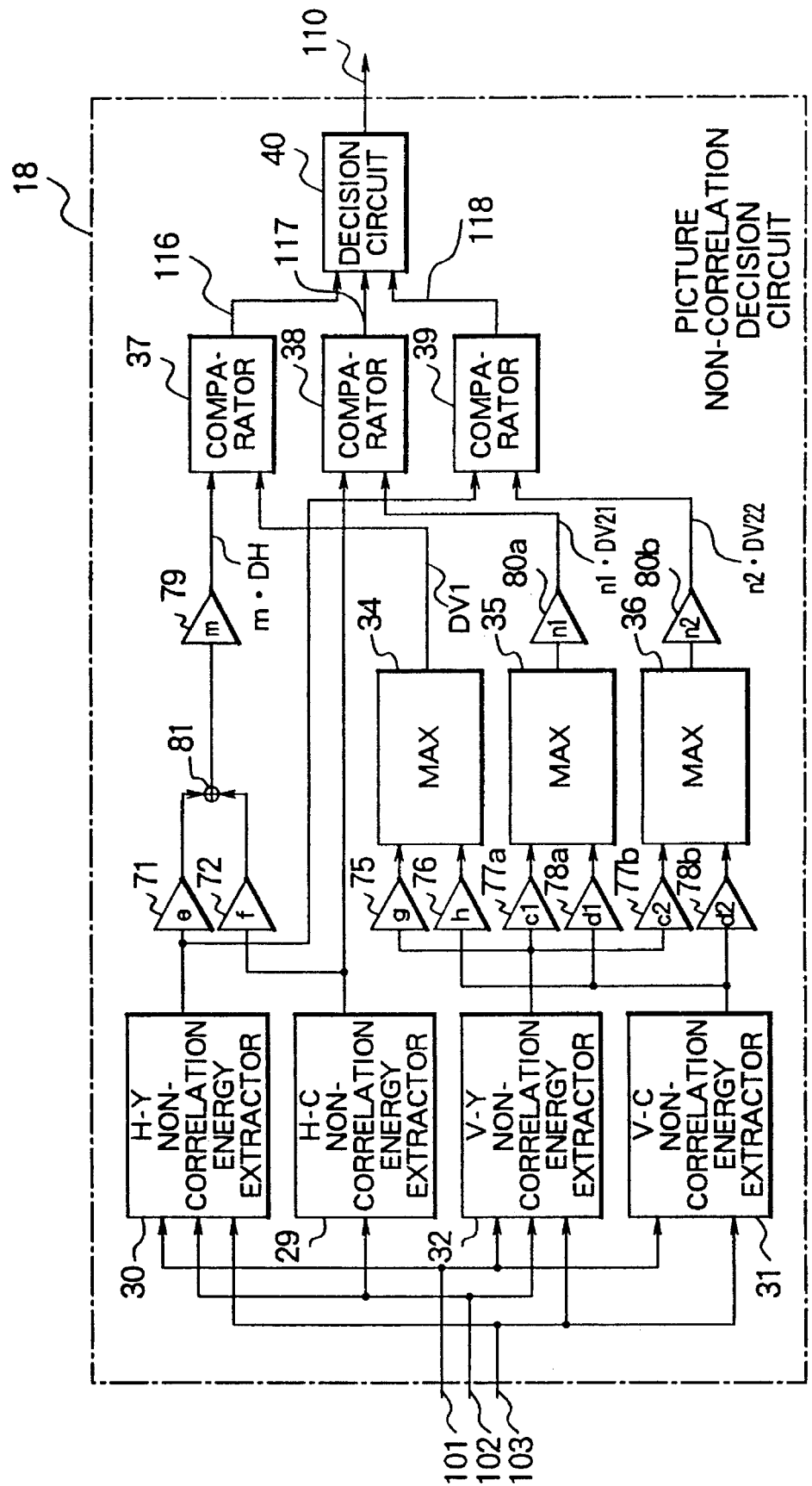
FIG. 21 is a block diagram showing a picture non-correlation decision circuit 18 used in Embodiments 25 and 26.

This embodiment is similar to Embodiment 1, but in place of the picture non-correlation decision circuit 18 of FIG. 9, the picture non-correlation decision circuit shown in FIG. 21 is used.

The picture non-correlation decision circuit 18 of this embodiment is similar to that of FIG. 9, but the maximum value circuit 33 of FIG. 9 is replaced by an adder 81.

That is, the output signal DCH of the horizontal chrominance non-correlation energy extractor 29 is branched in two routes. In the first route, the signal is applied directly to the comparator 38. In the second route, the signal is multiplied by a coefficient f at the multiplier 72 and the resultant signal is sent to the adder 81.

The output signal DYH of the horizontal luminance non-correlation energy extractor 30 is branched in two routes. In the first route, the signal is applied directly to the comparator 39. In the second route, the signal is multiplied by a coefficient e at the multiplier 71 and the resultant signal is sent to the adder 81.

The output signal DCV of the vertical chrominance non-correlation energy extractor 31 is branched in three routes. In the first route, the signal is multiplied by a coefficient h at the multiplier 76 and the resultant signal is sent to the maximum value circuit 34. In the second route, the signal is multiplied by a coefficient d1 at the multiplier 78a and the resultant signal is sent to the maximum value circuit 35. In the third route, the signal is multiplied by a coefficient d2 at, the multiplier 78b and the resultant signal is sent to the maximum value circuit 36.

The output signal DYV of the vertical luminance non-correlation energy extractor 32 is branched in three routes. In the first route, the signal is multiplied by a coefficient g at the multiplier 75 and the resultant signal is sent to the maximum value circuit 34. In the second route, the signal is multiplied by a coefficient c1 at the multiplier 77a and the resultant signal is sent to the maximum value circuit 35. In the third route, the signal is multiplied by a coefficient c2 at the multiplier 77b, and the resultant signal is sent to the maximum value circuit 36.

The output signal of the adder 81, as the horizontal non-correlation energy DH, is multiplied by a coefficient m at the multiplier 79, whose output is sent to the comparator 37. The output signal of the maximum value circuit 34 is applied as a first vertical non-correlation energy DV1 to the comparator 37. The output signal of the maximum value circuit 35, as a second vertical non-correlation energy DV21, is multiplied by a coefficient n1 at the multiplier 80a, and is sent to the comparator 38. The output signal of the maximum value circuit 36, third vertical non-correlation energy DV22, is multiplied by a coefficient n2 at the multiplier 80 to the comparator 39.

The comparator 37 compares the first vertical non-correlation energy DV1 and the product m·DH of the horizontal non-correlation energy DH and the coefficient m, and produces a high level output signal 116 when $DV1 \geq m \cdot DH$, and a low level output signal 116 at other times.

The comparator 38 compares the horizontal chrominance non-correlation energy DCH and the product n1·DV21 of the second vertical non-correlation energy DV21 and the coefficient n1, and produces a high level output signal 117 when $DCH \geq n1 \cdot DV21$, and a low level output signal 117 at other times.

The comparator 39 compares the horizontal luminance non-correlation energy DYH and the product n2·DV22 of the vertical non-correlation energy DV22 and the coefficient n2, and produces a high level output signal 118 when $DYH \geq n2 \cdot DV22$, and a low level output signal 117 at other times.

The respective output signals 116, 117 and 118 of the comparators 37, 38 and 39 are applied to the decision circuit 40. The output signal 110 of the decision circuit 40 serves as the output signal of the picture non-correlation decision circuit 18.

Following is a description of the picture non-correlation decision circuit 18 of this embodiment.

The first vertical non-correlation energy DV1, the second vertical non-correlation energy DV21, the third vertical non-correlation energy DV22 and the horizontal non-correlation energy DH can be expressed as follows.

$$DH = \max(e \cdot DYH + f \cdot DCH)$$

$$DV1 = \max(g \cdot DYV, h \cdot DCV)$$

$$DV21 = \max(c1 \cdot DYV, d1 \cdot DCV)$$

$$DV22 = \max(c2 \cdot DYV + d2 \cdot DCV)$$

At the comparator 37, DV1 and m·DH are compared. If $$DV1 \geq m \cdot DH$$

the vertical non-correlation is interpreted as strong, and a "1" signal 116 is sent to the decision circuit 40. If $$DV1 < m \cdot DV$$

the vertical non-correlation is interpreted as weak, and a "0" signal 116 is sent to the decision circuit 40.

At the comparator 38, DCH and n1·DV21 are compared. If $$DCH \geq n1 \cdot DV21$$

the horizontal non-correlation is interpreted as strong, and a "1" signal 117 is sent to the decision circuit 40. If $$DCH < n1 \cdot DV21$$

the horizontal non-correlation is interpreted as weak, and a "0" signal 117 is sent to the decision circuit 40.

At the comparator 39, DYH and n2·DV22 are compared. If $$DYH \geq n2 \cdot DV22$$

the horizontal non-correlation is interpreted as strong, and a "1" signal 118 is sent to the decision circuit 40. If $$DYH < n2 \cdot DV22$$

the horizontal non-correlation is interpreted as weak, as indicated below, a "0" signal 118 is sent to the decision circuit 40.

According to the results of the above correlation detection, the decision circuit 40 controls the selectors 23 and 25 in the following manner.

The relationship between the input signals 116, 117 and 118 of the decision circuit 40, and its output signal 110, the selection of the chrominance output signal 107, 109 or 111 at the selector 23 and the selection of the chrominance output signal 1131 or 1132 at the selector 25 is as shown in Table 3.

When the output signals 110a and 110b of the AND circuits 41 and 42 are both "0", the selector 23 selects the output signal 107 of the compensating delay circuit 20. When the output signal 110a of the AND circuit 41 is "0" and the output signal 110b of the AND circuit 42 is "1", the output signal 109 of the compensating delay circuit 21 is selected. When the output signal 110a of the AND circuit 41 is "1" and the output signal 110b of the AND circuit 42 is "0", the output signal 111 of the compensating delay circuit 22 is selected.

When the output signals 110a and 110b of the AND circuits 41 and 42 are both "1", the selector 25 selects the output signal 1131 of the compensating delay circuit 91. At other times, the selector 25 selects the output signal 1132 of the horizontal chrominance extraction filter 24.

Consequently, in the embodiment of FIG. 2, the response C11(Z) of the filter for extracting the chrominance signal output through the terminal 2G, and the response C12(Z) of the filter for extracting the chrominance signal used for extracting the luminance signal are given below:

When the vertical non-correlation is strong, $$C11(Z) = Ch1(Z)$$

$$C12(Z) = Ch1(Z) \cdot Ch2(Z)$$

When the horizontal non-correlation is strong, $$C11(Z) = C12(Z) = Cv(Z)$$

When neither of these conditions are met, $$C11(Z) = Chv(Z)$$

$$C12(Z) = Chv(Z) \cdot CH2(Z)$$

Embodiment 26

This embodiment is similar to Embodiment 2, but in place of the picture non-correlation decision circuit 18 of FIG. 9, the picture non-correlation decision circuit shown in FIG. 21 is used.

The operation of the picture non-correlation decision circuit 18 is the same as Embodiment 25

The relationship between the input signals 116, 117 and 118 of the decision circuit 40, and its output signal 110, the selection of the chrominance output signal 107, 109 or 111 at the selector 23 and the selection of the chrominance output signal 1131 or 1132 at the selector 25a is as shown in Table 3.

Embodiment 27

Figure 22:
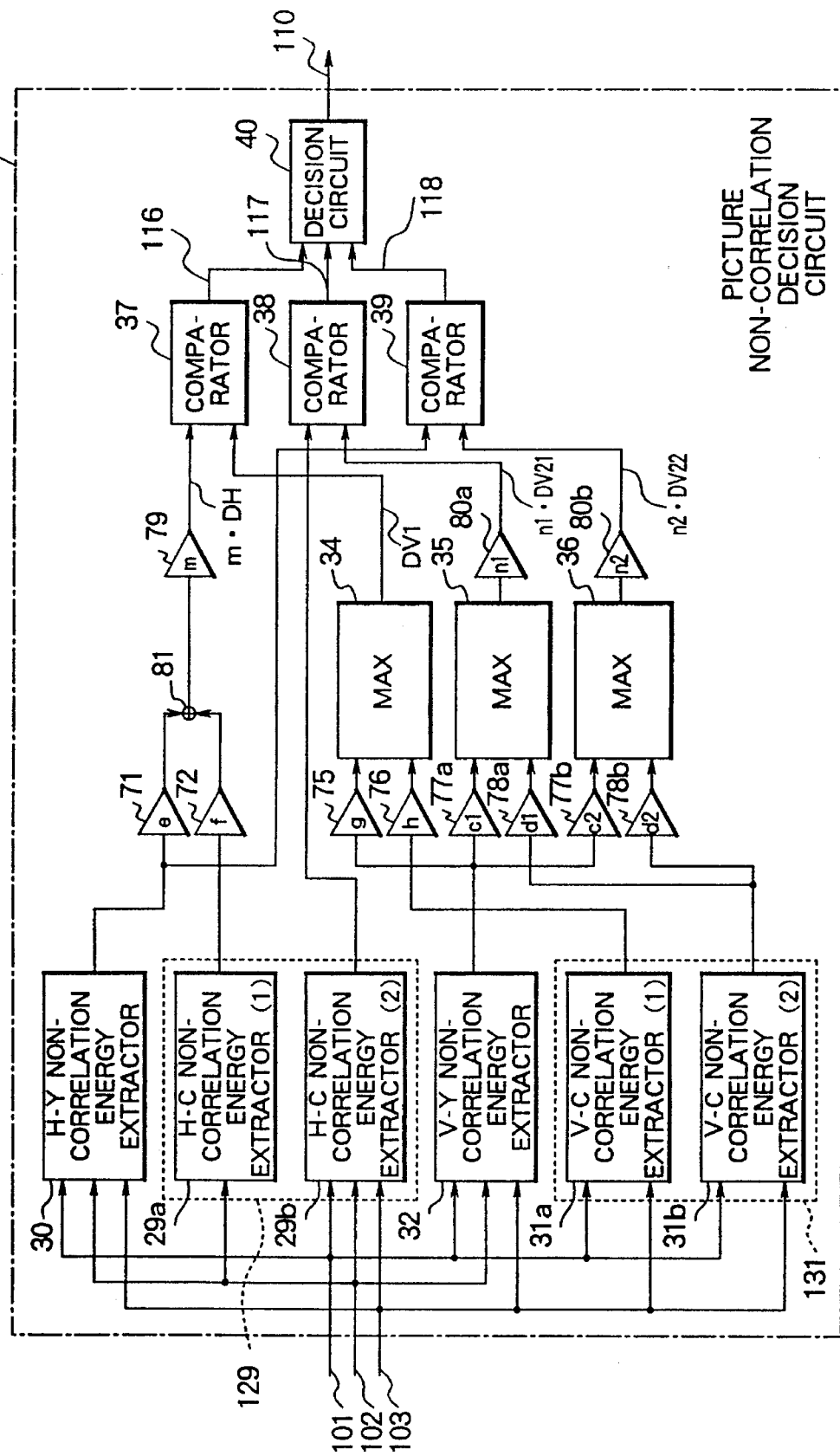
FIG. 22 is a block diagram showing a picture non-correlation decision circuit 18 used in Embodiments 27 and 28.

This embodiment is similar to Embodiment 1, but in place of the picture non-correlation decision circuit 18 of FIG. 9, the picture non-correlation decision circuit shown in FIG. 22 is used.

The picture non-correlation decision circuit 18 of this embodiment is similar to that of FIG. 21, but is modified in the same way as in FIG. 10. That is, it is provided with the horizontal chrominance non-correlation energy extractor 129 comprising the first and second horizontal chrominance non-correlation energy extractors 29a and 29b, and the vertical chrominance non-correlation energy extractor 131 comprising the first and second vertical chrominance non-correlation energy extractors 31a and 31b. The control over the selection by the selectors 23 and 25 according to the output signal 110 of the decision circuit 40 is as shown in Table 3.

Embodiment 28

This embodiment is similar to Embodiment 2, but in place of the picture non-correlation decision circuit 18 of FIG. 9, the picture non-correlation decision circuit shown in FIG. 22 is used.

The operation of this picture non-correlation decision circuit 18 is the same as Embodiment 27. The control over the selection by the selectors 23 and 25a according to the output signal 110 of the decision circuit 40 is as shown in Table 3.

Embodiment 29

Figure 23:
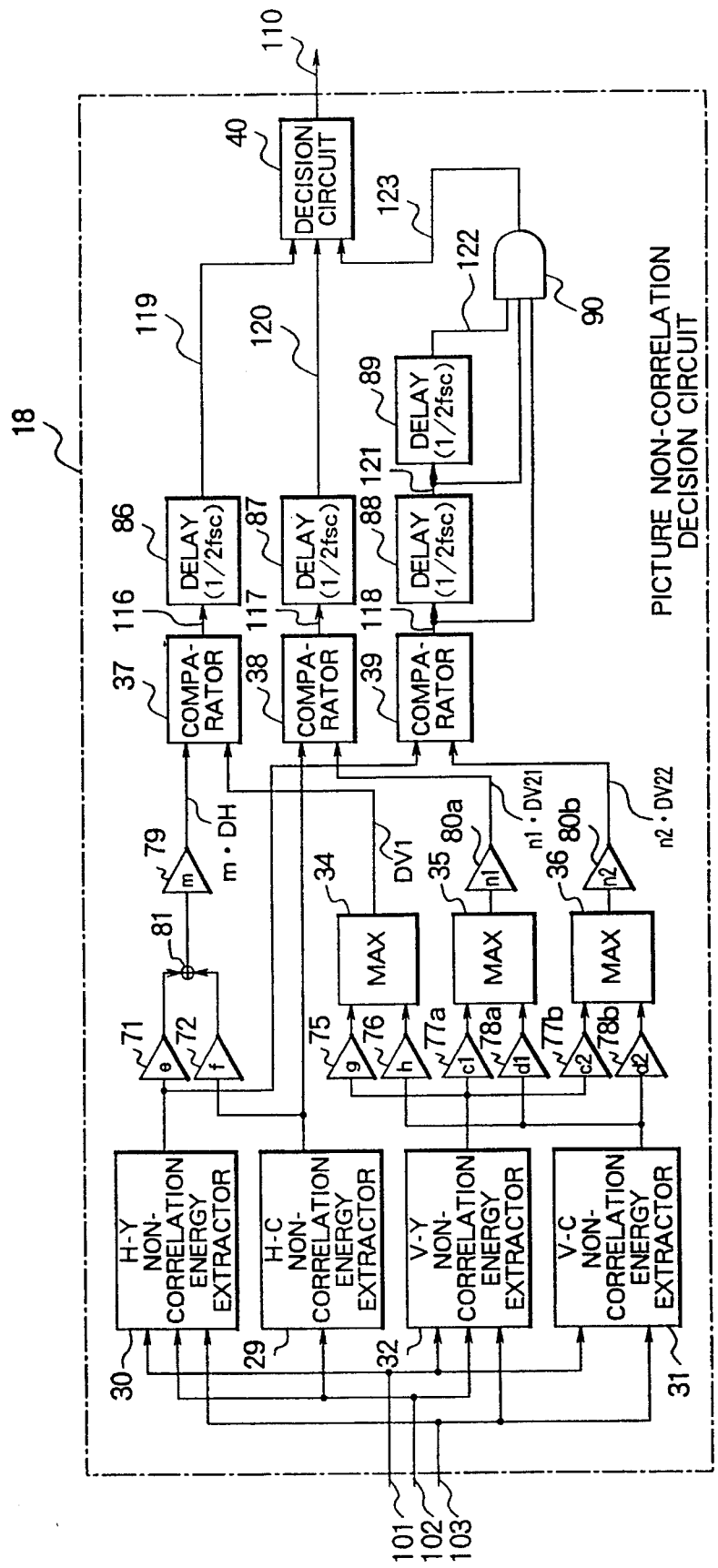
FIG. 23 is a block diagram showing a picture non-correlation decision circuit 18 used in Embodiments 29 and 30.

This embodiment is similar to Embodiment 1, but in place of the picture non-correlation decision circuit 18 of FIG. 9, the picture non-correlation decision circuit shown in FIG. 23 is used.

The picture non-correlation decision circuit of FIG. 23 is similar to that off FIG. 21, but is modified in the same way as FIG. 11. That is, delay circuits 86–89 and AND circuit 90 similar to those in FIG. 11 are provided between the comparators 37–39 and the decision circuit 40. Operation of these added circuits is the same as the embodiment of FIG. 11. The decision circuit 40 controls the selectors 23 and 25 oil the basis of the input signals 119, 120 and 123 according to the results of the correlation detection described in the embodiment of FIG. 21. The control over the selectors 23 and 25 in accordance with the output signal 110 of the decision circuit 40 is as shown in Table 3.

Embodiment 30

This embodiment is similar to Embodiment 2, but in place of the picture non-correlation decision circuit 18 of FIG. 9, the picture non-correlation decision circuit shown in FIG. 23 is used.

The operation of this picture non-correlation decision circuit 18 operation is the same as Embodiment 29, and the control over the selectors 23 and 25a in accordance with the output signal 110 of the decision circuit 40 is as shown in Table 3.

Embodiment 31

Figure 24:
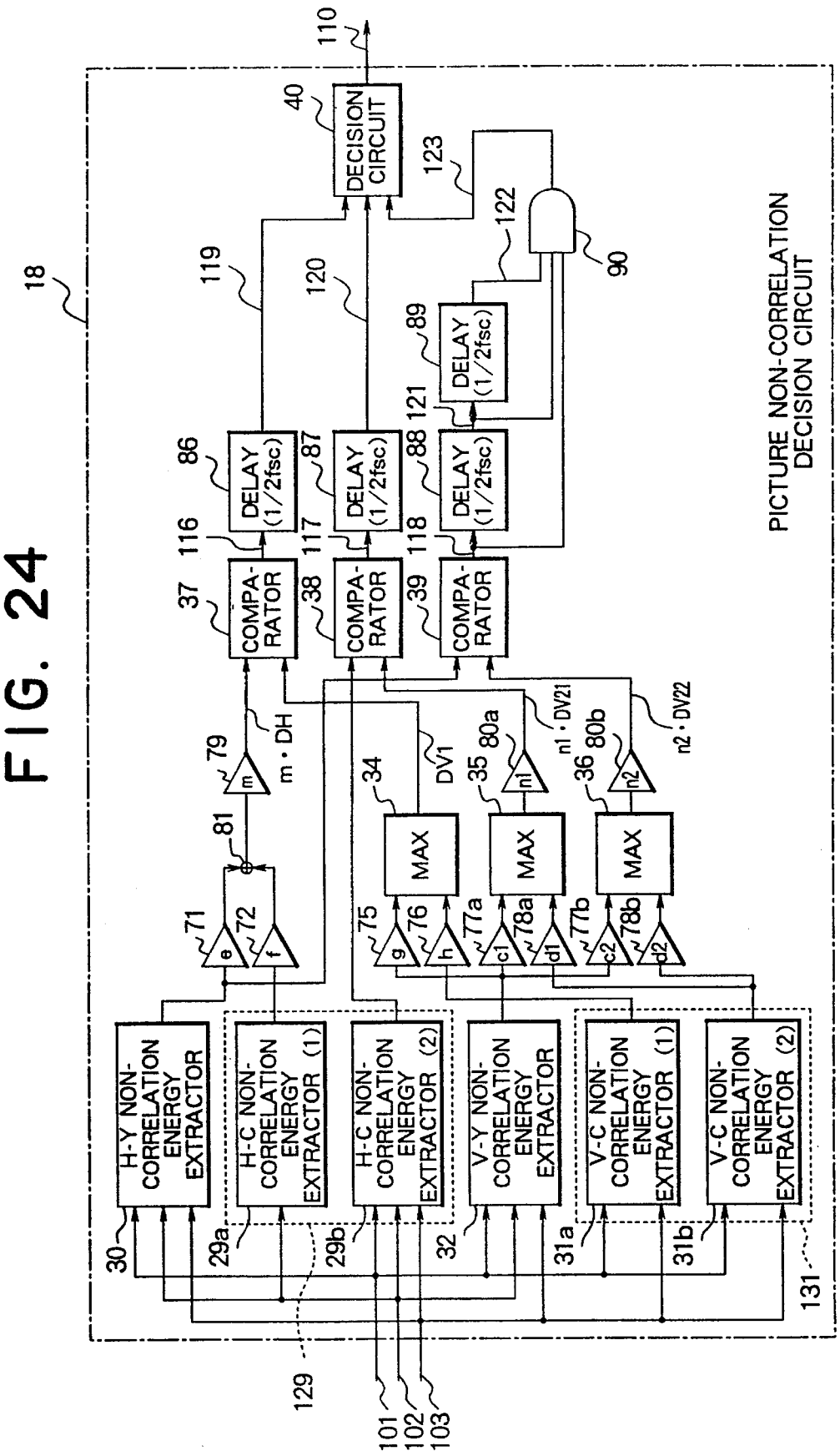
FIG. 24 is a block diagram showing a picture non-correlation decision circuit 18 used in Embodiments 31 and 32.

This embodiment is similar to Embodiment 1, but in place of the picture non-correlation decision circuit 18 of FIG. 9, the picture non-correlation decision circuit shown in FIG. 24 is used.

The picture non-correlation decision circuit 18 of this embodiment is similar to that of FIG. 23, but is modified in the same way as in FIG. 10. That is, it is provided with the horizontal chrominance non-correlation energy extractor 129 comprising the first and second horizontal chrominance non-correlation energy extractors 29a and 29b, and the vertical chrominance non-correlation energy extractor 131 comprising the first and second vertical chrominance non-correlation energy extractors 31a and 31b. The control over the selection by the selectors 23 and 25 according to the output signal 110 off the decision circuit 40 is as shown in Table 3.

Embodiment 32

This embodiment is similar to Embodiment 2, but in place of the picture non-correlation decision circuit 18 of FIG. 9, the picture non-correlation decision circuit shown in FIG. 24 is used.

The operation of this picture non-correlation decision circuit 18 operation is the same as Embodiment 31, and the control over the selectors 23 and 25a in accordance with the output signal 110 of the decision circuit 40 output 110 is as shown in Table 3.

Embodiment 33

Figure 25:
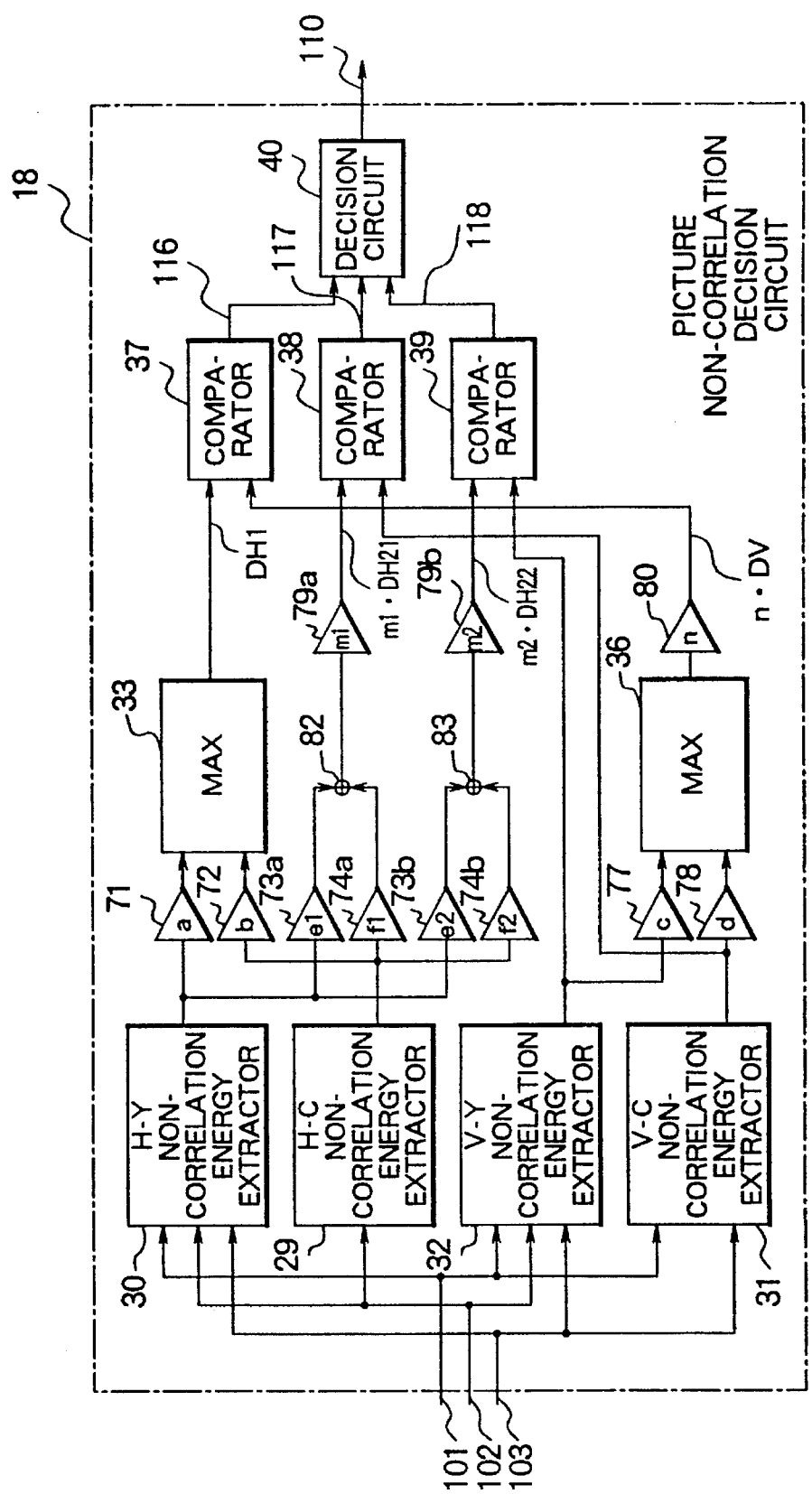
FIG. 25 is a block diagram showing a picture non-correlation decision circuit 18 used in Embodiments 32 and 34.

This embodiment is similar to Embodiment 1, but in place of the picture non-correlation decision circuit 18 of FIG. 9, the picture non-correlation decision circuit shown in FIG. 25 is used.

The picture non-correlation decision circuit 18 of this embodiment is similar to that of FIG. 9, but the maximum value circuit 34 of FIG. 9 is replaced by an adder 82, and the maximum value circuit, 35 of FIG. 9 is replaced by an adder 83.

The output signal DCH of the horizontal chrominance non-correlation energy extractor 29 is branched in three routes. In the first route, the signal is multiplied by a coefficient b at the multiplier 72, and the resultant signal is sent to the maximum value circuit 33. In the second route, the signal is multiplied by a coefficient f1 at the multiplier 74a, and the resultant signal is sent to the adder 82. In the third route, the signal is multiplied by a coefficient f2 at the multiplier 74b, and the resultant signal is sent to the adder 83.

The output signal DYH of the horizontal luminance non-correlation energy extractor 30 is branched in three routes. In the first route, the signal is multiplied by a coefficient a at the multiplier 71, and the resultant signal is sent to the maximum value circuit 33. In the second route, the signal is multiplied by a coefficient e1 at the multiplier 73a, and the resultant signal is sent to the adder 82. In the third route, the signal is multiplied by a coefficient e2 at the multiplier 73b, and the resultant signal is sent to the adder 83.

The output signal DCV of the vertical chrominance non-correlation energy extractor 31 is branched in two routes. In the first route, the signal is applied directly to the comparator 38. In the second route, the signal is multiplied by a coefficient d at the multiplier 78, and the resultant signal is sent to the maximum value circuit 36.

The output signal DYV of the vertical luminance non-correlation energy extractor 2 is branched in two routes. In the first route, the signal is applied directly to the comparator 39. In the second route, the signal is multiplied by a coefficient e at the multiplier 77, and the resultant signal is sent to the maximum value circuit 36.

The output signal of the maximum value circuit 33 is applied as a first horizontal non-correlation energy DH1 to the comparator 37. The output signal of the adder 82, as a second horizontal non-correlation energy DH21, is multiplied by a coefficient m1 at multiplier 79a, and the product is sent to the comparator 38. The output signal of the adder 83, as a third horizontal non-correlation energy DH22, is multiplied by a coefficient m2 at the multiplier 79b, and the product is sent to the comparator 39.

The output signal of the maximum value circuit 36, as the vertical non-correlation energy DV, is multiplied by a coefficient n at the multiplier 80, and the product is sent to the comparator 37.

The comparator 37 compares the first horizontal non-correlation energy DH1 and the product n·DV of the vertical non-correlation energy DV and the coefficient n, and produces a high level output signal 116 when DH1≧n·DV, and a low level output signal 116 at other times.

The comparator 38 compares the vertical chrominance non-correlation energy DCV and the product m1·DH21, of the second horizontal non-correlation energy DH21 and the coefficient m1, and produces a high level output signal 117 when DCV≧m1·DH21, and a low level output signal 117 at other times.

The comparator 39 compares the vertical luminance non-correlation energy DYV and the product m2·DH22 of the third horizontal non-correlation energy DH22 and the coefficient m2, and produces a high level output signal 118 when DYV≧m2·DH22, and a low lever output signal 117 at other times.

The respective output signals 116, 117 and 118 of the comparators 37, 38 and 39 are applied to the decision circuit 40. The output signal 110 of the decision circuit 40 serves as the output signal of the picture non-correlation decision circuit 18.

Following is a description of the operation of the picture non-correlation decision circuit 18 of this embodiment.

The first horizontal non-correlation energy DH1, the second horizontal non-correlation energy DH21, the third horizontal non-correlation energy DH22 and the vertical non-correlation energy DV can be expressed as follows.

$$DH1=\max(a \cdot DYH, b \cdot DCH)$$

$$DH21=e1 \cdot DYH+f1 \cdot DCH$$

$$DH22=e2 \cdot DYH+f2 \cdot DCH$$

$$DV=\max(c \cdot DYV, d \cdot DCV)$$

At the comparator 37, DH1 and n·DV are compared. If $$DH1 \geq n \cdot DV$$

the horizontal non-correlation is interpreted as strong, and a "1" signal 116 is sent to the decision circuit 40. If $$DH1 < n \cdot DV$$

the horizontal non-correlation is interpreted as weak, and a "0" signal 116 is sent to the decision circuit 40.

At the comparator 38, DCV and m1·DH21 are compared. If $$DCV \geq m1 \cdot DH21$$

the vertical non-correlation is interpreted as strong, and a "1" signal 117 is sent to the decision circuit 40. If $$DCV < m1 \cdot DH21$$

the vertical non-correlation is interpreted as weak, and a "0" signal 117 is sent to the decision circuit 40.

At the comparator 39, DYV and m2·DH22 are compared. If $$DYV \geq m2 \cdot DH22$$

the vertical non-correlation is interpreted as strong, and a "1" signal 118 is sent to the decision circuit 40. If $$DYV < m2 \cdot DH22$$

the vertical non-correlation is interpreted as weak, and a "0" signal 118 is sent to the decision circuit 40.

According to the results of the above correlation detection, the decision circuit 40 controls the selectors 23 and 25 in the following manner.

The relationship between the input signals 116, 117 and 118 of the decision circuit 40, and its output signal 110, the selection of the chrominance output signal 107, 109 or 111 at the selector 23 and the selection of the chrominance output signal 1131 or 1132 at the selector 25 is as shown in Table 2.

When the output signals 110a and 110b of the AND circuits 41 and 42 are both "0", the selector 23 selects the compensating delay circuit 21 output signal 109. When the output signal 110a of the AND circuit 41 is "0" and the output signal 110b off the AND circuit 42 is "1", the output signal 107 of the compensating delay circuit 20 is selected. When the output signal 110a of the AND circuit 41 is "1" and the output signal 110b of the AND circuit 42 is "0", the output signal 111 of the compensating delay circuit 22 is selected.

When the output signal 110b of the AND circuit 42 is "1", the selector 25 selects the output signal 1131 of the compensating delay circuit 91. At other times, the selector 25 selects the output signal 1132 of the horizontal chrominance extraction filter 24.

Consequently, in the embodiment of FIG. 2, the response C11(Z) of the filter for extracting the chrominance signal output through the terminal 26, and the response C12(Z) of the filter for extracting the chrominance signal used for extracting the luminance signal are given below:

When the vertical non-correlation is strong, $$C11(Z)=Ch1(Z)$$

$$C12(Z)=Ch1(Z) \cdot Ch2(Z)$$

When the horizontal non-correlation is strong, $$C11(Z)=C12(Z)=Cv(Z)$$

When neither of these conditions are met, $$C11(Z)=Chv(Z)$$

$$C12(Z)=Chv(Z) \cdot CH2(Z)$$

Embodiment 34

This embodiment is similar to Embodiment 2, but in place of the picture non-correlation decision circuit 18 of FIG. 9, the picture non-correlation decision circuit shown in FIG. 25 is used.

The operation of this picture non-correlation decision circuit 18 is the same as Embodiment 33.

The relationship between the input signals 116, 117 and 118 of the decision circuit 40, and its output signal 110, the selection of the chrominance output signal 107, 109 or 111 at the selector 23 and the selection of the chrominance output signal 1131 or 1132 at the selector 25a is as shown in Table 2.

When the output signals 110a and 110b of the AND circuits 41 and 42 are both "0", the selector 23 selects the output signal 109 of the compensating delay circuit 21. When the output signal 110a of the AND circuit 41 is "0" and the output signal 110b of the AND circuit 42 is "1", the output signal 107 of the compensating delay circuit 20 is selected. When the output signal 110a of the AND circuit 41 is "1" and the output signal 110b of the AND circuit 42 is "0", the output signal 111 of the compensating delay circuit 22 is selected.

When the output signal 110b of the AND circuit 42 is "1", the selector 25 selects the output signal 1131 of the compensating delay circuit 91. At other times, the selector 25 selects the output signal 1132 of the horizontal chrominance extraction filter 24.

Consequently, in the embodiment of FIG. 2, the response C21(Z) of the filter for extracting the chrominance signal output through the terminal 26, and the response C22(Z) of the filter for extracting the chrominance signal used for extracting the luminance signal are given below:

When the vertical non-correlation is strong, $$C21(Z)=Ch1(Z) \cdot Ch2(Z)$$

$$C22(Z)=Ch1(Z)$$

When the horizontal non-correlation is strong, $$C21(Z)=C22(Z)=Cv(Z)$$

When neither of these conditions are met, $C21(Z)=Chv(Z)\cdot CH2(Z)$ $C22(Z)=Chv(Z)$

Embodiment 35

Figure 26:
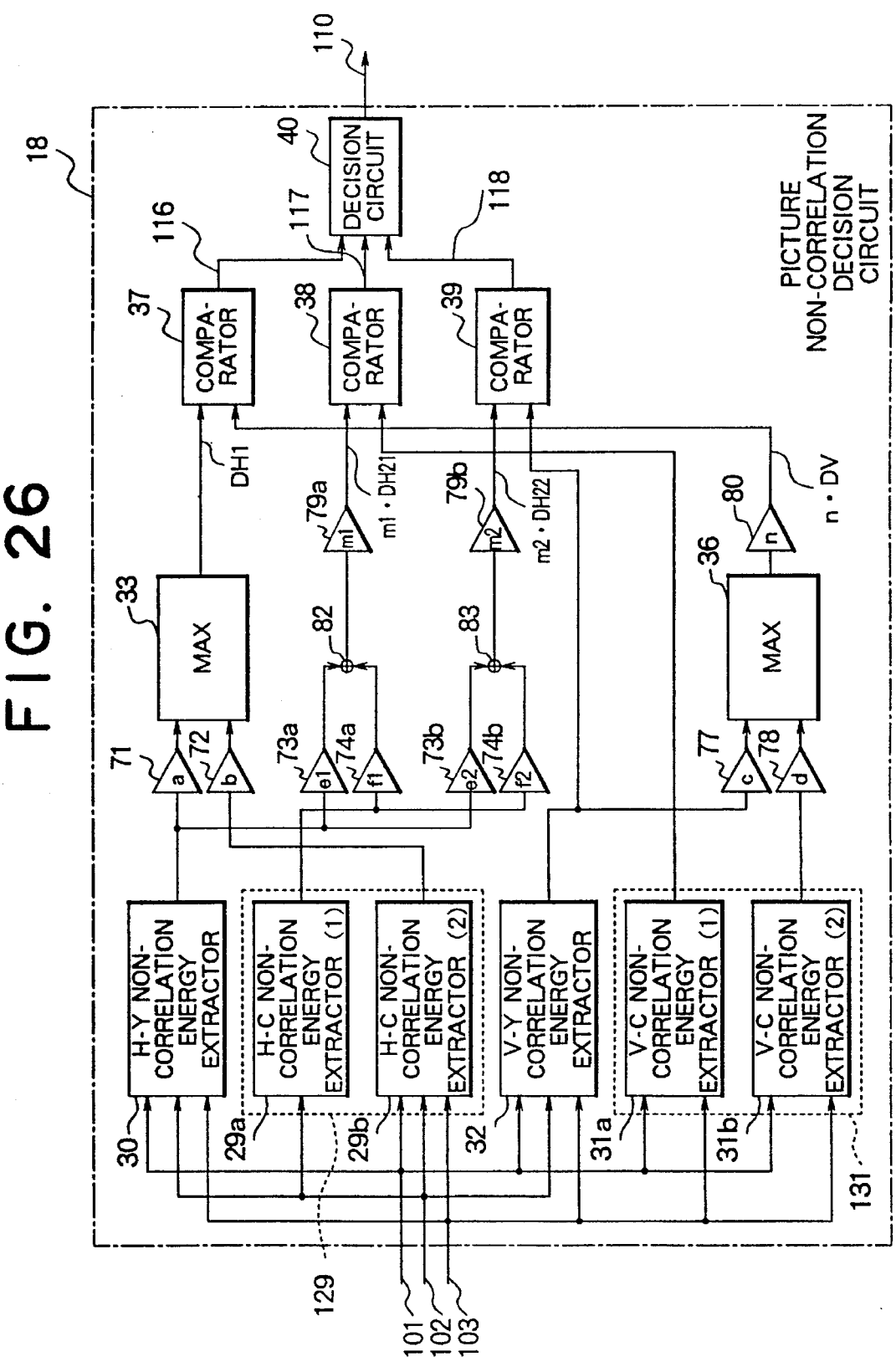
FIG. 26 a block diagram showing a picture non-correlation decision circuit 18 used in Embodiments 35 and 36.

This embodiment is similar to Embodiment 1, but in place of the picture non-correlation decision circuit 18 of FIG. 9, the picture non-correlation decision circuit shown in FIG. 26 is used.

The picture non-correlation decision circuit 18 of this embodiment is similar to that of FIG. 25, but is modified in the same way as in FIG. 10. That is, it is provided with the horizontal chrominance non-correlation energy extractor 129 comprising the first and second horizontal chrominance non-correlation energy extractors 29a and 29b, and the vertical chrominance non-correlation energy extractor 131 comprising the first and second vertical chrominance non-correlation energy extractors 31a and 31b. The control over the selection by the selectors 23 and 25 according to the output signal 110 of the decision circuit 40 is as shown in Table 2.

Embodiment 36

This embodiment is similar to Embodiment 2, but in place of the picture non-correlation decision circuit 18 of FIG. 9, the picture non-correlation decision circuit shown in FIG. 26 is used.

The operation of this picture non-correlation decision circuit 18 is the same as Embodiment 35, and the control over the selectors 23 and 25a in accordance with the output signal 110 of the decision circuit 40 is as shown in Table 2.

Embodiment 37

Figure 27:
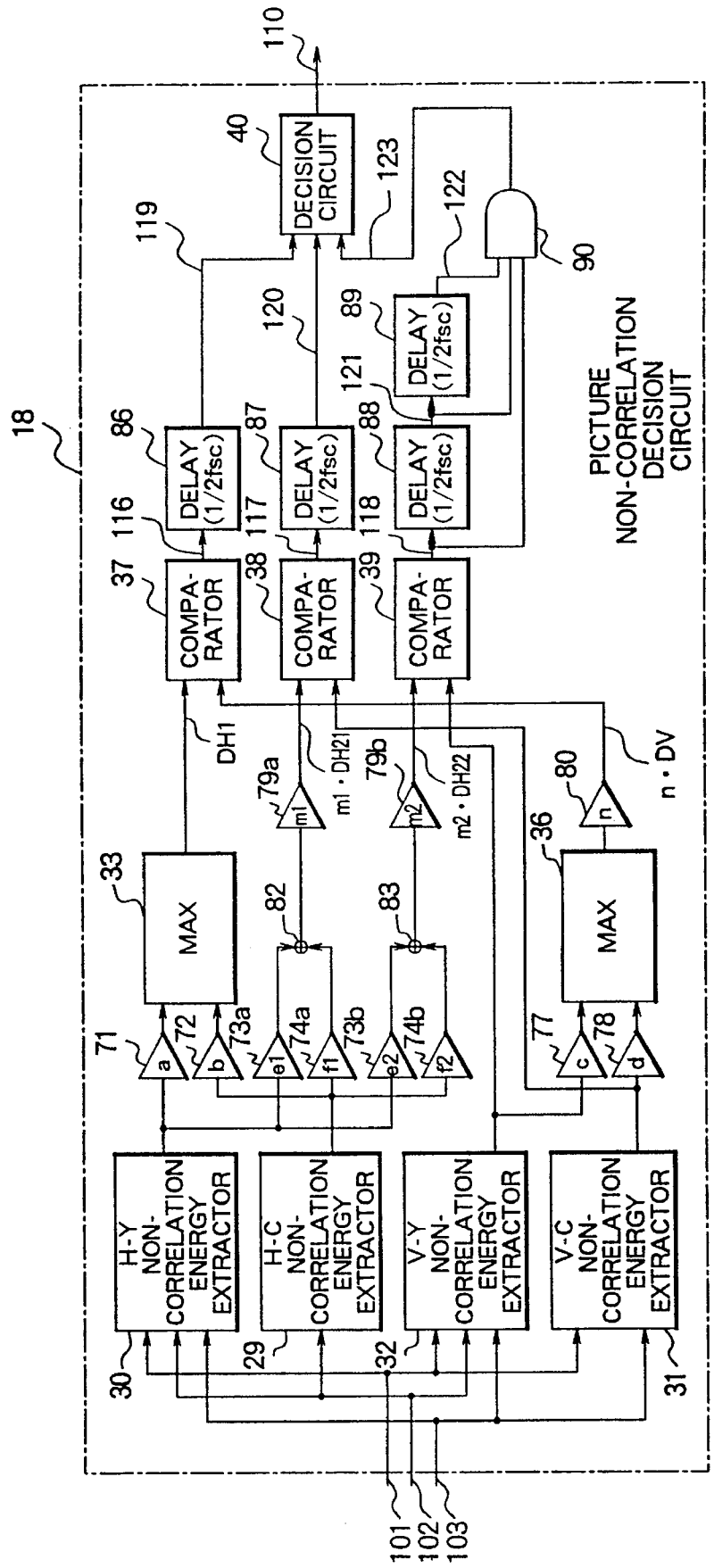
FIG. 27 is a block diagram showing a picture non-correlation decision circuit 18 used in Embodiments 37 and 38.

This embodiment is similar to Embodiment 1, but in place of the picture non-correlation decision circuit 18 of FIG. 9, the picture non-correlation decision circuit shown in FIG. 27 is used.

The picture non-correlation decision circuit 18 of this embodiment is similar to that of FIG. 25, but is modified in the same way as in FIG. 11. That is, the delay circuits 86–89 and the AND circuit 90 are provided between the comparators 37–39 and the decision circuit 40. Operation of these added portions is the same as the embodiment of FIG. 11. The decision circuit 40 controls selectors 23 and 25 on the basis of input signals 119, 120 and 123 according to the correlation detection results described in the embodiment of FIG. 21. The control over the selectors 23 and 25 in accordance with the output signal 110 of the decision circuit 40 is as shown in Table 2.

Embodiment 38

This embodiment is similar to Embodiment 2, but in place of the picture non-correlation decision circuit 18 of FIG. 9, the picture non-correlation decision circuit shown in FIG. 27 is used.

The operation of this picture non-correlation decision circuit 18 is the same as Embodiment 37 and the control over the selectors 23 and 25a in accordance with the output signal 110 of the decision circuit 40 is as shown in Table 2.

Embodiment 39

Figure 28:
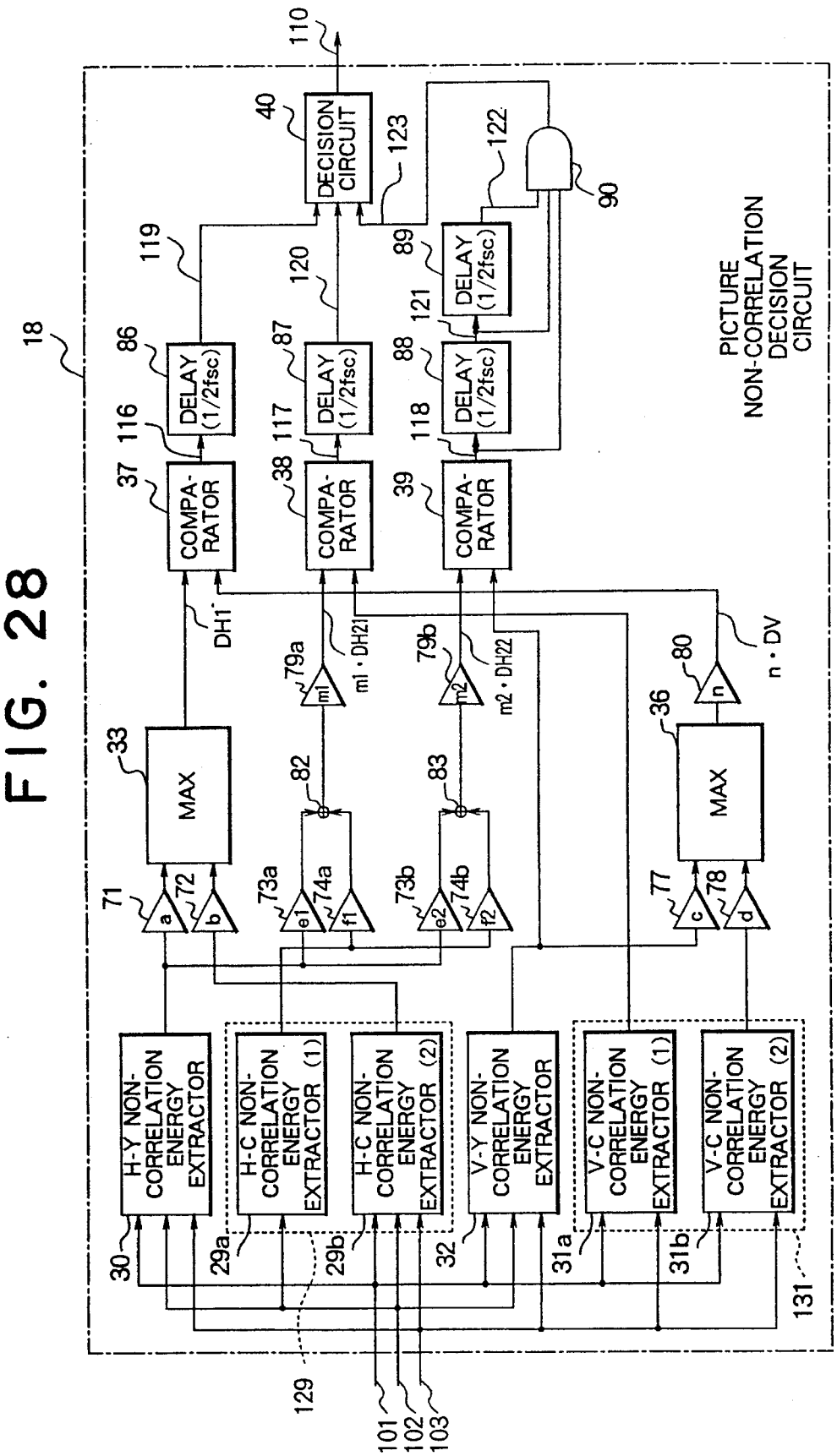
FIG. 28 is a block diagram showing a picture non-correlation decision circuit 18 used in Embodiments 39 and 40.

This embodiment is similar to Embodiment 1, but in place of the picture non-correlation decision circuit 18 of FIG. 9, the picture non-correlation decision circuit shown in FIG. 28 is used.

The picture non-correlation decision circuit 18 of this embodiment is similar to that of FIG. 27, but is modified in the same way as in FIG. 10. That is, it is provided with the horizontal chrominance non-correlation energy extractor 129 comprising the first and second horizontal chrominance non-correlation energy extractors 29a and 29b, and the vertical chrominance non-correlation energy extractor 131 comprising the first and second vertical chrominance non-correlation energy extractors 31a and 31b. The control over the selection of the selectors 23 and 25 according to the decision circuit 40 is as shown Table 2.

Embodiment 40

This embodiment is similar to Embodiment 2, but in place of the picture non-correlation decision circuit 18 of FIG. 9, the picture non-correlation decision circuit shown in FIG. 28 is used.

The operation off this picture non-correlation decision circuit 18 is the same as that of Embodiment 39, and the control over the selectors 23 and 25a in accordance with the output signal 110 of the decision circuit 40 is as shown in Table 2.

Embodiment 41

Figure 29:
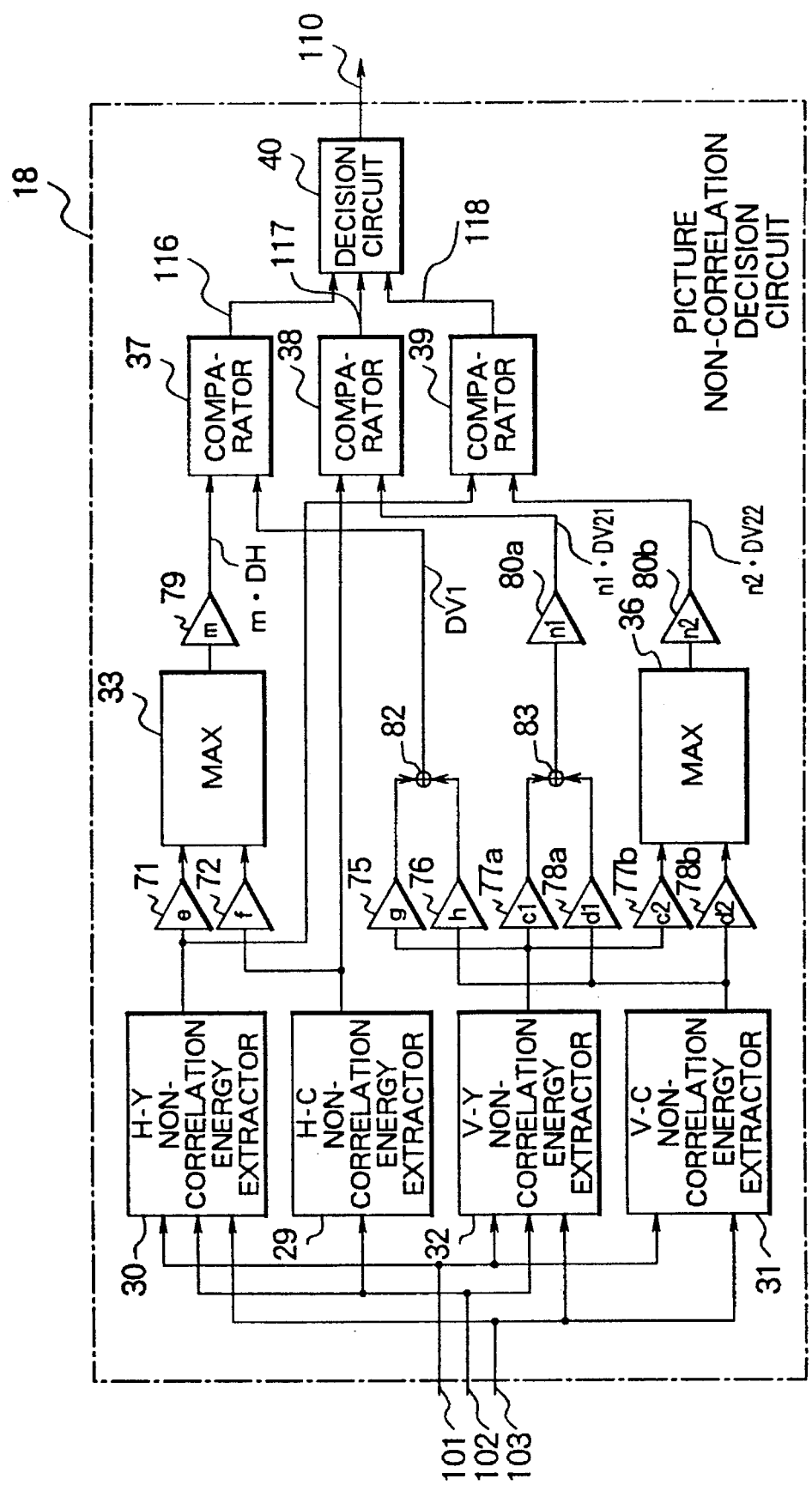
FIG. 29 is a block diagram showing a picture non-correlation decision circuit 18 used in Embodiments 41 and 42.

This embodiment is similar to Embodiment 1, but in place of the picture non-correlation decision circuit 18 of FIG. 9, the picture non-correlation decision circuit shown in FIG. 29 is used.

The picture non-correlation decision circuit 18 of this embodiment is similar to that of FIG. 25, but the inputs of the adders 82 and 83 are coupled via multipliers 75, 76, 77a and 78a to the outputs off the vertical luminance non-correlation energy extractor 32 and the vertical chrominance non-correlation energy extractor 31, respectively.

Moreover, the output of the horizontal luminance non-correlation energy extractor 30 is coupled directly to one of the comparators, 39. This is in contrast to FIG. 25, in which the output of the vertical chrominance non-correlation energy extractor 31 is directly coupled one of the maximum value circuits, 38. Details of the interconnection of the embodiment of FIG. 29 is as follows:

The output signal DCH of the horizontal chrominance non-correlation energy extractor 29 is branched in two routes. In the first route, the signal is applied directly to the comparator 38. In the second route, the signal is multiplied by a coefficient f at the multiplier 72, and the resultant signal is sent to the maximum value circuit 33.

The output signal DYH of the horizontal luminance non-correlation energy extractor 30 is branched in two routes. In the first route, the signal is applied directly to the comparator 39. In the second route, the signal is multiplied by a coefficient c at the multiplier 71, and the resultant signal is sent to the maximum value circuit 33.

The output signal DCV of the vertical chrominance non-correlation energy extractor 31 is branched in three routes. In the first route, the signal is multiplied by a coefficient h at the multiplier 76, and the resultant signal is sent to the adder 82. In the second route, the signal is multiplied by a coefficient d1 at the multiplier 78a, and the resultant signal is sent to the adder 83. In the third route, the signal is multiplied by a coefficient d2 at the multiplier 78b, and the resultant signal is sent to the maximum value circuit 36.

The output signal DYV of the vertical luminance non-correlation energy extractor 32 is branched in three routes. In the first route, the signal is multiplied by a coefficient g at the multiplier 75, and the resultant signal is sent to the adder 82. In the second route, the signal is multiplied by a coefficient c1 at the multiplier 77a, and the resultant signal is sent to the adder 83. In the third route, the signal is multiplied by a coefficient c2 at the multiplier 77b, and the resultant signal is sent to the maximum value circuit 36.

The output signal of the maximum value circuit 33, as the horizontal non-correlation energy DH, is multiplied by a coefficient m at the multiplier 79, and the product is sent to the comparator 37. The output signal of the adder 82 is applied as a first, vertical non-correlation energy DV1 to the comparator 37. The output signal of the adder 83, as a second vertical non-correlation energy DV21, is multiplied by a coefficient n1 at the multiplier 80a, and the product is sent to the comparator 38. The output signal of the maximum value circuit, 36, as a third vertical non-correlation energy DV22, is multiplied by a coefficient n2 at the multiplier 80b, and the product is sent to the comparator 39.

The comparator 37 compares the first vertical non-correlation energy DV1 and the product m·DH of the horizontal non-correlation energy DH and the coefficient m, and produces a high level output, signal 116 when $DV1 \geq m \cdot DH$, and a low level output signal 116 at other times.

The comparator 38 compares the horizontal chrominance non-correlation energy DCH and the product n1·DV21 of the second vertical non-correlation energy DV21 and the coefficient n1, and produces a high level output signal 117 when $DCH \geq n1 \cdot DV21$, and a low level output signal 117 at other times.

The comparator 39 compares the horizontal luminance non-correlation energy DYH and the product n2·DV22 of the third vertical non-correlation energy DV22 and the coefficient n2, and produces a high level output signal 118 when $DYH \geq n2 \cdot DV22$, and a low level output signal 117 at other times.

The respective output signals 116, 117 and 118 of the comparators 37, 38 and 39 are applied to the decision circuit 40. The output signal 110 of the decision circuit 40 serves as the output signal of the picture non-correlation decision circuit 18.

Following is a description off operation of the picture non-correlation decision circuit 18 of this embodiment.

The first vertical non-correlation energy DV1, the second vertical non-correlation energy DV21, the third vertical non-correlation energy DV22 and the horizontal non-correlation energy DH can be expressed as follows.

$$DH = \max(e \cdot DYH, f \cdot DCH)$$

$$DV1 = g \cdot DYV + h \cdot DCV$$

$$DV21 = c1 \cdot DYV + d1 \cdot DCV$$

$$DV22 = \max(c2 \cdot DYV, d2 \cdot DCV)$$

At the comparator 37, DV1 and m·DH are compared. If $$DV1 \geq m \cdot DH$$

the vertical non-correlation is interpreted as strong, and a "1" signal 116 is sent to the decision circuit 40. If $$DV1 < m \cdot DH$$

the vertical non-correlation is interpreted as weak, as indicated below, a "0" signal 116 is sent to the decision circuit 40.

At the comparator 38, DCH and n1·DV21 are compared. If $$DCH \geq n1 \cdot DV21$$

the horizontal non-correlation is interpreted as strong, and a "1" signal 117 is sent to the decision circuit 40. If $$DCH < n1 \cdot DV21$$

the horizontal non-correlation is interpreted as weak, and a "0" signal 117 is sent to the decision circuit 40.

At the comparator 39, DYH and n2·DV22 are compared. If $$DYH \geq n2 \cdot DV22$$

the horizontal non-correlation is interpreted as strong, and a "1" signal 118 is sent to the decision circuit 40. If $$DYH < n2 \cdot DV22$$

the horizontal non-correlation is interpreted as weak, and a "0" signal 118 is sent to the decision circuit 40.

According to the results of the above correlation detection, the decision circuit 40 controls the selectors 23 and 25 in the following manner.

The relationship between the input signals 116, 117 and 118 of the decision circuit 40, and its output signal 110, the selection of the chrominance output signal 107, 109 or 111 at the selector 23 and the selection of the chrominance output signal 1131 or 1132 at the selector 25 is as shown in Table 3.

When the output signals 110a and 110b of the AND circuits 41 and 42 are both "0", the selector 23 selects the output signal 107 of the compensating delay circuit 20. When the output signal 110a of the AND circuit 41 is "0" and the output signal 110b of the AND circuit 42 is "1", the output signal 109 of the compensating delay circuit 21 is selected. When the output signal 110a of the AND circuit 41 is "1" and the output signal 110b of the AND circuit 42 is "0", the output signal 111 of the compensating delay circuit 22.

When the output signals 110a and 110b of the AND circuits 41 and 42 are both "1", the selector 25 selects the output signal 1131 of the compensating delay circuit 91. At other times, the selector 25 selects the output signal 1132 of the horizontal chrominance extraction filter 24.

Consequently, in this embodiment, the response C11(Z) of the filter for extracting the chrominance signal output through the terminal 26, and the response C12(Z) of the filter for extracting the chrominance signal used for extracting the luminance signal are given below:
When the vertical non-correlation is strong, $$C11(Z) = Ch1(Z)$$

$$C12(Z) = Ch1(Z) \cdot Ch2(Z)$$

When the horizontal non-correlation is strong, $$C11(Z) = C22(Z) = Cv(Z)$$

When neither of these conditions are met, $$C11(Z) = Chv(Z)$$

$$C12(Z) = Chv(Z) \cdot CH2(Z)$$

Embodiment 42

This embodiment is similar to Embodiment 2, but in place of the picture non-correlation decision circuit 18 of FIG. 9, the picture non-correlation decision circuit shown in FIG. 29 is used.

The operation of this picture non-correlation decision circuit 18 is the same as that of Embodiment 41.

The relationship between the input signals 116, 117 and 118 of the decision circuit 40, and its output signal 110, the selection of the chrominance output signal 107, 109 or 111 at the selector 23 and the selection of the chrominance output signal 1131 or 1132 at the selector 25a is as shown in Table 3.

Embodiment 43

Figure 30:
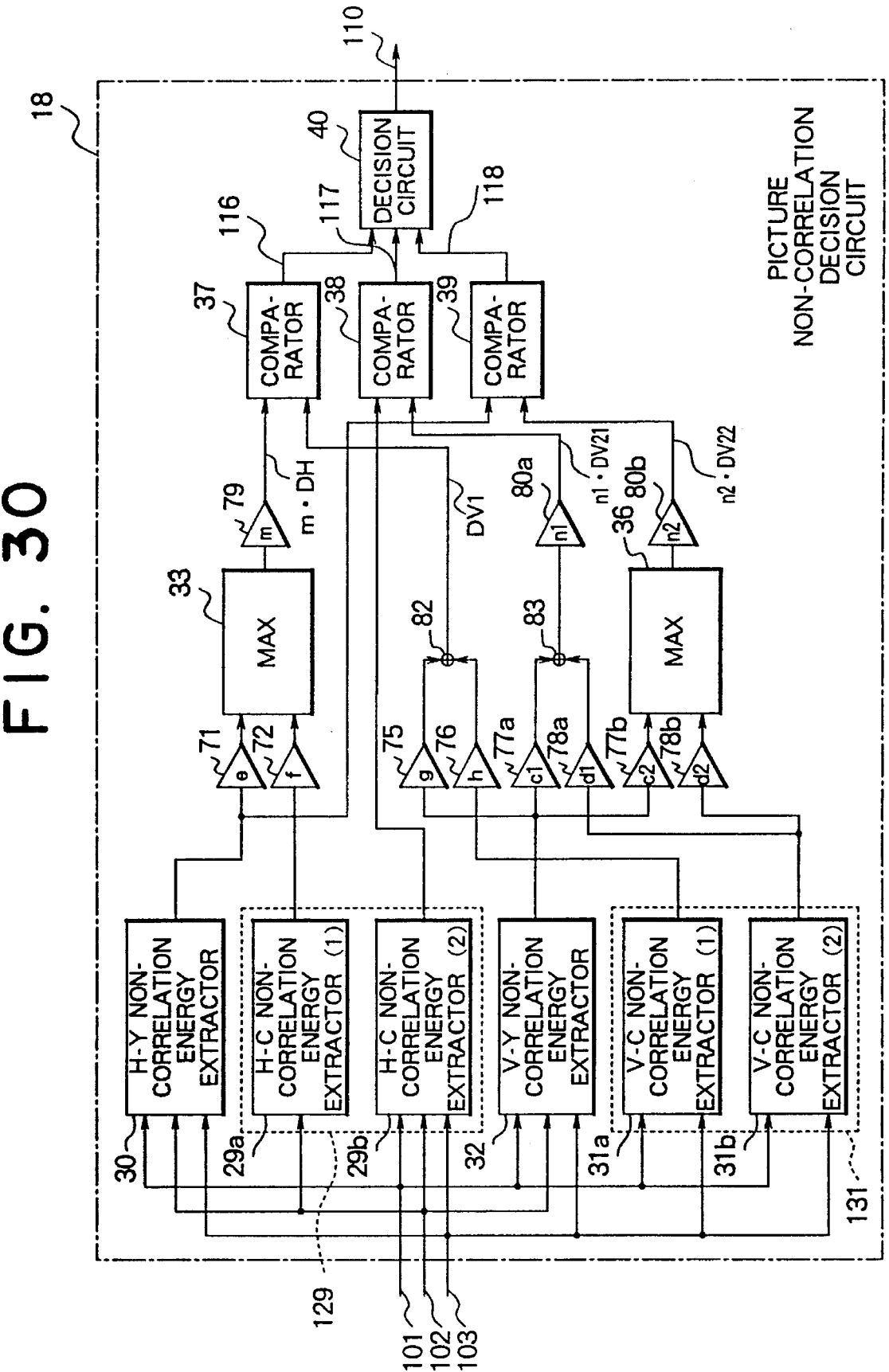
FIG. 30 is a block diagram showing a picture non-correlation decision circuit 18 used in Embodiments 43 and 44.

This embodiment is similar to Embodiment 1, but in place of the picture non-correlation decision circuit 18 of FIG. 9, the picture non-correlation decision circuit shown in FIG. 30 is used.

The picture non-correlation decision circuit 18 of this embodiment is similar to that of FIG. 29, but is modified in the same way as in FIG. 10. That is, it is provided with the horizontal chrominance non-correlation energy extractor 129 comprising the first and second horizontal chrominance non-correlation energy extractors 29a and 29b, and the vertical chrominance non-correlation energy extractor 131 comprising the first and second vertical chrominance non-correlation energy extractors 31a and 31b. The control over the selection by the selectors 23 and 25 according to the FIG. 28 decision circuit 40 output 110 is as shown in Table 3.

Embodiment 44

This embodiment is similar to Embodiment 2, but in place of the picture non-correlation decision circuit 18 of FIG. 9, the picture non-correlation decision circuit shown in FIG. 30 is used.

The operation of this picture non-correlation decision circuit 18 is the same as that of Embodiment 43, and the control over the selectors 23 and 25a in accordance with the output signal 110 of the decision circuit 40 is as shown in Table 3.

Embodiment 45

This embodiment is similar to Embodiment 1, but in place of the picture non-correlation decision circuit 18 of FIG. 9, the picture non-correlation decision circuit shown in FIG. 81 is used.

Figure 31:
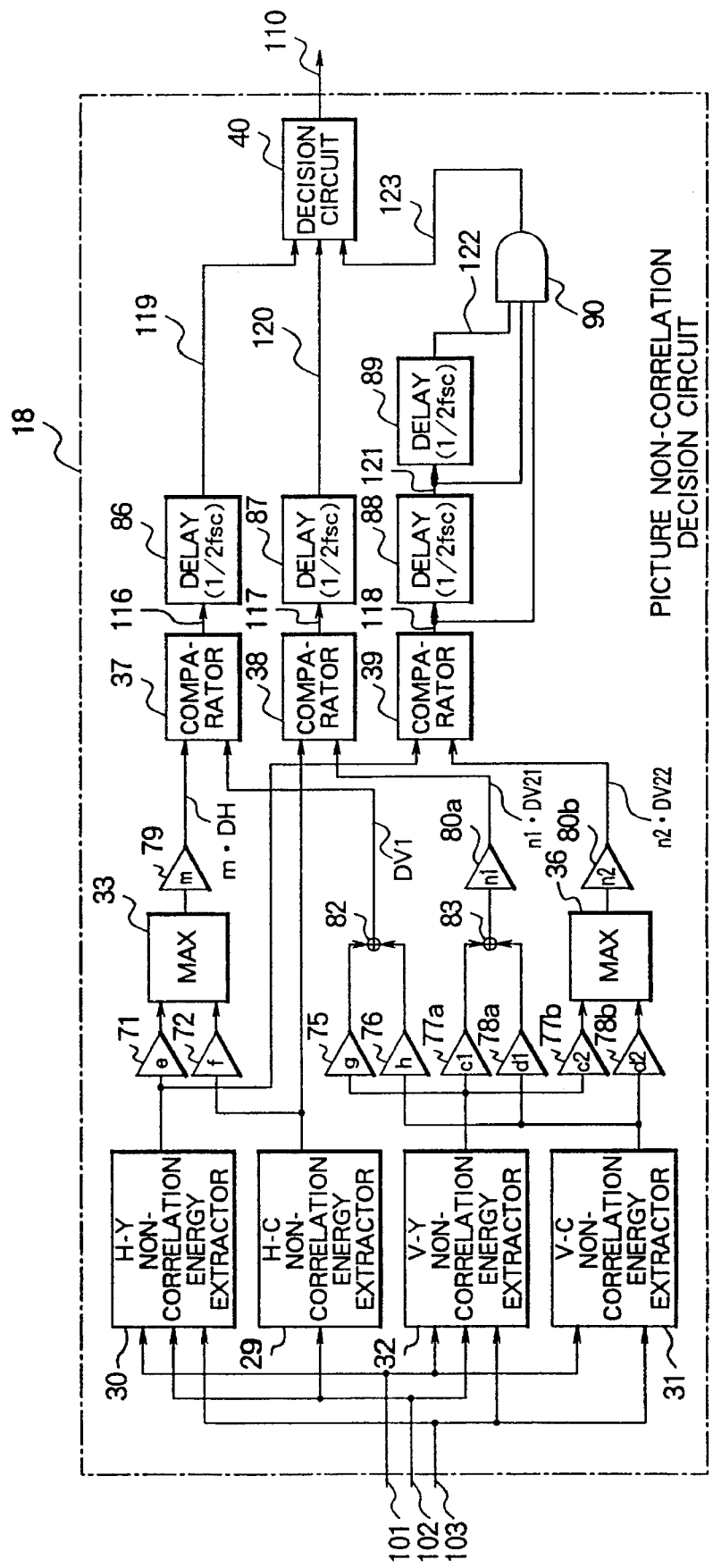
FIG. 31 is a block diagram showing a picture non-correlation decision circuit 18 used in Embodiments 45 and 46.

The picture non-correlation decision circuit 18 of FIG. 31 is similar to that of FIG. 29, but is modified in the same way as in FIG. 11. That is, the delay circuits 86–89 and the AND circuit 90 are provided between the comparators 87–89 and the decision circuit 40. Operation of these added circuits is the same as that of the embodiment of FIG. 11. The decision circuit 40 controls selectors 23 and 25 on the basis of the input signals 119, 120 and 128 according to the results of the correlation detection described in the embodiment of FIG. 29. The control over the selectors 28 and 25 in accordance with the output signal 110 of the decision circuit 40 is as shown in Table 3.

Embodiment 46

This embodiment is similar to Embodiment 2, but in place of the picture non-correlation decision circuit 18 of FIG. 9, the picture non-correlation decision circuit shown in FIG. 31 is used.

The operation of this picture non-correlation decision circuit 18 is the same as time of Embodiment 45, and the control over the selectors 23 and 25a in accordance with the output signal 110 of the decision circuit 40 is as shown in Table 3.

Embodiment 47

Figure 32:
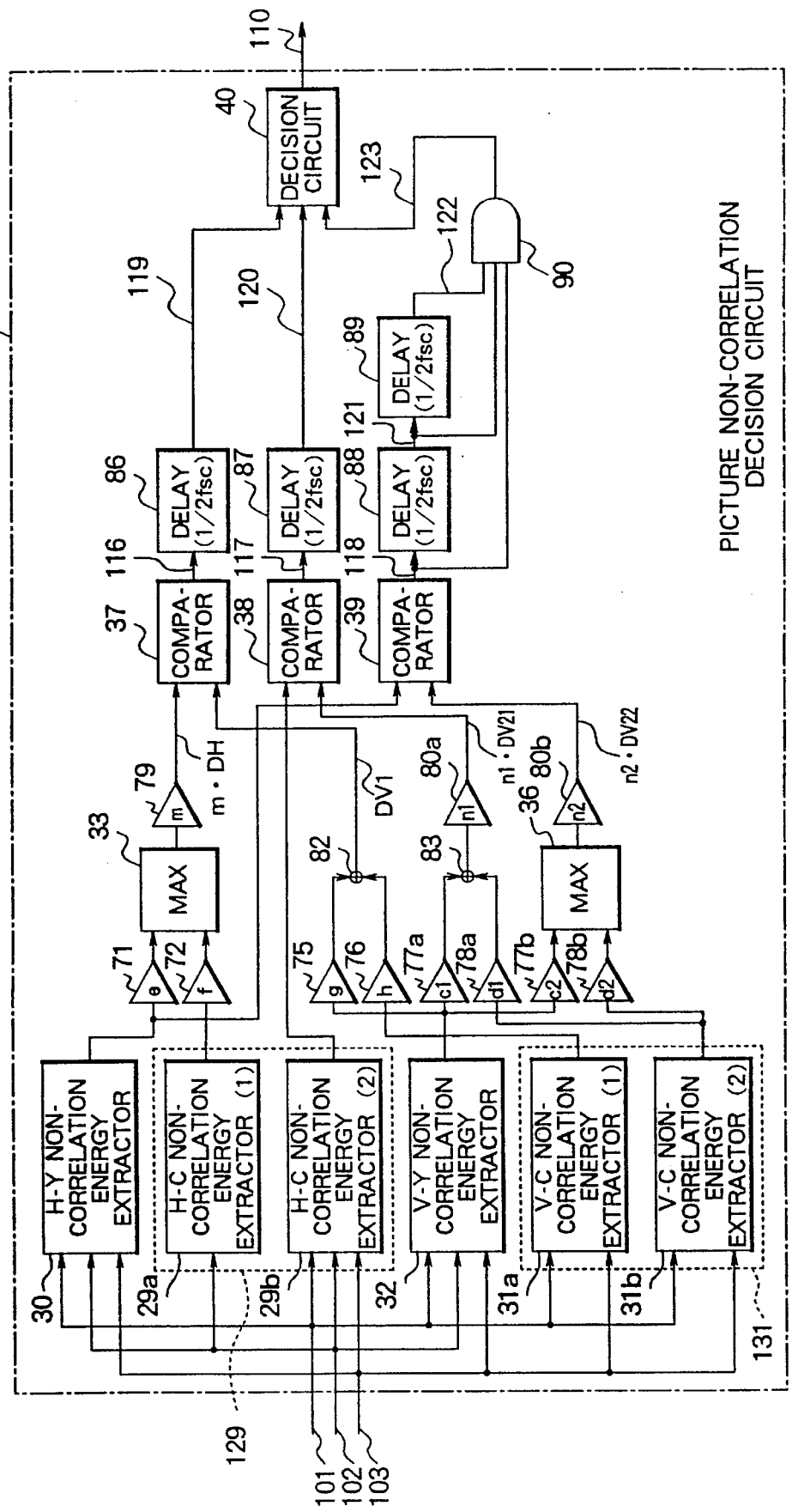
FIG. 32 is a block diagram showing a picture non-correlation decision circuit 18 used in Embodiments 47 and 48.

This embodiment is similar to Embodiment 1, but in place of the picture non-correlation decision circuit 18 of FIG. 9, the picture non-correlation decision circuit shown in FIG. 32 is used.

The picture non-correlation decision circuit 18 of this embodiment is similar to that of FIG. 31, but is modified in the same way as in FIG. 11. That is, it is provided with the horizontal chrominance non-correlation energy extractor 129 comprising the first and second horizontal chrominance non-correlation energy extractors 29a and 29b, and the vertical chrominance non-correlation energy extractor 131 comprising the first and second vertical chrominance non-correlation energy extractors 31a and 31b. The control over the selection by the selectors 23 and 25 according to the output signal 110 of the decision circuit 40 is as shown in Table 3.

Embodiment 48

This embodiment is similar to Embodiment 2, but in place of the picture non-correlation decision circuit 18 of FIG. 9, the picture non-correlation decision circuit shown in FIG. 32 is used.

The operation of this picture non-correlation decision circuit 18 is the same as that of Embodiment 47, and the control over the selectors 23 and 25a in accordance with the output signal 110 of the decision circuit 40 is as shown in Table 3.

Embodiment 49

Figure 33:
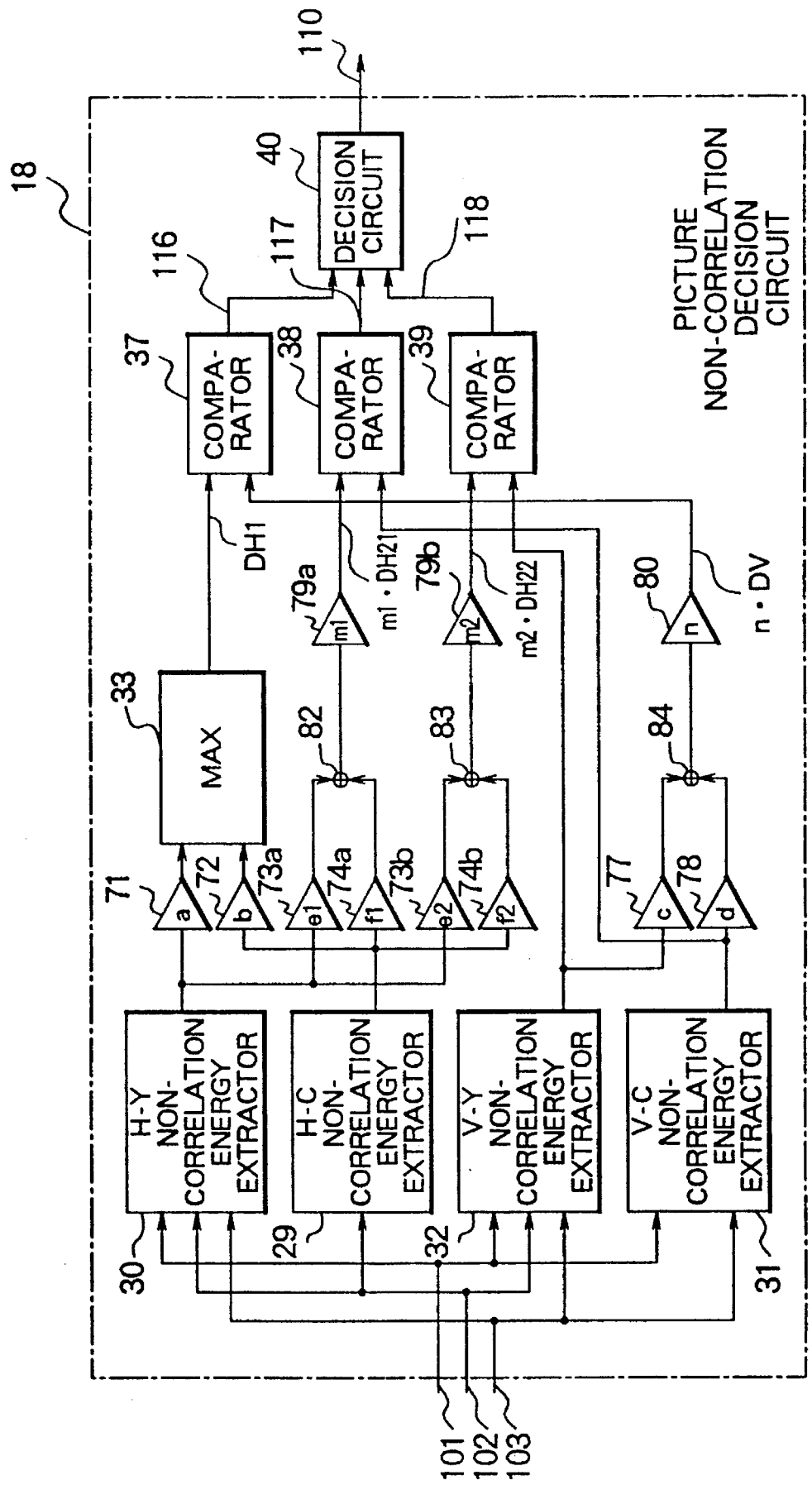
FIG. 33 is a block diagram showing a picture non-correlation decision circuit 18 used in Embodiments 49 and 50.

This embodiment is similar to Embodiment 1, but place of the picture non-correlation decision circuit 18 of FIG. 9, the picture non-correlation decision circuit shown ill FIG. 33 is used.

The picture non-correlation decision circuit 18 of this embodiment is similar to that of FIG. 25, but another one of the maximum value circuits, 36 is replaced by an adder 84. That is, the interconnection of the circuits of the embodiment of FIG. 33 is as follows:

The output signal DCH of the horizontal chrominance non-correlation energy extractor 29 is branched in three routes. In the first route, the signal is multiplied by a coefficient b at the multiplier 72 and the resultant signal is sent to the maximum value circuit 33. In the second route, the signal is multiplied by a coefficient f1 at the multiplier 74a, and the resultant signal is sent to the adder 82. In the third route, the signal is multiplied by a coefficient f2 at the multiplier 74b, and the resultant signal is sent to the adder 83.

The output signal DYH of the circuit for the horizontal luminance non-correlation energy extractor 30 is branched in three routes. In the first route, the signal is multiplied by a coefficient a at the multiplier 71, and the resultant signal is sent to the maximum value circuit 33. In the second route, the signal is multiplied by a coefficient e1 at the multiplier 73a, and the resultant signal is sent to the adder 82. In the third route, the signal is multiplied by a coefficient e2 at the multiplier 73b, and the resultant signal is sent to the adder 83.

The output signal DCV of the vertical chrominance non-correlation energy extractor 31 is branched in two routes. In the first route, the signal is applied directly to the comparator 38. In the second route, the signal is multiplied by a coefficient d at the multiplier 78, and the resultant signal is sent to the adder 84.

The output signal DYV of the vertical luminance non-correlation energy extractor 32 is branched in two routes. In the first route, the signal is applied directly to the comparator 39. In the second route, the signal is multiplied by a coefficient c at the multiplier 77, and the resultant signal is sent to the adder 84.

The output signal of the maximum value circuit 33 is applied as a first horizontal non-correlation energy DH1 to the comparator 37. The output signal of the adder 82, as a second horizontal non-correlation energy DH21, is multiplied by a coefficient m1 at the multiplier 79a, and the product is sent to the comparator 38. The output signal of the adder 83, as a third horizontal non-correlation energy DH22, is multiplied by a coefficient m2 at the multiplier 79b, and the product is sent to the comparator 39.

The output signal of the maximum value circuit 36, as the vertical non-correlation energy DV, is multiplied by a coefficient n at the multiplier 80, and the product is sent to the comparator 37.

The comparator 37 compares the first horizontal non-correlation energy DH1 and the product n·DV of the vertical non-correlation energy DV and the coefficient n, and produces a high level output signal 116 when DH1≧n·DV, and a low level output signal 116 at other times.

The comparator 38 compares the vertical chrominance non-correlation energy DCV and the product m1·DH21 of the second horizontal non-correlation energy DH21 and the coefficient m1, and produces a high level output signal 117 when DCV≧m1·DH21, and a low level output signal 117 at other times.

The comparator 39 compares the vertical luminance non-correlation energy DYV and the product m2·DH22 of the third horizontal non-correlation energy DH22 and the coefficient m2, and produces a high level output signal 118 when DYV≧m2·DH22, and a low level output signal 117 at other times.

The respective output signals 116, 117 and 118 of the comparators 37, 38 and 39 are applied to the decision circuit 40. The output signal 110 of the decision circuit 40 serves as the output signal of the picture non-correlation decision circuit 18.

Following is a description of the operation of the picture non-correlation decision circuit 18 operation in accordance with this embodiment.

The first horizontal non-correlation energy DH1, the second horizontal non-correlation energy DH21, the third horizontal non-correlation energy DH22 and the vertical non-correlation energy DV can be expressed as follows.

$$DH1 = \max(a \cdot DYH, b \cdot DCH)$$

$$DH21 = e1 \cdot DYH + f1 \cdot DCH$$

$$DH22 = e2 \cdot DYH + f2 \cdot DCH$$

$$DV = c \cdot DYV + d \cdot DCV$$

At the comparator 37, DH1 and n·DV are compared. If $$DH1 \geq n \cdot DV$$

the horizontal non-correlation is interpreted as strong, and a "1" signal 116 is sent to the decision circuit 40. If $$DH1 < n \cdot DV$$

the horizontal non-correlation is interpreted as weak, and a "0" signal 116 is sent to the decision circuit 40.

At the comparator 38, DCV and m1·DH21 are compared. If $$DCV \geq m1 \cdot DH21$$

the vertical non-correlation is interpreted as strong, and a "1" signal 117 is sent to the decision circuit 40. If $$DCV < m1 \cdot DH21$$

the vertical non-correlation is interpreted as weak, and a "0" signal 117 is sent to the decision circuit 40.

At the comparator 39, DYV and m2·DH22 are compared. If $$DYV \geq m2 \cdot DH22$$

the vertical non-correlation is interpreted as strong, and a "1" signal 118 is sent to the decision circuit 40. If $$DYV < m2 \cdot DH22$$

the vertical non-correlation is interpreted as weak, and a "0" signal 118 is sent to the decision circuit 40.

According to the results of the above correlation detection, the decision circuit 40 controls the selectors 23 and 25 in the following manner.

The relationship between the input signals 116, 117 and 118 of the decision circuit 40, and its output signal 110, the selection of the chrominance output signal 107, 109 or 111 at the selector 23 and the selection of the chrominance output signal 1131 or 1132 at the selector 25 is as shown in Table 2.

When the output signals 110a and 110b of the AND circuits 41 and 42 are both "0", the selector 23 selects the output signal 109 of the compensating delay circuit 21. When the output signal 110a of the AND circuit 41 is "0" and the output signal 110b of the AND circuit 42 is "1", the output signal 107 of the compensating delay circuit 20 is selected. When the output signal 110a of the AND circuit 41 is "1" and the output signal 110b of the AND circuit 42 is "0", the output signal 111 of the compensating delay circuit 22 is selected.

When the output signal 110b of the AND circuit 42 is "1", the selector 25 selects the output signal 1131 of the compensating delay circuit 91. At other times, the selector 25 selects the output signal 1132 of the horizontal chrominance extraction filter 24.

Consequently, in this embodiment, the response C11(Z) of the filter for extracting the chrominance signal output through the terminal 26, and the response C12(Z) of the filter for extracting the chrominance signal used for extracting the luminance signal are given below:

When the vertical non-correlation is strong, $$C11(Z) = Ch1(Z)$$

$$C12(Z) = Ch1(Z) \cdot Ch2(Z)$$

When the horizontal non-correlation is strong, $$C11(Z) = C12(Z) = Cv(Z)$$

When neither of these conditions are met, $C11(Z)=Chv(Z)$ $C12(Z)=Chv(Z)\cdot CH2(Z)$

Embodiment 50

This embodiment is similar to Embodiment 2, but in place of the picture non-correlation decision circuit 18 of FIG. 9, the picture non-correlation decision circuit shown in FIG. 33 is used.

The operation of this picture non-correlation decision circuit 18 is the same as Embodiment 49

The relationship between the input signals 116, 117 and 118 of the decision circuit 40, and its output signal 110, the selection of the chrominance output signal 107, 109 or 111 at the selector 23 and the selection of the chrominance output signal 1131 or 1132 at the selector 25a is as shown in Table 3.

When the output signals 110a and 110b of the AND circuits 41 and 42 are both "0", the selector 23 selects the output signal 109 of the compensating delay circuit 21. When the output signal 110a of the AND circuit 41 is "0" and the output signal 110b of the AND circuit 42 is "1", the output signal 107 of the compensating delay circuit 20. When the output signal 110a of the AND circuit 41 is "1" and the output signal 110b of the AND circuit 42 is "0", the output signal 111 of the compensating delay circuit 22 is selected.

When the output signal 110b of the AND circuit 42 is "1", the selector 25a selects the output signal 1131 of the compensating delay circuit 91a. At other times, the selector 25a selects the output signal 1132 of the horizontal chrominance extraction filter 24a.

Consequently, in this embodiment, the response C21(Z) of the filter for extracting the chrominance signal output through the terminal 26, and the response C22(Z) of the filter for extracting the chrominance signal used for extracting the luminance signal are given below:
When the vertical non-correlation is strong, $C21(Z)=Ch1(Z)\cdot Ch2(Z)$ $C22(Z)=Ch1(Z)$ When the horizontal non-correlation is strong, $C21(Z)=C22(Z)=Cv(Z)$ When neither of these conditions are met, $C21(Z)=Chv(Z)\cdot CH2(Z)$ $C22(Z)=Chv(Z)$

Embodiment 51

Figure 34:
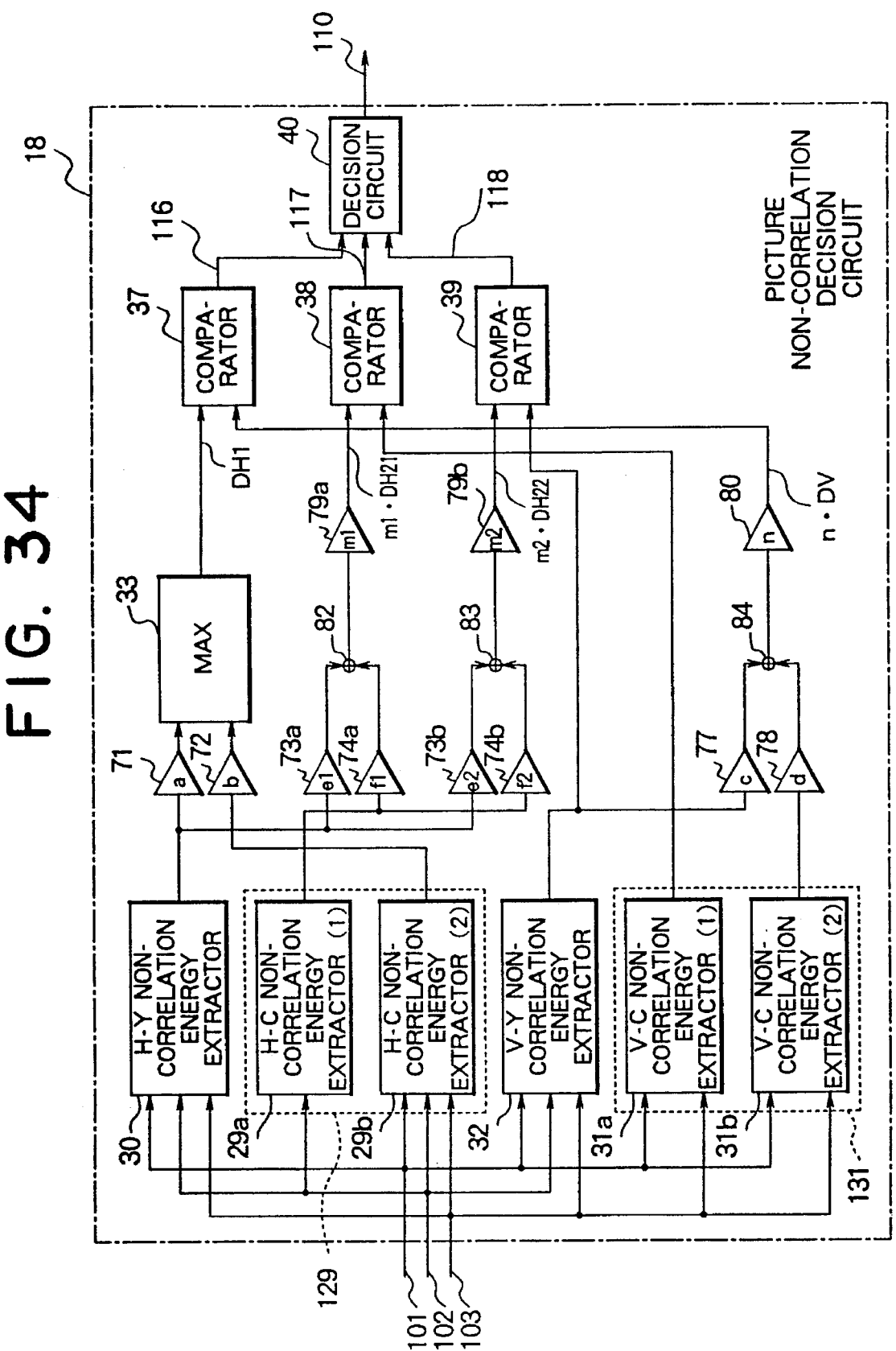
FIG. 34 is a block diagram showing a picture non-correlation decision circuit 18 used in Embodiments 51 and 52.

This embodiment is similar to Embodiment 1, but in place of the picture non-correlation decision circuit 18 of FIG. 9, the picture non-correlation decision circuit shown in FIG. 34 is used.

The picture non-correlation decision circuit 18 of this embodiment is similar to that of FIG. 33, but is modified in the same way as in FIG. 10. That is, it is provided with the horizontal chrominance non-correlation energy extractor 129 comprising the first and second horizontal chrominance non-correlation energy extractors 29a and 29b, and the vertical chrominance non-correlation energy extractor 131 comprising the first and second vertical chrominance non-correlation energy extractors 31a and 31b. The control over the selection by the selectors 23 and 25 according to the output signal 110 of the decision circuit 40 is as shown in Table 2.

Embodiment 52

This embodiment is similar to Embodiment 2, but in place of the picture non-correlation decision circuit 18 of FIG. 9, the picture non-correlation decision circuit shown in FIG. 34 is used.

The operation of this picture non-correlation decision circuit 18 is the same as Embodiment 51, and the control over the selectors 23 and 25a in accordance with the output signal 110 of the decision circuit 40 is as shown in Table 3.

Embodiment 53

Figure 35:
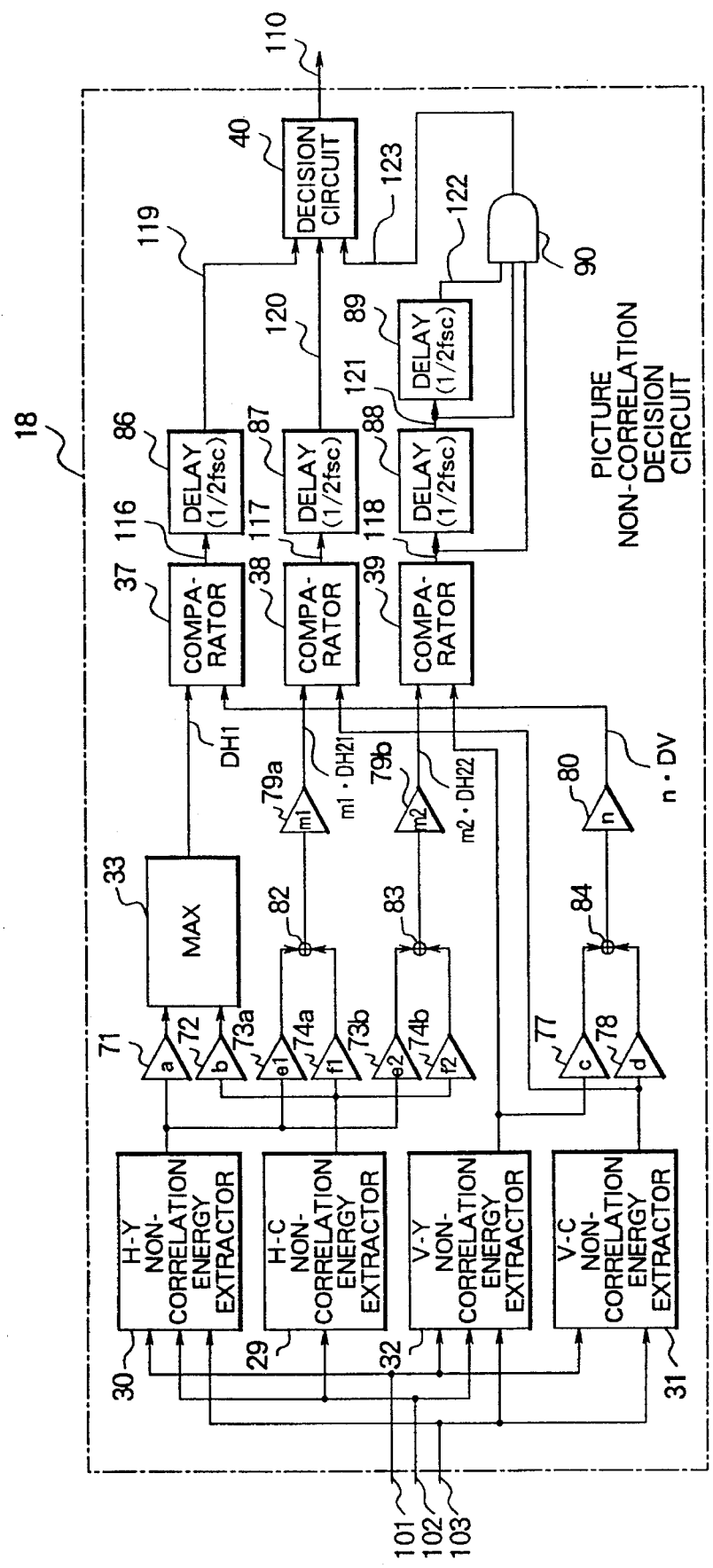
FIG. 35 is a block diagram showing a picture non-correlation decision circuit 18 used in Embodiments 53 and 54.

This embodiment is similar to Embodiment 1, but in place of the picture non-correlation decision circuit 18 of FIG. 9, the picture non-correlation decision circuit shown in FIG. 35 is used.

The picture non-correlation decision circuit 18 of this embodiment is similar to that of FIG. 33, but is modified in the same way as in FIG. 11. That is, the delay circuits 86–89 and the AND circuit 90 are provided between the comparators 37–39 and the decision circuit 40.

The decision circuit 40 controls the selectors 23 and 25 on the basis of the input signals 119, 120 and 123 according to the results of the correlation detection described in the embodiment of FIG. 33. The control over the selectors 23 and 25 in accordance with the output signals 110a and 110b of the decision circuit 40 is as shown in Table 2.

Embodiment 54

This embodiment is similar to Embodiment 2, but in place of the picture non-correlation decision circuit 18 of FIG. 9, the picture non-correlation decision circuit shown in FIG. 35 is used.

The operation of this picture non-correlation decision circuit 18 is the same as Embodiment 53 and the control over the selectors 23 and 25a in accordance with the output signal 110 of the decision circuit 40 is as shown in Table 3.

Embodiment 55

Figure 36:
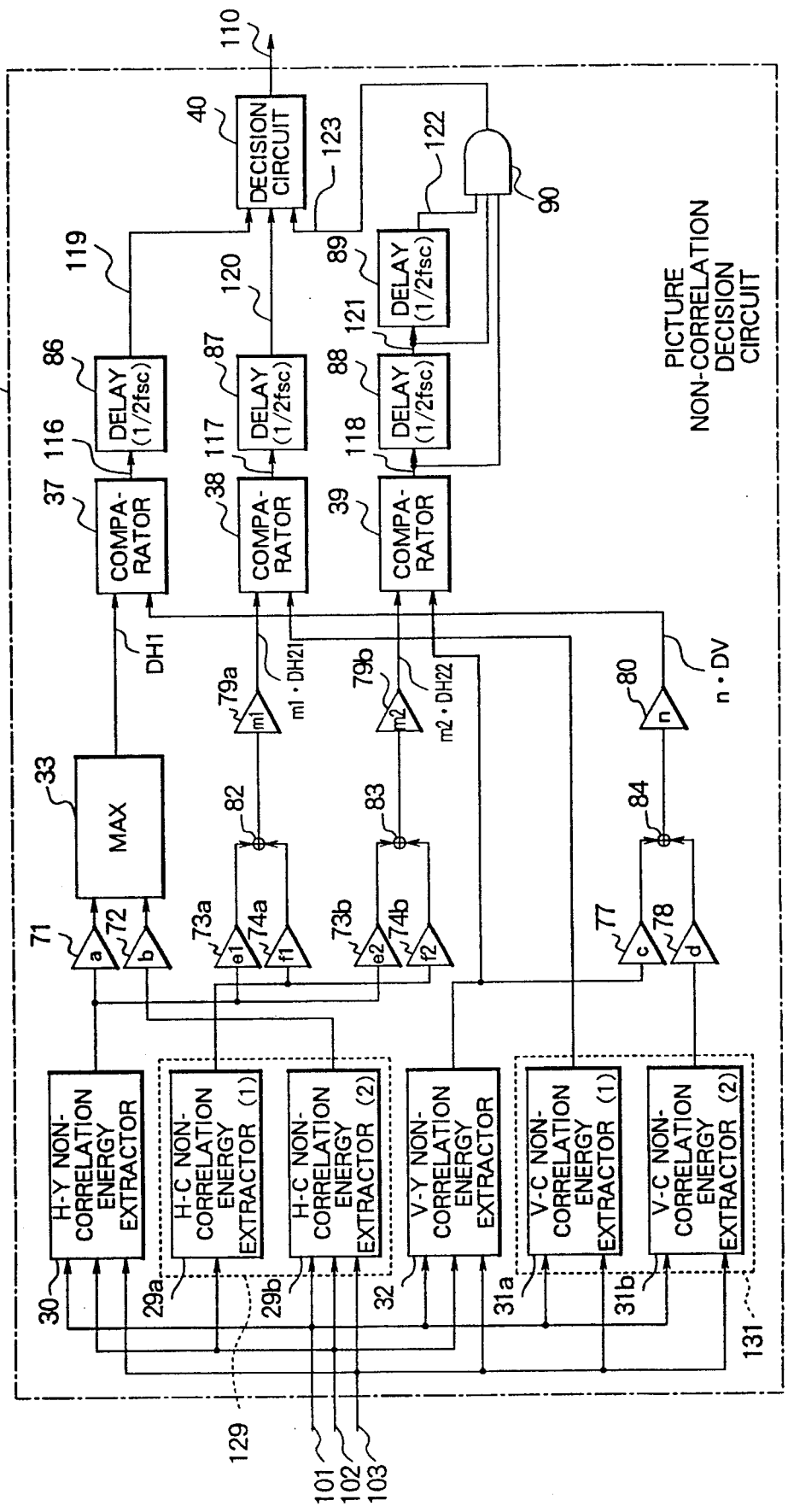
FIG. 36 is a block diagram showing a picture non-correlation decision circuit 18 used in Embodiments 55 and 56.

This embodiment is similar to Embodiment 1, but in place of the picture non-correlation decision circuit 18 of FIG. 9, the picture non-correlation decision circuit shown in FIG. 36 is used.

The picture non-correlation decision circuit 18 of this embodiment is similar to that of FIG. 35, but is modified in the same way as in FIG. 10. That is, it is provided with the horizontal chrominance non-correlation energy extractor 129 comprising the first and second horizontal chrominance non-correlation energy extractors 29a and 29b, and the vertical chrominance non-correlation energy extractor 131 comprising the first and second vertical chrominance non-correlation energy extractors 31a and 31b. The control over the selection by the selectors 23 and 25 according to the output signal 110 of the decision circuit 40 is as shown in Table 2.

Embodiment 56

This embodiment is similar to Embodiment 2, but in place of the picture non-correlation decision circuit 18 of FIG. 9, the picture non-correlation decision circuit shown in FIG. 36 is used.

The operation of this picture non-correlation decision circuit 18 is the same as Embodiment 55, and the control over the selectors 23 and 25a in accordance with the output signal 110 of the decision circuit 40 is as shown in Table 3.

Embodiment 57

Figure 37:
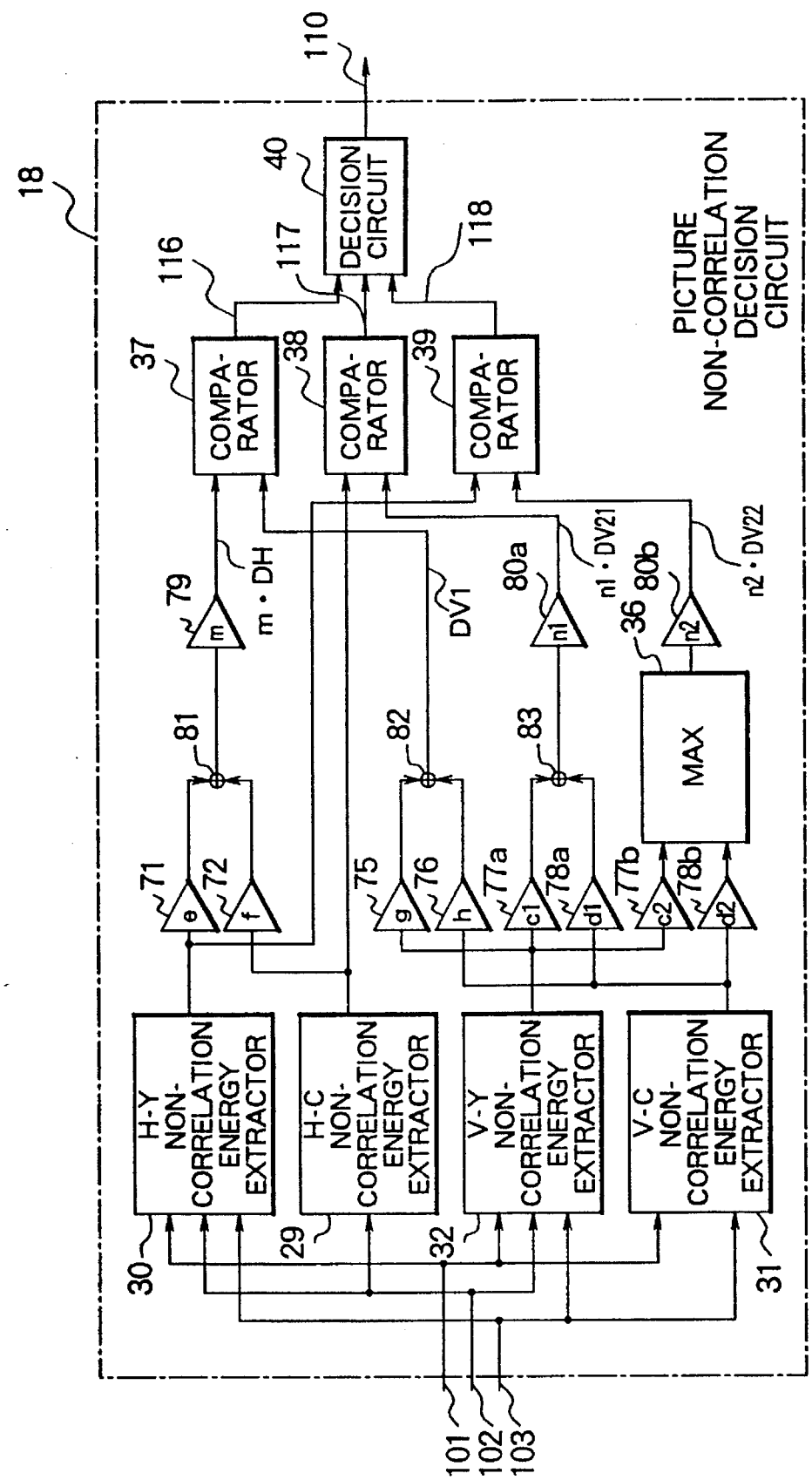
FIG. 37 is a block diagram showing a picture non-correlation decision circuit 18 used in Embodiments 57 and 58.

This embodiment is similar to Embodiment 1, but in place of the picture non-correlation decision circuit 18 of FIG. 9, the picture non-correlation decision circuit shown in FIG. 37 is used.

The picture non-correlation decision circuit 18 of this embodiment is similar to that of FIG. 29, but the maximum value circuit 33 is replaced by all adder 81, and the interconnection is as follows:

The output signal DCH of the horizontal chrominance non-correlation energy extractor 29 is branched in two routes. In the first route, the signal is applied directly to the comparator 38. In the second route, the signal is multiplied by a coefficient f at the multiplier 72, and the resultant signal is sent to the adder 81.

The output signal DYH of the horizontal luminance non-correlation energy extractor 30 is branched in two routes. In the first route, the signal is applied directly to the comparator 39. In the second route, the signal is multiplied by a coefficient e at the multiplier 71, and the resultant signal is sent to the adder 81.

The output signal DCV of the vertical chrominance non-correlation energy extractor 31 is branched in three routes. In the first route, the signal is multiplied by a coefficient it at the multiplier 76, and the resultant signal is sent to the adder 82. In the second route, the signal is multiplied by a coefficient d1 at the multiplier 78a, and the resultant signal is sent to the adder 83. In the third route, the signal is multiplied by a coefficient d2 at the multiplier 78b, and the resultant signal is sent to the maximum value circuit 36.

The output signal DYV of the vertical luminance non-correlation energy extractor 32 is branched in three routes. In the first route, the signal is multiplied by a coefficient g at the multiplier 75, and the resultant signal is sent to the adder 82. In the second route, the signal is multiplied by a coefficient c1 at the multiplier 77a, and the resultant signal is sent to the adder 83. In the third route, the signal is multiplied by a coefficient c2 at the multiplier 77b, and the resultant signal is sent to the maximum value circuit 36.

The output signal of the adder 81, as the horizontal non-correlation energy DH1, is multiplied by a coefficient m at the multiplier 79, and the product is applied to the comparator 37. The output signal of the adder 82 is applied as a first vertical non-correlation energy DV1 to the comparator 37. The output signal of the adder 83, as a second vertical non-correlation energy DV21, is multiplied by a coefficient n1 h at the multiplier 80a, and the product is applied to the comparator 38. The output signal of the maximum value circuit 36, as a third vertical non-correlation energy DV22, is multiplied by a coefficient n2 at the multiplier 80b, and time product is applied to the comparator 39.

The comparator 37 compares the first vertical non-correlation energy DV1 and the produce m·DH of the horizontal non-correlation energy DH and the coefficient m, and produces a high level output signal DH when DV1≧m·DH, and a low level output signal 116 at other times.

The comparator 38 compares the horizontal chrominance non-correlation energy DCH and the product n1·DV21 of the second vertical non-correlation energy DV21 and the coefficient n1, and produces a high level output signal 117 when DCH≧n1·DV21, and a low level output signal 117 at other times.

The comparator 39 compares the horizontal luminance non-correlation energy DYH and the product n2·DV22 of the third vertical non-correlation energy DV22 and the coefficient n2, and produces a high level output signal 118 when DYH≧n2·DV22, and a low level output signal 117 at other times.

The respective output signals 116, 117 and 118 of the comparators 37, 38 and 39 are applied to the decision circuit 40. The output signal 110 of the decision circuit 40 serves as the output signal of the picture non-correlation decision circuit 18.

Following is a description of the operation of the picture non-correlation decision circuit 18 in accordance with this embodiment.

The first vertical non-correlation energy DV1, the second vertical non-correlation energy DV21, the third vertical non-correlation energy DV22 and the horizontal non-correlation energy DH can be expressed as follows.

$$DH = e \cdot DYH + f \cdot DCH$$

$$DV1 = g \cdot DYV + h \cdot DCV$$

$$DV21 = c1 \cdot DYV + d1 \cdot DCV$$

$$DV22 = \max(c2 \cdot DYV, d2 \cdot DCV)$$

At the comparator 37, DV1 and m·DH are compared. If $$DV1 \geq m \cdot DH$$

the vertical non-correlation is interpreted as strong, and a "1" signal 116 is sent to the decision circuit 40. If $$DV1 < m \cdot DH$$

the vertical non-correlation is interpreted as weak, and a "0" signal 116 is sent to the decision circuit 40.

At the comparator 38, DCH and n1·DV21 are compared. If $$DCH \geq n1 \cdot DV21$$

the horizontal non-correlation is interpreted as strong, as indicated below, a "1" signal 117 is sent to the decision circuit 40. If $$DCH < n1 \cdot DV21$$

the horizontal non-correlation is interpreted as weak, as indicated below, a "0" signal 117 is sent to the decision circuit 40.

At the comparator 39, DYH and n2·DV22 are compared. If $$DYH \geq n2 \cdot DV22$$

the horizontal non-correlation is interpreted as strong, as indicated below, a "1" signal 118 is sent to the decision circuit 40. If $$DYH < n2 \cdot DV22$$

the horizontal non-correlation is interpreted as weak, as indicated below, a "0" signal 118 is sent to the decision circuit 40.

According to results of the above correlation detection, the decision circuit 40 controls the selectors 23 and 25 in the following manner.

The relationship between the input signals 116, 117 and 118 of the decision circuit 40, and its output signal 110, the selection of the chrominance output signal 107, 109 or 111 at the selector 23 and the selection of the chrominance output signal 1131 or 1132 at the selector 25 is as shown in Table 3.

When the output signals 110a and 110b of the AND circuits 41 and 42 are both "0", the selector 23 selects the output signal 107 of the compensating delay circuit 20. When the output signal 110a of the AND circuit 41 is "0" and the output signal 110b of the AND circuit 42 is "1", the output signal 109 of the compensating delay circuit 21 is selected. When the output signal 110a of the AND circuit 41 is "1" and the output signal 110b of the AND circuit 42 is "0", the output signal 111 of the delay circuit 22 is selected.

When the output signals 110a and 110b of the AND circuits 41 and 42 are both "1", the selector 25 selects the output signal 1131 of the compensating delay circuit 91. At other times, the selector 25 selects the output signal 1132 of the horizontal chrominance extraction filter 24.

Consequently, in this embodiment, the response C11(Z) of the filter for extracting the chrominance signal output through the terminal 26, and the response C12(Z) of the filter for extracting the chrominance signal used for extracting the luminance signal are given below:
When the vertical non-correlation is strong, $C11(Z)=Ch1(Z)$ $C12(Z)=Ch1(Z) \cdot Ch2(Z)$ When the horizontal non-correlation is strong, $C11(Z)=C22(Z)=Cv(Z)$ When neither of these conditions are met, $C11(Z)=Chv(Z)$ $C12(Z)=Chv(Z) \cdot CH2(Z)$ Embodiment 58

This embodiment is similar to Embodiment 2, but in place of the picture non-correlation decision circuit 18 of FIG. 9, the picture non-correlation decision circuit shown in FIG. 37 is used.

The operation of this picture non-correlation decision circuit 18 is the same as Embodiment 57.

The relationship between the input signals 116, 117 and 118 of the decision circuit 40, and its output signal 110, the selection of the chrominance output signal 107, 109 or 111 at the selector 23 and the selection of the chrominance output signal 1131 or 1132 at the selector 25a is as shown in Table 3.

Embodiment 59

Figure 38:
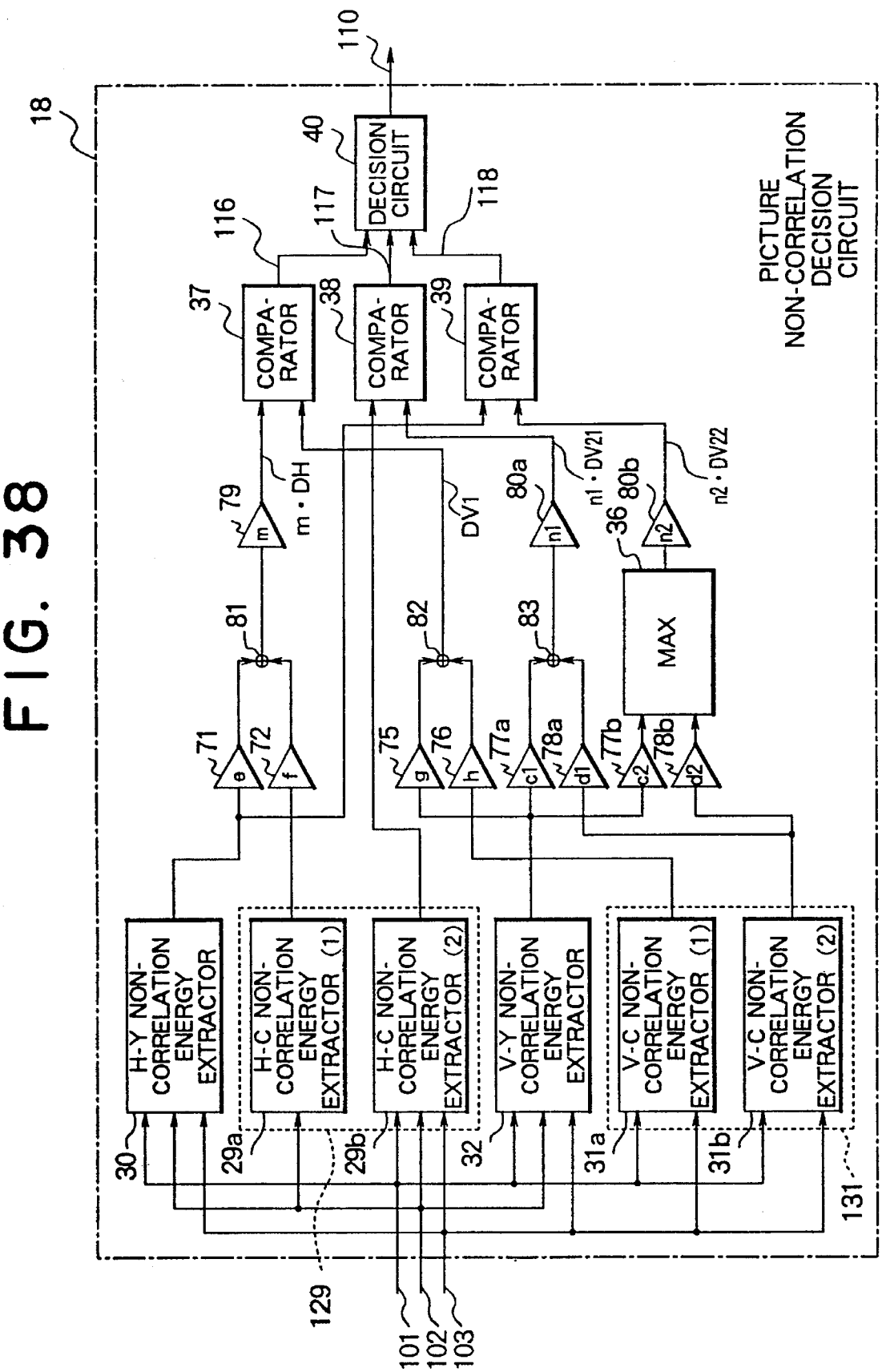
FIG. 38 is a block diagram showing a picture non-correlation decision circuit 18 used in Embodiments 59 and 60.

This embodiment is similar to Embodiment 1, but in place of the picture non-correlation decision circuit 18 of FIG. 9, the picture non-correlation decision circuit shown in FIG. 38 is used.

The picture non-correlation decision circuit 18 of this embodiment is similar to that of FIG. 37, but is modified in the same way as in FIG. 10. That is, it is provided with the horizontal chrominance non-correlation energy extractor 129 comprising the first and second horizontal chrominance non-correlation energy extractors 29a and 29b, and the vertical chrominance non-correlation energy extractor 131 comprising the first and second vertical chrominance non-correlation energy extractors 31a and 31b. The control over the selection by the selectors 23 and 25a according to the output signal 110 of the decision circuit 40 is as shown in Table 3.

Embodiment 60

This embodiment is similar to Embodiment 2, but in place of the picture non-correlation decision circuit 18 of FIG. 9, the picture non-correlation decision circuit shown in FIG. 38 is used.

The picture non-correlation decision circuit 18 of this embodiment is the same as Embodiment 59, and the control over the selectors 23 and 25a in accordance with the output signal 110 of the decision circuit 40 is as shown in Table 3.

Embodiment 61

Figure 39:
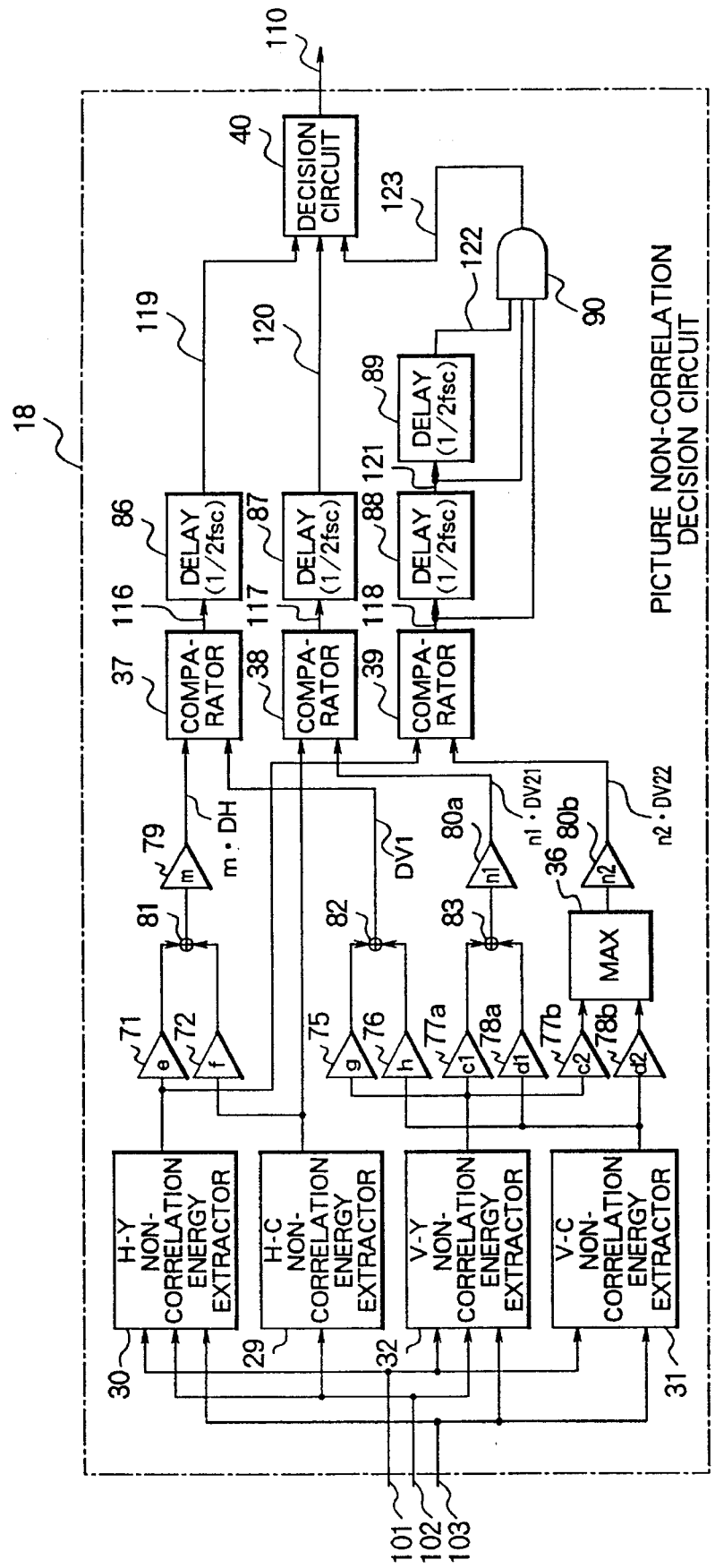
FIG. 39 is a block diagram showing a picture non-correlation decision circuit 18 used in Embodiments 61 and 62.

This embodiment is similar to Embodiment 1, but in place of the picture non-correlation decision circuit 18 of FIG. 9, the picture non-correlation decision circuit shown ill FIG. 39 is used.

The picture non-correlation decision circuit 18 of this embodiment is similar to that of FIG. 37, but is modified in the same way as in FIG. 11. That is, the delay circuits 86–89 and the AND circuit 90 are provided between the comparators 37–39 and the decision circuit 40.

The operation of these added circuits is the same as the corresponding circuits in FIG. 11. The decision circuit 40 controls the selectors 23 and 25 on the basis of the input signals 119, 120 and 123 according to the results of the correlation detection described in the embodiment of FIG. 37. The control over the selectors 23 and 25 in accordance with the output signal 110 of the decision circuit 40 is as shown in Table 3.

Embodiment 62

This embodiment is similar to Embodiment 2, but in place of the picture non-correlation decision circuit 18 of FIG. 9, the picture non-correlation decision circuit shown in FIG. 39 is used.

The operation of this picture non-correlation decision circuit 18 is the same as Embodiment 61, and the control over the selectors 23 and 25a in accordance with the output signal 110 off the decision circuit 40 is as shown in Table 3.

Embodiment 63

Figure 40:
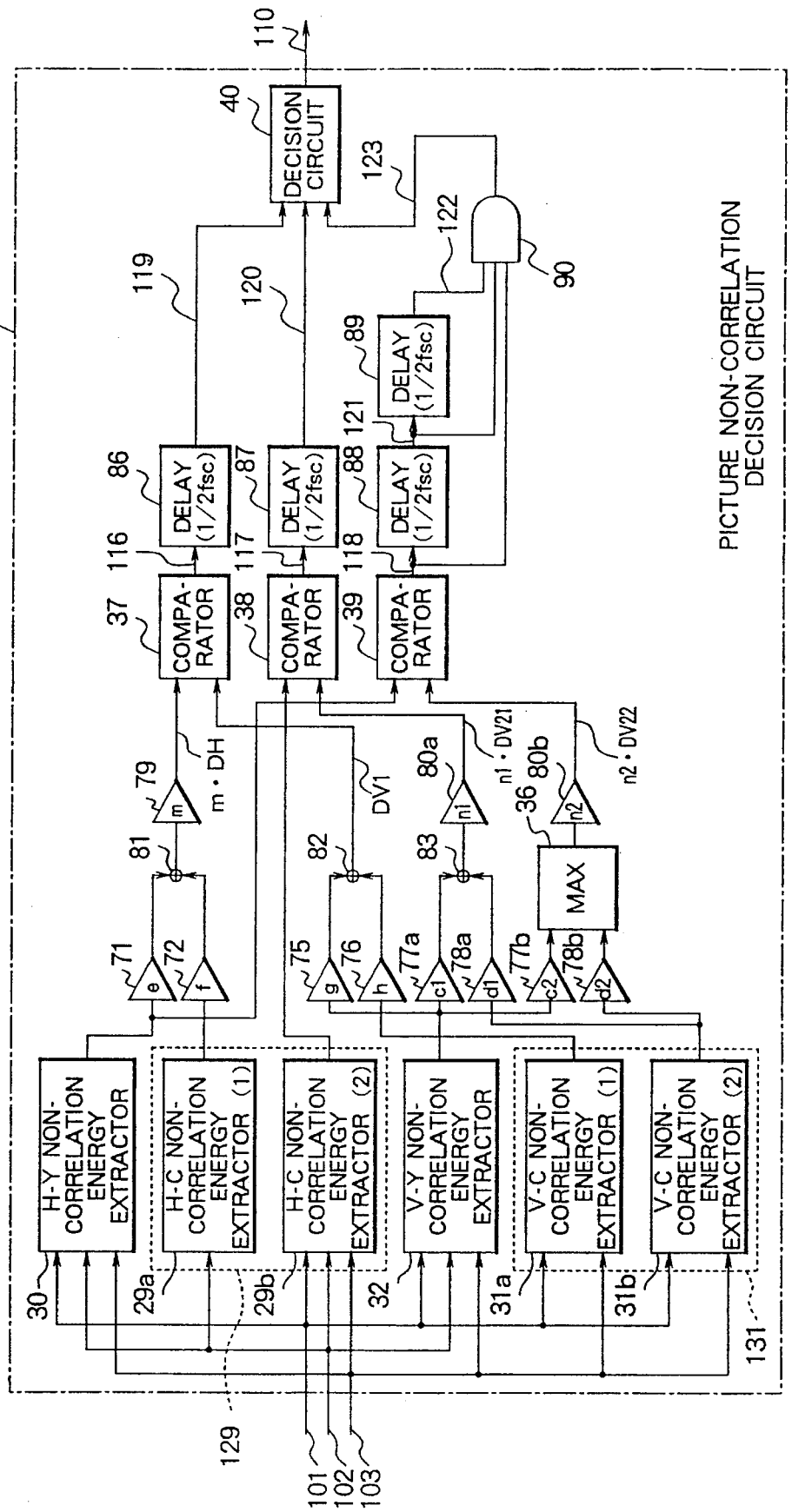
FIG. 40 is a block diagram showing a picture non-correlation decision circuit 18 used in Embodiments 63 and 64.

This embodiment is similar to Embodiment 1, but in place of the picture non-correlation decision circuit 18 of FIG. 9, the picture non-correlation decision circuit shown in FIG. 40 is used.

The picture non-correlation decision circuit 18 of this embodiment similar to that of FIG. 39, but is modified in the same way as in FIG. 10. That is, it is provided with the horizontal chrominance non-correlation energy extractor 129 comprising the first and second horizontal chrominance non-correlation energy extractors 29a and 29b, and the vertical chrominance non-correlation energy extractor 131 comprising the first and second vertical chrominance non-correlation energy extractors 31a and 31b. The control over the selection by the selectors 23 and 25 according to the output signal 110 of the decision circuit 40 is as shown in Table 3.

Embodiment 64

This embodiment is similar to Embodiment 2, but in place of the picture non-correlation decision circuit 18 of FIG. 9, the picture non-correlation decision circuit shown in FIG. 40 is used.

The operation of this picture non-correlation decision circuit 18 is the same as Embodiment 63, and the control over the selectors 23 and 25a in accordance with the output signal 110 of the decision circuit 40 is as shown in Table 3.

Modifications

In the above embodiments, the composite color television signal was sampled at a frequency 4 times the color subcarrier frequency synchronized to the horizontal scanning frequency. However, sampling may be other than 4 times the color subcarrier frequency, if the sampling points are arranged in a grid pattern on the screen.

The digital filters used in the above embodiments are examples and it is also acceptable, for example, to construct higher order filters. In addition, in the above embodiments, the digital filters are FIR filters, but IIR filters can also be used.

Figure 41:
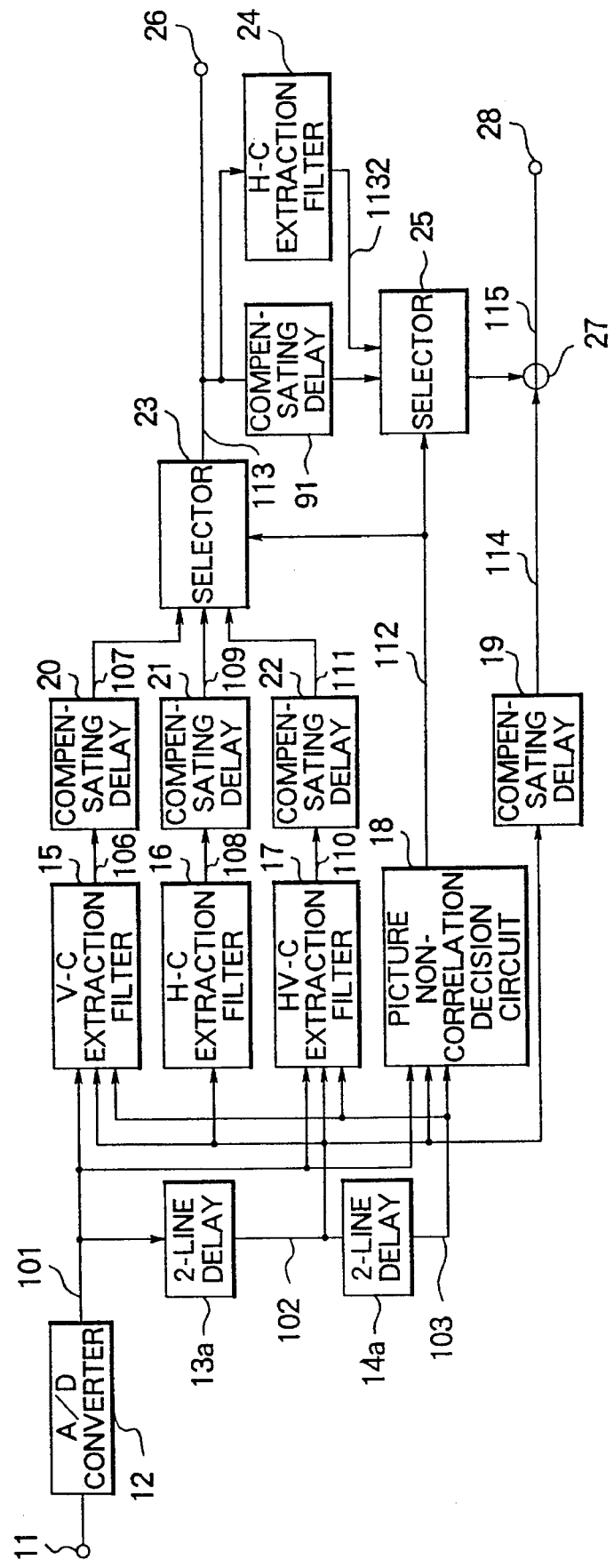
FIG. 41 is a block diagram showing a luminance/chrominance separating filter of another embodiment of the present invention.
Figure 42:
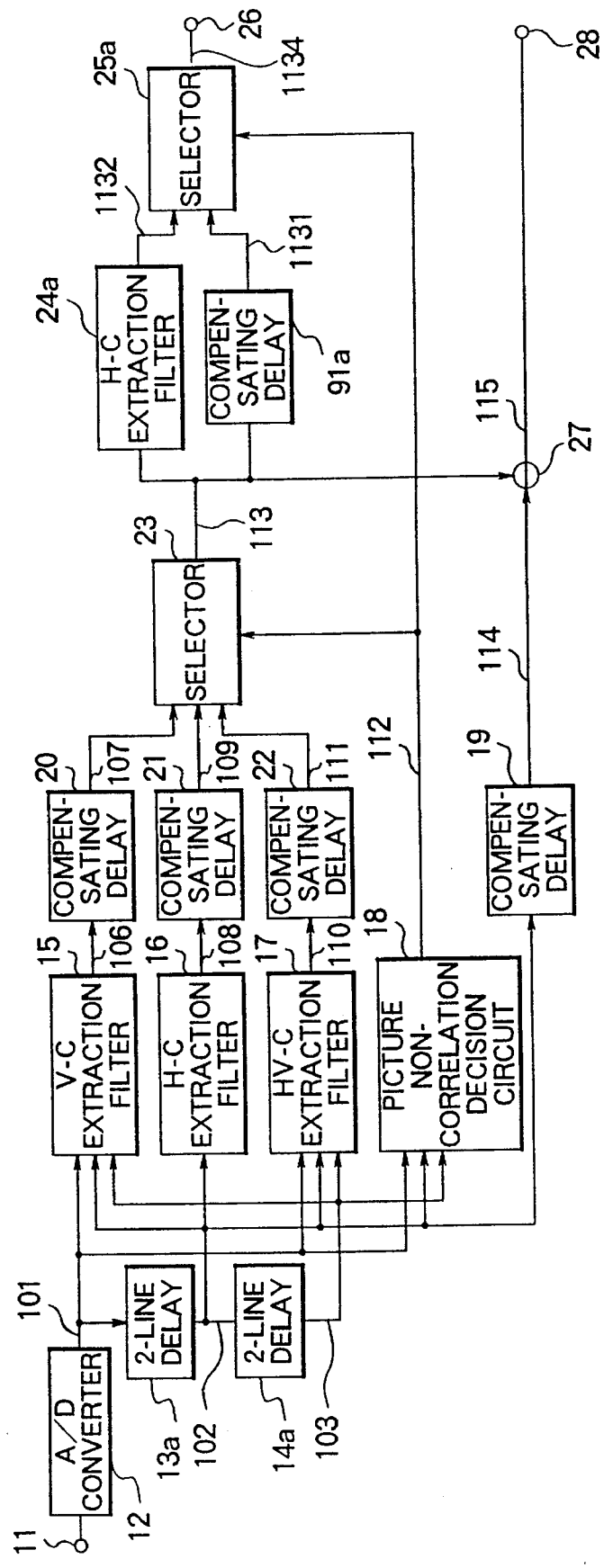
FIG. 42 is a block diagram showing a luminance/chrominance separating filter of another embodiment of the present invention.
Figure 43:
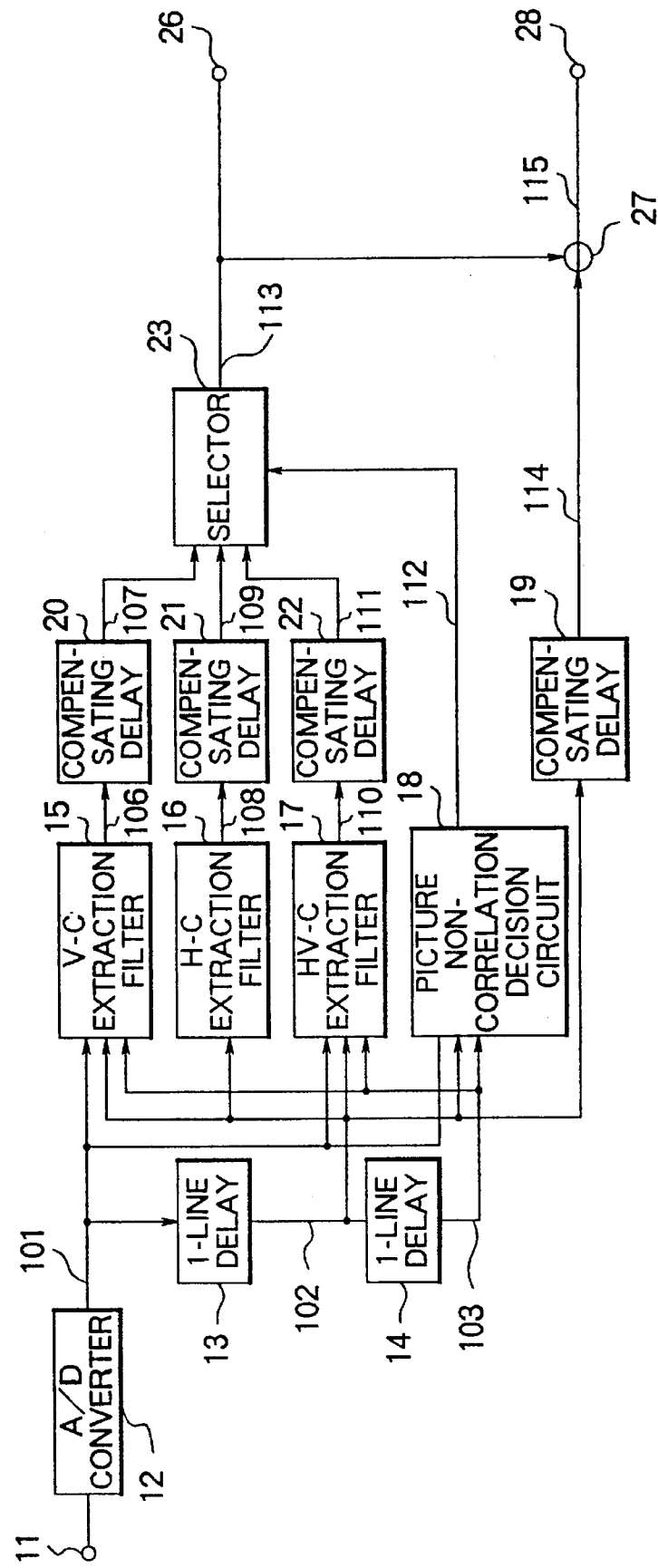
FIG. 43 is a block diagram showing a luminance/chrominance separating filter in the prior art.
Figure 44:
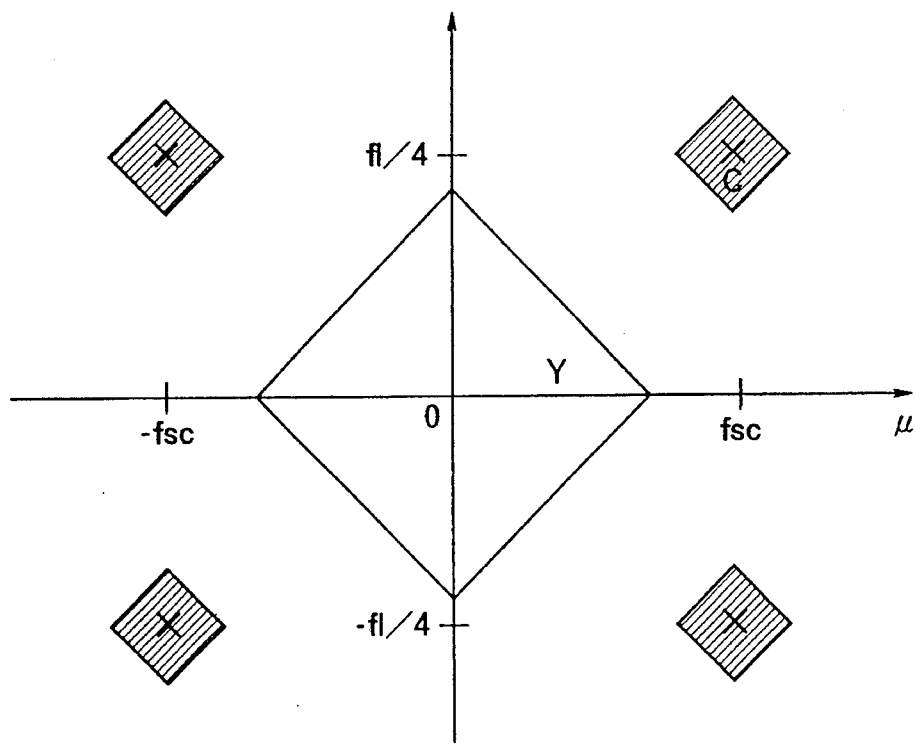
FIG. 44 is a diagram showing the frequency distribution on a two-dimensional plane of the NTSC composite color television signal.
Figure 45:
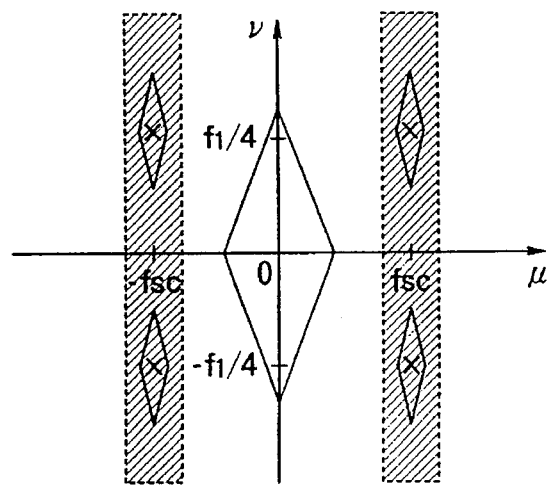
FIG. 45 is a diagram showing the frequency distribution on a two-dimensional plane of the NTSC composite color television signal of a picture having a strong horizontal correlation and weak vertical correlation.
Figure 46:
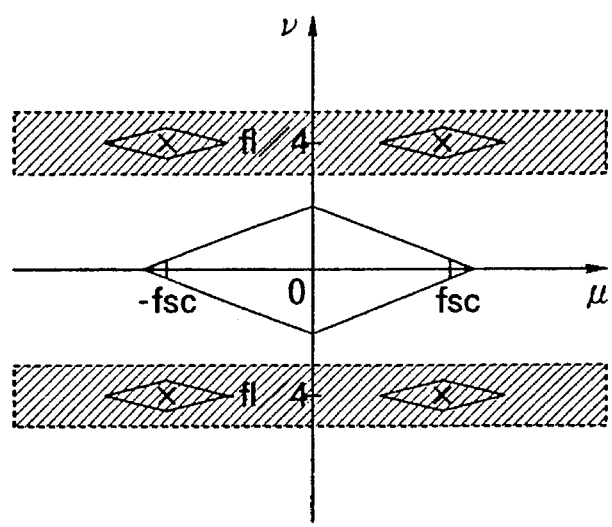
FIG. 46 is a diagram showing the frequency distribution on a two-dimensional plane of the NTSC composite color television signal of a picture having a strong vertical correlation and weak horizontal correlation.
Figure 47:
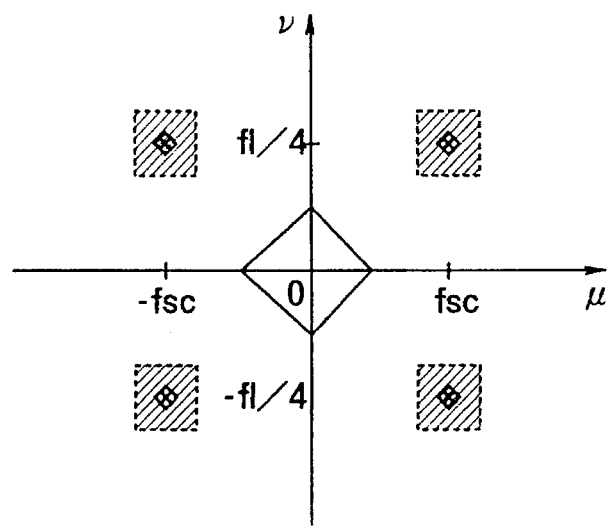
FIG. 47 is a diagram showing the frequency distribution on a two-dimensional plane of the NTSC composite color television signal of a picture having a strong horizontal correlation and a strong vertical correlation.

Although all NTSC system YC separating filter was described in the above embodiments, by replacing the 1-line delay circuits 13 and 14 of FIG. 1 or FIG. 2 with two 2-line delay circuits 13a and 14a such as indicated in FIG. 41 or FIG. 42, this invention can be applied to a PAL system YC separating filter.

What is claimed is:

1. A luminance/chrominance separating filter for separating a composite color television signal into a luminance signal and a chrominance signal, said separating filter comprising:

means for producing sample values of a specific sampling point and a plurality of reference sampling points of the composite color television signal, said reference sampling points being situated in the neighborhood of the specific sampling point when the sampling points are arranged on a two-dimensional plane corresponding to a display screen;

a first horizontal chrominance extraction filter for extracting, from said sample value of said specific sampling point, frequency components corresponding to components of a color subcarrier in a horizontal direction to produce a first chrominance signal;

a vertical chrominance extraction filter for extracting, from said sample values of said specific and reference sampling points, frequency components corresponding to components of a color subcarrier in a vertical direction to produce a second chrominance signal;

a horizontal and vertical chrominance extraction filter for extracting, from said sample values of said specific and reference sampling points, frequency components corresponding to components of a color subcarrier in said horizontal and vertical directions to produce a third chrominance signal;

a first selector for selecting one of said first, second and third chrominance signals based on a chrominance signal selection signal indicative of non-correlation in said horizontal and vertical directions;

a second horizontal chrominance extraction filter, receiving said selected chrominance signal and having a narrower bandwidth than said first horizontal chrominance extraction filter; and a second selector receiving output of said second horizontal chrominance extraction filter, output of said first selector and said chrominance signal selection signal, and selecting, based on said chrominance signal selection signal, said output of said second horizontal chrominance extraction filter when said first selector selects either said first or third chrominance signal, and selecting, based on said chrominance signal selection signal, said output of said first selector when said first selector selects said second chrominance signal.

2. A luminance/chrominance separating filter according to claim 1, further comprising:

a picture non-correlation decision circuit responsive to the sample values of said specific and reference sampling points for detecting said non-correlation in the horizontal direction and said non-correlation in the vertical direction of said sample values and outputting said chrominance signal selection signal indicative of said non-correlation in said horizontal and vertical directions;

wherein said picture non-correlation decision circuit includes,
   a horizontal chrominance non-correlation energy extractor responsive to at least the sample value of said specific sampling point for extracting horizontal chrominance non-correlation correlation energy consisting primarily of the chrominance signal extending in the horizontal direction;

a horizontal luminance non-correlation energy extractor responsive to the sample values of said specific and reference sampling points for extracting horizontal luminance non-correlation energy consisting primarily of the luminance signal extending in the horizontal direction;

a vertical chrominance non-correlation energy extractor responsive to the sample values of said reference sampling points for detecting vertical chrominance non-correlation energy consisting primarily of the chrominance signal extending in the vertical direction;

a vertical luminance non-correlation energy extractor responsive to the sample values of said specific and reference sampling points for detecting vertical luminance non-correlation energy consisting primarily of the luminance signal extending in the vertical direction; and judging means responsive to outputs of said horizontal chrominance non-correlation energy extractor, said horizontal luminance non-correlation energy extractor, said vertical chrominance non-correlation energy extractor and said vertical luminance non-correlation energy extractor for determining which of the horizontal and vertical non-correlations is strong, generating said chrominance signal selection signal such that said first selector selects said first chrominance signal when the vertical non-correlation is strong, selects said second chrominance signal when the horizontal non-correlation is strong, and selects said third chrominance signal when neither said horizontal or vertical non-correlations is strong, and further generating said chrominance signal selection signal such that said second selector selects said output of said second horizontal chrominance extraction filter when said first selector selects either said first or third chrominance signal.

3. A luminance/chrominance separating filter according to claim 2, wherein output of said second selector is used for calculation with the sample value of the specific sampling point of the composite color television signal to produce an output luminance signal.

4. A luminance/chrominance separating filter according to claim 3, further comprising a subtractor for subtracting the output of said second selector from the sample value of the specific sampling point of the composite color television signal to produce said output luminance signal.

5. A luminance/chrominance separating filter according to claim 3, wherein said judging means comprises:

a first maximum value circuit for receiving the horizontal chrominance non-correlation energy multiplied by a first predetermined coefficient and the horizontal luminance non-correlation energy multiplied by a second predetermined coefficient, and producing, as an output thereof, a larger one of the horizontal chrominance non-correlation energy multiplied by said first predetermined coefficient and the horizontal luminance non-correlation energy multiplied by said second predetermined coefficient;

a second maximum value circuit for receiving the horizontal chrominance non-correlation energy multiplied by a third predetermined coefficient and the horizontal luminance non-correlation energy multiplied by a fourth predetermined coefficient, and producing, as an output thereof, a larger one of the horizontal chrominance non-correlation energy multiplied by said third predetermined coefficient and the horizontal luminance non-correlation energy multiplied by said fourth predetermined coefficient;

a third maximum value circuit for receiving the horizontal chrominance non-correlation energy multiplied by a fifth predetermined coefficient and the horizontal luminance non-correlation energy multiplied by a sixth predetermined coefficient, and producing, as an output thereof, a larger one of the horizontal chrominance non-correlation energy multiplied by said fifth predetermined coefficient and the horizontal luminance non-correlation energy multiplied by said sixth predetermined coefficient;

a fourth maximum value circuit for receiving the vertical chrominance non-correlation energy multiplied by a seventh predetermined coefficient and the vertical luminance non-correlation energy multiplied by an eighth predetermined coefficient, and producing, as an output thereof, a larger one of the vertical chrominance non-correlation energy multiplied by said seventh predetermined coefficient and the vertical luminance non-correlation energy multiplied by said eighth predetermined coefficient;

a first comparator for comparing the output of said first maximum value circuit and the output of said fourth maximum value circuit multiplied by a ninth predetermined coefficient, and producing an output signal which indicates whether the horizontal non-correlation is weak or strong based on the comparison;

a second comparator for comparing the vertical chrominance non-correlation energy with the output of the second maximum value circuit multiplied by a tenth predetermined coefficient, and producing an output signal which indicates whether the vertical non-correlation is weak or strong based on the comparison;

a third comparator for comparing the vertical luminance non-correlation energy with the output of the third maximum value circuit multiplied by an eleventh predetermined coefficient, and producing an output signal which indicates whether the vertical non-correlation is weak or strong based on the comparison; and a decision circuit receiving the output signals of the first to third comparators, determining strength of said horizontal non-correlation and said vertical non-correlation, generating said chrominance signal selection signal such that said first selector selects said first chrominance signal when the vertical non-correlation is strong, the second chrominance signal when the horizontal non-correlation is strong, and the third chrominance signal when neither said horizontal or vertical non-correlation is strong, and further generating said chrominance signal selection signal such that said second selector selects said output of said second horizontal chrominance extraction filter, when said first selector selects either said first or third chrominance signal.

6. A luminance/chrominance separating filter according to claim 5, wherein said horizontal chrominance non-correlation energy extractor comprises:
a first horizontal chrominance non-correlation energy extractor responsive to the sample value of said specific sampling point for detecting first horizontal chrominance non-correlation energy consisting primarily of the chrominance signal in the horizontal direction; and
a second horizontal chrominance non-correlation energy extractor responsive to the sample values of said specific and reference sampling points for detecting second horizontal chrominance non-correlation energy consisting primarily of the chrominance signal in the horizontal direction;

said vertical chrominance non-correlation energy extractor comprises:
a first vertical chrominance non-correlation energy extractor responsive to the sample values of said reference sampling points for detecting first vertical chrominance non-correlation energy consisting primarily of the chrominance signal in the vertical direction; and
a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive said second horizontal chrominance non-correlation energy multiplied by said first predetermined coefficient and the horizontal luminance non-correlation energy multiplied by said second predetermined coefficient, and produces, as an output thereof, a larger one of said second horizontal chrominance non-correlation energy multiplied by said first predetermined coefficient and the horizontal luminance non-correlation energy multiplied by said second predetermined coefficient;

said second maximum value circuit is coupled to receive said first horizontal chrominance non-correlation energy multiplied by said third predetermined coefficient and the horizontal luminance non-correlation energy multiplied by said fourth predetermined coefficient, and produces, as an output thereof, a larger one of said first horizontal chrominance non-correlation energy multiplied by said third predetermined coefficient and the horizontal luminance non-correlation energy multiplied by said fourth predetermined coefficient;

said third maximum value circuit is coupled to receive said first horizontal chrominance non-correlation energy multiplied by said fifth predetermined coefficient and the horizontal luminance non-correlation energy multiplied by said sixth predetermined coefficient, and produces, as an output thereof, a larger one of said first horizontal chrominance non-correlation energy multiplied by said fifth predetermined coefficient and the horizontal luminance non-correlation energy multiplied by said sixth predetermined coefficient;

said fourth maximum value circuit is coupled to receive said second vertical chrominance non-correlation energy multiplied by said seventh predetermined coefficient and the vertical luminance non-correlation energy multiplied by said eighth predetermined coefficient, and produces, as an output thereof, a larger one of said second vertical chrominance non-correlation energy multiplied by said seventh predetermined coefficient and the vertical luminance non-correlation energy multiplied by said eighth predetermined coefficient; and said second comparator is coupled to receive said first vertical chrominance non-correlation energy and the output signal of the second maximum value circuit multiplied by said tenth predetermined coefficient, and produces an output signal which indicates whether the vertical non-correlation is weak or strong based on the comparison.

7. A luminance/chrominance separating filter according to claim 5, further comprising:

a first delay circuit for delaying the output signal of the first comparator by a time length of half a period of the color subcarrier to produce a first delayed output signal;

a second delay circuit for delaying the output signal of the second comparator by said time length to produce a second delayed output signal;

a third delay circuit for delaying the output signal of the third comparator by said time length to produce a third delayed output signal;

a fourth delay circuit for delaying the third delayed output signal by said time length to produce a fourth delayed output signal;

an AND circuit for producing a logical product of the output signal of the third comparator, said third delayed output signal and said fourth delayed output signal;

wherein said decision circuit receives said first and second delayed output signals, and said logical product, and determines strength of the horizontal non-correlation and the vertical non-correlation on the basis of said first and second delayed output signals and said logical product.

8. A luminance/chrominance separating filter according to claim 7, wherein said horizontal chrominance non-correlation energy extractor comprises:

a first horizontal chrominance non-correlation energy extractor responsive to the sample value of said specific sampling point for detecting first horizontal chrominance non-correlation energy consisting primarily of the chrominance signal in the horizontal direction; and a second horizontal chrominance non-correlation energy extractor responsive to the sample values of said specific and reference sampling points for detecting second horizontal chrominance non-correlation energy consisting primarily of the chrominance signal in the horizontal direction;

said vertical chrominance non-correlation energy extractor comprises:

a first vertical chrominance non-correlation energy extractor responsive to the sample values of said reference sampling points for detecting first vertical chrominance non-correlation energy consisting primarily of the chrominance signal in the vertical direction; and a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive said second horizontal chrominance non-correlation energy multiplied by said first predetermined coefficient and the horizontal luminance non-correlation energy multiplied by said second predetermined coefficient, and produces, as an output thereof, a larger one of said second horizontal chrominance non-correlation energy multiplied by said first predetermined coefficient and the horizontal luminance non-correlation energy multiplied by said second predetermined coefficient;

said second maximum value circuit is coupled to receive said first horizontal chrominance non-correlation energy multiplied by said third predetermined coefficient and the horizontal luminance non-correlation energy multiplied by said fourth predetermined coefficient, and produces, as an output thereof, a larger one of said first horizontal chrominance non-correlation energy multiplied by said third predetermined coefficient and the horizontal luminance non-correlation energy multiplied by said fourth predetermined coefficient;

said third maximum value circuit is coupled to receive said first horizontal chrominance non-correlation energy multiplied by said fifth predetermined coefficient and the horizontal luminance non-correlation energy multiplied by said sixth predetermined coefficient, and produces, as an output thereof, a larger one of said first horizontal chrominance non-correlation energy multiplied by said fifth predetermined coefficient and the horizontal luminance non-correlation energy multiplied by said sixth predetermined coefficient;

said fourth maximum value circuit is coupled to receive said second vertical chrominance non-correlation energy multiplied by said seventh predetermined coefficient and the vertical luminance non-correlation energy multiplied by said eighth predetermined coefficient, and produces, as an output thereof, a larger one of said second vertical chrominance non-correlation energy multiplied by said seventh predetermined coefficient and the vertical luminance non-correlation energy multiplied by said eighth predetermined coefficient; and said second comparator is coupled to receive said first vertical chrominance non-correlation energy and the output signal of the second maximum value circuit multiplied by said tenth predetermined coefficient, and produces an output signal which indicates whether the vertical non-correlation is weak or strong based on the comparison.

9. A luminance/chrominance separating filter according to claim 3, wherein said judging means comprises:

a first maximum value circuit for receiving the horizontal chrominance non-correlation energy multiplied by a first predetermined coefficient and the horizontal luminance non-correlation correlation energy multiplied by a second predetermined coefficient, and producing, as an output thereof, a larger one of the horizontal chrominance non-correlation energy multiplied by said first predetermined coefficient and the horizontal luminance non-correlation energy multiplied by said second predetermined coefficient;

a second maximum value circuit for receiving the vertical chrominance non-correlation energy multiplied by a third predetermined coefficient and the vertical luminance non-correlation energy multiplied by a fourth predetermined coefficient, and producing, as an output thereof, a larger one of the vertical chrominance non-correlation energy multiplied by said third predetermined coefficient and the vertical luminance non-correlation energy multiplied by said fourth predetermined coefficient;

a third maximum value circuit for receiving the vertical chrominance non-correlation energy multiplied by a fifth predetermined coefficient and the vertical luminance non-correlation energy multiplied by a sixth predetermined coefficient, and producing, as an output thereof, a larger one of the vertical chrominance non-correlation energy multiplied by said fifth predetermined coefficient and the vertical luminance non-correlation energy multiplied by said sixth predetermined coefficient;

a fourth maximum value circuit for receiving the vertical chrominance non-correlation energy multiplied by a seventh predetermined coefficient and the vertical luminance non-correlation energy multiplied by an eighth predetermined coefficient, and producing, as an output thereof, a larger one of the vertical chrominance non-correlation energy multiplied by said seventh predetermined coefficient and the vertical luminance non-correlation energy multiplied by said eighth predetermined coefficient;

a first comparator for comparing the output signal of said second maximum value circuit with the output signal of said first maximum value circuit multiplied by a ninth predetermined coefficient, and producing an output signal which indicates whether the vertical non-correlation is weak or strong based on the comparison;

a second comparator for comparing the horizontal chrominance signal non-correlation energy with the output signal of the third maximum value circuit multiplied by a tenth predetermined coefficient, and producing an output signal which indicates whether the horizontal non-correlation is weak or strong based on the comparison;

a third comparator for comparing the horizontal luminance non-correlation energy with the output signal of the fourth maximum value circuit multiplied by an eleventh predetermined coefficient, and producing an output signal which indicates whether the horizontal non-correlation is weak or strong based on the comparison; and a decision circuit receiving the output signals of the first, second and third comparators, determining strength of the horizontal non-correlation and the vertical non-correlation, generating said chrominance signal selection signal such that said first selector selects to output said first chrominance signal when the vertical non-correlation is strong, the second chrominance signal when the horizontal non-correlation is strong, and the third chrominance signal when neither said horizontal or vertical non-correlation is strong, and further generating said chrominance signal selection signal such that said second selector selects the output of said second horizontal chrominance extraction filter, when said first selector selects either said first or third chrominance signal.

10. A luminance/chrominance separating filter according to claim 9, wherein said horizontal chrominance non-correlation energy extractor comprises:
a first horizontal chrominance non-correlation energy extractor responsive to the sample value of said specific sampling point for detecting first horizontal chrominance non-correlation energy consisting primarily of the chrominance signal in the horizontal direction; and
a second horizontal chrominance non-correlation energy extractor responsive to the sample values of said specific and reference sampling points for detecting second horizontal chrominance non-correlation energy consisting primarily of the chrominance signal in the horizontal direction;

said vertical chrominance non-correlation energy extractor comprises:
a first vertical chrominance non-correlation energy extractor responsive to the sample values of said reference sampling points for detecting first vertical chrominance non-correlation energy consisting primarily of the chrominance signal in the vertical direction; and
a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive the first horizontal chrominance non-correlation energy multiplied by said first predetermined coefficient and the horizontal luminance non-correlation energy multiplied by said second predetermined coefficient, and produces, as an output thereof, a larger one of the first horizontal chrominance non-correlation energy multiplied by said first predetermined coefficient and the horizontal luminance non-correlation energy multiplied by said second predetermined coefficient;

said second maximum value circuit is coupled to receive the first vertical chrominance non-correlation energy multiplied by said third predetermined coefficient and the vertical luminance non-correlation energy multiplied by said fourth predetermined coefficient, and produces, as an output thereof, a larger one of the first vertical chrominance non-correlation energy multiplied by said third predetermined coefficient and the vertical luminance non-correlation energy multiplied by said fourth predetermined coefficient;

said third maximum value circuit is coupled to receive the second vertical chrominance non-correlation energy multiplied by said fifth predetermined coefficient and the vertical luminance non-correlation energy multiplied by said sixth predetermined coefficient, and produces, as an output thereof, a larger one of the second vertical chrominance non-correlation energy multiplied by said fifth predetermined coefficient and the vertical luminance non-correlation energy multiplied by said sixth predetermined coefficient;

said fourth maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient;

said second comparator is coupled to receive the second horizontal chrominance signal non-correlation energy and the output signal of the third maximum value circuit multiplied by said tenth predetermined coefficient, and produces an output signal which indicates whether the horizontal non-correlation is weak or strong based on said comparison.

11. A luminance/chrominance separating filter according to claim 9, further comprising:

a first delay circuit for delaying the output signal of the first comparator by a time length of half a period of the color subcarrier to produce a first delayed output signal;

a second delay circuit for delaying the output signal of the second comparator by said time length to produce a second delayed output signal;

a third delay circuit for delaying the output signal of the third comparator by said time length to produce a third delayed output signal;

a fourth delay circuit for delaying the third delayed output signal by said time length to produce a fourth delayed output signal;

an AND circuit for producing a logical product of the output signal of the third comparator, said third delayed output signal and said fourth delayed output signal;

wherein said decision circuit receives said first and second delayed output signals, and said logical product, and determines strength of the horizontal non-correlation and the vertical non-correlation on the basis of said first and second delayed output signals and said logical product.

12. A luminance/chrominance separating filter according to claim 11, wherein said horizontal chrominance non-correlation energy extractor comprises:

a first horizontal chrominance non-correlation energy extractor responsive to the sample value of said specific sampling point for detecting first horizontal chrominance non-correlation energy consisting primarily of the chrominance signal in the horizontal direction; and a second horizontal chrominance non-correlation energy extractor responsive to the sample values of said specific and reference sampling points for detecting second horizontal chrominance non-correlation energy consisting primarily of the chrominance signal in the horizontal direction;

said vertical chrominance non-correlation energy extractor comprises:

a first vertical chrominance non-correlation energy extractor responsive to the sample values of said reference sampling points for detecting first vertical chrominance non-correlation energy consisting primarily of the chrominance signal in the vertical direction; and a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive the first horizontal chrominance non-correlation energy multiplied by said first predetermined coefficient and the horizontal luminance non-correlation energy multiplied by said second predetermined coefficient, and produces, as an output thereof, a larger one of the first horizontal chrominance non-correlation energy multiplied by said first predetermined coefficient and the horizontal luminance non-correlation energy multiplied by said second predetermined coefficient;

said second maximum value circuit is coupled to receive the first vertical chrominance non-correlation energy multiplied by said third predetermined coefficient and the vertical luminance non-correlation energy multiplied by said fourth predetermined coefficient, and produces, as an output thereof, a larger one of the first vertical chrominance non-correlation energy multiplied by said third predetermined coefficient and the vertical luminance non-correlation energy multiplied by said fourth predetermined coefficient;

said third maximum value circuit is coupled to receive the second vertical chrominance non-correlation energy multiplied by said fifth predetermined coefficient and the vertical luminance non-correlation energy multiplied by said sixth predetermined coefficient, and produces, as an output thereof, a larger one of the second vertical chrominance non-correlation energy multiplied by said fifth predetermined coefficient and the vertical luminance non-correlation energy multiplied by said sixth predetermined coefficient;

said fourth maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient;

said second comparator is coupled to receive the second horizontal chrominance signal non-correlation energy and the output signal of the third maximum value circuit multiplied by said tenth predetermined coefficient, and produces an output signal which indicates whether the horizontal non-correlation is weak or strong based on said comparison.

13. A luminance/chrominance separating filter according to claim 3, wherein said judging means comprises:

a first maximum value circuit for receiving the horizontal chrominance non-correlation energy multiplied by a first predetermined coefficient and the horizontal luminance non-correlation energy multiplied by a second predetermined coefficient, and producing, as an output thereof, a larger one of the horizontal chrominance non-correlation energy multiplied by said first predetermined coefficient and the horizontal luminance non-correlation energy multiplied by said second predetermined coefficient;

a second maximum value circuit for receiving the horizontal chrominance non-correlation energy multiplied by a third predetermined coefficient and the horizontal luminance non-correlation energy multiplied by a fourth predetermined coefficient, and producing, as an output thereof, a larger one of the horizontal chrominance non-correlation energy multiplied by said third predetermined coefficient and the horizontal luminance non-correlation energy multiplied by said fourth predetermined coefficient;

a third maximum value circuit for receiving the horizontal chrominance non-correlation energy multiplied by a fifth predetermined coefficient and the horizontal luminance non-correlation energy multiplied by a sixth predetermined coefficient, and producing, as an output thereof, a larger one of the horizontal chrominance non-correlation energy multiplied by said fifth predetermined coefficient and the horizontal luminance non-correlation energy multiplied by said sixth predetermined coefficient;

an adder for adding the vertical chrominance non-correlation energy multiplied by a seventh predetermined coefficient to the vertical luminance non-correlation energy multiplied by an eighth predetermined coefficient, and producing, as an output thereof, a sum of the vertical chrominance non-correlation energy multiplied by said seventh predetermined coefficient and the vertical luminance non-correlation energy multiplied by said eighth predetermined coefficient;

a first comparator for comparing the output signal of said first maximum value circuit with the output signal of said adder multiplied by a ninth predetermined coefficient, and producing an output signal which indicates whether the horizontal non-correlation is weak or strong based on the comparison;

a second comparator for comparing the vertical chrominance non-correlation energy with the output signal of the second maximum value circuit multiplied by a tenth predetermined coefficient, and producing an output signal which indicates whether the vertical non-correlation is weak or strong based on the comparison;

a third comparator for comparing the vertical luminance non-correlation energy with the output signal of the third maximum value circuit multiplied by an eleventh predetermined coefficient, and producing an output signal which indicates whether the vertical non-correlation is weak or strong based on the comparison; and a decision circuit receiving the output signals of the first, second, and third comparators, determining strength of said horizontal non-correlation and said vertical non-correlation, generating said chrominance signal selection signal such that said first selector selects to output said first chrominance signal when the vertical non-correlation is strong, the second chrominance signal when the horizontal non-correlation is strong, and the third chrominance signal when neither said horizontal or vertical non-correlation is strong, and further generating said chrominance signal selection signal such that said second selector selects the output of said second horizontal chrominance extraction filter, when said first selector selects either said first or third chrominance signal.

14. A luminance/chrominance separating filter according to claim 13, wherein said horizontal chrominance non-correlation energy extractor comprises:
a first horizontal chrominance non-correlation energy extractor responsive to the sample value of said specific sampling point for detecting first horizontal chrominance non-correlation energy consisting primarily of the chrominance signal in the horizontal direction; and
a second horizontal chrominance non-correlation energy extractor responsive to the sample values of said specific and reference sampling points for detecting second horizontal chrominance non-correlation energy consisting primarily of the chrominance signal in the horizontal direction;

said vertical chrominance non-correlation energy extractor comprises:
a first vertical chrominance non-correlation energy extractor responsive to the sample values of said reference sampling points for detecting first vertical chrominance non-correlation energy consisting primarily of the chrominance signal in the vertical direction; and
a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive the second horizontal chrominance non-correlation energy multiplied by said first predetermined coefficient and the horizontal luminance non-correlation energy multiplied by said second predetermined coefficient, and produces, as an output thereof, a larger one of the second horizontal chrominance non-correlation energy multiplied by said first predetermined coefficient and the horizontal luminance non-correlation energy multiplied by said second predetermined coefficient;

said second maximum value circuit is coupled to receive the first horizontal chrominance non-correlation energy multiplied by said third predetermined coefficient and the horizontal luminance non-correlation energy multiplied by said fourth predetermined coefficient, and produces, as an output thereof, a larger one of the first horizontal chrominance non-correlation energy multiplied by said third predetermined coefficient and the horizontal luminance non-correlation energy multiplied by said fourth predetermined coefficient;

said third maximum value circuit is coupled to receive the first horizontal chrominance non-correlation energy multiplied by said fifth predetermined coefficient and the horizontal luminance non-correlation energy multiplied by said sixth predetermined coefficient, and produces, as an output thereof, a larger one of the first horizontal chrominance non-correlation energy multiplied by said fifth predetermined coefficient and the horizontal luminance non-correlation energy multiplied by said sixth predetermined coefficient;

said adder is coupled to add the second vertical chrominance non-correlation energy multiplied by said seventh predetermined coefficient to the vertical luminance non-correlation energy multiplied by said eighth predetermined coefficient; and said second comparator for comparing the first vertical chrominance non-correlation energy with the output signal of the second maximum value circuit multiplied by said tenth predetermined coefficient, and producing an output signal which indicates whether the vertical non-correlation is weak or strong based on the comparison.

15. A luminance/chrominance separating filter according to claim 13, further comprising:

a first delay circuit for delaying the output signal of the first comparator by a time length of half a period of the color subcarrier to produce a first delayed output signal;

a second delay circuit for delaying the output signal of the second comparator by said time length to produce a second delayed output signal;

a third delay circuit for delaying the output signal of the third comparator by said time length to produce a third delayed output signal;

a fourth delay circuit for delaying the third delayed output signal by said time length to produce a fourth delayed output signal;

an AND circuit for producing a logical product of the output signal of the third comparator, said third delayed output signal and said fourth delayed output signal;

wherein said decision circuit receives said first and second delayed output signals, and said logical product, and determines strength of the horizontal non-correlation and the vertical non-correlation on the basis of said first and second delayed output signals and said logical product.

16. A luminance/chrominance separating filter according to claim 15, wherein said horizontal chrominance non-correlation energy extractor comprises:

a first horizontal chrominance non-correlation energy extractor responsive to the sample value of said specific sampling point for detecting first horizontal chrominance non-correlation energy consisting primarily of the chrominance signal in the horizontal direction; and a second horizontal chrominance non-correlation energy extractor responsive to the sample values of said specific and reference sampling points for detecting second horizontal chrominance non-correlation energy consisting primarily of the chrominance signal in the horizontal direction;

said vertical chrominance non-correlation energy extractor comprises:

a first vertical chrominance non-correlation energy extractor responsive to the sample values of said reference sampling points for detecting first vertical chrominance non-correlation energy consisting primarily of the chrominance signal in the vertical direction; and a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive the second horizontal chrominance non-correlation energy multiplied by said first predetermined coefficient and the horizontal luminance non-correlation energy multiplied by said second predetermined coefficient, and produces, as an output thereof, a larger one of the second horizontal chrominance non-correlation energy multiplied by said first predetermined coefficient and the horizontal luminance non-correlation energy multiplied by said second predetermined coefficient;

said second maximum value circuit is coupled to receive the first horizontal chrominance non-correlation energy multiplied by said third predetermined coefficient and the horizontal luminance non-correlation energy multiplied by said fourth predetermined coefficient, and produces, as an output thereof, a larger one of the first horizontal chrominance non-correlation energy multiplied by said third predetermined coefficient and the horizontal luminance non-correlation energy multiplied by said fourth predetermined coefficient;

said third maximum value circuit is coupled to receive the first horizontal chrominance non-correlation energy multiplied by said fifth predetermined coefficient and the horizontal luminance non-correlation energy multiplied by said sixth predetermined coefficient, and produces, as an output thereof, a larger one of the first horizontal chrominance non-correlation energy multiplied by said fifth predetermined coefficient and the horizontal luminance non-correlation energy multiplied by said sixth predetermined coefficient;

said adder is coupled to add the second vertical chrominance non-correlation energy multiplied by said seventh predetermined coefficient to the vertical luminance non-correlation energy multiplied by said eighth predetermined coefficient; and said second comparator for comparing the first vertical chrominance non-correlation energy with the output signal of the second maximum value circuit multiplied by said tenth predetermined coefficient, and producing an output signal which indicates whether the vertical non-correlation is weak or strong based on the comparison.

17. A luminance/chrominance separating filter according to claim 3, wherein said judging means comprises:

an adder for adding the horizontal chrominance non-correlation energy multiplied by a first predetermined coefficient to the horizontal luminance non-correlation energy multiplied by a second predetermined coefficient, and producing, as an output thereof, a sum of the horizontal chrominance non-correlation energy multiplied by said first predetermined coefficient and the horizontal luminance non-correlation energy multiplied by said second predetermined coefficient;

a first maximum value circuit for receiving the vertical chrominance non-correlation energy multiplied by a third predetermined coefficient and the vertical luminance non-correlation energy multiplied by a fourth predetermined coefficient, and producing, as an output thereof, a larger one of the vertical chrominance non-correlation energy multiplied by said third predetermined coefficient and the vertical luminance non-correlation energy multiplied by said fourth predetermined coefficient;

a second maximum value circuit for receiving the vertical chrominance non-correlation energy multiplied by a fifth predetermined coefficient and the vertical luminance non-correlation energy multiplied by a sixth predetermined coefficient, and producing, as an output thereof, a larger one of the vertical chrominance non-correlation energy multiplied by said fifth predetermined coefficient and the vertical luminance non-correlation energy multiplied by said sixth predetermined coefficient;

a third maximum value circuit for receiving the vertical chrominance non-correlation energy multiplied by a seventh predetermined coefficient and the vertical luminance non-correlation energy multiplied by an eighth predetermined coefficient, and producing, as an output thereof, a larger one of the vertical chrominance non-correlation energy multiplied by said seventh predetermined coefficient and the vertical luminance non-correlation energy multiplied by said eighth predetermined coefficient;

a first comparator for comparing the output signal of said first maximum value circuit with the output signal of said adder multiplied by a ninth predetermined coefficient, and producing an output signal which indicates whether the vertical non-correlation is weak or strong based on the comparison;

a second comparator for comparing the horizontal chrominance signal non-correlation energy with the output signal of the second maximum value circuit multiplied by a tenth predetermined coefficient, and producing an output signal which indicates whether the horizontal non-correlation is weak or strong based on the comparison;

a third comparator for comparing the horizontal luminance non-correlation energy with the output signal of the third maximum value circuit multiplied by an eleventh predetermined coefficient, and producing an output signal which indicates whether the horizontal non-correlation is weak or strong based on the comparison; and a decision circuit receiving the output signals of the first, second, and third comparators, determining strength of said horizontal non-correlation and said vertical non-correlation, generating said chrominance signal selection signal such that said first selector selects to output said first chrominance signal when the vertical non-correlation is strong, the second chrominance signal when the horizontal non-correlation is strong, and the third chrominance signal when neither said horizontal or vertical non-correlation is strong, and further generating said chrominance signal selection signal such that said second selector selects the output of said second horizontal chrominance extraction filter, when said first selector selects either said first or third chrominance signal.

18. A luminance/chrominance separating filter according to claim 17, wherein said horizontal chrominance non-correlation energy extractor comprises:
  a first horizontal chrominance non-correlation energy extractor responsive to the sample value of said specific sampling point for detecting first horizontal chrominance non-correlation energy consisting primarily of the chrominance signal in the horizontal direction; and
  a second horizontal chrominance non-correlation energy extractor responsive to the sample values of said specific and reference sampling points for detecting second horizontal chrominance non-correlation energy consisting primarily of the chrominance signal in the horizontal direction;

said vertical chrominance non-correlation energy extractor comprises:
  a first vertical chrominance non-correlation energy extractor responsive to the sample values of said reference sampling points for detecting first vertical chrominance non-correlation energy consisting primarily of the chrominance signal in the vertical direction; and
  a second vertical chrominance non-correlation energy extractor responsive to the sample values of said reference sampling points for detecting second vertical chrominance non-correlation energy consisting primarily of the chrominance signal in the vertical direction;

said adder is coupled to add the first horizontal chrominance non-correlation energy multiplied by said first predetermined coefficient to the horizontal luminance non-correlation energy multiplied by said second predetermined coefficient;

said first maximum value circuit is coupled to receive the first vertical chrominance non-correlation energy multiplied by said third predetermined coefficient and the vertical luminance non-correlation energy multiplied by said fourth predetermined coefficient, and produces, as an output thereof, a larger one of the first vertical chrominance non-correlation energy multiplied by said third predetermined coefficient and the vertical luminance non-correlation energy multiplied by said fourth predetermined coefficient;

said second maximum value circuit is coupled to receive the second vertical chrominance non-correlation energy multiplied by said fifth predetermined coefficient and the vertical luminance non-correlation energy multiplied by said sixth predetermined coefficient, and produces, as an output thereof, a larger one of the second vertical chrominance non-correlation energy multiplied by said fifth predetermined coefficient and the vertical luminance non-correlation energy multiplied by said sixth predetermined coefficient;

said third maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient; and said second comparator is coupled to receive the second horizontal chrominance signal non-correlation energy and the output signal of the second maximum value circuit multiplied by said tenth predetermined coefficient, and produces an output signal which indicates whether the horizontal non-correlation is weak or strong based on the comparison.

19. A luminance/chrominance separating filter according to claim 17, further comprising:

a first delay circuit for delaying the output signal of the first comparator by a time length of half a period of the color subcarrier to produce a first delayed output signal;

a second delay circuit for delaying the output signal of the second comparator by said time length to produce a second delayed output signal;

a third delay circuit for delaying the output signal of the third comparator by said time length to produce a third delayed output signal;

a fourth delay circuit for delaying the third delayed output signal by said time length to produce a fourth delayed output signal;

an AND circuit for producing a logical product of the output signal of the third comparator, said third delayed output signal and said fourth delayed output signal;

wherein said decision circuit receives said first and second delayed output signals, and said logical product, and determines strength of the horizontal non-correlation and the vertical non-correlation on the basis of said first and second delayed output signals and said logical product.

20. A luminance/chrominance separating filter according to claim 19, wherein said horizontal chrominance non-correlation energy extractor comprises:

a first horizontal chrominance non-correlation energy extractor responsive to the sample value of said specific sampling point for detecting first horizontal chrominance non-correlation energy consisting primarily of the chrominance signal in the horizontal direction; and a second horizontal chrominance non-correlation energy extractor responsive to the sample values of said specific and reference sampling points for detecting second horizontal chrominance non-correlation energy consisting primarily of the chrominance signal in the horizontal direction;

said vertical chrominance non-correlation energy extractor comprises:

a first vertical chrominance non-correlation energy extractor responsive to the sample values of said reference sampling points for detecting first vertical chrominance non-correlation energy consisting primarily of the chrominance signal in the vertical direction; and a second vertical chrominance non-correlation energy extractor responsive to the sample values of said reference sampling points for detecting second vertical chrominance non-correlation energy consisting primarily of the chrominance signal in the vertical direction;

said adder is coupled to add the first horizontal chrominance non-correlation energy multiplied by said first predetermined coefficient to the horizontal luminance non-correlation energy multiplied by said second predetermined coefficient;

said first maximum value circuit is coupled to receive the first vertical chrominance non-correlation energy multiplied by said third predetermined coefficient and the vertical luminance non-correlation energy multiplied by said fourth predetermined coefficient, and produces, as an output thereof, a larger one of the first vertical chrominance non-correlation energy multiplied said third predetermined coefficient and the vertical luminance non-correlation energy multiplied by said fourth predetermined coefficient;

said second maximum value circuit is coupled to receive the second vertical chrominance non-correlation energy multiplied by said fifth predetermined coefficient and the vertical luminance non-correlation energy multiplied by said sixth predetermined coefficient, and produces, as an output thereof, a larger one of the second vertical chrominance non-correlation energy multiplied by said fifth predetermined coefficient and the vertical luminance non-correlation energy multiplied by said sixth predetermined coefficient;

said third maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient; and said second comparator is coupled to receive the second horizontal chrominance signal non-correlation energy and the output signal of the second maximum value circuit multiplied by a said tenth predetermined coefficient, and produces an output signal which indicates whether the horizontal non-correlation is weak or strong based on the comparison.

21. A luminance/chrominance separating filter according to claim 3, wherein said judging means comprises:

a first maximum value circuit for receiving the horizontal chrominance non-correlation energy multiplied by a first predetermined coefficient and the horizontal luminance non-correlation energy multiplied by a second predetermined coefficient, and producing, as an output thereof, a larger one of the horizontal chrominance non-correlation energy multiplied by said first predetermined coefficient and the horizontal luminance non-correlation energy multiplied by said second predetermined coefficient;

a first adder for adding the horizontal chrominance non-correlation energy multiplied by a third predetermined coefficient to the horizontal luminance non-correlation energy multiplied by a fourth predetermined coefficient, and producing, as an output thereof, a sum of the horizontal chrominance non-correlation energy multiplied by said third predetermined coefficient and the horizontal luminance non-correlation energy multiplied by said fourth predetermined coefficient;

a second adder for adding the horizontal chrominance non-correlation energy multiplied by a fifth predetermined coefficient to the horizontal luminance non-correlation energy multiplied by a sixth predetermined coefficient, and producing, as an output thereof, a sum of the horizontal chrominance non-correlation energy multiplied by a fifth predetermined coefficient and the horizontal luminance non-correlation energy multiplied by a sixth predetermined coefficient;

a second maximum value circuit for receiving the vertical chrominance non-correlation energy multiplied by a seventh predetermined coefficient and the vertical luminance non-correlation energy multiplied by an eighth predetermined coefficient, and producing, as an output thereof, a larger one of the vertical chrominance non-correlation energy multiplied by said seventh predetermined coefficient and the vertical luminance non-correlation energy multiplied by said eighth predetermined coefficient;

a first comparator for comparing the output signal of said first maximum value circuit with the output signal of said second maximum value circuit multiplied by a ninth predetermined coefficient, and producing an output signal which indicates whether the horizontal non-correlation is weak or strong based on the comparison;

a second comparator for comparing the vertical chrominance non-correlation energy with the output signal of the first adder multiplied by a tenth predetermined coefficient, and producing an output signal which indicates whether the vertical non-correlation is weak or strong based on the comparison;

a third comparator for comparing the vertical luminance non-correlation energy with the output signal of the second adder multiplied by an eleventh predetermined coefficient, and producing an output signal which indicates whether the vertical non-correlation is weak or strong based on the comparison; and a decision circuit receiving the output signals of the first, second, and third comparators, determining strength of said horizontal non-correlation and said vertical non-correlation, generating said chrominance signal selection signal such that said first selector selects to output said first chrominance signal when the vertical non-correlation is strong, the second chrominance signal when the horizontal non-correlation is strong, and the third chrominance signal when neither said horizontal or vertical non-correlation is strong, and further generating said chrominance signal selection signal such that said second selector selects the output of said second horizontal chrominance extraction filter, when said first selector selects either said first or third chrominance signal.

22. A luminance/chrominance separating filter according to claim 21, wherein said horizontal chrominance non-correlation energy extractor comprises:

a first horizontal chrominance non-correlation energy extractor responsive to the sample value of said specific sampling point for detecting first horizontal chrominance non-correlation energy consisting primarily of the chrominance signal in the horizontal direction; and a second horizontal chrominance non-correlation energy extractor responsive to the sample values of said specific and reference sampling points for detecting second horizontal chrominance non-correlation energy consisting primarily of the chrominance signal in the horizontal direction;

said vertical chrominance non-correlation energy extractor comprises:

a first vertical chrominance non-correlation energy extractor responsive to the sample values of said reference sampling points for detecting first vertical chrominance non-correlation energy consisting primarily of the chrominance signal in the vertical direction; and a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive the second horizontal chrominance non-correlation energy multiplied by said first predetermined coefficient and the horizontal luminance non-correlation energy multiplied by said second predetermined coefficient, and produces, as an output thereof, a larger one of the second horizontal chrominance non-correlation energy multiplied by said first predetermined coefficient and the horizontal luminance non-correlation energy multiplied by said second predetermined coefficient;

said first adder is coupled to add the first horizontal chrominance non-correlation energy multiplied by said third predetermined coefficient to the horizontal luminance non-correlation energy multiplied by said fourth predetermined coefficient;

said second adder is coupled to add the first horizontal chrominance non-correlation energy multiplied by said fifth predetermined coefficient to the horizontal luminance non-correlation energy multiplied by said sixth predetermined coefficient;

said second maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient; and said second comparator is coupled to receive the first vertical chrominance non-correlation energy and the output signal of the first adder multiplied by said tenth predetermined coefficient, and produces an output signal which indicates whether the vertical non-correlation is weak or strong based on the comparison.

23. A luminance/chrominance separating filter according to claim 21, further comprising:

a first delay circuit for delaying the output signal of the first comparator by a time length of half a period of the color subcarrier to produce a first delayed output signal;

a second delay circuit for delaying the output signal of the second comparator by said time length to produce a second delayed output signal;

a third delay circuit for delaying the output signal of the third comparator by said time length to produce a third delayed output signal;

a fourth delay circuit for delaying the third delayed output signal by said time length to produce a fourth delayed output signal;

an AND circuit for producing a logical product of the output signal of the third comparator, said third delayed output signal and said fourth delayed output signal;

wherein said decision circuit receives said first and second delayed output signals, and said logical product, and determines strength of the horizontal non-correlation and the vertical non-correlation on the basis of said first and second delayed output signals and said logical product.

24. A luminance/chrominance separating filter according to claim 23, wherein said horizontal chrominance non-correlation energy extractor comprises:

a first horizontal chrominance non-correlation energy extractor responsive to the sample value of said specific sampling point for detecting first horizontal chrominance non-correlation energy consisting primarily of the chrominance signal in the horizontal direction; and a second horizontal chrominance non-correlation energy extractor responsive to the sample values of said specific and reference sampling point for detecting second horizontal chrominance non-correlation energy consisting primarily of the chrominance signal in the horizontal direction;

said vertical chrominance non-correlation energy extractor comprises:

a first vertical chrominance non-correlation energy extractor responsive to the sample values of said reference sampling points for detecting first vertical chrominance non-correlation energy consisting primarily of the chrominance signal in the vertical direction; and a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive the second horizontal chrominance non-correlation energy multiplied by said first predetermined coefficient and the horizontal luminance non-correlation energy multiplied by said second predetermined coefficient, and produces, as an output thereof, a larger one of the second horizontal chrominance non-correlation energy multiplied by said first predetermined coefficient and the horizontal luminance non-correlation energy multiplied by said second predetermined coefficient;

said first adder is coupled to add the first horizontal chrominance non-correlation energy multiplied by said third predetermined coefficient to the horizontal luminance non-correlation energy multiplied by said fourth predetermined coefficient;

said second adder is coupled to add the first horizontal chrominance non-correlation energy multiplied by said fifth predetermined coefficient to the horizontal luminance non-correlation energy multiplied by said sixth predetermined coefficient;

said second maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient; and said second comparator is coupled to receive the first vertical chrominance non-correlation energy and the output signal of the first adder multiplied by said tenth predetermined coefficient, and produces all output signal which indicates whether the vertical non-correlation is weak or strong based on the comparison.

25. A luminance/chrominance separating filter according to claim 3, wherein said judging means comprises:

a first maximum value circuit for receiving the horizontal chrominance non-correlation energy multiplied by a first predetermined coefficient and the horizontal luminance non-correlation energy multiplied by a second predetermined coefficient, and producing, as an output thereof, a larger one of the horizontal chrominance non-correlation energy multiplied by said first predetermined coefficient and the horizontal luminance non-correlation energy multiplied by said second predetermined coefficient;

a first adder for adding the vertical chrominance non-correlation energy multiplied by a third predetermined coefficient to the vertical luminance non-correlation energy multiplied by a fourth predetermined coefficient, and producing, as an output thereof, a sum of the vertical chrominance non-correlation energy multiplied by said third predetermined coefficient and the vertical luminance non-correlation energy multiplied by said fourth predetermined coefficient;

a second adder for adding the vertical chrominance non-correlation energy multiplied by a fifth predetermined coefficient to the vertical luminance non-correlation energy multiplied by a sixth predetermined coefficient, and producing, as an output thereof, a sum of the vertical chrominance non-correlation energy multiplied by said fifth predetermined coefficient and the vertical luminance non-correlation energy multiplied by said sixth predetermined coefficient;

a second maximum value circuit for receiving the vertical chrominance non-correlation energy multiplied by a seventh predetermined coefficient and the vertical luminance non-correlation energy multiplied by an eighth predetermined coefficient, and producing, as an output thereof, a larger one of the vertical chrominance non-correlation energy multiplied by said seventh predetermined coefficient and the vertical luminance non-correlation energy multiplied by said eighth predetermined coefficient;

a first comparator for comparing the output signal of said first adder with the output signal of said first maximum value circuit multiplied by a ninth predetermined coefficient, and producing an output signal which indicates whether the vertical non-correlation is weak or strong based on the comparison;

a second comparator for comparing the horizontal chrominance signal non-correlation energy with the output signal of the second adder multiplied by a tenth predetermined coefficient, and producing an output signal which indicates whether the horizontal non-correlation is weak or strong based on the comparison;

a third comparator for comparing the horizontal luminance non-correlation energy with the output signal of the second maximum value circuit multiplied by an eleventh predetermined coefficient, and producing an output signal which indicates whether the horizontal non-correlation is weak or strong based on the comparison; and a decision circuit receiving the output signals of the first, second, and third comparators, determining strength of said horizontal non-correlation and said vertical non-correlation, generating said chrominance signal selection signal such that said first selector selects to output said first chrominance signal when the vertical non-correlation is strong, the second chrominance signal when the horizontal non-correlation is strong, and the third chrominance signal when neither said horizontal or vertical non-correlation is strong, and further generating said chrominance signal selection signal such that said second selector selects the output of said second horizontal chrominance extraction filter, when said first selector selects either said first or third chrominance signal.

26. A luminance/chrominance separating filter according to claim 25, wherein said horizontal chrominance non-correlation energy extractor comprises:

a first horizontal chrominance non-correlation energy extractor responsive to the sample value of said specific sampling point for detecting first horizontal chrominance non-correlation energy consisting primarily of the chrominance signal in the horizontal direction; and a second horizontal chrominance non-correlation energy extractor responsive to the sample value of said specific sampling point for detecting second horizontal chrominance non-correlation energy consisting primarily of the chrominance signal in the horizontal direction;

said vertical chrominance non-correlation energy extractor comprises:
- a first vertical chrominance non-correlation energy extractor responsive to the sample values of said reference sampling points for detecting first vertical chrominance non-correlation energy consisting primarily or the chrominance signal in the vertical direction; and
- a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive the first horizontal chrominance non-correlation energy multiplied by said first predetermined coefficient and the horizontal luminance non-correlation energy multiplied by said second predetermined coefficient, and produces, as an output thereof, a larger one of the first horizontal chrominance non-correlation energy multiplied by said first predetermined coefficient and the horizontal luminance non-correlation energy multiplied by said second predetermined coefficient;

said first adder is coupled to add the first vertical chrominance non-correlation energy multiplied by said third predetermined coefficient to the vertical luminance non-correlation energy multiplied by said fourth predetermined coefficient;

said second adder is coupled to add the second vertical chrominance non-correlation energy multiplied by said fifth predetermined coefficient to the vertical luminance non-correlation energy multiplied by said sixth predetermined coefficient;

said second maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient; and said second comparator is coupled to receive the second horizontal chrominance signal non-correlation energy and the output signal of the second adder multiplied by said ninth predetermined coefficient, and produces an output signal which indicates whether the horizontal non-correlation is weak or strong based on the comparison.

27. A luminance/chrominance separating filter according to claim 25, further comprising:
- a first delay circuit for delaying the output signal of the first comparator by a time length of half a period of the color subcarrier to produce a first delayed output signal;
- a second delay circuit for delaying the output signal of the second comparator by said time length to produce a second delayed output signal;
- a third delay circuit for delaying the output signal of the third comparator by said time length to produce a third delayed output signal;
- a fourth delay circuit for delaying the third delayed output signal by said time length to produce a fourth delayed output signal;
- an AND circuit for producing a logical product of the output signal of the third comparator, said third delayed output signal and said fourth delayed output signal;
- wherein said decision circuit receives said first and second delayed output signals, and said logical product, and determines strength of the horizontal non-correlation and the vertical non-correlation on the basis of said first and second delayed output signals and said logical product.

28. A luminance/chrominance separating filter according to claim 27, wherein said horizontal chrominance non-correlation energy extractor comprises:
- a first horizontal chrominance non-correlation energy extractor responsive to the sample value of said specific sampling point for detecting first horizontal chrominance non-correlation energy consisting primarily of the chrominance signal in the horizontal direction; and
- a second horizontal chrominance non-correlation energy extractor responsive to the sample value of said specific and reference sampling point for detecting second horizontal chrominance non-correlation energy consisting primarily of the chrominance signal in the horizontal direction;

said vertical chrominance non-correlation energy extractor comprises:
- a first vertical chrominance non-correlation energy extractor responsive to the sample values of said reference sampling points for detecting first vertical chrominance non-correlation energy consisting primarily of the chrominance signal in the vertical direction; and
- a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive the first horizontal chrominance non-correlation energy multiplied by said first predetermined coefficient and the horizontal luminance non-correlation energy multiplied by said second predetermined coefficient, and produces, as an output thereof, a larger one of the first horizontal chrominance non-correlation energy multiplied by said first predetermined coefficient and the horizontal luminance non-correlation energy multiplied by said second predetermined coefficient;

said first adder is coupled to add the first vertical chrominance non-correlation energy multiplied by said third predetermined coefficient to the vertical luminance non-correlation energy multiplied by said fourth predetermined coefficient;

said second adder is coupled to add the second vertical chrominance non-correlation energy multiplied by said fifth predetermined coefficient to the vertical luminance non-correlation energy multiplied by said sixth predetermined coefficient;

said second maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient; and said second comparator is coupled to receive the second horizontal chrominance signal non-correlation energy and the output signal of the second adder multiplied by said ninth predetermined coefficient, and produces an output signal which indicates whether the horizontal non-correlation is weak or strong based on the comparison.

29. A luminance/chrominance separating filter according to claim 3, wherein said judging means comprises:

a maximum value circuit for receiving the horizontal chrominance non-correlation energy multiplied by a first predetermined coefficient and the horizontal luminance non-correlation energy multiplied by a second predetermined coefficient, and producing, as an output thereof, a larger one of the horizontal chrominance non-correlation energy multiplied by said first predetermined coefficient and the horizontal luminance non-correlation energy multiplied by said second predetermined coefficient;

a first adder for adding the horizontal chrominance non-correlation energy multiplied by a third predetermined coefficient to the horizontal luminance non-correlation energy multiplied by a fourth predetermined coefficient, and producing, as an output thereof, a sum of the horizontal chrominance non-correlation energy multiplied by said third predetermined coefficient and the horizontal luminance non-correlation energy multiplied by said fourth predetermined coefficient;

a second adder for adding the horizontal chrominance non-correlation energy multiplied by a fifth predetermined coefficient to the horizontal luminance non-correlation energy multiplied by a sixth predetermined coefficient, and producing, as an output thereof, a sum of the horizontal chrominance non-correlation energy multiplied by said fifth predetermined coefficient and the horizontal luminance non-correlation energy multiplied by said sixth predetermined coefficient;

a third adder for adding the vertical chrominance non-correlation energy multiplied by a seventh predetermined coefficient to the vertical luminance non-correlation energy multiplied by an eighth predetermined coefficient, and producing, as an output thereof, a sum of the vertical chrominance non-correlation energy multiplied by said seventh predetermined coefficient and the vertical luminance non-correlation energy multiplied by said eighth predetermined coefficient;

a first comparator for comparing the output signal of said maximum value circuit with the output signal of said third adder multiplied by a ninth predetermined coefficient, and producing an output signal which indicates whether the horizontal non-correlation is weak or strong based on the comparison;

a second comparator for comparing the vertical chrominance non-correlation energy with the output signal of the first adder multiplied by a tenth predetermined coefficient, and producing an output signal which indicates whether the vertical non-correlation is weak or strong based on the comparison;

a third comparator for comparing the vertical luminance non-correlation energy with the output signal of the second adder multiplied by an eleventh predetermined coefficient, and producing an output signal which indicates whether the vertical non-correlation is weak or strong based on the comparison; and a decision circuit receiving the output signals of the first, second, and third comparators, determining strength of said horizontal non-correlation and said vertical non-correlation, generating said chrominance signal selection signal such that said first selector selects to output said first chrominance signal when the vertical non-correlation is strong, the second chrominance signal when the horizontal non-correlation is strong, and the third chrominance signal when neither said horizontal or vertical non-correlation is strong, and further generating said chrominance signal selection signal such that said second selector selects the output of said second horizontal chrominance extraction filter, when said first selector selects either said first or third chrominance signal.

30. A luminance/chrominance separating filter according to claim 29, wherein said horizontal chrominance non-correlation energy extractor comprises:

a first horizontal chrominance non-correlation energy extractor responsive to the sample value of said specific sampling point for detecting first horizontal chrominance non-correlation energy consisting primarily of the chrominance signal in the horizontal direction; and a second horizontal chrominance non-correlation energy extractor responsive to the sample value of said specific sampling point for detecting second horizontal chrominance non-correlation energy consisting primarily of the chrominance signal in the horizontal direction;

said vertical chrominance non-correlation energy extractor comprises:

a first vertical chrominance non-correlation energy extractor responsive to the sample values of said reference sampling points for detecting first vertical chrominance non-correlation energy consisting primarily of the chrominance signal in the vertical direction; and a second vertical chrominance non-correlation energy extractor responsive to the sample values of said reference sampling points for detecting second vertical chrominance non-correlation energy consisting primarily of the chrominance signal in the vertical direction;

said maximum value circuit is coupled to receive the second horizontal chrominance non-correlation energy multiplied by said first predetermined coefficient and the horizontal luminance non-correlation energy multiplied by said second predetermined coefficient, and produces, as an output thereof, a larger one of the second horizontal chrominance non-correlation energy multiplied by said first predetermined coefficient and the horizontal luminance non-correlation energy multiplied by said second predetermined coefficient;

said first adder is coupled to add the first horizontal chrominance non-correlation energy multiplied by said third predetermined coefficient to the horizontal luminance non-correlation energy multiplied by said fourth predetermined coefficient;

said second adder is coupled to add the first horizontal chrominance non-correlation energy multiplied by said fifth predetermined coefficient to the horizontal luminance non-correlation energy multiplied by said sixth predetermined coefficient;

said third adder is coupled to add the second vertical chrominance non-correlation energy multiplied by said seventh predetermined coefficient to the vertical luminance non-correlation energy multiplied by said eighth predetermined coefficient; and said second comparator is coupled to receive the first vertical chrominance non-correlation energy and the output signal of the first adder multiplied by said tenth predetermined coefficient, and produces an output signal which indicates whether the vertical non-correlation is weak or strong based on the comparison.

31. A luminance/chrominance separating filter according to claim 29, further comprising:

a first delay circuit for delaying the output signal of the first comparator by a time length of half a period of the color subcarrier to produce a first delayed output signal;

a second delay circuit for delaying the output signal of the second comparator by said time length to produce a second delayed output signal;

a third delay circuit for delaying the output signal of the third comparator by said time length to produce a third delayed output signal;

a fourth delay circuit for delaying the third delayed output signal by said time length to produce a fourth delayed output signal;

an AND circuit for producing a logical product of the output signal of the third comparator, said third delayed output signal and said fourth delayed output signal;

wherein said decision circuit receives said first and second delayed output signals, and said logical product, and determines strength of the horizontal non-correlation and the vertical non-correlation on the basis of said first and second delayed output signals and said logical product.

32. A luminance/chrominance separating filter according to claim 31, wherein said horizontal chrominance non-correlation energy extractor comprises:

a first horizontal chrominance non-correlation energy extractor responsive to the sample value of said specific sampling point for detecting first horizontal chrominance non-correlation energy consisting primarily of the chrominance signal in the horizontal direction; and a second horizontal chrominance non-correlation energy extractor responsive to the sample value of said specific sampling point for detecting second horizontal chrominance non-correlation energy consisting primarily of the chrominance signal in the horizontal direction;

said vertical chrominance non-correlation energy extractor comprises:

a first vertical chrominance non-correlation energy extractor responsive to the sample values of said reference sampling points for detecting first vertical chrominance non-correlation energy consisting primarily of the chrominance signal in the vertical direction; and a second vertical chrominance non-correlation energy extractor responsive to the sample values of said reference sampling points for detecting second vertical chrominance non-correlation energy consisting primarily of the chrominance signal in the vertical direction;

said maximum value circuit is coupled to receive the second horizontal chrominance non-correlation energy multiplied by said first predetermined coefficient and the horizontal luminance non-correlation energy multiplied by said second predetermined coefficient, and produces, as an output thereof, a larger one of the second horizontal chrominance non-correlation energy multiplied by said first predetermined coefficient and the horizontal luminance non-correlation energy multiplied by said second predetermined coefficient;

said first adder is coupled to add the first horizontal chrominance non-correlation energy multiplied by said third predetermined coefficient to the horizontal luminance non-correlation energy multiplied by said fourth predetermined coefficient;

said second adder is coupled to and the first horizontal chrominance non-correlation energy multiplied by said fifth predetermined coefficient to the horizontal luminance non-correlation energy multiplied by said sixth predetermined coefficient;

said third adder is coupled to add the second vertical chrominance non-correlation energy multiplied by said seventh predetermined coefficient to the vertical luminance non-correlation energy multiplied by said eighth predetermined coefficient; and said second comparator is coupled to receive the first vertical chrominance non-correlation energy and the output signal of the first adder multiplied by said tenth predetermined coefficient, and produces an output signal which indicates whether the vertical non-correlation is weak or strong based on the comparison.

33. A luminance/chrominance separating filter according to claim 3, wherein said judging means comprises:

a first adder for adding the horizontal chrominance non-correlation energy multiplied by a first predetermined coefficient to the horizontal luminance non-correlation energy multiplied by a second predetermined coefficient, and producing, as an output thereof, a sum of the horizontal chrominance non-correlation energy multiplied by said first predetermined coefficient and the horizontal luminance non-correlation energy multiplied by said second predetermined coefficient;

a second adder for adding the vertical chrominance non-correlation energy multiplied by a third predetermined coefficient to the vertical luminance non-correlation energy multiplied by a fourth predetermined coefficient, and producing, as an output thereof, a sum of the vertical chrominance non-correlation energy multiplied by said third predetermined coefficient and the vertical luminance non-correlation energy multiplied by said fourth predetermined coefficient;

a third adder for adding the vertical chrominance non-correlation energy multiplied by a fifth predetermined coefficient to the vertical luminance non-correlation energy multiplied by a sixth predetermined coefficient, and producing, as an output thereof, a sum of the vertical chrominance non-correlation energy multiplied by said fifth predetermined coefficient and the vertical luminance non-correlation energy multiplied by said sixth predetermined coefficient;

a maximum value circuit coupled to receive the vertical chrominance non-correlation energy multiplied by a seventh predetermined coefficient and the vertical luminance non-correlation energy multiplied by an eighth predetermined coefficient, and producing, as an output thereof, a larger one of the vertical chrominance non-correlation energy multiplied by said seventh predetermined coefficient and the vertical luminance non-correlation energy multiplied by said eighth predetermined coefficient;

a first comparator for comparing the output signal of said second adder with the output signal of said first adder multiplied by a ninth predetermined coefficient, and producing an output signal which indicates whether the vertical non-correlation is weak or strong based on the comparison;

a second comparator for comparing the horizontal chrominance signal non-correlation energy with the output signal of the third adder multiplied by a tenth predetermined coefficient, and producing an output signal which indicates whether the horizontal non-correlation is weak or strong based on the comparison;

a third comparator for comparing the horizontal luminance non-correlation energy with the output signal of the maximum value circuit multiplied by an eleventh predetermined coefficient, and producing an output signal which indicates whether the horizontal non-correlation is weak or strong based on the comparison; and a decision circuit receiving the output signals of the first, second, and third comparators, determining strength of said horizontal non-correlation and said vertical non-correlation, generating said chrominance signal selection signal such that said first selector selects to output said first chrominance signal when the vertical non-correlation is strong, the second chrominance signal when the horizontal non-correlation is strong, and the third chrominance signal when neither said horizontal or vertical non-correlation is strong, and generating said chrominance signal selection signal such that said second selector selects the output of said second horizontal chrominance extraction filter, when said first selector selects either said first or third chrominance signal.

34. A luminance/chrominance separating filter according to claim 33, wherein said horizontal chrominance non-correlation energy extractor comprises:
  a first horizontal chrominance non-correlation energy extractor responsive to the sample value of said specific sampling point for detecting first horizontal chrominance non-correlation energy consisting primarily of the chrominance signal in the horizontal direction; and
  a second horizontal chrominance non-correlation energy extractor responsive to the sample value of said specific sampling point for detecting second horizontal chrominance non-correlation energy consisting primarily of the chrominance signal in the horizontal direction;

said vertical chrominance non-correlation energy extractor comprises:

a first vertical chrominance non-correlation energy extractor responsive to the sample values of said reference sampling points for detecting first vertical chrominance non-correlation energy consisting primarily of the chrominance signal in the vertical direction; and a second vertical chrominance non-correlation energy extractor responsive to the sample values of said reference sampling points for detecting second vertical chrominance non-correlation energy consisting primarily of the chrominance signal in the vertical direction;

said first adder is coupled to add the first horizontal chrominance non-correlation energy multiplied by said first predetermined coefficient to the horizontal luminance non-correlation energy multiplied by said second predetermined coefficient;

said second adder is coupled to add the first vertical chrominance non-correlation energy multiplied by said third predetermined coefficient to the vertical luminance non-correlation energy multiplied by said fourth predetermined coefficient;

said third adder is coupled to add the second vertical chrominance non-correlation energy multiplied by said fifth predetermined coefficient to the vertical luminance non-correlation energy multiplied by said sixth predetermined coefficient;

said maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient; and said second comparator is coupled to receive the second horizontal chrominance signal non-correlation energy and the output signal of the third adder multiplied by said tenth predetermined coefficient, and produces an output signal which indicates whether the horizontal non-correlation is weak or strong based on the comparison.

35. A luminance/chrominance separating filter according to claim 33, further comprising:

a first delay circuit for delaying the output signal of the first comparator by a time length of half a period of the color subcarrier to produce a first delayed output signal;

a second delay circuit for delaying the output signal of the second comparator by said time length to produce a second delayed output signal;

a third delay circuit for delaying the output signal of the third comparator by said time length to produce a third delayed output signal;

a fourth delay circuit for delaying the third delayed output signal by said time length to produce a fourth delayed output signal;

an AND circuit for producing a logical product of the output signal of the third comparator, said third delayed output signal and said fourth delayed output signal;

wherein said decision circuit receives said first and second delayed output signals, and said logical product, and determines strength of the horizontal non-correlation and the vertical non-correlation on the basis of said first and second delayed output signals and said logical product.

36. A luminance/chrominance separating filter according to claim 35, wherein said horizontal chrominance non-correlation energy extractor comprises:
  a first horizontal chrominance non-correlation energy extractor responsive to the sample value of said specific sampling point for detecting first horizontal chrominance non-correlation energy consisting primarily of the chrominance signal in the horizontal direction; and a second horizontal chrominance non-correlation energy extractor responsive to the sample value of said specific and reference sampling point for detecting second horizontal chrominance non-correlation energy consisting primarily of the chrominance signal in the horizontal direction;

said vertical chrominance non-correlation energy extractor comprises:

a first vertical chrominance non-correlation energy extractor responsive to the sample values of said reference sampling points for detecting first vertical chrominance non-correlation energy consisting primarily of the chrominance signal in the vertical direction; and a second vertical chrominance non-correlation energy extractor responsive to the sample values of said reference sampling points for detecting second vertical chrominance non-correlation energy consisting primarily of the chrominance signal in the vertical direction;

said first adder is coupled to add the first horizontal chrominance non-correlation energy multiplied by said first predetermined coefficient to the horizontal luminance non-correlation energy multiplied by said second predetermined coefficient;

said second adder is coupled to add the first vertical chrominance non-correlation energy multiplied by said third predetermined coefficient to the vertical luminance non-correlation energy multiplied by said fourth predetermined coefficient;

said third adder is coupled to add the second vertical chrominance non-correlation energy multiplied by said fifth predetermined coefficient to the vertical luminance non-correlation energy multiplied by said sixth predetermined coefficient;

said maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient; and said second comparator is coupled to receive the second horizontal chrominance signal non-correlation energy and the output signal of the third adder multiplied by said tenth predetermined coefficient, and produces an output signal which indicates whether the horizontal non-correlation is weak or strong based on the comparison.

37. A luminance/chrominance separating filter according to claim 2, wherein output of said second selector is used as an output chrominance signal.

38. A luminance/chrominance separating filter according to claim 37, further comprising a subtractor for subtracting the output of said first selector from the sample value of the specific sampling point of the composite color television signal to produce an output luminance signal.

39. A luminance/chrominance separating filter according to claim 37, wherein said judging means comprises:

a first maximum value circuit for receiving the horizontal chrominance non-correlation energy multiplied by a first predetermined coefficient and the horizontal luminance non-correlation energy multiplied by a second predetermined coefficient, and producing, as an output thereof, a larger one of the horizontal chrominance non-correlation energy multiplied by said first predetermined coefficient and the horizontal luminance non-correlation energy multiplied by said second predetermined coefficient;

a second maximum value circuit for receiving the horizontal chrominance non-correlation energy multiplied by a third predetermined coefficient and the horizontal luminance non-correlation energy multiplied by a fourth predetermined coefficient, and producing, as an output thereof, a larger one of the horizontal chrominance non-correlation energy multiplied by said third predetermined coefficient and the horizontal luminance non-correlation energy multiplied by said fourth predetermined coefficient;

a third maximum value circuit for receiving the horizontal chrominance non-correlation energy multiplied by a fifth predetermined coefficient and the horizontal luminance non-correlation energy multiplied by a sixth predetermined coefficient, and producing, as an output thereof, a larger one of the horizontal chrominance non-correlation energy multiplied by said fifth predetermined coefficient and the horizontal luminance non-correlation energy multiplied by said sixth predetermined coefficient;

a fourth maximum value circuit for receiving the vertical chrominance non-correlation energy multiplied by a seventh predetermined coefficient and the vertical luminance non-correlation energy multiplied by an eighth predetermined coefficient, and producing, as an output thereof, a larger one of the vertical chrominance non-correlation energy multiplied by said seventh predetermined coefficient and the vertical luminance non-correlation energy multiplied by said eighth predetermined coefficient;

a first comparator for comparing the output of said first maximum value circuit and the output of said fourth maximum value circuit multiplied by a ninth predetermined coefficient, and producing an output signal which indicates whether the horizontal non-correlation is weak or strong based on the comparison;

a second comparator for comparing the vertical chrominance non-correlation energy with the output of the second maximum value circuit multiplied by a tenth predetermined coefficient, and producing an output signal which indicates whether the vertical non-correlation is weak or strong based on the comparison;

a third comparator for comparing the vertical luminance non-correlation energy with the output of the third maximum value circuit multiplied by an eleventh predetermined coefficient, and producing an output signal which indicates whether the vertical non-correlation is weak or strong based on the comparison; and a decision circuit receiving the output signals of the first to third comparators, determining strength of said horizontal non-correlation and said vertical non-correlation, generating said chrominance signal selection signal such that said first selector selects said first chrominance signal when the vertical non-correlation is strong, the second chrominance signal when the horizontal non-correlation is strong, and the third chrominance signal when neither said horizontal or vertical non-correlation is strong, and further generating said chrominance signal selection signal such that said second selector selects said output of said second horizontal chrominance extraction filter, when said first selector selects either said first or third chrominance signal.

40. A luminance/chrominance separating filter according to claim 39, wherein said horizontal chrominance non-correlation energy extractor comprises:
  a first horizontal chrominance non-correlation energy extractor responsive to the sample value of said specific sampling point for detecting first horizontal chrominance non-correlation energy consisting primarily of the chrominance signal in the horizontal direction; and
  a second horizontal chrominance non-correlation energy extractor responsive to the sample value of said specific sampling point for detecting second horizontal chrominance non-correlation energy consisting primarily of the chrominance signal in the horizontal direction;

said vertical chrominance non-correlation energy extractor comprises:
  a first vertical chrominance non-correlation energy extractor responsive to the sample values of said reference sampling points for detecting first vertical chrominance non-correlation energy consisting primarily of the chrominance signal in the vertical direction; and
  a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive said second horizontal chrominance non-correlation energy multiplied by said first predetermined coefficient and the horizontal luminance non-correlation energy multiplied by said second predetermined coefficient, and produces, as an output thereof, a larger one of said second horizontal chrominance non-correlation energy multiplied by said first predetermined coefficient and the horizontal luminance non-correlation energy multiplied by said second predetermined coefficient;

said second maximum value circuit is coupled to receive said first horizontal chrominance non-correlation energy multiplied by said third predetermined coefficient and the horizontal luminance non-correlation energy multiplied by said fourth predetermined coefficient, and produces, as an output thereof, a larger one of said first horizontal chrominance non-correlation energy multiplied by said third predetermined coefficient and the horizontal luminance non-correlation energy multiplied by said fourth predetermined coefficient;

said third maximum value circuit is coupled to receive said first horizontal chrominance non-correlation energy multiplied by said fifth predetermined coefficient and the horizontal luminance non-correlation energy multiplied by said sixth predetermined coefficient, and produces, as an output thereof, a larger one of said first horizontal chrominance non-correlation energy multiplied by said fifth predetermined coefficient and the horizontal luminance non-correlation energy multiplied by said sixth predetermined coefficient;

said fourth maximum value circuit is coupled to receive said second vertical chrominance non-correlation energy multiplied by said seventh predetermined coefficient and the vertical luminance non-correlation energy multiplied by said eighth predetermined coefficient, and produces, as an output thereof, a larger one of said second vertical chrominance non-correlation energy multiplied by said seventh predetermined coefficient and the vertical luminance non-correlation energy multiplied by said eighth predetermined coefficient; and said second comparator is coupled to receive said first vertical chrominance non-correlation energy and the output signal of the second maximum value circuit multiplied by said tenth predetermined coefficient, and produces an output signal which indicates whether the vertical non-correlation is weak or strong based on the comparison.

41. A luminance/chrominance separating filter according to claim 39, further comprising:
  a first delay circuit for delaying the output signal of the first comparator by a time length of half a period of the color subcarrier to produce a first delayed output signal;
  a second delay circuit for delaying the output signal of the second comparator by said time length to produce a second delayed output signal;
  a third delay circuit for delaying the output signal of the third comparator by said time length to produce a third delayed output signal;
  a fourth delay circuit for delaying the third delayed output signal by said time length to produce a fourth delayed output signal;
  an AND circuit for producing a logical product of the output signal of the third comparator, said third delayed output signal and said fourth delayed output signal;
  wherein said decision circuit receives said first and second delayed output signals, and said logical product, and determines strength of the horizontal non-correlation and the vertical non-correlation on the basis of said first and second delayed output signals and said logical product.

42. A luminance/chrominance separating filter according to claim 41, wherein said horizontal chrominance non-correlation energy extractor comprises:
  a first horizontal chrominance non-correlation energy extractor responsive to the sample value of said specific sampling point for detecting first horizontal chrominance non-correlation energy consisting primarily of the chrominance signal in the horizontal direction; and
  a second horizontal chrominance non-correlation energy extractor responsive to the sample value of said specific sampling point for detecting second horizontal chrominance non-correlation energy consisting primarily of the chrominance signal in the horizontal direction;

said vertical chrominance non-correlation energy extractor comprises:
  a first vertical chrominance non-correlation energy extractor responsive to the sample values of said reference sampling points for detecting first vertical chrominance non-correlation energy consisting primarily of the chrominance signal in the vertical direction; and
  a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive said second horizontal chrominance non-correlation energy multiplied by said first predetermined coefficient and the horizontal luminance non-correlation energy multiplied by said second predetermined coefficient, and produces, as an output thereof, a larger one of said second horizontal chrominance non-correlation energy multiplied by said first predetermined coefficient and the horizontal luminance non-correlation energy multiplied by said second predetermined coefficient;

said second maximum value circuit is coupled to receive said first horizontal chrominance non-correlation energy multiplied by said third predetermined coefficient and the horizontal luminance non-correlation energy multiplied by said fourth predetermined coefficient, and produces, as an output thereof, a larger one of said first horizontal chrominance non-correlation energy multiplied by said third predetermined coefficient and the horizontal luminance non-correlation energy multiplied by said fourth predetermined coefficient;

said third maximum value circuit is coupled to receive said first horizontal chrominance non-correlation energy multiplied by said fifth predetermined coefficient and the horizontal luminance non-correlation energy multiplied by said sixth predetermined coefficient, and produces, as an output thereof, a larger one of said first horizontal chrominance non-correlation energy multiplied by said fifth predetermined coefficient and the horizontal luminance non-correlation energy multiplied by said sixth predetermined coefficient;

said fourth maximum value circuit is coupled to receive said second vertical chrominance non-correlation energy multiplied by said seventh predetermined coefficient and the vertical luminance non-correlation energy multiplied by said eighth predetermined coefficient, and produces, as an output thereof, a larger one of said second vertical chrominance non-correlation energy multiplied by said seventh predetermined coefficient and the vertical luminance non-correlation energy multiplied by said eighth predetermined coefficient; and said second comparator is coupled to receive said first vertical chrominance non-correlation energy and the output signal of the second maximum value circuit multiplied by said tenth predetermined coefficient, and produces an output signal which indicates whether the vertical non-correlation is weak or strong based on the comparison.

43. A luminance/chrominance separating filter according to claim 37, wherein said judging means comprises:

a first maximum value circuit for receiving the horizontal chrominance non-correlation energy multiplied by a first predetermined coefficient and the horizontal luminance non-correlation energy multiplied by a second predetermined coefficient, and producing, as an output thereof, a larger one of the horizontal chrominance non-correlation energy multiplied by said first predetermined coefficient and the horizontal luminance non-correlation energy multiplied by said second predetermined coefficient;

a second maximum value circuit for receiving the vertical chrominance non-correlation energy multiplied by a third predetermined coefficient and the vertical luminance non-correlation energy multiplied by a fourth predetermined coefficient, and producing, as an output thereof, a larger one of the vertical chrominance non-correlation energy multiplied by said third predetermined coefficient and the vertical luminance non-correlation energy multiplied by said fourth predetermined coefficient;

a third maximum value circuit for receiving the vertical chrominance non-correlation energy multiplied by a fifth predetermined coefficient and the vertical luminance non-correlation energy multiplied by a sixth predetermined coefficient, and producing, as an output thereof, a larger one of the vertical chrominance non-correlation energy multiplied by said fifth predetermined coefficient and the vertical luminance non-correlation energy multiplied by said sixth predetermined coefficient;

a fourth maximum value circuit for receiving the vertical chrominance non-correlation energy multiplied by a seventh predetermined coefficient and the vertical luminance non-correlation energy multiplied by an eighth predetermined coefficient, and producing, as an output thereof, a larger one of the vertical chrominance non-correlation energy multiplied by said seventh predetermined coefficient and the vertical luminance non-correlation energy multiplied by said eighth predetermined coefficient;

a first comparator for comparing the output signal of said second maximum value circuit with the output signal of said first maximum value circuit multiplied by a ninth predetermined coefficient, and producing an output signal which indicates whether the vertical non-correlation is weak or strong based on the comparison;

a second comparator for comparing the horizontal chrominance signal non-correlation energy with the output signal of the third maximum value circuit multiplied by a tenth predetermined coefficient, and producing an output signal which indicates whether the horizontal non-correlation is weak or strong based on the comparison;

a third comparator for comparing the horizontal luminance non-correlation energy with the output signal of the fourth maximum value circuit multiplied by an eleventh predetermined coefficient, and producing an output signal which indicates whether the horizontal non-correlation is weak or strong based on the comparison; and a decision circuit receiving the output signals of the first, second and third comparators, determining strength of the horizontal non-correlation and the vertical non-correlation, generating said chrominance signal selection signal such that said first selector selects to output said first chrominance signal when the vertical non-correlation is strong, the second chrominance signal when the horizontal non-correlation is strong, and the third chrominance signal when neither said horizontal or vertical non-correlation is strong, and further generating said chrominance signal selection signal such that said second selector selects the output of said second horizontal chrominance extraction filter, when said first selector selects either said first or third chrominance signal.

44. A luminance/chrominance separating filter according to claim 43, wherein said horizontal chrominance non-correlation energy extractor comprises:
- a first horizontal chrominance non-correlation energy extractor responsive to the sample value of said specific sampling point for detecting first horizontal chrominance non-correlation energy consisting primarily of the chrominance signal in the horizontal direction; and
- a second horizontal chrominance non-correlation energy extractor responsive to the sample value of said specific and reference sampling point for detecting second horizontal chrominance non-correlation energy consisting primarily of the chrominance signal in the horizontal direction;

said vertical chrominance non-correlation energy extractor comprises:
- a first vertical chrominance non-correlation energy extractor responsive to the sample values of said reference sampling points for detecting first vertical chrominance non-correlation energy consisting primarily of the chrominance signal in the vertical direction; and
- a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive the first horizontal chrominance non-correlation energy multiplied by said first predetermined coefficient and the horizontal luminance non-correlation energy multiplied by said second predetermined coefficient, and produces, as an output thereof, a larger one of the first horizontal chrominance non-correlation energy multiplied by said first predetermined coefficient and the horizontal luminance non-correlation energy multiplied by said second predetermined coefficient;

said second maximum value circuit is coupled to receive the first vertical chrominance non-correlation energy multiplied by said third predetermined coefficient and the vertical luminance non-correlation energy multiplied by said fourth predetermined coefficient, and produces, as an output thereof, a larger one of the first vertical chrominance non-correlation energy multiplied by said third predetermined coefficient and the vertical luminance non-correlation energy multiplied by said fourth predetermined coefficient;

said third maximum value circuit is coupled to receive the second vertical chrominance non-correlation energy multiplied by said fifth predetermined coefficient and the vertical luminance non-correlation energy multiplied by said sixth predetermined coefficient, and produces, as an output thereof, a larger one of the second vertical chrominance non-correlation energy multiplied by said fifth predetermined coefficient and the vertical luminance non-correlation energy multiplied by said sixth predetermined coefficient;

said fourth maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient;

said second comparator is coupled to receive the second horizontal chrominance signal non-correlation energy and the output signal of the third maximum value circuit multiplied by said tenth predetermined coefficient, and produces an output signal which indicates whether the horizontal non-correlation is weak or strong based on said comparison.

45. A luminance/chrominance separating filter according to claim 43, further comprising:
- a first delay circuit for delaying the output signal of the first comparator by a time length of half a period of the color subcarrier to produce a first delayed output signal;
- a second delay circuit for delaying the output signal of the second comparator by said time length to produce a second delayed output signal;
- a third delay circuit for delaying the output signal of the third comparator by said time length to produce a third delayed output signal;
- a fourth delay circuit for delaying the third delayed output signal by said time length to produce a fourth delayed output signal;
- an AND circuit for producing a logical product of the output signal of the third comparator, said third delayed output signal and said fourth delayed output signal;
- wherein said decision circuit receives said first and second delayed output signals, and said logical product, and determines strength of the horizontal non-correlation and the vertical non-correlation on the basis of said first and second delayed output signals and said logical product.

46. A luminance/chrominance separating filter according to claim 45, wherein
said horizontal chrominance non-correlation energy extractor comprises:
- a first horizontal chrominance non-correlation energy extractor responsive to the sample value of said specific sampling point for detecting first horizontal chrominance non-correlation energy consisting primarily of the chrominance signal in the horizontal direction; and
- a second horizontal chrominance non-correlation energy extractor responsive to the sample value of said specific and reference sampling point for detecting second horizontal chrominance non-correlation energy consisting primarily of the chrominance signal in the horizontal direction;

said vertical chrominance non-correlation energy extractor comprises:
- a first vertical chrominance non-correlation energy extractor responsive to the sample values of said reference sampling points for detecting first vertical chrominance non-correlation energy consisting primarily of the chrominance signal in the vertical direction; and
- a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive the first horizontal chrominance non-correlation energy multiplied by said first predetermined coefficient and the horizontal luminance non-correlation energy multiplied by said second predetermined coefficient, and produces, as an output thereof, a larger one of the first horizontal chrominance non-correlation energy multiplied by said first predetermined coefficient and the horizontal luminance non-correlation energy multiplied by said second predetermined coefficient;

said second maximum value circuit is coupled to receive the first vertical chrominance non-correlation energy multiplied by said third predetermined coefficient and the vertical luminance non-correlation energy multiplied by said fourth predetermined coefficient, and produces, as an output thereof, a larger one of the first vertical chrominance non-correlation energy multiplied by said third predetermined coefficient and the vertical luminance non-correlation energy multiplied by said fourth predetermined coefficient;

said third maximum value circuit is coupled to receive the second vertical chrominance non-correlation energy multiplied by said fifth predetermined coefficient and the vertical luminance non-correlation energy multiplied by said sixth predetermined coefficient, and produces, as an output thereof, a larger one of the second vertical chrominance non-correlation energy multiplied by said fifth predetermined coefficient and the vertical luminance non-correlation energy multiplied by said sixth predetermined coefficient;

said fourth maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient;

said second comparator is coupled to receive the second horizontal chrominance signal non-correlation energy and the output signal of the third maximum value circuit multiplied by said tenth predetermined coefficient, and produces an output signal which indicates whether the horizontal non-correlation is weak or strong based on said comparison.

47. A luminance/chrominance separating filter according to claim 37, wherein said judging means comprises:

a first maximum value circuit for receiving the horizontal chrominance non-correlation energy multiplied by a first predetermined coefficient and the horizontal luminance non-correlation energy multiplied by a second predetermined coefficient, and producing, as an output thereof, a larger one of the horizontal chrominance non-correlation energy multiplied by said first predetermined coefficient and the horizontal luminance non-correlation energy multiplied by said second predetermined coefficient;

a second maximum value circuit for receiving the horizontal chrominance non-correlation energy multiplied by a third predetermined coefficient and the horizontal luminance non-correlation energy multiplied by a fourth predetermined coefficient, and producing, as an output thereof, a larger one of the horizontal chrominance non-correlation energy multiplied by said third predetermined coefficient and the horizontal luminance non-correlation energy multiplied by said fourth predetermined coefficient;

a third maximum value circuit for receiving the horizontal chrominance non-correlation energy multiplied by a fifth predetermined coefficient and the horizontal luminance non-correlation energy multiplied by a sixth predetermined coefficient, and producing, as an output thereof, a larger one of the horizontal chrominance non-correlation energy multiplied by said fifth predetermined coefficient and the horizontal luminance non-correlation energy multiplied by said sixth predetermined coefficient;

an adder for adding the vertical chrominance non-correlation energy multiplied by a seventh predetermined coefficient to the vertical luminance non-correlation energy multiplied by an eighth predetermined coefficient, and producing, as an output thereof, a sum of the vertical chrominance non-correlation energy multiplied by said seventh predetermined coefficient and the vertical luminance non-correlation energy multiplied by said eighth predetermined coefficient;

a first comparator for comparing the output signal of said first maximum value circuit with the output signal of said adder multiplied by a ninth predetermined coefficient, and producing an output signal which indicates whether the horizontal non-correlation is weak or strong based on the comparison;

a second comparator for comparing the vertical chrominance non-correlation energy with the output signal of the second maximum value circuit multiplied by a tenth predetermined coefficient, and producing an output signal which indicates whether the vertical non-correlation is weak or strong based on the comparison;

a third comparator for comparing the vertical luminance non-correlation energy with the output signal of the third maximum value circuit multiplied by an eleventh predetermined coefficient, and producing an output signal which indicates whether the vertical non-correlation is weak or strong based on the comparison; and a decision circuit receiving the output signals of the first, second, and third comparators, determining strength of said horizontal non-correlation and said vertical non-correlation, generating said chrominance signal selection signal such that said first selector selects to output said first chrominance signal when the vertical non-correlation is strong, the second chrominance signal when the horizontal non-correlation is strong, and the third chrominance signal when neither said horizontal or vertical non-correlation is strong, and further generating said chrominance signal selection signal such that said second selector selects the output of said second horizontal chrominance extraction filter, when said first selector selects either said first or third chrominance signal.

48. A luminance/chrominance separating filter according to claim 47, wherein said horizontal chrominance non-correlation energy extractor comprises:

a first horizontal chrominance non-correlation energy extractor responsive to the sample value of said specific sampling point for detecting first horizontal chrominance non-correlation energy consisting primarily of the chrominance signal in the horizontal direction; and a second horizontal chrominance non-correlation energy extractor responsive to the sample value of said specific sampling point for detecting second horizontal chrominance non-correlation energy consisting primarily of the chrominance signal in the horizontal direction;

said vertical chrominance non-correlation energy extractor comprises:
a first vertical chrominance non-correlation energy extractor responsive to the sample values of said reference sampling points for detecting first vertical chrominance non-correlation energy consisting primarily of the chrominance signal in the vertical direction; and
a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive the second horizontal chrominance non-correlation energy multiplied by said first predetermined coefficient and the horizontal luminance non-correlation energy multiplied by said second predetermined coefficient, and produces, as an output thereof, a larger one of the second horizontal chrominance non-correlation energy multiplied by said first predetermined coefficient and the horizontal luminance non-correlation energy multiplied by said second predetermined coefficient;

said second maximum value circuit is coupled to receive the first horizontal chrominance non-correlation energy multiplied by said third predetermined coefficient and the horizontal luminance non-correlation energy multiplied by said fourth predetermined coefficient, and produces, as an output thereof, a larger one of the first horizontal chrominance non-correlation energy multiplied by said third predetermined coefficient and the horizontal luminance non-correlation energy multiplied by said fourth predetermined coefficient;

said third maximum value circuit is coupled to receive the first horizontal chrominance non-correlation energy multiplied by said fifth predetermined coefficient and the horizontal luminance non-correlation energy multiplied by said sixth predetermined coefficient, and produces, as an output thereof, a larger one of the first horizontal chrominance non-correlation energy multiplied by said fifth predetermined coefficient and the horizontal luminance non-correlation energy multiplied by said sixth predetermined coefficient;

said adder is coupled to add the second vertical chrominance non-correlation energy multiplied by said seventh predetermined coefficient to the vertical luminance non-correlation energy multiplied by said eighth predetermined coefficient; and said second comparator for comparing the first vertical chrominance non-correlation energy with the output signal of the second maximum value circuit multiplied by said tenth predetermined coefficient, and producing an output signal which indicates whether the vertical non-correlation is weak or strong based on the comparison.

49. A luminance/chrominance separating filter according to claim 47, further comprising:
a first delay circuit for delaying the output signal of the first comparator by a time length of half a period of the color subcarrier to produce a first delayed output signal;
a second delay circuit for delaying the output signal of the second comparator by said time length to produce a second delayed output signal;
a third delay circuit for delaying the output signal of the third comparator by said time length to produce a third delayed output signal;
a fourth delay circuit for delaying the third delayed output signal by said time length to produce a fourth delayed output signal;
an AND circuit for producing a logical product of the output signal of the third comparator, said third delayed output signal and said fourth delayed output signal;
wherein said decision circuit receives said first and second delayed output signals, and said logical product, and determines strength of the horizontal non-correlation and the vertical non-correlation on the basis of said first and second delayed output signals and said logical product.

50. A luminance/chrominance separating filter according to claim 49, wherein
said horizontal chrominance non-correlation energy extractor comprises:
a first horizontal chrominance non-correlation energy extractor responsive to the sample value of said specific sampling point for detecting first horizontal chrominance non-correlation energy consisting primarily of the chrominance signal in the horizontal direction; and
a second horizontal chrominance non-correlation energy extractor responsive to the sample value of said specific sampling point for detecting second horizontal chrominance non-correlation energy consisting primarily of the chrominance signal in the horizontal direction;

said vertical chrominance non-correlation energy extractor comprises:
a first vertical chrominance non-correlation energy extractor responsive to the sample values of said reference sampling points for detecting first vertical chrominance non-correlation energy consisting primarily of the chrominance signal in the vertical direction; and
a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive the second horizontal chrominance non-correlation energy multiplied by said first predetermined coefficient and the horizontal luminance non-correlation energy multiplied by said second predetermined coefficient, and produces, as an output thereof, a larger one of the second horizontal chrominance non-correlation energy multiplied by said first predetermined coefficient and the horizontal luminance non-correlation energy multiplied by said second predetermined coefficient;

said second maximum value circuit is coupled to receive the first horizontal chrominance non-correlation energy multiplied by said third predetermined coefficient and the horizontal luminance non-correlation energy multiplied by said fourth predetermined coefficient, and produces, as an output thereof, a larger one of the first horizontal chrominance non-correlation energy multiplied by said third predetermined coefficient and the horizontal luminance non-correlation energy multiplied by said fourth predetermined coefficient;

said third maximum value circuit is coupled to receive the first horizontal chrominance non-correlation energy multiplied by said fifth predetermined coefficient and the horizontal luminance non-correlation energy multiplied by said sixth predetermined coefficient, and produces, as an output thereof, a larger one of the first horizontal chrominance non-correlation energy multiplied by said fifth predetermined coefficient and the horizontal luminance non-correlation energy multiplied by said sixth predetermined coefficient;

said adder is coupled to add the second vertical chrominance non-correlation energy multiplied by said seventh predetermined coefficient to the vertical luminance non-correlation energy multiplied by said eighth predetermined coefficient; and said second comparator for comparing the first vertical chrominance non-correlation energy with the output signal of the second maximum value circuit multiplied by said tenth predetermined coefficient, and producing an output signal which indicates whether the vertical non-correlation is weak or strong based on the comparison.

51. A luminance/chrominance separating filter according to claim 37, wherein said judging means comprises:

an adder for adding the horizontal chrominance non-correlation energy multiplied by a first predetermined coefficient to the horizontal luminance non-correlation energy multiplied by a second predetermined coefficient, and producing, as an output thereof, a sum of the horizontal chrominance non-correlation energy multiplied by said first predetermined coefficient and the horizontal luminance non-correlation energy multiplied by said second predetermined coefficient;

a first maximum value circuit for receiving the vertical chrominance non-correlation energy multiplied by a third predetermined coefficient and the vertical luminance non-correlation energy multiplied by a fourth predetermined coefficient, and producing, as an output thereof, a larger one of the vertical chrominance non-correlation energy multiplied by said third predetermined coefficient and the vertical luminance non-correlation energy multiplied by said fourth predetermined coefficient;

a second maximum value circuit for receiving the vertical chrominance non-correlation energy multiplied by a fifth predetermined coefficient and the vertical luminance non-correlation energy multiplied by a sixth predetermined coefficient, and producing, as an output thereof, a larger one of the vertical chrominance non-correlation energy multiplied by said fifth predetermined coefficient and the vertical luminance non-correlation energy multiplied by said sixth predetermined coefficient;

a third maximum value circuit for receiving the vertical chrominance non-correlation energy multiplied by a seventh predetermined coefficient and the vertical luminance non-correlation energy multiplied by an eighth predetermined coefficient, and producing, as an output thereof, a larger one of the vertical chrominance non-correlation energy multiplied by said seventh predetermined coefficient and the vertical luminance non-correlation energy multiplied by said eighth predetermined coefficient;

a first comparator for comparing the output signal of said first maximum value circuit with the output signal of said adder multiplied by a ninth predetermined coefficient, and producing an output signal which indicates whether the vertical non-correlation is weak or strong based on the comparison;

a second comparator for comparing the horizontal chrominance signal non-correlation energy with the output signal of the second maximum value circuit multiplied by a tenth predetermined coefficient, and producing an output signal which indicates whether the horizontal non-correlation is weak or strong based on the comparison;

a third comparator for comparing the horizontal luminance non-correlation energy with the output signal of the third maximum value circuit multiplied by an eleventh predetermined coefficient, and producing an output signal which indicates whether the horizontal non-correlation is weak or strong based on the comparison; and a decision circuit receiving the output signals of the first, second, and third comparators, determining strength of said horizontal non-correlation and said vertical non-correlation, generating said chrominance signal selection signal such that said first selector selects to output said first chrominance signal when the vertical non-correlation is strong, the second chrominance signal when the horizontal non-correlation is strong, and the third chrominance signal when neither said horizontal or vertical non-correlation is strong, and further generating said chrominance signal selection signal such that said second selector selects the output of said second horizontal chrominance extraction filter, when said first selector selects either said first or third chrominance signal.

52. A luminance/chrominance separating filter according to claim 51, wherein said horizontal chrominance non-correlation energy extractor comprises:
a first horizontal chrominance non-correlation energy extractor responsive to the sample value of said specific sampling point for detecting first horizontal chrominance non-correlation energy consisting primarily of the chrominance signal in the horizontal direction; and
a second horizontal chrominance non-correlation energy extractor responsive to the sample value of said specific and reference sampling point for detecting second horizontal chrominance non-correlation energy consisting primarily of the chrominance signal in the horizontal direction;

said vertical chrominance non-correlation energy extractor comprises:
a first vertical chrominance non-correlation energy extractor responsive to the sample values of said reference sampling points for detecting first vertical chrominance non-correlation energy consisting primarily of the chrominance signal in the vertical direction; and
a second vertical chrominance non-correlation energy extractor responsive to the sample values of said reference sampling points for detecting second vertical chrominance non-correlation energy consisting primarily of the chrominance signal in the vertical direction;

said adder is coupled to add the first horizontal chrominance non-correlation energy multiplied by said first predetermined coefficient to the horizontal luminance non-correlation energy multiplied by said second predetermined coefficient;

said first maximum value circuit is coupled to receive the first vertical chrominance non-correlation energy multiplied by said third predetermined coefficient and the vertical luminance non-correlation energy multiplied by said fourth predetermined coefficient, and produces, as an output thereof, a larger one of the first vertical chrominance non-correlation energy multiplied by said third predetermined coefficient and the vertical luminance non-correlation energy multiplied by said fourth predetermined coefficient;

said second maximum value circuit is coupled to receive the second vertical chrominance non-correlation energy multiplied by said fifth predetermined coefficient and the vertical luminance non-correlation energy multiplied by said sixth predetermined coefficient, and produces, as an output thereof, a larger one of the second vertical chrominance non-correlation energy multiplied by said fifth predetermined coefficient and the vertical luminance non-correlation energy multiplied by said sixth predetermined coefficient;

said third maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient; and said second comparator is coupled to receive the second horizontal chrominance signal non-correlation energy and the output signal of the second maximum value circuit multiplied by said tenth predetermined coefficient, and produces an output signal which indicates whether the horizontal non-correlation is weak or strong based on the comparison.

53. A luminance/chrominance separating filter according to claim 51, further comprising:

a first delay circuit for delaying the output signal of the first comparator by a time length of half a period of the color subcarrier to produce a first delayed output signal;

a second delay circuit for delaying the output signal of the second comparator by said time length to produce a second delayed output signal;

a third delay circuit for delaying the output signal of the third comparator by said time length to produce a third delayed output signal;

a fourth delay circuit for delaying the third delayed output signal by said time length to produce a fourth delayed output signal;

an AND circuit for producing a logical product of the output signal of the third comparator, said third delayed output signal and said fourth delayed output signal;

wherein said decision circuit receives said first and second delayed output signals, and said logical product, and determines strength of the horizontal non-correlation and the vertical non-correlation on the basis of said first and second delayed output signals and said logical product.

54. A luminance/chrominance separating filter according to claim 53, wherein said horizontal chrominance non-correlation energy extractor comprises:

a first horizontal chrominance non-correlation energy extractor responsive to the sample value of said specific sampling point for detecting first horizontal chrominance non-correlation energy consisting primarily of the chrominance signal in the horizontal direction; and a second horizontal chrominance non-correlation energy extractor responsive to the sample value of said specific and reference sampling point for detecting second horizontal chrominance non-correlation energy consisting primarily of the chrominance signal in the horizontal direction;

said vertical chrominance non-correlation energy extractor comprises:

a first vertical chrominance non-correlation energy extractor responsive to the sample values of said reference sampling points for detecting first vertical chrominance non-correlation energy consisting primarily of the chrominance signal in the vertical direction; and a second vertical chrominance non-correlation energy extractor responsive to the sample values of said reference sampling points for detecting second vertical chrominance non-correlation energy consisting primarily of the chrominance signal in the vertical direction;

said adder is coupled to add the first horizontal chrominance non-correlation energy multiplied by said first predetermined coefficient to the horizontal luminance non-correlation energy multiplied by said second predetermined coefficient;

said first maximum value circuit is coupled to receive the first vertical chrominance non-correlation energy multiplied by said third predetermined coefficient and the vertical luminance non-correlation energy multiplied by said fourth predetermined coefficient, and produces, as an output thereof, a larger one of the first vertical chrominance non-correlation energy multiplied by said third predetermined coefficient and the vertical luminance non-correlation energy multiplied by said fourth predetermined coefficient;

said second maximum value circuit is coupled to receive the second vertical chrominance non-correlation energy multiplied by said fifth predetermined coefficient and the vertical luminance non-correlation energy multiplied by said sixth predetermined coefficient, and produces, as an output thereof, a larger one of the second vertical chrominance non-correlation energy multiplied by said fifth predetermined coefficient and the vertical luminance non-correlation energy multiplied by said sixth predetermined coefficient;

said third maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient; and said second comparator is coupled to receive the second horizontal chrominance signal non-correlation energy and the output signal of the second maximum value circuit multiplied by a said tenth predetermined coefficient, and produces an output signal which indicates whether the horizontal non-correlation is weak or strong based on the comparison.

55. A luminance/chrominance separating filter according to claim 37, wherein said judging means comprises:

a first maximum value circuit for receiving the horizontal chrominance non-correlation energy multiplied by a first predetermined coefficient and the horizontal luminance non-correlation energy multiplied by a second predetermined coefficient, and producing, as an output thereof, a larger one of the horizontal chrominance non-correlation energy multiplied by said first predetermined coefficient and the horizontal luminance non-correlation energy multiplied by said second predetermined coefficient;

a first adder for adding the horizontal chrominance non-correlation energy multiplied by a third predetermined coefficient to the horizontal luminance non-correlation energy multiplied by a fourth predetermined coefficient, and producing, as an output thereof, a sum of the horizontal chrominance non-correlation energy multiplied by said third predetermined coefficient and the horizontal luminance non-correlation energy multiplied by said fourth predetermined coefficient;

a second adder for adding the horizontal chrominance non-correlation energy multiplied by a fifth predetermined coefficient to the horizontal luminance non-correlation energy multiplied by a sixth predetermined coefficient, and producing, as an output thereof, a sum of the horizontal chrominance non-correlation energy multiplied by a fifth predetermined coefficient and the horizontal luminance non-correlation energy multiplied by a sixth predetermined coefficient;

a second maximum value circuit for receiving the vertical chrominance non-correlation energy multiplied by a seventh predetermined coefficient and the vertical luminance non-correlation energy multiplied by an eighth predetermined coefficient, and producing, as an output thereof, a larger one of the vertical chrominance non-correlation energy multiplied by said seventh predetermined coefficient and the vertical luminance non-correlation energy multiplied by said eighth predetermined coefficient;

a first comparator for comparing the output signal of said first maximum value circuit with the output signal of said second maximum value circuit multiplied by a ninth predetermined coefficient, and producing an output signal which indicates whether the horizontal non-correlation is weak or strong based on the comparison;

a second comparator for comparing the vertical chrominance non-correlation energy with the output signal of the first adder multiplied by a tenth predetermined coefficient, and producing an output signal which indicates whether the vertical non-correlation is weak or strong based on the comparison;

a third comparator for comparing the vertical luminance non-correlation energy with the output signal of the second adder multiplied by an eleventh predetermined coefficient, and producing an output signal which indicates whether the vertical non-correlation is weak or strong based on the comparison; and a decision circuit receiving the output signals of the first, second, and third comparators, determining strength of said horizontal non-correlation and said vertical non-correlation, generating said chrominance signal selection signal such that said first selector selects to output said first chrominance signal when the vertical non-correlation is strong, the second chrominance signal when the horizontal non-correlation is strong, and the third chrominance signal when neither said horizontal or vertical non-correlation is strong, and further generating said chrominance signal selection signal such that said second selector selects the output of said second horizontal chrominance extraction filter, when said first selector selects either said first or third chrominance signal.

56. A luminance/chrominance separating filter according to claim 55, wherein said horizontal chrominance non-correlation energy extractor comprises:
  a first horizontal chrominance non-correlation energy extractor responsive to the sample value of said specific sampling point for detecting first horizontal chrominance non-correlation energy consisting primarily of the chrominance signal in the horizontal direction; and
  a second horizontal chrominance non-correlation energy extractor responsive to the sample value of said specific and reference sampling point for detecting second horizontal chrominance non-correlation energy consisting primarily of the chrominance signal in the horizontal direction;

said vertical chrominance non-correlation energy extractor comprises:
  a first vertical chrominance non-correlation energy extractor responsive to the sample values of said reference sampling points for detecting first vertical chrominance non-correlation energy consisting primarily of the chrominance signal in the vertical direction; and
  a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive the second horizontal chrominance non-correlation energy multiplied by said first predetermined coefficient and the horizontal luminance non-correlation energy multiplied by said second predetermined coefficient, and produces, as an output thereof, a larger one of the second horizontal chrominance non-correlation energy multiplied by said first predetermined coefficient and the horizontal luminance non-correlation energy multiplied by said second predetermined coefficient;

said first adder is coupled to add the first horizontal chrominance non-correlation energy multiplied by said third predetermined coefficient to the horizontal luminance non-correlation energy multiplied by said fourth predetermined coefficient;

said second adder is coupled to add the first horizontal chrominance non-correlation energy multiplied by said fifth predetermined coefficient to the horizontal luminance non-correlation energy multiplied by said sixth predetermined coefficient;

said second maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient; and said second comparator is coupled to receive the first vertical chrominance non-correlation energy and the output signal of the first adder multiplied by said tenth predetermined coefficient, and produces an output signal which indicates whether the vertical non-correlation is weak or strong based on the comparison.

57. A luminance/chrominance separating filter according to claim 55, further comprising:

a first delay circuit for delaying the output signal of the first comparator by a time length Of half a period of the color subcarrier to produce a first delayed output signal;

a second delay circuit for delaying the output signal of the second comparator by said time length to produce a second delayed output signal;

a third delay circuit for delaying the output signal of the third comparator by said time length to produce a third delayed output signal;

a fourth delay circuit for delaying the third delayed output signal by said time length to produce a fourth delayed output signal;

an AND circuit for producing a logical product of the output signal of the third comparator, said third delayed output signal and said fourth delayed output signal;

wherein said decision circuit receives said first and second delayed output signals, and said logical product, and determines strength of the horizontal non-correlation and the vertical non-correlation on the basis of said first and second delayed output signals and said logical product.

58. A luminance/chrominance separating filter according to claim 57, wherein said horizontal chrominance non-correlation energy extractor comprises:

a first horizontal chrominance non-correlation energy extractor responsive to the sample value of said specific sampling point for detecting first horizontal chrominance non-correlation energy consisting primarily of the chrominance signal in the horizontal direction; and a second horizontal chrominance non-correlation energy extractor responsive to the sample value of said specific and reference sampling point for detecting second horizontal chrominance non-correlation energy consisting primarily of the chrominance signal in the horizontal direction;

said vertical chrominance non-correlation energy extractor comprises:

a first vertical chrominance non-correlation energy extractor responsive to the sample values of said reference sampling points for detecting first vertical chrominance non-correlation energy consisting primarily of the chrominance signal in the vertical direction; and a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive the second horizontal chrominance non-correlation energy multiplied by said first predetermined coefficient and the horizontal luminance non-correlation energy multiplied by said second predetermined coefficient, and produces, as an output thereof, a larger one of the second horizontal chrominance non-correlation energy multiplied by said first predetermined coefficient and the horizontal luminance non-correlation energy multiplied by said second predetermined coefficient;

said first adder is coupled to add the first horizontal chrominance non-correlation energy multiplied by said third predetermined coefficient to the horizontal luminance non-correlation energy multiplied by said fourth predetermined coefficient;

said second adder is coupled to add the first horizontal chrominance non-correlation energy multiplied by said fifth predetermined coefficient to the horizontal luminance non-correlation energy multiplied by said sixth predetermined coefficient;

said second maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient; and said second comparator is coupled to receive the first vertical chrominance non-correlation energy and the output signal of the first adder multiplied by said tenth predetermined coefficient, and produces all output signal which indicates whether the vertical non-correlation is weak or strong based on the comparison.

59. A luminance/chrominance separating filter according to claim 37, wherein said judging means comprises:

a first maximum value circuit for receiving the horizontal chrominance non-correlation energy multiplied by a first predetermined coefficient and the horizontal luminance non-correlation energy multiplied by a second predetermined coefficient, and producing, as an output thereof, a larger one of the horizontal chrominance non-correlation energy multiplied by said first predetermined coefficient and the horizontal luminance non-correlation energy multiplied by said second predetermined coefficient;

a first adder for adding the vertical chrominance non-correlation energy multiplied by a third predetermined coefficient to the vertical luminance non-correlation energy multiplied by a fourth predetermined coefficient, and producing, as an output thereof, a sum of the vertical chrominance non-correlation energy multiplied by said third predetermined coefficient and the vertical luminance non-correlation energy multiplied by said fourth predetermined coefficient;

a second adder for adding the vertical chrominance non-correlation energy multiplied by a fifth predetermined coefficient to the vertical luminance non-correlation energy multiplied by a sixth predetermined coefficient, and producing, as an output thereof, a sum of the vertical chrominance non-correlation energy multiplied by said fifth predetermined coefficient and the vertical luminance non-correlation energy multiplied by said sixth predetermined coefficient;

a second maximum value circuit for receiving the vertical chrominance non-correlation energy multiplied by a seventh predetermined coefficient and the vertical luminance non-correlation energy multiplied by an eighth predetermined coefficient, and producing, as an output thereof, a larger one of the vertical chrominance non-correlation energy multiplied by said seventh predetermined coefficient and the vertical luminance non-correlation energy multiplied by said eighth predetermined coefficient;

a first comparator for comparing the output signal of said first adder with the output signal of said first maximum value circuit multiplied by a ninth predetermined coefficient, and producing an output signal which indicates whether the vertical non-correlation is weak or strong based on the comparison;

a second comparator for comparing the horizontal chrominance signal non-correlation energy with the output signal of the second adder multiplied by a tenth predetermined coefficient, and producing an output signal which indicates whether the horizontal non-correlation is weak or strong based on the comparison;

a third comparator for comparing the horizontal luminance non-correlation energy with the output signal of the second maximum value circuit multiplied by an eleventh predetermined coefficient, and producing an output signal which indicates whether the horizontal non-correlation is weak or strong based on the comparison; and a decision circuit receiving the output signals of the first, second, and third comparators, determining strength of said horizontal non-correlation and said vertical non-correlation, generating said chrominance signal selection signal such that said first selector selects to output said first chrominance signal when the vertical non-correlation is strong, the second chrominance signal when the horizontal non-correlation is strong, and the third chrominance signal when neither said horizontal or vertical non-correlation is strong, and further generating said chrominance signal selection signal such that said second selector selects the output of said second horizontal chrominance extraction filter, when said first selector selects either said first or third chrominance signal.

60. A luminance/chrominance separating filter according to claim 59, wherein said horizontal chrominance non-correlation energy extractor comprises:

a first horizontal chrominance non-correlation energy extractor responsive to the sample value of said specific sampling point for detecting first horizontal chrominance non-correlation energy consisting primarily of the chrominance signal in the horizontal direction; and a second horizontal chrominance non-correlation energy extractor responsive to the sample value of said specific and reference sampling point for detecting second horizontal chrominance non-correlation energy consisting primarily of the chrominance signal in the horizontal direction;

said vertical chrominance non-correlation energy extractor comprises:

a first vertical chrominance non-correlation energy extractor responsive to the sample values of said reference sampling points for detecting first vertical chrominance non-correlation energy consisting primarily or the chrominance signal in the vertical direction; and a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive the first horizontal chrominance non-correlation energy multiplied by said first predetermined coefficient and the horizontal luminance non-correlation energy multiplied by said second predetermined coefficient, and produces, as an output thereof, a larger one of the first horizontal chrominance non-correlation energy multiplied by said first predetermined coefficient and the horizontal luminance non-correlation energy multiplied by said second predetermined coefficient;

said first adder is coupled to add the first vertical chrominance non-correlation energy multiplied by said third predetermined coefficient to the vertical luminance non-correlation energy multiplied by said fourth predetermined coefficient;

said second adder is coupled to add the second vertical chrominance non-correlation energy multiplied by said fifth predetermined coefficient to the vertical luminance non-correlation energy multiplied by said sixth predetermined coefficient;

said second maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient; and said second comparator is coupled to receive the second horizontal chrominance signal non-correlation energy and the output signal of the second adder multiplied by said ninth predetermined coefficient, and produces an output signal which indicates whether the horizontal non-correlation is weak or strong based on the comparison.

61. A luminance/chrominance separating filter according to claim 59, further comprising:

a first delay circuit for delaying the output signal of the first comparator by a time length of half a period of the color subcarrier to produce a first delayed output signal;

a second delay circuit for delaying the output signal of the second comparator by said time length to produce a second delayed output signal;

a third delay circuit for delaying the output signal of the third comparator by said time length to produce a third delayed output signal;

a fourth delay circuit for delaying the third delayed output signal by said time length to produce a fourth delayed output signal;

an AND circuit for producing a logical product of the output signal of the third comparator, said third delayed output signal and said fourth delayed output signal;

wherein said decision circuit receives said first and second delayed output signals, and said logical product, and determines strength of the horizontal non-correlation and the vertical non-correlation on the basis of said first and second delayed output signals and said logical product.

62. A luminance/chrominance separating filter according to claim 61, wherein said horizontal chrominance non-correlation energy extractor comprises:
- a first horizontal chrominance non-correlation energy extractor responsive to the sample value of said specific sampling point for detecting first horizontal chrominance non-correlation energy consisting primarily of the chrominance signal in the horizontal direction; and
- a second horizontal chrominance non-correlation energy extractor responsive to the sample value of said specific and reference sampling point for detecting second horizontal chrominance non-correlation energy consisting primarily of the chrominance signal in the horizontal direction;

said vertical chrominance non-correlation energy extractor comprises:
- a first vertical chrominance non-correlation energy extractor responsive to the sample values of said reference sampling points for detecting first vertical chrominance non-correlation energy consisting primarily of the chrominance signal in the vertical direction; and
- a second vertical chrominance non-correlation energy extractor responsive to the sample values of said reference sampling points for detecting second vertical chrominance non-correlation energy consisting primarily of the chrominance signal in the vertical direction;

said first maximum value circuit is coupled to receive the first horizontal chrominance non-correlation energy multiplied by said first predetermined coefficient and the horizontal luminance non-correlation energy multiplied by said second predetermined coefficient, and produces, as an output thereof, a larger one of the first horizontal chrominance non-correlation energy multiplied by said first predetermined coefficient and the horizontal luminance non-correlation energy multiplied by said second predetermined coefficient;

said first adder is coupled to add the first vertical chrominance non-correlation energy multiplied by said third predetermined coefficient to the vertical luminance non-correlation energy multiplied by said fourth predetermined coefficient;

said second adder is coupled to add the second vertical chrominance non-correlation energy multiplied by said fifth predetermined coefficient to the vertical luminance non-correlation energy multiplied by said sixth predetermined coefficient;

said second maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient; and said second comparator is coupled to receive the second horizontal chrominance signal non-correlation energy and the output signal of the second adder multiplied by said ninth predetermined coefficient, and produces an output signal which indicates whether the horizontal non-correlation is weak or strong based on the comparison.

63. A luminance/chrominance separating filter according to claim 37, wherein said judging means comprises:
- a maximum value circuit for receiving the horizontal chrominance non-correlation energy multiplied by a first predetermined coefficient and the horizontal luminance non-correlation energy multiplied by a second predetermined coefficient, and producing, as an output thereof, a larger one of the horizontal chrominance non-correlation energy multiplied by said first predetermined coefficient and the horizontal luminance non-correlation energy multiplied by said second predetermined coefficient;
- a first adder for adding the horizontal chrominance non-correlation energy multiplied by a third predetermined coefficient to the horizontal luminance non-correlation energy multiplied by a fourth predetermined coefficient, and producing, as an output thereof, a sum of the horizontal chrominance non-correlation energy multiplied by said third predetermined coefficient and the horizontal luminance non-correlation energy multiplied by said fourth predetermined coefficient;
- a second adder for adding the horizontal chrominance non-correlation energy multiplied by a fifth predetermined coefficient to the horizontal luminance non-correlation energy multiplied by a sixth predetermined coefficient, and producing, as an output thereof, a sum of the horizontal chrominance non-correlation energy multiplied by said fifth predetermined coefficient and the horizontal luminance non-correlation energy multiplied by said sixth predetermined coefficient;
- a third adder for adding the vertical chrominance non-correlation energy multiplied by a seventh predetermined coefficient to the vertical luminance non-correlation energy multiplied by an eighth predetermined coefficient, and producing, as an output thereof, a sum of the vertical chrominance non-correlation energy multiplied by said seventh predetermined coefficient and the vertical luminance non-correlation energy multiplied by said eighth predetermined coefficient;
- a first comparator for comparing the output signal of said maximum value circuit with the output signal of said third adder multiplied by a ninth predetermined coefficient, and producing an output signal which indicates whether the horizontal non-correlation is weak or strong based on the comparison;
- a second comparator for comparing the vertical chrominance non-correlation energy with the output signal of the first adder multiplied by a tenth predetermined coefficient, and producing an output signal which indicates whether the vertical non-correlation is weak or strong based on the comparison;
- a third comparator for comparing the vertical luminance non-correlation energy with the output signal of the second adder multiplied by an eleventh predetermined coefficient, and producing an output signal which indicates whether the vertical non-correlation is weak or strong based on the comparison; and
- a decision circuit receiving the output signals of the first, second, and third comparators, determining strength of said horizontal non-correlation and said vertical non-correlation, generating said chrominance signal selection signal such that said first selector selects to output said first chrominance signal when the vertical non-correlation is strong, the second chrominance signal when the horizontal non-correlation is strong, and the third chrominance signal when neither said horizontal or vertical non-correlation is strong, and further generating said chrominance signal selection signal such that said second selector selects the output of said second horizontal chrominance extraction filter, when said first selector selects either said first or third chrominance signal.

64. A luminance/chrominance separating filter according to claim 63, wherein said horizontal chrominance non-correlation energy extractor comprises:
a first horizontal chrominance non-correlation energy extractor responsive to the sample value of said specific sampling point for detecting first horizontal chrominance non-correlation energy consisting primarily of the chrominance signal in the horizontal direction; and
a second horizontal chrominance non-correlation energy extractor responsive to the sample value of said specific and reference sampling point for detecting second horizontal chrominance non-correlation energy consisting primarily of the chrominance signal in the horizontal direction;

said vertical chrominance non-correlation energy extractor comprises:
a first vertical chrominance non-correlation energy extractor responsive to the sample values of said reference sampling points for detecting first vertical chrominance non-correlation energy consisting primarily of the chrominance signal in the vertical direction; and
a second vertical chrominance non-correlation energy extractor responsive to the sample values of said reference sampling points for detecting second vertical chrominance non-correlation energy consisting primarily of the chrominance signal in the vertical direction;

said maximum value circuit is coupled to receive the second horizontal chrominance non-correlation energy multiplied by said first predetermined coefficient and the horizontal luminance non-correlation energy multiplied by said second predetermined coefficient, and produces, as an output thereof, a larger one of the second horizontal chrominance non-correlation energy multiplied by said first predetermined coefficient and the horizontal luminance non-correlation energy multiplied by said second predetermined coefficient;

said first adder is coupled to add the first horizontal chrominance non-correlation energy multiplied by said third predetermined coefficient to the horizontal luminance non-correlation energy multiplied by said fourth predetermined coefficient;

said second adder is coupled to add the first horizontal chrominance non-correlation energy multiplied by said fifth predetermined coefficient to the horizontal luminance non-correlation energy multiplied by said sixth predetermined coefficient;

said third adder is coupled to add the second vertical chrominance non-correlation energy multiplied by said seventh predetermined coefficient to the vertical luminance non-correlation energy multiplied by said eighth predetermined coefficient; and said second comparator is coupled to receive the first vertical chrominance non-correlation energy and the output signal of the first adder multiplied by said tenth predetermined coefficient, and produces an output signal which indicates whether the vertical non-correlation is weak or strong based on the comparison.

65. A luminance/chrominance separating filter according to claim 63, further comprising:
a first delay circuit for delaying the output signal of the first comparator by a time length of half a period of the color subcarrier to produce a first delayed output signal;
a second delay circuit for delaying the output signal of the second comparator by said time length to produce a second delayed output signal;
a third delay circuit for delaying the output signal of the third comparator by said time length to produce a third delayed output signal;
a fourth delay circuit for delaying the third delayed output signal by said time length to produce a fourth delayed output signal;
an AND circuit for producing a logical product of the output signal of the third comparator, said third delayed output signal and said fourth delayed output signal;
wherein said decision circuit receives said first and second delayed output signals, and said logical product, and determines strength of the horizontal non-correlation and the vertical non-correlation on the basis of said first and second delayed output signals and said logical product.

66. A luminance/chrominance separating filter according to claim 65, wherein said horizontal chrominance non-correlation energy extractor comprises:
a first horizontal chrominance non-correlation energy extractor responsive to the sample value of said specific sampling point for detecting first horizontal chrominance non-correlation energy consisting primarily of the chrominance signal in the horizontal direction; and
a second horizontal chrominance non-correlation energy extractor responsive to the sample value of said specific and reference sampling point for detecting second horizontal chrominance non-correlation energy consisting primarily of the chrominance signal in the horizontal direction;

said vertical chrominance non-correlation energy extractor comprises:
a first vertical chrominance non-correlation energy extractor responsive to the sample values of said reference sampling points for detecting first vertical chrominance non-correlation energy consisting primarily of the chrominance signal in the vertical direction; and
a second vertical chrominance non-correlation energy extractor responsive to the sample values of said reference sampling points for detecting second vertical chrominance non-correlation energy consisting primarily of the chrominance signal in the vertical direction;

said maximum value circuit is coupled to receive the second horizontal chrominance non-correlation energy multiplied by said first predetermined coefficient and the horizontal luminance non-correlation energy multiplied by said second predetermined coefficient, and produces, as an output thereof, a larger one of the second horizontal chrominance non-correlation energy multiplied by said first predetermined coefficient and the horizontal luminance non-correlation energy multiplied by said second predetermined coefficient;

said first adder is coupled to add the first horizontal chrominance non-correlation energy multiplied by said third predetermined coefficient to the horizontal luminance non-correlation energy multiplied by said fourth predetermined coefficient;

said second adder is coupled to and the first horizontal chrominance non-correlation energy multiplied by said fifth predetermined coefficient to the horizontal luminance non-correlation energy multiplied by said sixth predetermined coefficient;

said third adder is coupled to add the second vertical chrominance non-correlation energy multiplied by said seventh predetermined coefficient to the vertical luminance non-correlation energy multiplied by said eighth predetermined coefficient; and said second comparator is coupled to receive the first vertical chrominance non-correlation energy and the output signal of the first adder multiplied by said tenth predetermined coefficient, and produces an output signal which indicates whether the vertical non-correlation is weak or strong based on the comparison.

67. A luminance/chrominance separating filter according to claim 37, wherein said judging means comprises:

a first adder for adding the horizontal chrominance non-correlation energy multiplied by a first predetermined coefficient to the horizontal luminance non-correlation energy multiplied by a second predetermined coefficient, and producing, as an output thereof, a sum of the horizontal chrominance non-correlation energy multiplied by said first predetermined coefficient and the horizontal luminance non-correlation energy multiplied by said second predetermined coefficient;

a second adder for adding the vertical chrominance non-correlation energy multiplied by a third predetermined coefficient to the vertical luminance non-correlation energy multiplied by a fourth predetermined coefficient, and producing, as an output thereof, a sum of the vertical chrominance non-correlation energy multiplied by said third predetermined coefficient and the vertical luminance non-correlation energy multiplied by said fourth predetermined coefficient;

a third adder for adding the vertical chrominance non-correlation energy multiplied by a fifth predetermined coefficient to the vertical luminance non-correlation energy multiplied by a sixth predetermined coefficient, and producing, as an output thereof, a sum of the vertical chrominance non-correlation energy multiplied by said fifth predetermined coefficient and the vertical luminance non-correlation energy multiplied by said sixth predetermined coefficient;

a maximum value circuit coupled to receive the vertical chrominance non-correlation energy multiplied by a seventh predetermined coefficient and the vertical luminance non-correlation energy multiplied by an eighth predetermined coefficient, and producing, as an output thereof, a larger one of the vertical chrominance non-correlation energy multiplied by said seventh predetermined coefficient and the vertical luminance non-correlation energy multiplied by said eighth predetermined coefficient;

a first comparator for comparing the output signal of said second adder with the output signal of said first adder multiplied by a ninth predetermined coefficient, and producing an output signal which indicates whether the vertical non-correlation is weak or strong based on the comparison;

a second comparator for comparing the horizontal chrominance signal non-correlation energy with the output signal of the third adder multiplied by a tenth predetermined coefficient, and producing an output signal which indicates whether the horizontal non-correlation is weak or strong based on the comparison;

a third comparator for comparing the horizontal luminance non-correlation energy with the output signal of the maximum value circuit multiplied by an eleventh predetermined coefficient, and producing an output signal which indicates whether the horizontal non-correlation is weak or strong based on the comparison; and a decision circuit receiving the output signals of the first, second, and third comparators, determining strength of said horizontal non-correlation and said vertical non-correlation, generating said chrominance signal selection signal such that said first selector selects to output said first chrominance signal when the vertical non-correlation is strong, the second chrominance signal when the horizontal non-correlation is strong, and the third chrominance signal when neither said horizontal or vertical non-correlation is strong, and generating said chrominance signal selection signal such that said second selector selects the output of said second horizontal chrominance extraction filter, when said first selector selects either said first or third chrominance signal.

68. A luminance/chrominance separating filter according to claim 67, wherein said horizontal chrominance non-correlation energy extractor comprises:

a first horizontal chrominance non-correlation energy extractor responsive to the sample value of said specific sampling point for detecting first horizontal chrominance non-correlation energy consisting primarily of the chrominance signal in the horizontal direction; and a second horizontal chrominance non-correlation energy extractor responsive to the sample value of said specific and reference sampling point for detecting second horizontal chrominance non-correlation energy consisting primarily of the chrominance signal in the horizontal direction;

said vertical chrominance non-correlation energy extractor comprises:

a first vertical chrominance non-correlation energy extractor responsive to the sample values of said reference sampling points for detecting first vertical chrominance non-correlation energy consisting primarily of the chrominance signal in the vertical direction; and a second vertical chrominance non-correlation energy extractor responsive to the sample values of said reference sampling points for detecting second vertical chrominance non-correlation energy consisting primarily of the chrominance signal in the vertical direction;

said first adder is coupled to add the first horizontal chrominance non-correlation energy multiplied by said first predetermined coefficient to the horizontal luminance non-correlation energy multiplied by said second predetermined coefficient;

said second adder is coupled to add the first vertical chrominance non-correlation energy multiplied by said third predetermined coefficient to the vertical luminance non-correlation energy multiplied by said fourth predetermined coefficient;

said third adder is coupled to add the second vertical chrominance non-correlation energy multiplied by said fifth predetermined coefficient to the vertical luminance non-correlation energy multiplied by said sixth predetermined coefficient;

said maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient; and said second comparator is coupled to receive the second horizontal chrominance signal non-correlation energy and the output signal of the third adder multiplied by said tenth predetermined coefficient, and produces an output signal which indicates whether the horizontal non-correlation is weak or strong based on the comparison.

69. A luminance/chrominance separating filter according to claim 67, further comprising:

a first delay circuit for delaying the output signal of the first comparator by a time length of half a period of the color subcarrier to produce a first delayed output signal;

a second delay circuit for delaying the output signal of the second comparator by said time length to produce a second delayed output signal;

a third delay circuit for delaying the output signal of the third comparator by said time length to produce a third delayed output signal;

a fourth delay circuit for delaying the third delayed output signal by said time length to produce a fourth delayed output signal;

an AND circuit for producing a logical product of the output signal of the third comparator, said third delayed output signal and said fourth delayed output signal;

wherein said decision circuit receives said first and second delayed output signals, and said logical product, and determines strength of the horizontal non-correlation and the vertical non-correlation on the basis of said first and second delayed output signals and said logical product.

70. A luminance/chrominance separating filter according to claim 69, wherein said horizontal chrominance non-correlation energy extractor comprises:

a first horizontal chrominance non-correlation energy extractor responsive to the sample value of said specific sampling point for detecting first horizontal chrominance non-correlation energy consisting primarily of the chrominance signal in the horizontal direction; and a second horizontal chrominance non-correlation energy extractor responsive to the sample value of said specific and reference sampling point for detecting second horizontal chrominance non-correlation energy consisting primarily of the chrominance signal in the horizontal direction;

said vertical chrominance non-correlation energy extractor comprises:

a first vertical chrominance non-correlation energy extractor responsive to the sample values of said reference sampling points for detecting first vertical chrominance non-correlation energy consisting primarily of the chrominance signal in the vertical direction; and a second vertical chrominance non-correlation energy extractor responsive to the sample values of said reference sampling points for detecting second vertical chrominance non-correlation energy consisting primarily of the chrominance signal in the vertical direction;

said first adder is coupled to add the first horizontal chrominance non-correlation energy multiplied by said first predetermined coefficient to the horizontal luminance non-correlation energy multiplied by said second predetermined coefficient;

said second adder is coupled to add the first vertical chrominance non-correlation energy multiplied by said third predetermined coefficient to the vertical luminance non-correlation energy multiplied by said fourth predetermined coefficient;

said third adder is coupled to add the second vertical chrominance non-correlation energy multiplied by said fifth predetermined coefficient to the vertical luminance non-correlation energy multiplied by said sixth predetermined coefficient;

said maximum value circuit is coupled to receive the second vertical chrominance non-correlation energy multiplied by said seventh predetermined coefficient and the vertical luminance non-correlation energy multiplied by said eighth predetermined coefficient, and produces, as an output thereof, a larger one of the second vertical chrominance non-correlation energy multiplied by said seventh predetermined coefficient and the vertical luminance non-correlation energy multiplied by said eighth predetermined coefficient; and said second comparator is coupled to receive the second horizontal chrominance signal non-correlation energy and the output signal of the third adder multiplied by said tenth predetermined coefficient, and produces an output signal which indicates whether the horizontal non-correlation is weak or strong based on the comparison.

71. A luminance/chrominance separating filter according to claim 1, further comprising:

a picture non-correlation decision circuit responsive to the sample values of said specific reference sampling points for detecting the non-correlation in the horizontal direction and the non-correlation in the vertical direction of said sample values and outputting said chrominance signal selection signal indicative of said non-correlation in said horizontal and vertical directions.

72. A luminance/chrominance separating filter according to claim 71, wherein said picture non-correlation decision circuit generates said chrominance signal selection signal such that said first selector selects said first chrominance signal when the vertical non-correlation is strong, selects said second chrominance signal when the horizontal non-correlation is strong, and selects said third chrominance signal when neither said horizontal or vertical non-correlation is strong, and further generates said chrominance signal selection signal such that said second selector selects said output of said second horizontal chrominance extraction filter when said first selector selects either said first or third chrominance signal.

73. A luminance/chrominance separating filter according to claim 72, wherein output of said second selector is used for calculation with the sample value of the specific sampling point of the composite color television signal to produce an output luminance signal.

74. A luminance/chrominance separating filter according to claim 72, wherein output of said second selector is used as an output chrominance signal.

* * * * *